(12) United States Patent
Collingwood et al.

(10) Patent No.: US 12,552,770 B2
(45) Date of Patent: Feb. 17, 2026

(54) COMPOUNDS FOR TREATING RESPIRATORY DISEASE

(71) Applicant: TMEM16A Limited, Welwyn Garden City (GB)

(72) Inventors: Stephen Collingwood, Brighton (GB); Clive Mccarthy, Abingdon (GB); Duncan Alexander Hay, Abingdon (GB); Jonathan David Hargrave, Abingdon (GB); Albert Ma, Abingdon (GB); Thomas Beauregard Schofield, Abingdon (GB); Matthew Smith, Abingdon (GB); Edward Walker, Abingdon (GB); Naomi Went, Abingdon (GB); Peter Ingram, Abingdon (GB); Christopher Stimson, Abingdon (GB); Someina Khor, Abingdon (GB)

(73) Assignee: TMEM16A Limited, Welwyn Garden City (GB)

( * ) Notice: Subject to any disclaimer, the term of this patent is extended or adjusted under 35 U.S.C. 154(b) by 966 days.

(21) Appl. No.: 17/547,940

(22) Filed: Dec. 10, 2021

(65) Prior Publication Data
US 2022/0098167 A1    Mar. 31, 2022

Related U.S. Application Data

(63) Continuation of application No. PCT/GB2020/051415, filed on Jun. 12, 2020.

(51) Int. Cl.
*C07D 401/06* (2006.01)
*C07D 231/56* (2006.01)
(Continued)

(52) U.S. Cl.
CPC ........ *C07D 401/06* (2013.01); *C07D 231/56* (2013.01); *C07D 235/08* (2013.01);
(Continued)

(58) Field of Classification Search
CPC ... C07D 401/06; C07D 231/56; C07D 235/08
(Continued)

(56) References Cited

U.S. PATENT DOCUMENTS

2004/0204409 A1    10/2004    Ando et al.
2005/0239767 A1    10/2005    Chan et al.
(Continued)

FOREIGN PATENT DOCUMENTS

| CN | 108689942 A | 10/2018 |
|---|---|---|
| EA | 201890532 A1 | 9/2018 |

(Continued)

OTHER PUBLICATIONS

U.S. Appl. No. 18/332,551, filed Jun. 9, 2023, Benzimidazole Derivatives for Treating Respiratory.*
(Continued)

*Primary Examiner* — Jeffrey S Lundgren
*Assistant Examiner* — Heather Dahlin
(74) *Attorney, Agent, or Firm* — Robert C. Hall

(57) ABSTRACT

Compounds of general formula (I) and their tautomeric forms all enantiomers and isotopic variants and salts and solvates thereof:

(I)

(Continued)

wherein

--- represents a single or a double bond and R¹, R², X¹, X², X³, X⁴, X⁵, Y and Z are as defined herein;

are useful for treating respiratory disease and other diseases and conditions modulated by TMEM16A.

8 Claims, 1 Drawing Sheet

(51) Int. Cl.

| | | |
|---|---|---|
| C07D 235/08 | (2006.01) | |
| C07D 263/56 | (2006.01) | |
| C07D 405/06 | (2006.01) | |
| C07D 405/12 | (2006.01) | |
| C07D 413/10 | (2006.01) | |
| C07D 471/04 | (2006.01) | |

(52) U.S. Cl.
CPC ......... *C07D 263/56* (2013.01); *C07D 405/06* (2013.01); *C07D 405/12* (2013.01); *C07D 413/10* (2013.01); *C07D 471/04* (2013.01)

(58) Field of Classification Search
USPC ......................................................... 514/338
See application file for complete search history.

(56) References Cited

U.S. PATENT DOCUMENTS

| | | |
|---|---|---|
| 2007/0203143 A1 | 8/2007 | Sheppard et al. |
| 2009/0163545 A1 | 6/2009 | Goldfarb |
| 2010/0105663 A1 | 4/2010 | Siegel et al. |
| 2014/0243321 A1 | 8/2014 | Arnold et al. |

FOREIGN PATENT DOCUMENTS

| | | | |
|---|---|---|---|
| WO | 2006084246 A2 | 8/2006 | |
| WO | 2007043653 A1 | 4/2007 | |
| WO | 2009019504 A1 | 2/2009 | |
| WO | 2010105663 A1 | 9/2010 | |
| WO | 2011099832 A2 | 8/2011 | |
| WO | WO2019145726 * | 8/2013 | ........... C07D 213/72 |
| WO | 2017087608 A1 | 5/2017 | |
| WO | 2017221008 A1 | 12/2017 | |
| WO | 2018195127 A1 | 10/2018 | |
| WO | 2019077340 A1 | 4/2019 | |
| WO | 2019145726 A1 | 8/2019 | |
| WO | 2020051207 A2 | 3/2020 | |

OTHER PUBLICATIONS

2-Cyclohexyl-N-[2-(morpholin-4-ylmethyl)-3H-benzimidazol-5-yl]acetamide, PubChem, Nov. 26, 2010, p. 1-7. (Year: 2010).*

CAS Registry No. 2198650-19-8, SciFinder, last visited Jun. 16, 2025, uploaded Mar. 25, 2018, p. 1. (Year: 2018).*

CAS Registry No. 2199952-23-1 , SciFinder, last visited Jun. 16, 2025, uploaded Mar. 27, 2018, p. 1. (Year: 2018).*

CAS Registry No. 2201722-73-6 , SciFinder, last visited Jun. 16, 2025, uploaded Mar. 29, 2018, p. 1. (Year: 2018).*

Namkung W, Yao Z, Finkbeiner WE, Verkman AS. Small-molecule activators of TMEM16A, a calcium-activated chloride channel, stimulate epithelial chloride secretion and intestinal contraction. The FASEB Journal. Nov. 2011;25(11):4048. (Year: 2011).*

Accurso et al., Denufosol Tetrasodium in Patients with Cystic Fibrosis and Normal to Mildly Impaired Lung Function, American Journal of Respiratory and Critical Care Medicine, 2011, vol. 183, pp. 627-634.

Kellerman et al., Denufosol: a review of studies with inhaled P2Y(2) agonists that led to Phase 3, Pulmonary Pharmacology & Therapeutics, 2008, vol. 21, pp. 600-607.

Kunzelmann et al., Pharmacotherapy of the Ion Transport Defect in Cystic Fibrosis: Role of Purinergic Receptor Agonists and Other Potential Therapeutics, Am J Respir Med, 2003, 2(4):299-309, Abstract.

International Search Report and Written Opinion received for PCT Patent International Application No. PCT/GB2020/051415, mailed Aug. 10, 2020, 20 pages.

Adams et al. "Quinone Imides. XVIII. P-quinonedipivalimides And Their Reactions", *J. Am. Chem. Soc.*, 1952, 74,3660-3664.

Losch et al. "Easy, Green and Safe Carbonylation Reactions through Zeolite-Catalyzed Carbon Monoxide Production from Formic Acid", *ASC*, Sep. 11, 2015, 357,2931-2938.

Punna et al. "A Hierarchy of Aryloxide Deprotection by Boron Tribromide", Organic Letters, Aug. 5, 2004, 6,2777-2779.

Schoenberger et al. "ChemInform Abstract: Novel Small Molecule Epithelial Sodium Channel Inhibitors as Potential Therapeutics in Cystic Fibrosis—a Patent Evaluation", *Expert Opin. Ther. Pat.*, Oct. 1, 2013, 23,1383-1389.

Tekiner-Gulbas et al. "Synthesis And In Vitro Antimicrobial Activity Of New 2-[p-substituted-benzyl]-5-[substituted-carbonylamino]benzoxazoles", *Eur. J. Med. Chem.*, 2007, 42,1293-1299.

* cited by examiner

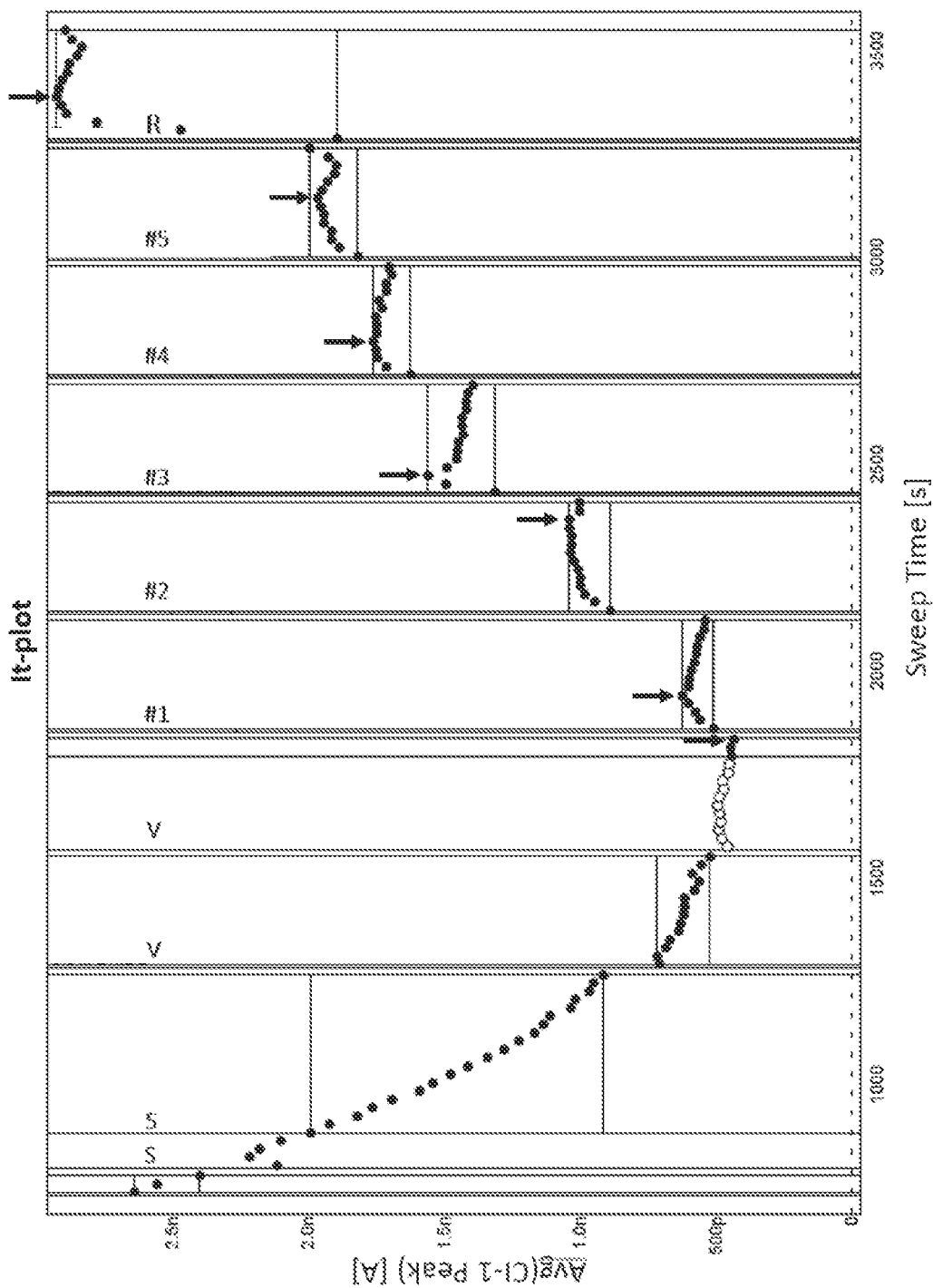

COMPOUNDS FOR TREATING RESPIRATORY DISEASE

This application is a continuation of the International Application No. PCT/GB2020/051415, filed Jun. 12, 2020, which claims the benefit of GB Application No. 1908451.6, filed Jun. 12, 2019 and GB Application No. 1917691.6, filed Dec. 4, 2019, which are incorporated hereby by reference in their entirety for all purposes.

The present invention relates to compounds including certain novel compounds which have activity as positive modulators of the calcium-activated chloride channel (CaCC), TMEM16A. The invention also relates to methods of preparing the compounds and pharmaceutical compositions containing them as well as to the use of these compounds in treating diseases and conditions modulated by TMEM16A, particularly respiratory diseases and conditions.

Humans can inhale up to 12,000 L of air each day and with it comes the potential for airborne pathogens (such as bacteria, viruses and fungal spores) to enter the airways. To protect against these airborne pathogens, the lung has evolved innate defense mechanisms to minimise the potential for infection and colonisation of the airways. One such mechanism is the mucus clearance system, whereby secreted mucus is propelled up and out of the airways by the coordinated beating of cilia together with cough clearance. This ongoing 'cleansing' of the lung constantly removes inhaled particles and microbes thereby reducing the risk of infection.

In recent years it has become clear that the hydration of the mucus gel is critical to enable mucus clearance (Boucher 2007; Matsui et al, 1998). In a normal, healthy airway, the mucus gel is typically 97% water and 3% w/v solids under which conditions the mucus is cleared by mucociliary action. The hydration of the airway mucosa is regulated by the coordinated activity of a number of ion channels and transporters. The balance of anion ($Cl^-/HCO_3^-$) secretion mediated via the Cystic Fibrosis Transmembrane Conductance Regulator (CFTR) and the Calcium Activated Chloride Conductance (CaCC; TMEM16A) and $Na^+$ absorption through the epithelial $Na^+$ channel (ENaC) determine the hydration status of the airway mucosa. As ions are transported across the epithelium, water is osmotically obliged to follow and thus fluid is either secreted or absorbed.

In respiratory diseases such as chronic bronchitis and cystic fibrosis, the % solids of the mucus gel is increased as the hydration is reduced and mucus clearance is reduced (Boucher, 2007). In cystic fibrosis, where loss of function mutations in CFTR attenuates ability of the airway to secrete fluid, the % solids can be increased to 15% which is believed to contribute towards the plugging of small airways and failure of mucus clearance. Strategies to increase the hydration of the airway mucus include either the stimulation of anion and thereby fluid secretion or the inhibition of $Na^+$ absorption. To this end, stimulating the activity of TMEM16A channels will increase anion secretion and therefore increase fluid accumulation in the airway mucosa, hydrate mucus and enhance mucus clearance mechanisms.

TMEM16A, also referred to as Anoctamin-1 (Ano1), is the molecular identity of calcium-activated chloride channels (Caputo et al, 2008; Yang et al, 2008). TMEM16A channels open in response to elevation of intracellular calcium levels and allow the bidirectional flux of chloride, bicarbonate and other anions across the cell membrane. Functionally TMEM16A channels have been proposed to modulate transepithelial ion transport, gastrointestinal peristalsis, nociception and cell migration/proliferation (Pedemonte & Galietta, 2014).

TMEM16A channels are expressed by the epithelial cells of different organs including the lungs, liver, kidney, pancreas and salivary glands. In the airway epithelium TMEM16A is expressed at high levels in mucus producing goblet cells, ciliated cells and in submucosal glands. Physiologically TMEM16A is activated by stimuli which mobilise intracellular calcium, particularly purinergic agonists (ATP, UTP), which are released by the respiratory epithelium in response to cyclical shear stress caused by breathing and other mechanical stimuli such as cough. In addition to increasing anion secretion leading to enhanced hydration of the airways, activation of TMEM16A plays an important role in bicarbonate secretion. Bicarbonate secretion is reported to be an important regulator of mucus properties and in controlling airway lumen pH and hence the activity of native antimicrobials such as defensins (Pezzulo et al, 2012).

Indirect modulation of TMEM16A, via elevation of intracellular calcium, has been clinically explored e.g. denufosol (Kunzelmann & Mall, 2003). Although encouraging initial results were observed in small patient cohorts this approach did not deliver clinical benefit in larger patient cohorts (Accurso et al 2011; Kellerman et al 2008). This lack of clinical effect was ascribed to only a transient elevation in anion secretion, the result of a short half-life of denufosol on the surface of the epithelium and receptor/pathway desensitisation, and unwanted effects of elevating intracellular calcium such as increased release of mucus from goblet cells (Moss, 2013). Compounds which act directly upon TMEM16A to enhance channel opening at low levels of calcium elevation are expected to durably enhance anion secretion and mucociliary clearance in patients and improve innate defense. As TMEM16A activity is independent of CFTR function, TMEM16A positive modulators have the potential to deliver clinical benefit to all CF patients and non-CF respiratory diseases characterised by mucus congestion including chronic bronchitis and severe asthma.

TMEM16A modulation has been implicated as a therapy for dry mouth (xerostomia), resultant from salivary gland dysfunction in Sjorgen's syndrome and radiation therapy, dry eye, cholestasis and gastrointestinal motility disorders.

Our application, PCT/GB2019/050209 relates to compounds which are positive modulators of TMEM16A and which are therefore of use in the treatment of diseases and conditions in which modulation of TMEM16A plays a role, particularly respiratory diseases and conditions. The present inventors have developed further compounds which are positive modulators of TMEM16A.

In a first aspect of the present invention there is provided a compound of general formula (I) including all tautomeric forms all enantiomers and isotopic variants and salts and solvates thereof:

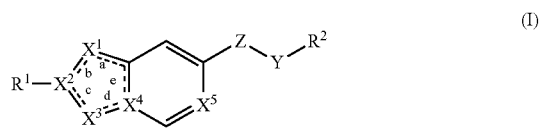

wherein represents a single or a double bond;

$X^1$ is N, $X^3$ is NH, $X^2$ and $X^4$ are C, a, c and d are single bonds and b and e are double bonds; or $X^1$ is NH, $X^3$ is N, $X^2$ and $X^4$ are C, a, b and d are single bonds and c and e are double bonds; or $X^1$ is N, $X^2$ is N, $X^3$ is $CR^3$ or $C-N(R^{3a})(R^{3b})$, $X^4$ is C; b, c and e are single bonds and a and d are double bonds;

each $R^3$, $R^{3a}$ and $R^{3b}$ is independently H or methyl; or $X^1$ is N, $X^3$ is O, $X^2$ and $X^4$ are C, a, c and d are single bonds and b and e are double bonds;

$X^1$ and $X^4$ are N, $X^2$ is C and $X^3$ is CH; a and c are double bonds and b, d and e are single bonds;

$X^1$ is O, $X^3$ is N, $X^2$ and $X^4$ are C, a, b and d are single bonds and c and e are double bonds;

$X^5$ is CH or N;

$R^1$ is i. $-O-R^5$, provided that $X^2$ is not N;
   wherein $R^5$ is a 5- or 6-membered carbocyclyl or heterocyclyl group optionally substituted with OH; or ii. $CH(R^7)-N(R^8)-C(O)OR^9$
   $R^7$ is H, phenyl or $C_{1-3}$ alkyl optionally substituted with one or more substituents selected from OH and $O(C_{1-4}$ alkyl);
   $R^8$ is H, methyl or $C_{2-3}$ alkyl optionally substituted with one or more substituents selected from OH and methoxy;
   $R^9$ is $C_{1-4}$ alkyl, optionally substituted with one or more substituents selected from halo, OH and methoxy; or
   $R^7$ and $R^8$ together with the atoms to which they are attached combine to form a 5- or 6-membered heterocyclic ring optionally containing a further heteroatom selected from N, O and S and optionally substituted with $C_{1-3}$ alkyl; or iii. $CH(R^7)-N(R^8)-C(O)N(R^9)(R^{10})$;
   $R^7$, $R^8$ and $R^9$ are as defined above and $R^{10}$ is H or methyl; or iv. $CH(R^{11})(R^{12})$;
   $R^{11}$ is H, methyl, $CH_2OR^{13}$, $OR^{13}$ or $N(R^{13})(R^{14})$;
   each $R^{13}$ and $R^{14}$ is independently H or methyl; and
   $R^{12}$ is selected from:
      a 5- or 6-membered carbocyclyl or oxygen-containing heterocyclyl ring, wherein said carbocyclyl or heterocyclyl ring is optionally substituted with OH; and
      a 6-membered aryl or 6-membered heteroaryl ring, wherein said aryl or heteroaryl ring is optionally substituted with one or more substituents selected from OH; methoxy; chloro; fluoro; $C_{1-6}$ alkyl optionally substituted with one or more substituents selected from halo, OH and CN; a 3- to 6-membered cycloalkyl or heterocyclyl group, wherein said cycloalkyl or heterocyclyl group is optionally substituted with one or more substituents selected from halo, OH, CN and $C_{1-6}$ alkyl optionally substituted with one or more substituents selected from halo, OH and CN; and a 5-membered heteroaryl group optionally substituted with one or more substituents selected from $C_{1-4}$ alkyl and halo; or
      when $R^{12}$ is a 6-membered aryl or heteroaryl ring, a substituent on $R^{12}$ may combine with $R^{11}$ and, together with the atom to which they are attached, form a 5- or 6-membered ring fused to the 6-membered aryl or heteroaryl ring $R^{12}$, wherein the 5- or 6-membered ring is optionally substituted with $C_{1-3}$ alkyl; or v. $C_{2-6}$ alkyl optionally substituted with one or more substituents selected from phenyl, $OR^{15}$ and $N(R^{15})(R^{16})$;
   each $R^{15}$ and $R^{16}$ is independently selected from H or $C_{1-3}$ alkyl; or vi. a 3- to 8-membered cycloalkyl ring optionally substituted with one or more substituents selected from OH, CN, halo and $C_{1-4}$ alkyl optionally substituted with one or more substituents selected from halo, OH and CN;

Z is a linker selected from $-NH-C(O)-$ and $-C(O)-NH-$;

Y is $-CH_2-$ or $-CH(CH_3)-$;

$R^2$ is 6- to 10-membered aryl, 5- to 10-membered heteroaryl or 3- to 10-membered carbocyclic ring system, wherein the aryl, heteroaryl or carbocyclic ring system is optionally substituted with one or more substituents selected from fluoro; chloro; CN; nitro; OH; $C_{1-6}$ alkyl optionally substituted with one or more substituents selected from halo, OH and CN; $O(C_{1-6}$ alkyl) optionally substituted with one or more substituents selected from halo, OH and CN, and $NH-C(O)O-C_{1-6}$ alkyl optionally substituted with one or more substituents selected from halo and OH; or Y and $R^2$ together form a group $-CH_2-C(R^{17})(R^{18})-CH_2-N(R^{19})-C(O)OR^{20}$;
   wherein each of $R^{17}$, $R^{18}$ and $R^{19}$ is independently H or $C_{1-4}$ alkyl or $R^{18}$ and $R^{19}$ combine and together with the atoms to which they are attached form a 5- or 6-membered heterocyclic ring optionally substituted with $C_{1-3}$ alkyl; and
   $R^{20}$ is $C_{1-6}$ alkyl optionally substituted with one or more halo substituents; or Y and $R^2$ together form a $C_3$-10 alkyl group substituted with one or more substituents selected from halo, OH and CN; or Y and $R^2$ together form a 3- to 8-membered carbocyclic ring optionally substituted with one or more substituents selected from halo, OH, CN and $C_{1-6}$ alkyl optionally substituted with one or more substituents selected from halo, OH and CN;

provided that:

I. when $X^1$ is N, $X^3$ is NH, $X^2$ and $X^4$ are C, a, c and d are single bonds and b and e are double bonds:
   A. when $R^1$ is $CH(R^{11})(R^{12})$; where $R^{11}$ is H or methyl and $R^{12}$ is phenyl which is unsubstituted or substituted with 1 or 2 substituents, wherein the substituents are selected from halo and methoxy:
      i. $R^2$ is not phenyl or heteroaryl, wherein said phenyl or heteroaryl is optionally substituted with 1 or 2 substituents selected from halo, $C_{1-4}$ alkyl, $C_{1-4}$ alkoxy and a 5-membered heteroaryl ring; and
      ii. Y and $R^2$ do not combine to form a 3- to 8-membered cycloalkyl ring optionally substituted with methyl; or a $C_{3-10}$ alkyl group optionally substituted with CN
   B. when $R^1$ is $CH(R^{11})(R^{12})$; where $R^{12}$ is phenyl and $R^{11}$ together with a substituent on $R^{12}$ and the atoms to which they are attached combine to form a 5- or 6-membered ring fused to the phenyl ring $R^{12}$, wherein the 5- or 6-membered ring is optionally substituted with $C_{1-3}$ alkyl:
      i. $R^2$ is not phenyl or heteroaryl, wherein said phenyl or heteroaryl is optionally substituted with 1, 2 or 3 substituents, wherein the substituents are selected from halo, $C_{1-4}$ alkyl, $C_{1-4}$ haloalkyl and $C_{1-4}$ alkoxy; and ii. Y and $R^2$ do not combine to form $C_{3-10}$ alkyl substituted with CN;
C. when $R^1$ is $CH(R^{11})(R^{12})$; where $R^{11}$ is H and $R^{12}$ is cyclohexyl:
  $R^2$ is not phenyl optionally substituted with 1, 2 or 3 substituents, wherein the substituents are selected from halo, methyl, methoxy; unsubstituted 5- to 8 membered heteroaryl;
D. when $R^1$ is $C_{2-6}$ alkyl optionally substituted with a single substituent selected from OH and phenyl:
  $R^2$ is not phenyl or 5- to 10 membered heteroaryl, either of which is optionally substituted with one or two substituents, wherein the substituents are selected from halo, methyl, trifluoromethyl, $O(C_{1-4}$ alkyl) or a 5-membered heteroaryl ring;
E. when $R^1$ is an unsubstituted 3- to 8-membered cycloalkyl ring:
  $R^2$ is not phenyl optionally substituted with one substituent selected from halo, OH, methyl, trifluoromethyl, $O(C_{1-4}$ alkyl) or a 5-membered heteroaryl ring;
II. when $X^1$ is N, $X^2$ is N, $X^3$ is $CR^3$ or $C-N(R^{3a})(R^{3b})$, $X^4$ is C; b, c and e are single bonds and a and d are double bonds; each $R^3$, $R^{3a}$ and $R^{3b}$ is independently H or methyl:
A. when $R^1$ is $CH(R^{11})(R^{12})$; and $R^{11}$ is H and $R^{12}$ is phenyl which is unsubstituted or substituted with 1 or 2 substituents selected from halo and methoxy:
  $R^2$ is not phenyl optionally substituted with one halo substituent;
B. when $R^1$ is $C_{2-6}$ alkyl optionally substituted with phenyl:
  $R^2$ is not phenyl or naphthyl optionally substituted with one or two substituents selected from halo, methoxy and a 5-membered heteroaryl group;
III. when $X^1$ is N, $X^3$ is O, $X^2$ and $X^4$ are C, a, c and d are single bonds and b and e are double bonds:
A. when $R^1$ is $CH(R^{11})(R^{12})$; and $R^{11}$ is H and $R^{12}$ is phenyl which is unsubstituted or substituted with 1 or 2 substituents selected from halo and methoxy:
  i. $R^2$ is not phenyl or heteroaryl, wherein said phenyl or heteroaryl is optionally substituted with one or two substituents selected from halo, $C_{1-4}$ alkyl, $C_{1-4}$ alkoxy and a 5-membered heteroaryl group; and
  ii. Y and $R^2$ do not combine to form a $C_{3-10}$ alkyl group substituted with one or more substituents selected from halo and OH
B. when $R^1$ is $CH(R^{11})(R^{12})$; and $R^{12}$ is phenyl and a substituent on $R^{12}$ combines with $R^{11}$ and the atoms to which they are attached to form a 5- or 6-membered ring fused to the 6-membered aryl or heteroaryl ring $R^{12}$, wherein the 5- or 6-membered ring is optionally substituted with $C_{1-3}$ alkyl:
  Y and $R^2$ do not combine to form $C_{3-10}$ alkyl substituted with one or more halo substituents;
IV. when $X^1$ is O, $X^3$ is N, $X^2$ and $X^4$ are C, a, b and d are single bonds and c and e are double bonds; $R^1$ is $CH(R^{11})(R^{12})$; and $R^{11}$ is H and $R^{12}$ is phenyl which is unsubstituted or substituted with 1 or 2 substituents selected from halo and methoxy:
  i. $R^2$ is not phenyl or heteroaryl, wherein said phenyl or heteroaryl is optionally substituted with one, two or three substituents selected from halo, $C_{1-4}$ alkyl, $C_{1-4}$ alkoxy and a 5-membered heteroaryl group; and
  ii. Y and $R^2$ do not combine to form an unsubstituted 3- to 8-membered cycloalkyl ring; or a $C_{3-10}$ alkyl group optionally substituted with one or more substituents selected from halo and OH.

In some suitable compounds of general formula (I):
when $X^1$ is N, $X^2$ is N, $X^3$ is $CR^3$ or $C-N(R^{3a})(R^{3b})$, $X^4$ is C; b, c and e are single bonds and a and d are double bonds; each $R^3$, $R^{3a}$ and $R^{3b}$ is independently H or methyl:
A. when $R^1$ is $CH(R^{11})(R^{12})$; and $R^{11}$ is H and $R^{12}$ is phenyl which is unsubstituted or substituted with 1 or 2 substituents selected from halo and methoxy:
  $R^2$ is not phenyl optionally substituted with one halo substituent;
B. when $R^1$ is $C_{2-6}$ alkyl optionally substituted with phenyl:
  $R^2$ is not phenyl, thienyl or naphthyl optionally substituted with one or two substituents selected from halo, methoxy and a 5-membered heteroaryl group.

Compounds of general formula (I) are modulators of TMEM 16A and are therefore useful for the treatment or prophylaxis of diseases and conditions affected by the modulation of TMEM16A.

Throughout the specification and the claims which follow, unless the context requires otherwise, the word 'comprise', and variations such as 'comprises' and 'comprising', will be understood to imply the inclusion of a stated integer, step, group of integers or group of steps but not to the exclusion of any other integer, step, group of integers or group of steps.

In the present specification, references to "pharmaceutical use" refer to use for administration to a human or an animal, in particular a human or a mammal, for example a domesticated or livestock mammal, for the treatment or prophylaxis of a disease or medical condition. The term "pharmaceutical composition" refers to a composition which is suitable for pharmaceutical use and "pharmaceutically acceptable" refers to an agent which is suitable for use in a pharmaceutical composition. Other similar terms should be construed accordingly.

In the present specification, the term "$C_{1-6}$" alkyl refers to a straight or branched fully saturated hydrocarbon group having from 1 to 6 carbon atoms. The term encompasses methyl, ethyl, n-propyl, isopropyl, n-butyl, isobutyl and t-butyl. Other alkyl groups, for example $C_{1-10}$ alkyl are as defined above but contain different numbers of carbon atoms.

The terms "carbocyclic" and "carbocyclyl" refer to a non-aromatic hydrocarbon ring system containing from 3 to 10 ring carbon atoms, unless otherwise indicated, and optionally one or more double bond. The carbocyclic group may be a single ring or may contain two or three rings which may be fused or bridged, where carbon atoms in a bridge are included in the number of ring carbon atoms. Examples include cyclopropyl, cyclobutyl, cyclopentyl, cyclohexyl, cyclopentenyl and cyclohexenyl as well as bridged systems such as bicyclo[1.1.1]pentyl, bicyclo-[2.2.1]heptyl, bicyclo-[2.2.2]octyl and adamantyl.

In the context of the present specification, the terms "heterocyclic" and "heterocyclyl" refer to a non-aromatic ring system containing 3 to 10 ring atoms, unless otherwise indicated, including at least one heteroatom selected from N, O and S. The heterocyclic group may be a single ring or may contain two or three rings which may be fused or bridged, where bridge atoms are included in the number of ring atoms. Examples include tetrahydrofuranyl, tetrahydropyranyl, pyrrolidinyl, piperidinyl, morpholinyl, piperazinyl and thiomorpholinyl, as well as fused systems such as cyclopropyl-fused pyrrolidine. References to an oxygen containing heterocyclic ring include both rings in which the only heteroatom is oxygen, for example tetrahydrofuran and tetrahydropyran and also rings in which an additional heteroatom selected from N and S is present, or example morpholine.

The terms "aryl" and "aromatic" in the context of the present specification refer to a ring system with aromatic character having from 5 to 14 ring carbon atoms, unless otherwise indicated, and containing up to three rings. Where an aryl group contains more than one ring, not all rings must be fully aromatic in character. Examples of aromatic moieties are benzene, naphthalene, fluorene, tetrahydronaphthalene, indane and indene.

The terms "heteroaryl" and "heteroaromatic" in the context of the specification refer to a ring system with aromatic character having from 5 to 14 ring atoms, unless otherwise indicated, at least one of which is a heteroatom selected from N, O and S, and containing up to three rings. Where a heteroaryl group contains more than one ring, not all rings must be aromatic in character. Examples of heteroaryl groups include pyridine, pyrimidine, indole, indazole, thiophene, benzothiophene, benzoxazole, benzofuran, dihydrobenzofuran, tetrahydrobenzofuran, benzimidazole, benzimidazoline, quinoline and indolene.

The term "oxo" refers to a C=O substituent, where the carbon atom is a ring atom of a carbocyclyl, heterocyclyl group or a ring of an aryl or heteroaryl group which is not aromatic in character.

The term "halogen" refers to fluorine, chlorine, bromine or iodine and the term "halo" to fluoro, chloro, bromo or iodo groups. Similarly, "halide" refers to fluoride, chloride, bromide or iodide.

The term "$C_{1-6}$ haloalkyl" as used herein refers to a $C_{1-6}$ alkyl group as defined above in which one or more of the hydrogen atoms is replaced by a halo group. Any number of hydrogen atoms may be replaced, up to perhalo substitution. Examples include trifluoromethyl, chloroethyl and 1,1-difluoroethyl. A fluoroalkyl group is a haloalkyl group in which halo is fluoro.

The term "isotopic variant" refers to isotopically-labelled compounds which are identical to those recited in formula (I) but for the fact that one or more atoms are replaced by an atom having an atomic mass or mass number different from the atomic mass or mass number most commonly found in nature, or in which the proportion of an atom having an atomic mass or mass number found less commonly in nature has been increased (the latter concept being referred to as "isotopic enrichment"). Examples of isotopes that can be incorporated into compounds of the invention include isotopes of hydrogen, carbon, nitrogen, oxygen, fluorine, iodine and chlorine such as 2H (deuterium), 3H, 11C, 13C, 14C, 18F, 123I or 125I (e.g. 3H, 11C, 14C, 18F, 123I or 125I), which may be naturally occurring or non-naturally occurring isotopes.

In an alternative aspect of the invention, there is provided a compound of general formula (Ix) including all tautomeric forms all enantiomers and isotopic variants and salts and solvates thereof:

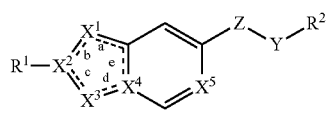

(Ix)

wherein

═ represents a single or a double bond;
$X^1$ is N, $X^3$ is NH, $X^2$ and $X^4$ are C, a, c and d are single bonds and b and e are double bonds; or
$X^1$ is NH, $X^3$ is N, $X^2$ and $X^4$ are C, a, b and d are single bonds and c and e are double bonds; or
$X^1$ is N, $X^2$ is N, $X^3$ is $CR^3$ or $C-N(R^{3a})(R^{3b})$, $X^4$ is C; b, c and e are single bonds and a and d are double bonds;
each $R^3$, $R^{3a}$ and $R^{3b}$ is independently H or methyl; or
$X^1$ is N, $X^3$ is O, $X^2$ and $X^4$ are C, a, c and d are single bonds and b and e are double bonds;
$X^1$ and $X^4$ are N, $X^2$ is C and $X^3$ is CH; a and c are double bonds and b, d and e are single bonds;
$X^1$ is O, $X^3$ is N, $X^2$ and $X^4$ are C, a, b and d are single bonds and c and e are double bonds;
$X^5$ is CH or N;
$R^1$ is
i. —O—$R^5$ or $N(R^5)(R^6)$, provided that $X^2$ is not N;
wherein $R^5$ is a 5- or 6-membered carbocyclyl or heterocyclyl group optionally substituted with OH;
$R^6$ is H, methyl or ethyl; or
ii. $CH(R^7)$—$N(R^8)$—$C(O)OR^9$
$R^7$ is H, phenyl or $C_{1-3}$ alkyl optionally substituted with one or more substituents selected from OH and $O(C_{1-4}$ alkyl);
$R^8$ is H, methyl or $C_{2-3}$ alkyl optionally substituted with one or more substituents selected from OH and methoxy;
$R^9$ is $C_{1-4}$ alkyl, optionally substituted with one or more substituents selected from halo, OH and methoxy; or
$R^7$ and $R^8$ together with the atoms to which they are attached combine to form a 5- or 6-membered heterocyclic ring optionally containing a further heteroatom selected from N, O and S and optionally substituted with $C_{1-3}$ alkyl; or
iii. $CH(R^7)$—$N(R^8)$—$C(O)N(R^9)(R^{10})$;
$R^7$, $R^8$ and $R^9$ are as defined above and $R^{10}$ is H or methyl; or
iv. $CH(R^{11})(R^{12})$;
$R^{11}$ is H, methyl, $CH_2OR^{13}$, $OR^{13}$ or $N(R^{13})(R^{14})$;
each $R^{13}$ and $R^{14}$ is independently H or methyl;
$R^{12}$ is a 5- or 6-membered carbocyclyl or heterocyclyl ring optionally substituted with OH; or a 6-membered aryl or heteroaryl ring either of which is optionally substituted with one or more substituents selected from OH, methoxy, chloro, fluoro and $C_{1-3}$ alkyl; or a 5-membered heteroaryl group optionally substituted with one or more substituents selected from $C_{1-4}$ alkyl and halo; or
when $R^{12}$ is a 6-membered aryl or heteroaryl ring, a substituent on $R^{12}$ may combine with $R^{11}$ and together with the atom to which they are attached form a 5- or 6-membered ring fused to the 6-membered aryl or heteroaryl ring $R^{12}$, wherein the 5- or 6-membered ring is optionally substituted with $C_{1-3}$ alkyl; or
v. $C_{2-4}$ alkyl optionally substituted with one or more substituents selected from phenyl, $OR^{15}$ and $N(R^{15})(R^{16})$;
each $R^{15}$ and $R^{16}$ is independently selected from H or $C_{1-3}$ alkyl;
Z is a linker selected from —NH—C(O)— and —C(O)—NH—;
Y is —$CH_2$— or —$CH(CH_3)$—;
$R^2$ is 6- to 10-membered aryl, 5- to 10-membered heteroaryl or 5- to 10-membered carbocyclic ring system, any of which is optionally substituted with one or more substituents selected from fluoro, chloro, CN, nitro, OH, $C_{1-6}$ alkyl $C_{1-6}$ haloalkyl, O($C_{1-6}$ alkyl), O($C_{1-6}$ haloalkyl) and NH—C(O)O—$C_{1-6}$ alkyl; or Y and $R^2$ together form a group —$CH_2$—C($R^{17}$)($R^{18}$)—$CH_2$—N($R^{19}$)—C(O)O$R^{20}$;

wherein each of $R^{17}$, $R^{18}$ and $R^{19}$ is independently H or $C_{1-4}$ alkyl or $R^{18}$ and $R^{19}$ combine and together with the atoms to which they are attached form a 5- or 6-membered heterocyclic ring optionally substituted with $C_{1-3}$ alkyl; and $R^{20}$ is $C_{1-6}$ alkyl optionally substituted with one or more halo substituents; or Y and $R^2$ together form an unsubstituted $C_{5-10}$ alkyl group; provided that:

(i) when $R^1$ is $C_{2-4}$ alkyl optionally substituted as defined above, $R^2$ is not aryl or heteroaryl optionally substituted as defined above; and (ii) when $R^1$ is CH($R^{11}$)($R^{12}$), wherein $R^{11}$ is H or methyl and $R^{12}$ is phenyl or cyclohexyl, either of which is optionally substituted as defined above;

$R^2$ is not aryl or heteroaryl optionally substituted as defined above; and

Y and $R^2$ do not combine to form a $C_{5-10}$ alkyl group.

More suitably, there is provided a compound of general formula (I) or (Ix) as defined above provided that:

when $R^1$ is $C_{2-6}$ alkyl, $R^2$ is not aryl or heteroaryl optionally substituted as defined above; and when $R^1$ is CH($R^{11}$)($R^{12}$), wherein $R^{11}$ is H or methyl;

$R^2$ is not aryl or heteroaryl optionally substituted as defined above; and/or

Y and $R^2$ do not combine to form a $C_{5-10}$ alkyl group substituted as defined above.

Suitably, there is provided a compound of general formula (I) or (Ix) as defined above provided that:

when $R^1$ is $C_{2-6}$ alkyl, $R^2$ is not aryl or heteroaryl optionally substituted as defined above; and when $R^1$ is CH($R^{11}$)($R^{12}$), wherein $R^{11}$ is H or methyl;

$R^2$ is not aryl or heteroaryl optionally substituted as defined above; and/or

Y and $R^2$ do not combine to form a $C_{5-10}$ alkyl group substituted as defined above.

Alternatively, there is provided a compound of general formula (I) or (Ix) as defined above provided that:

when $R^1$ is $C_{2-4}$ alkyl, $R^2$ is not aryl or heteroaryl optionally substituted as defined above; and when $R^1$ is CH($R^{11}$)($R^{12}$), wherein $R^{11}$ is H or methyl;

$R^2$ is not aryl or heteroaryl optionally substituted as defined above; and/or

Y and $R^2$ do not combine to form a $C_{5-10}$ alkyl group substituted as defined above.

In some suitable compounds of general formula (I) and (Ix):

$X^1$ is N, $X^3$ is NH, $X^2$ and $X^4$ are C, a, c and d are single bonds and b and e are double bonds; or $X^1$ is NH, $X^3$ is N, $X^2$ and $X^4$ are C, a, b and d are single bonds and c and e are double bonds; or $X^1$ is N, $X^2$ is N, $X^3$ is CR$^3$ or C—N($R^{3a}$)($R^{3b}$), $X^4$ is C; b, c and e are single bonds and a and d are double bonds;

each $R^3$, $R^{3a}$ and $R^{3b}$ is independently H or methyl; or $X^1$ is N, $X^3$ is O, $X^2$ and $X^4$ are C, a, c and d are single bonds and b and e are double bonds;

$X^1$ and $X^4$ are N, $X^2$ is C and $X^3$ is CH; a and c are double bonds and b, d and e are single bonds.

More suitably $X^1$ is N, $X^3$ is NH, $X^2$ and $X^4$ are C, a, c and d are single bonds and b and e are double bonds; or $X^1$ is NH, $X^3$ is N, $X^2$ and $X^4$ are C, a, b and d are single bonds and c and e are double bonds; or $X^1$ is N, $X^2$ is N, $X^3$ is CR$^3$ or C—N($R^{3a}$)($R^{3b}$), $X^4$ is C; b, c and e are single bonds and a and d are double bonds;

each $R^3$, $R^{3a}$ and $R^{3b}$ is independently H or methyl.

Particularly suitable compounds of general formula (I) are those in which:

$X^1$ is N, $X^3$ is NH, $X^2$ and $X^4$ are C, a, c and d are single bonds and b and e are double bonds;

or its tautomer in which $X^1$ is NH, $X^3$ is N, $X^2$ and $X^4$ are C, a, b and d are single bonds and c and e are double bonds.

In some compounds of general formula (I):

when $R^1$ is $C_{2-4}$ alkyl optionally substituted as defined above, $R^2$ is not aryl or heteroaryl optionally substituted as defined above; and when $R^1$ is CH($R^{11}$)($R^{12}$), wherein $R^{11}$ is H or methyl and $R^{12}$ is phenyl or cyclohexyl, either of which is optionally substituted as defined above;

$R^2$ is not aryl or heteroaryl optionally substituted as defined above; and/or

Y and $R^2$ do not combine to form a $C_{5-10}$ alkyl group substituted as defined above.

In other compounds of general formula (I):

When $R^1$ is $C_{2-4}$ alkyl, $R^2$ is not aryl or heteroaryl optionally substituted as defined above; and when $R^1$ is CH($R^{11}$)($R^{12}$), wherein $R^{11}$ is H or methyl;

$R^2$ is not aryl or heteroaryl optionally substituted as defined above; and

Y and $R^2$ do not combine to form a $C_{5-10}$ alkyl group.

The compound of general formula (I) may be a compound of general formula (IA), (IB), (IC), (ID) or (IE):

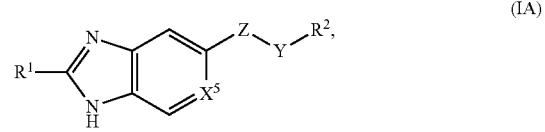

(IA)

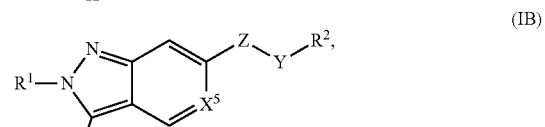

(IB)

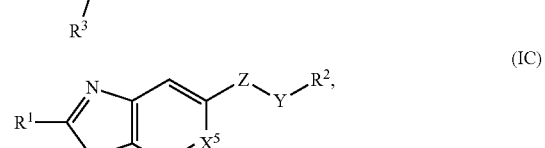

(IC)

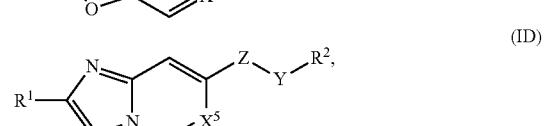

(ID)

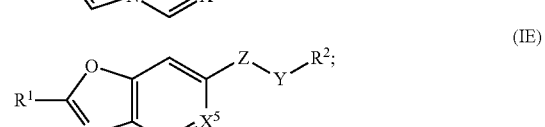

(IE)

wherein $R^1$, $X^5$, Z, Y and $R^2$ are as defined for general formula (I) or for general formula (Ix).

The compound of general formula (IA) may be also be in the tautomeric form:

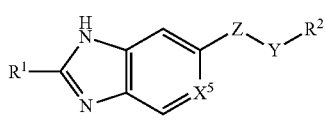

In some cases, the compound of general formula (I) is a compound of general formula (IA).

In some cases, the compound of general formula (I) is a compound of general formula (IB).

In some cases, the compound of general formula (I) is a compound of general formula (IC).

In some cases, the compound of general formula (I) is a compound of general formula (ID).

In some cases, the compound of general formula (I) is a compound of general formula (IE).

The invention also provides:

a compound of general formula (IA) wherein $R^1$, $X^5$, Z, Y and $R^2$ are as defined for general formula (I) or for general formula (Ix), provided that:
  A. when $R^1$ is $CH(R^{11})(R^{12})$; where $R^{11}$ is H or methyl and $R^{12}$ is phenyl which is unsubstituted or substituted with 1 or 2 substituents, wherein the substituents are selected from halo and methoxy:
    i. $R^2$ is not phenyl or heteroaryl, wherein said phenyl or heteroaryl is optionally substituted with 1 or 2 substituents selected from halo, $C_{1-4}$ alkyl, $C_{1-4}$ alkoxy and a 5-membered heteroaryl ring; and
    ii. Y and $R^2$ do not combine to form a 3- to 8-membered cycloalkyl ring optionally substituted with methyl; or a $C_{3-10}$ alkyl group substituted with CN
  B. when $R^1$ is $CH(R^{11})(R^{12})$; where $R^{11}$ is H and $R^{12}$ is phenyl and a substituent on $R^{12}$ combines with $R^{11}$ and the atoms to which they are attached to form a 5- or 6-membered ring fused to the 6-membered aryl or heteroaryl ring $R^{12}$, wherein the 5- or 6-membered ring is optionally substituted with $C_{1-3}$ alkyl:
    i. $R^2$ is not phenyl or heteroaryl, wherein said phenyl or heteroaryl is optionally substituted with 1, 2 or 3 substituents, wherein the substituents are selected from halo, $C_{1-4}$ alkyl, $C_{1-4}$ haloalkyl and $C_{1-4}$ alkoxy; and
    ii. Y and $R^2$ do not combine to form $C_{3-10}$ alkyl substituted with CN;
  C. when $R^1$ is $CH(R^{11})(R^{12})$; where $R^{11}$ is H and $R^{12}$ is cyclohexyl:
    $R^2$ is not phenyl optionally substituted with 1, 2 or 3 substituents, wherein the substituents are selected from halo, methyl, methoxy; unsubstituted 5- to 8 membered heteroaryl;
  D. when $R^1$ is $C_{2-6}$ alkyl optionally substituted with a single substituent selected from OH and phenyl:
    $R^2$ is not phenyl or 5- to 10 membered heteroaryl, either of which is optionally substituted with one or two substituents, wherein the substituents are selected from halo, methyl, trifluoromethyl, $O(C_{1-4}$ alkyl) or a 5-membered heteroaryl ring;
  E. when $R^1$ is an unsubstituted 3- to 8-membered cycloalkyl ring:
    $R^2$ is not phenyl optionally substituted with one substituent selected from halo, OH, methyl, trifluoromethyl, $O(C_{1-4}$ alkyl) or a 5-membered heteroaryl ring; and a compound of general formula (IB) wherein $R^1$, $X^5$, Z, Y and $R^2$ are as defined for general formula (I) or for general formula (Ix), provided that:
  A. when $R^1$ is $CH(R^{11})(R^{12})$; and $R^{11}$ is H and $R^{12}$ is phenyl which is unsubstituted or substituted with 1 or 2 substituents selected from halo and methoxy:
    $R^2$ is not phenyl optionally substituted with one halo substituent;
  B. when $R^1$ is $C_{2-6}$ alkyl optionally substituted with phenyl:
    $R^2$ is not phenyl, thienyl or naphthyl optionally substituted with one or two substituents selected from halo, methoxy and a 5-membered heteroaryl group; and a compound of general formula (IC) wherein $R^1$, $X^5$, Z, Y and $R^2$ are as defined for general formula (I) or for general formula (Ix), provided that:
  when $R^1$ is $CH(R^{11})(R^{12})$, wherein $R^{11}$ is H or methyl and $R^{12}$ is phenyl optionally substituted as defined above:
    $R^2$ is not aryl or heteroaryl optionally substituted as defined above; and a compound of general formula (IC) wherein $R^1$, $X^5$, Z, Y and $R^2$ are as defined for general formula (I) or for general formula (Ix), provided that:
  A. when $R^1$ is $CH(R^{11})(R^{12})$; and $R^{11}$ is H and $R^{12}$ is phenyl which is unsubstituted or substituted with 1 or 2 substituents selected from halo and methoxy:
    i. $R^2$ is not phenyl or heteroaryl, wherein said phenyl or heteroaryl is optionally substituted with one or two substituents selected from halo, $C_{1-4}$ alkyl, $C_{1-4}$ alkoxy and a 5-membered heteroaryl group; and
    ii. Y and $R^2$ do not combine to form a $C_{3-10}$ alkyl group substituted with one or more substituents selected from halo and OH
  B. when $R^1$ is $CH(R^{11})(R^{12})$; and $R^{11}$ is H and $R^{12}$ is phenyl and a substituent on $R^{12}$ combines with $R^{11}$ and the atoms to which they are attached to form a 5- or 6-membered ring fused to the 6-membered aryl or heteroaryl ring $R^{12}$, wherein the 5- or 6-membered ring is optionally substituted with $C_{1-3}$ alkyl:
    Y and $R^2$ do not combine to form $C_{3-10}$ alkyl substituted with one or more halo substituents;

a compound of general formula (ID); and a compound of general formula (IE) wherein $R^1$, $X^5$, Z, Y and $R^2$ are as defined for general formula (I) or for general formula (Ix), provided that:
  i. $R^2$ is not phenyl or heteroaryl, wherein said phenyl or heteroaryl is optionally substituted with one, two or three substituents selected from halo, $C_{1-4}$ alkyl, $C_{1-4}$ alkoxy and a 5-membered heteroaryl group; and
  ii. Y and $R^2$ do not combine to form an unsubstituted 3- to 8-membered cycloalkyl ring; or a $C_{3-10}$ alkyl group substituted with one or more substituents selected from halo and OH.

Compounds of general formulae (IA), (IB), (IC) and (ID) are more suitable, especially compounds of general formulae (IA), (IB) and (IC) and more especially compounds of general formulae (IA) and (IB).

Compounds of general formula (IA) are particularly suitable.

Suitably in the compounds of general formulae (I), (Ix), (IA), (IB), (IC), (ID) and (IE), $X^5$ is CH.

In some compounds of the invention, Z is —NHC(O)— such that the nitrogen atom is linked to the central ring and the C(O) is linked to Y.

In other compounds of the invention, Z is —C(O)NH— such that —C(O) is linked to the central ring and the nitrogen atom is linked to Y.

In some more suitable compounds of the present invention, Y is —$CH_2$—.

In some suitable compounds of the invention, particularly compounds of general formulae (IA), (IC), (ID) and (IE), $R^1$ is $OR^5$. In these compounds, $R^5$ is suitably an unsubstituted 5- or 6-membered heterocyclyl group, especially an oxygen-containing heterocyclyl group and suitably a tetrahydrofuranyl or tetrahydropyranyl group, especially tetrahydrofuranyl, for example tetrahydrofuran-3-yl.

In other suitable compounds of the invention, $R^1$ is $CH(R^7)$—$N(R^8)$—$C(O)OR^9$. In such compounds, more suitable groups $R^7$ include H, phenyl and $C_{1-3}$ alkyl substituted with methoxy, especially H, phenyl or $CH_2OCH_3$.

$R^8$ is suitably H, methyl or ethyl optionally substituted with OH or $OCH_3$. Specific examples of $R^8$ include H, methyl, ethyl, $CH_2CH_2OCH_3$ and $CH_2CH_2OH$.

$R^9$ is suitably $C_{2-4}$ alkyl optionally substituted with one or more halo substituents. More suitably, $R^9$ is $C_{2-4}$ branched alkyl group such as i-propyl or t-butyl or a $C_{2-4}$ haloalkyl group such as 2,2,2-trifluoroethyl.

Alternatively, as described above, $R^7$ and $R^8$ together with the atoms to which they are attached may combine to form a 5- or 6-membered heterocyclic ring optionally containing a further heteroatom. In this case, the 5- or 6-membered heterocyclic ring may be a heterocyclic ring containing only the nitrogen atom attached to $R^8$ or a heterocyclic ring containing the nitrogen atom attached to $R^8$ and one further heteroatom, for example a nitrogen or oxygen atom. The ring thus formed may be substituted with $C_{1-3}$ alkyl, particularly methyl or ethyl, but is more suitably unsubstituted. Examples of such rings include pyrrolidine, piperidine, piperazine and morpholine, especially pyrrolidine and morpholine.

In still other suitable compounds of the invention, $R^1$ is $CH(R^7)$—$N(R^8)$—$C(O)N(R^9)(R^{10})$. In these compounds, more suitable $R^7$, $R^8$ and $R^9$ moieties are as defined above for the compounds in which $R^1$ is $CH(R^7)$—$N(R^8)$—$C(O)OR^9$. As set out above, $R^{10}$ is H or methyl.

In further compounds of the invention, $R^1$ is $CH(R^{11})(R^{12})$.

In some such compounds, $R^{12}$ is a 5- or 6-membered carbocyclic or oxygen-containing heterocyclic ring optionally substituted with OH.

In these compounds, $R^{11}$ is suitably H or methyl, more suitably H.

$R^{12}$ is more suitably cyclopentyl or cyclohexyl or an oxygen-containing 5- or 6-membered heterocyclic ring, optionally containing a further heteroatom, for example tetrahydrofuranyl, tetrahydropyranyl or morpholinyl. Still more suitably, $R^{12}$ is cyclopentyl, cyclohexyl tetrahydrofuranyl or tetrahydropyranyl.

As discussed above, $R^{12}$ is optionally substituted with OH. Typically, $R^{12}$ is unsubstituted or has a single OH substituent. When $R^{12}$ has a single OH substituent, it may be at the ring atom which is attached to $CH(R^{11})$.

In other compounds in which $R^1$ is $CH(R^{11})(R^{12})$, $R^{12}$ is 6-membered aryl or heteroaryl ring wherein said aryl or heteroaryl ring is optionally substituted with one or more substituents selected from OH, methoxy, chloro, fluoro, $C_{1-6}$ alkyl optionally substituted with halo or OH and a 5-membered heteroaryl group optionally substituted with one or more substituents selected from $C_{1-4}$ alkyl and halo.

More suitably in these compounds, $R^{11}$ is H, methyl or methoxy, especially H.

More suitably, $R^{12}$ is selected from phenyl or pyridyl, for example pyridin-3-yl and is suitably unsubstituted or is substituted with one or more substituents, suitably one, two or three substituents, selected from OH, methoxy, fluoro, chloro and $C_{1-4}$ alkyl optionally substituted with OH; still more suitably the phenyl or pyridyl group $R^{12}$ is unsubstituted or substituted with one, two or three substituents selected from OH, methoxy, fluoro, chloro and $C_{3-4}$ alkyl optionally substituted with OH.

In some such compounds, $R^{12}$ is unsubstituted phenyl. Alternatively, $R^{12}$ is phenyl with a single OH or methoxy substituent at the 2-, 3- or 4-position of the phenyl ring. As a further alternative, $R^{12}$ may be phenyl having a first substituent selected from OH and methoxy, especially OH, and one or two further substituents selected from halogen, CN or $C_{1-4}$ alkyl optionally substituted with halo, OH or CN.

In some particularly suitable compounds, $R^{12}$ is phenyl substituted with a first substituent selected from OH and methoxy, especially OH; and a second substituent selected from fluoro and chloro. In this case, the first substituent may be at the 2-position and the second substituent may be at the 3-, 4-, 5- or 6-position. Still more suitably, $R^{12}$ is phenyl with an OH substituent at the 2-position and a fluoro at the 3-, 4-, 5- or 6-position.

In alternative particularly suitable compounds, $R^{12}$ is phenyl with a first substituent selected from OH and methoxy, especially OH; a second substituent selected from fluoro and chloro; and a third substituent selected from $C_{1-4}$ alkyl optionally substituted with OH or CN but especially $C_{3-4}$ alkyl having a single OH substituent. More suitably, $R^{12}$ is phenyl having a first substituent which is OH, a second substituent which is fluoro and a third substituent selected from t-butyl, —$C(CH_3)_2OH$ and —$C(CH_3)_2CH_2OH$. In some examples, the third substituent is at the 4-position, the fluoro substituent is at the 2-position and OH is at the 5-position.

In further alternative compounds, $R^{12}$ is phenyl substituted with a first substituent selected from OH and methoxy, especially OH; and a second substituent selected from:
  $C_{1-6}$ alkyl optionally substituted with one or more substituents selected from halo, OH and CN; and
  3- to 6-membered cycloalkyl or heterocyclyl, wherein said cycloalkyl or heterocyclyl group is optionally substituted with one or more substituents selected from halo, OH, CN and $C_{1-6}$ alkyl optionally substituted with one or more substituents selected from halo, OH and CN.

More suitably in this case, the phenyl group $R^{12}$ is also substituted with a third substituent selected from chloro and fluoro, especially fluoro.

In other such compounds $R^{12}$ is phenyl substituted with a 5-membered heteroaryl ring optionally substituted with one or more $C_{1-4}$ alkyl groups, especially one or two such groups, suitably with one or two methyl groups. Suitable 5-membered heteroaryl groups include nitrogen-containing heteroaryl groups such as pyrrole, oxazole, thiazole and imidazole.

In other such compounds, $R^{12}$ is unsubstituted pyridyl, typically unsubstituted pyridin-3-yl. Alternatively, $R^{12}$ is pyridyl having a single substituent selected from OH, methoxy, fluoro and chloro at the ring position adjacent to the atom attached to $CH(R^{11})$. In the case where $R^{12}$ is pyridin-3-yl, the substituent may be at the 2-position. Alternatively, $R^2$ is pyridyl having one to three substituents selected from halo, OH and $C_{1-4}$ alkyl optionally substituted with OH, for example pyridyl having a substituent selected from $C_{3-4}$ alkyl groups optionally having a single OH substituent and one or two further substituents selected from OH and halo.

When $R^1$ is $CH(R^{11})(R^{12})$ in which $R^{12}$ is a 6-membered aryl or heteroaryl ring and a substituent on $R^{12}$ combines with $R^{11}$ to form a 5- or 6-membered ring fused to the 6-membered aryl or heteroaryl ring $R^{12}$, the fused 5- or 6-membered ring is suitably saturated such that the group $CH(R^{11})(R^{12})$ is, for example benzofuran, indoline or indane, especially dihydrobenzofuran.

As discussed above, $R^1$ may be $C_{2-6}$ alkyl optionally substituted with one or more substituents selected from phenyl, $OR^{15}$ and $N(R^{15})(R^{16})$. In more suitable compounds of this type, $R^1$ is $C_{2-3}$ alkyl optionally substituted with one or more substituents selected from phenyl, $OR^{15}$ and $N(R^{15})(R^{16})$, wherein each of $R^{15}$ and $R^{16}$ is independently as defined above but is especially H or methyl.

Suitably, the alkyl group $R^1$ is unsubstituted or substituted with one or more substituents, typically a single substituent, selected from phenyl and $OR^{15}$, where $R^{15}$ is as defined above but is more suitably H or methyl.

Alternatively, $R^1$ may be a 3- to 8-membered cycloalkyl ring optionally substituted with one or more substituents selected from OH, CN, halo and $C_{1-4}$ alkyl optionally substituted with one or more substituents selected from halo and OH. More suitably in this case, $R^1$ is a 3- to 6-membered ring or still more suitably a 3- to 4-membered ring optionally substituted with one or more substituents for example one or two substituents, especially one substituent, as described above. Particularly suitable substituents when $R^{12}$ is a cycloalkyl group include $C_{1-4}$ alkyl and $C_{1-4}$ haloalkyl, still more suitably $C_{1-2}$ alkyl and $C_{1-2}$ haloalkyl, for example methyl and trifluoromethyl.

In some suitable compounds of the invention, $R^2$ is a 3- to 10-membered carbocyclic ring system optionally substituted as defined above.

In some compounds of this type, $R^2$ is a bridged carbocyclic ring system such as bicyclo[1.1.1]pentanyl, bicyclo[2.1.1]hexanyl, bicyclo-[2.2.1]heptanyl, bicyclo-[2.2.2]octanyl or adamantyl, especially bicyclo-[2.2.1]heptanyl or adamantyl. Compounds in which $R^2$ is adamantyl are particularly suitable. Suitably, when $R^2$ is a bridged carbocyclic ring system, it is unsubstituted.

In other compounds of this type, $R^2$ is a carbocyclic ring system selected from cyclopropyl, cyclobutyl, cyclopentyl, cyclohexyl and cycloheptyl, any of which may be unsubstituted or substituted as defined above. More suitable substituents for such $R^2$ groups include OH, fluoro, $C_{1-6}$ alkyl, $O(C_{1-6}$ alkyl), and $NH-C(O)O-C_{1-6}$ alkyl, especially OH, $C_{1-4}$ alkyl, $O(C_{1-4}$ alkyl) and $NH-C(O)O-C_{1-4}$ alkyl, for example OH, methyl, methoxy and $NHC(O)O-C_{1-4}$ alkyl.

Suitably, when $R^2$ is a carbocyclic ring system as described above, it is unsubstituted or substituted with a single substituent as defined above. The substituent is suitably positioned at the carbon atom which is linked to the moiety Y.

More suitably, $R^2$ is an unsubstituted cyclopentyl, cyclohexyl or cycloheptyl ring, especially unsubstituted cycloheptyl.

In alternative more suitable compounds, $R^2$ is a cyclopropyl or cyclobutyl ring substituted with one or more substituents selected from halo, $C_{1-4}$ alkyl and $C_{1-4}$ haloalkyl. Still more suitably, in this case, $R^2$ is cyclopropyl substituted with $C_{1-2}$ haloalkyl, and particularly cyclopropyl substituted with a single trifluoromethyl substituent. In this case, the trifluoromethyl may be attached at the 1-position of the cyclopropyl ring, i.e. the atom by which the cyclopropyl group is attached to the remainder of the molecule.

In other compounds of the invention, $R^2$ is a 6- to 10-membered aryl or 5- to 10-membered heteroaryl ring system, optionally substituted as defined above. More suitably in this case, $R^2$ is phenyl or a 5- or 6-membered heteroaryl ring optionally substituted with one or more substituents selected from fluoro, chloro, OH, $C_{1-6}$ alkyl optionally substituted with one or more substituents selected from OH and halo, $O(C_{1-6}$ alkyl) and $O(C_{1-6}$ haloalkyl), still more suitably fluoro, chloro, OH, $C_{1-4}$ alkyl, $C_{1-4}$ alkyl substituted with OH and $O(C_{1-4}$ alkyl); and especially fluoro, chloro, OH, $C_{1-4}$ alkyl, $C_{1-4}$ alkyl substituted with OH and methoxy.

In still other compounds of the present invention, Y and $R^2$ together form a $C_{3-10}$ alkyl group substituted as defined above. In some cases, this may be a branched $C_{5-10}$ alkyl group and more suitably a branched alkyl group of the form: $CH_2C(R^{21})(R^{22})(R^{23})$, $CH(CH_3)C(R^{21})(R^{22})(R^{23})$ or $C(CH_3)_2C(R^{21})(R^{22})(R^{23})$ where each of $R^{21}$, $R^{22}$ and $R^{23}$ is $C_{1-4}$ alkyl, provided that the total number of carbon atoms in the $Y-R^2$ moiety is less than 10 and that at least one carbon atom is substituted with one or more substituents selected from halo, OH and CN.

In other more suitable compounds of the present invention, Y and $R^2$ together form a $C_{2-6}$ alkyl group substituted with one or more substituents as described above. More suitably, the $C_{2-6}$ alkyl group is substituted with one or more halo substituents. Still more suitably in compounds of this type, Y and $R^2$ together form a $C_{3-4}$ alkyl group substituted by one or more substituents as described above but more suitably with one or more halo substituents and especially with one or more fluoro substituents. An example of such a $Y-R^2$ group is $-CH_2-CH_2-CF_3$.

In further more suitable compounds of the present invention, Y and $R^2$ together form a 3- to 6-membered carbocyclic ring optionally substituted with one or more substituents as described above. More suitably, Y and $R^2$ together form a cyclopropyl or cyclobutyl ring optionally substituted as described above but more suitably substituted with one or more substituents selected from halo, $C_{1-4}$ alkyl and $C_{1-4}$ haloalkyl, especially with a single $C_{1-2}$ haloalkyl substituent such as trifluoromethyl. In this case, the trifluoromethyl may be attached at the 1-position of the cyclopropyl ring, i.e. the atom by which the cyclopropyl group is attached to the remainder of the molecule.

In still other compounds of the present invention, Y and $R^2$ together form a group $-CH_2-C(R^{17})(R^{18})-CH_2-N(R^{19})-C(O)OR^{20}$, wherein each of $R^{17}$, $R^{18}$, $R^{19}$ and $R^{20}$ is as defined above.

More suitably in this case, each $R^{18}$ and $R^{19}$ is independently H or methyl, especially methyl, or $R^{18}$ and $R^{19}$ combine with the atoms to which they are attached to form a 6-membered heterocyclic ring; and $R^{20}$ is $C_{1-6}$ alkyl, for example i-propyl, s-butyl or t-butyl.

Where compatible, the embodiments and preferences described above for compounds of formula (I) extend also to compounds of formula (Ix).

Specific examples of novel compounds of general formula (I) include the following:
2-(1-Adamantyl)-N-[2-(cyclohexylmethyl)-1H-benzimidazol-5-yl]acetamide (Compound 1);
2-(1-Adamantyl)-N-[2-(tetrahydropyran-2-ylmethyl)-1H-benzimidazol-5-yl] acetamide (Compound 1.1);
2-(2-Adamantyl)-N-(2-benzyl-1H-benzimidazol-5-yl) (Compound 2);
2-(2-Adamantyl)-N-[2-(2-phenylethyl)-1H-benzimidazol-5-yl]acetamide (Compound 2.1);
2-(2-Adamantyl)-N-[2-[methoxy(phenyl)methyl]-1H-benzimidazol-5-yl]acetamide (Compound 2.2);

2-(2-Adamantyl)-N-[2-[(2-methoxyphenyl)methyl]-1H-benzimidazol-5-yl]acetamide (Compound 2.3);

2-(2-Adamantyl)-N-[2-[(R)-methylamino(phenyl)methyl]-1H-benzimidazol-5-yl]acetamide (Compound 3);

2-(1-Adamantyl)-N-[2-[(2-chloro-3-pyridyl)methyl]-1H-benzimidazol-5-yl]acetamide (Compound 4);

2-(2-Adamantyl)-N-[2-[(2-hydroxyphenyl)methyl]-1H-benzimidazol-5-yl]acetamide (Compound 5);

2-(2-Adamantyl)-N-[2-[(4-hydroxyphenyl)methyl]-1H-benzimidazol-5-yl]acetamide (Compound 5.1);

2-(2-Adamantyl)-N-[2-[(5-chloro-2-hydroxy-phenyl)methyl]-1H-benzimidazol-5-yl]acetamide (Compound 5.2);

2,2,2-Trifluoroethyl N-[[5-[[2-(1-adamantyl)acetyl]amino]-1H-benzimidazol-2-yl]methyl]carbamate (Compound 6);

2-(1-Adamantyl)-N-[2-[[3-(3,5-dimethylisoxazol-4-yl)phenyl]methyl]-3H-benzimidazol-5-yl]acetamide (Compound 7);

tert-Butyl N-[[5-[[2-(2-adamantyl)acetyl]amino]-1H-benzimidazol-2-yl]methyl] carbamate (Compound 8);

2-(2-Adamantyl)-N-(2-tetrahydrofuran-3-yloxy-1H-benzimidazol-5-yl)acetamide (Compound 9);

N-(Cycloheptylmethyl)-2-[(2-hydroxyphenyl)methyl]-1,3-benzoxazole-5-carboxamide (Compound 10);

2-(1-Adamantyl)-N-[3-amino-2-[(2-hydroxyphenyl)methyl]indazol-6-yl]acetamide (Compound 11);

2-Cyclohexyl-N-(2-isopropyl-1,3-benzoxazol-5-yl)acetamide (Compound 12);

N-(Cycloheptylmethyl)-2-[(2-hydroxyphenyl)methyl]indazole-6-carboxamide (Compound 13);

2-(1-Adamantyl)-N-(2-benzyl-3H-imidazo[4,5-c]pyridin-6-yl)acetamide (Compound 14);

2-Benzyl-N-(cycloheptylmethyl)imidazo[1,2-a]pyridine-7-carboxamide (Compound 15);

2-(1-Adamantyl)-N-(2-benzylindazol-6-yl)acetamide (Compound 16);

2-(1-Adamantyl)-N-(2-benzyl-3-methyl-indazol-6-yl)acetamide (Compound 17);

N-(2-tert-Butyl-1H-benzimidazol-5-yl)-2-(5-chloro-2-hydroxy-phenyl)acetamide (Compound 18); tert-Butyl N-[3-[(2-benzyl-1H-benzimidazole-5-carbonyl)amino]-2,2-dimethyl-propyl]carbamate (Compound 19);

2-tert-Butyl-N-(cycloheptylmethyl)-3H-benzimidazole-5-carboxamide (Compound 20);

2-[(4-tert-Butyl-2-fluoro-5-hydroxy-phenyl)methyl]-N-[1-(trifluoromethyl) cyclopropyl]-1H-benzimidazole-5-carboxamide (Compound 21);

2-[(4-tert-Butyl-2-fluoro-5-hydroxy-phenyl)methyl]-N-[[1-(trifluoromethyl) cyclopropyl]methyl]-1H-benzimidazole-5-carboxamide (Compound 21.1);

2-[(4-tert-Butyl-2-fluoro-5-hydroxy-phenyl)methyl]-N-(3,3,3-trifluoropropyl)-1H-benzimidazole-5-carboxamide (Compound 21.2);

2-[(4-tert-Butyl-2-fluoro-5-hydroxy-phenyl)methyl]-N-[1-(trifluoromethyl) cyclopropyl]-1,3-benzoxazole-5-carboxamide (Compound 21.3);

2-[(4-tert-Butyl-2-fluoro-5-hydroxy-phenyl)methyl]-N-[[1-(trifluoromethyl) cyclopropyl]methyl]-1,3-benzoxazole-5-carboxamide (Compound 21.4);

2-[2-Fluoro-5-hydroxy-4-(1-hydroxy-1-methyl-ethyl)phenyl]-N-[2-[1-(trifluoromethyl) cyclopropyl]-1H-benzimidazol-5-yl]acetamide (Compound 22);

2-(4-tert-Butyl-2-fluoro-5-hydroxy-phenyl)-N-[2-[1-(trifluoromethyl)cyclopropyl]-1H-benzimidazol-5-yl]acetamide (Compound 23);

2-Benzyl-N-(3,3,3-trifluoropropyl)-1H-benzimidazole-5-carboxamide (Compound 24);

2-Benzyl-N-(cyclopentylmethyl)-1H-benzimidazole-5-carboxamide (Compound 24.1);

2-Benzyl-N-(cycloheptylmethyl)-1H-benzimidazole-5-carboxamide (Compound 24.2);

N-(Cycloheptylmethyl)-2-[(2-fluoro-6-hydroxy-phenyl)methyl]-1H-benzimidazole-5-carboxamide (Compound 25);

N-(Cycloheptylmethyl)-2-[(5-fluoro-2-hydroxy-phenyl)methyl]-1H-benzimidazole-5-carboxamide (Compound 25.1);

N-(Cycloheptylmethyl)-2-[(3-fluoro-2-hydroxy-phenyl)methyl]-1H-benzimidazole-5-carboxamide (Compound 25.2);

N-(Cycloheptylmethyl)-2-[(2-hydroxy phenyl)methyl]-1H-benzimidazole-5-carboxamide (Compound 25.3);

N-(Cycloheptylmethyl)-2-[(4-fluoro-2-hydroxy-phenyl)methyl]-1H-benzimidazole-5-carboxamide (Compound 25.4);

N-(Cycloheptylmethyl)-2-[(3-hydroxyphenyl)methyl]-1H-benzimidazole-5-carboxamide (Compound 25.5);

2-(5-Chloro-2-hydroxy-phenyl)-N-[2-(2,2-dimethylpropyl)-1H-benzimidazol-5-yl]acetamide (Compound 26);

N-(2-tert-Butyl-1H-benzimidazol-5-yl)-2-(5-chloro-2-hydroxy-phenyl)acetamide (Compound 27);

N-(Cycloheptylmethyl)-2-(1-methylcyclobutyl)-3H-benzimidazole-5-carboxamide (Compound 28);

2-[[2-Fluoro-5-hydroxy-4-(2-hydroxy-1,1-dimethyl-ethyl)phenyl]methyl]-N-[[1-(trifluoromethyl)cyclopropyl]methyl]-1H-benzimidazole-5-carboxamide (Compound 29);

2-[[2-Fluoro-5-hydroxy-4-(2-hydroxy-1,1-dimethyl-ethyl)phenyl]methyl]-N-(3,3,3-trifluoropropyl)-1H-benzimidazole-5-carboxamide (Compound 29.1);

N-[[2-Fluoro-5-hydroxy-4-(2-hydroxy-1,1-dimethyl-ethyl)phenyl]methyl]-2-[1-(trifluoromethyl)cyclopropyl]-1H-benzimidazole-5-carboxamide (Compound 30);

2-[[2-Fluoro-5-hydroxy-4-(1-hydroxy-1-methyl-ethyl)phenyl]methyl]-N-(3,3,3-trifluoropropyl)-1H-benzimidazole-5-carboxamide (Compound 31);

2-[[2-Fluoro-5-hydroxy-4-(1-hydroxy-1-methyl-ethyl)phenyl]methyl]-N-[1-(trifluoromethyl)cyclopropyl]-1H-benzimidazole-5-carboxamide (Compound 31.1);

2-[[5-Fluoro-2-hydroxy-3-(2-hydroxy-1,1-dimethyl-ethyl)phenyl]methyl]-N-[[1-(trifluoromethyl)cyclopropyl]methyl]-1H-benzimidazole-5-carboxamide (Compound 32);

2-[(4-tert-Butyl-2-fluoro-5-hydroxy-phenyl)methyl]-N-[1-(trifluoromethyl)cyclopropyl] imidazo[1,2-a]pyridine-7-carboxamide (Compound 33);

and salts and solvates of the above.

A compound of general formula (IA) may be prepared by reacting a compound of general formula (II):

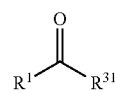

(II)

wherein $R^1$ is as defined for general formula (I) and $R^{31}$ is OH or halo, for example chloro; with a compound of general formula (III):

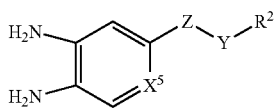

(III)

wherein $X^5$, Z, Y and $R^2$ are as defined for general formula (I).

Suitably, the reaction is conducted in the presence of a coupling reagent and under basic conditions, for example in the presence of an amine such as diisopropylethylamine (DIPEA) or triethylamine (TEA) and in an organic solvent such as DMF.

Suitable coupling reagents include known peptide coupling agents such as O-(Benzotriazol-1-yl)-N,N,N',N'-tetramethyluronium hexafluorophosphate (HBTU), O-(Benzotriazol-1-yl)-N,N,N',N'-tetramethyluronium tetrafluoroborate (TBTU), O-(7-Azabenzotriazol-1-yl)-N,N,N',N'-tetramethyluronium hexafluorophosphate (HATU), O-(7-Azabenzotriazol-1-yl)-N,N,N',N'-tetramethyluronium tetrafluoroborate (TATU), (Benzotriazol-1-yloxy)tris(dimethylamino)phosphonium hexafluorophosphate (BOP), (Benzotriazol-1-yloxy)tripyrrolidinophosphonium hexafluorophosphate (PyBOP) carbodiimides such as 1-ethyl-3-(3-dimethylaminopropyl)carbodiimide (EDCl) and triazoles such as 1-hydroxy-7-azabenzotriazole (HOAt) or hydroxybenzotriazole (HOBt). Suitably, the reaction is conducted under basic conditions, for example in the presence of an amine such as diisopropylethylamine (DIPEA) and in an organic solvent such as DMF.

The reaction between the compounds of general formulae (II) and (III) may be carried out in a single step or, alternatively in two steps. In a two-step reaction, the first step produces an intermediate of general formula (IV):

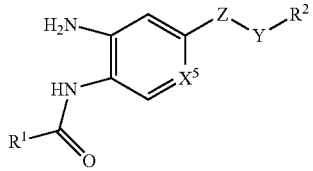

(IV)

wherein $R^1$, $X^5$, Z, Y and $R^2$ are as defined for general formula (I).

The intermediate of general formula (IV) may be isolated and then further reacted to produce the required product of general formula (I). Reagents are as described above for the single step reaction but it is preferred that, in the compound of general formula (II), $R^{31}$ is halo, particularly chloro.

Compounds of general formula (II) are readily available or may be synthesised by known methods. For example, when $R^1$ is $CH(R^{11})(R^{12})$, wherein $R^{11}$ is as defined above and $R^{12}$ is a 6-membered aryl or heteroaryl ring substituted with $(R^{30})_m$, wherein each $R^{30}$ is independently OH, methoxy, chloro, fluoro, $C_{1-6}$ alkyl optionally substituted with one or more substituents selected from halo and O, or a 5-membered heteroaryl group optionally substituted with one or more substituents selected from $C_{1-4}$ alkyl and halo; and m is 0, 1, 2, 3, 4 or 5. Compounds of general formula (II) can be converted to other compounds of general formula (II). For example, a compound of general formula (II) having a fluoro and a methoxy substituent can be alkylated as shown in Example 21 below.

In some cases, the $R^1$ group of a compound of general formula (II) may be protected and the protecting group may be removed after the reaction with the compound of general formula (III). For example, if the $R^1$ group comprises an aromatic ring substituted with OH or with alkyl substituted with OH, protection may be required. An example of the use of protecting groups in such a case is given in the examples below, where the $R^1$ group is $CH(R^{11})(R^{12})$, in which $R^{11}$ is H and $R^{12}$ is phenyl substituted with OH and —$C(CH_2)_2$—$CH_2OH$. In this case, in the compound of general formula (II), the OH groups are protected as a lactone, which can be ring opened by treatment with a reducing agent, such as sodium or lithium borohydride, to give the required $R^{12}$ group.

A compound of general formula (II) in which $R^{31}$ is OH may be prepared by hydrolysis of a compound of general formula (V):

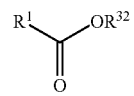

(V)

wherein $R^1$ is as defined above and $R^{32}$ is $C_{1-6}$ alkyl or benzyl.

The hydrolysis may be, for example, base hydrolysis using an alkali metal hydroxide, for example lithium hydroxide or sodium hydroxide in a polar solvent, typically a mixture of a an alcoholic solvent such as methanol or ethanol and water.

A compound of general formula (V) in which $R^1$ is benzyl substituted with $R^{30}$, where $R^{30}$ is a 5-membered heteroaryl group optionally substituted with one or more substituents selected from $C_{1-4}$ alkyl and halo may be prepared by reacting a compound of general formula (VI):

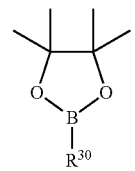

(VI)

wherein $R^{30}$ is a 5-membered heteroaryl group optionally substituted with one or more substituents selected from $C_{1-4}$ alkyl and halo;

with a halophenyl acetic acid ester of general formula (VII):

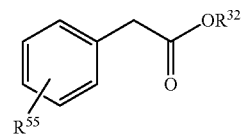

wherein $R^{32}$ is as defined for general formula (V) and $R^{55}$ is halo, especially bromo.

Typically, the reaction is carried out in the presence of tripotassium phosphate and a palladium catalyst such as [1,1'-Bis(diphenylphosphino)ferrocene]dichloropalladium (II) (Pd(dppf)$_2$Cl$_2$) in a solvent such as dioxane and under an inert atmosphere, typically a nitrogen atmosphere. The reaction temperature is suitably about 80 to 120° C., for example about 100° C.

A compound of general formula (III) may be synthesised by reducing a compound of general formula (VIII):

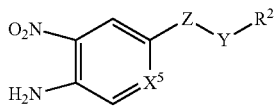
(VIII)

wherein $X^5$, Z, Y and $R^2$ are as defined for general formula (I).

Suitable reduction methods include catalytic hydrogenation, for example, over a palladium/carbon catalyst. Alternatively, the reducing agent may be a transition metal such as zinc, for example under acidic conditions.

A compound of general formula (VIII) in which Z is —NHC(O)— (i.e. NH is attached to the phenyl group) may be prepared by reacting a compound of general formula (IX):

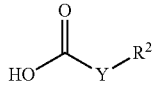
(IX)

wherein $R^2$ is as defined for general formula (I) with a compound of general formula (X):

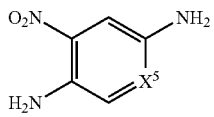
(X)

wherein $X^5$ is as defined for general formula (I).

The reaction may be carried out in the presence of an amine such as DIPEA and a coupling reagent. Suitable coupling reagents are as discussed above for the reaction of the compounds of general formulae (II) and (III). N,N-dimethylformamide is a suitable solvent.

In some cases, substituents on the $R^2$ group in the compound of general formula (IX) may require protection. For example, as shown in Example 29 below, when $R^2$ is phenyl substituted at adjacent positions with OH and 2-hydroxy-1,1-dimethylethyl, this may be protected as a lactone. Synthesis of the lactone-protected compound of general formula (IX) (Intermediate B) is described below.

Compounds of general formulae (IX) and (X) are readily available or may be prepared by methods known to those of skill in the art.

In a variation of the method described above, which is particularly suitable for producing compounds in which $X^5$ is N and Z is —NHC(O)—, a compound of general formula (IX) may be reacted with a halogenating agent such as thionyl chloride followed by ammonium hydroxide to produce a compound of general formula (XI):

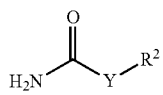
(XI)

wherein $R^2$ is as defined for general formula (I).

The compound of general formula (XI) may be reacted with a protected compound of general formula (XII):

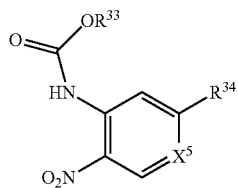
(XII)

wherein $X^5$ is as defined for general formula (I), $R^{33}$ is $C_{1-6}$ alkyl or benzyl and $R^{34}$ is halo, especially bromo; to give a protected compound of general formula (VIIIa):

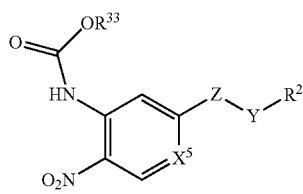
(VIIIa)

wherein $X^5$ Y and $R^2$ are as defined for general formula (I), $R^{33}$ is as defined for general formula (XII) and Z is —NHC(O)— (i.e. NH is attached to the phenyl group).

Suitably, the reaction is carried out in the presence of an amine such as (1R,2R)—N,N'-dimethyl-1,2-cyclohexanediamine and a copper catalyst such as copper iodide.

The compound of general formula (VIIIa) can be deprotected to give a compound of general formula (VIII) as defined above. Deprotection of compounds of general formula (VIIIa) can be achieved by treatment with an acid such as hydrochloric acid.

The protected compound of general formula (XII) may be prepared by reacting a compound of general formula (XIII):

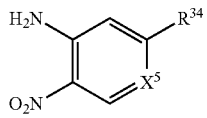
(XIII)

wherein $X^5$ is as defined for general formula (I) and $R^{34}$ is as defined for general formula (XII);
with a carboxylic anhydride of general formula (XIV):

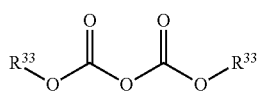
(XIV)

wherein $R^{33}$ is as defined for general formula (XII);
in the presence of a base such as sodium hydride.

The compound of general formula (VIIIa) may be reduced as described above for the compound of general formula (VIII), to give a compound of general formula (IIIa):

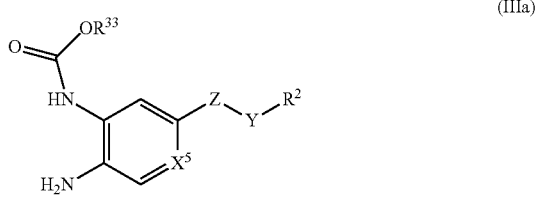

(IIIa)

wherein $X^5$, Z, Y and $R^2$ are as defined for general formula (I) and $R^{33}$ is $C_{1-6}$ alkyl or benzyl.

The compound of general formula (IIIa) may be reacted with a compound of general formula (II) using the reaction conditions described above to give a protected compound of general formula (IVa):

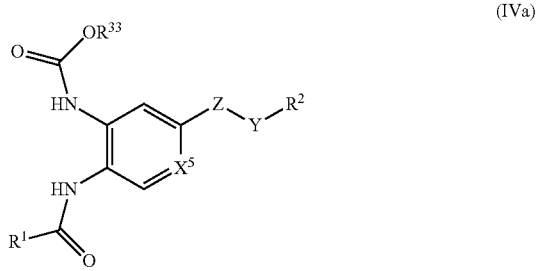

(IVa)

wherein $R^1$, $X^5$, Z, Y and $R^2$ are as defined for general formula (I) and $R^{33}$ is as defined for general formula (IIIa).

The compound of general formula (IVa) may be treated with an acid, for example HCl in dioxane to remove the protecting group and yield a compound of general formula (IV), which may be reacted as described above to give a compound of general formula (I).

A compound of general formula (III) in which Z is —C(O)NH— (i.e. C(O) is attached to the phenyl group) may be prepared by reacting a compound of general formula (XV):

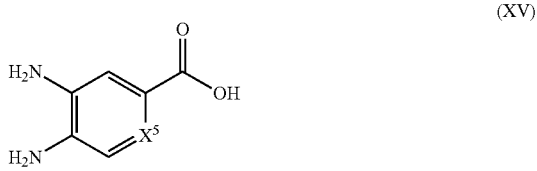

(XV)

wherein $X^5$ is as defined for general formula (I); with a compound of general formula (XVI):

R²—Y—NH₂  (XVI)

wherein $R^2$ and Y are as defined for general formula (I).

The reaction may be carried out in the presence of an amine such as DIPEA or TEA and a coupling reagent. Suitable coupling reagents are as discussed above for the reaction of the compounds of general formulae (II) and (III). N,N-dimethylformamide is a suitable solvent.

Compounds of general formulae (XV) and (XVI) are known and are readily available or may be prepared by known methods.

A compound of formula (IA) in which Z is —NHC(O)— (i.e. the NH is attached to the benzimidazole) may also be prepared by reacting a compound of general formula (IX) as defined above with a compound of general formula (XVII):

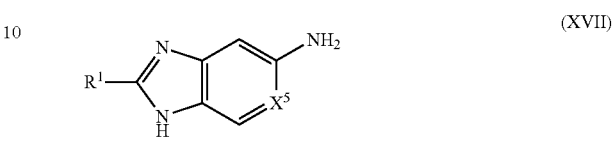

(XVII)

wherein $R^1$ and $X^5$ are as defined for general formula (I).

The reaction may be carried out in the presence of an amine such as DIPEA and a coupling reagent. Suitable coupling reagents are as discussed above for the reaction of the compounds of general formulae (II) and (III). N,N-dimethylformamide is a suitable solvent.

A compound of general formula (XVII) may be prepared by the reduction of a compound of general formula (XVIII):

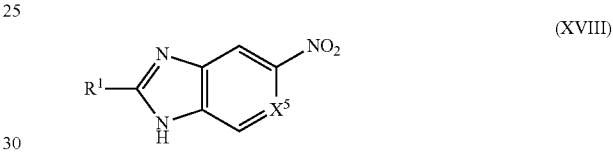

(XVIII)

wherein $R^1$ and $X^5$ are as defined for general formula (M).

Suitably, the reduction is carried out by catalytic hydrogenation over a palladium or platinum catalyst, for example a Pd/C catalyst.

A compound of general formula (XVIII) may be prepared by reacting a compound of general formula (II) as defined above with a compound of general formula (XIX):

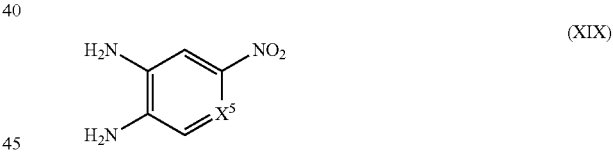

(XIX)

wherein $X^5$ is as defined for general formula (I).

The reaction may be carried out in the presence of an amine such as DIPEA and a coupling reagent. Suitable coupling reagents are as discussed above for the reaction of the compounds of general formulae (II) and (III). N,N-dimethylformamide is a suitable solvent. HATU may be used as a coupling agent for the reaction between the compounds of general formulae (II) and (XIX).

A compound of general formula (I) which is a compound of general formula (IA) in which $R^1$ is $OR^5$ may be prepared by deprotecting a compound of general formula (XX):

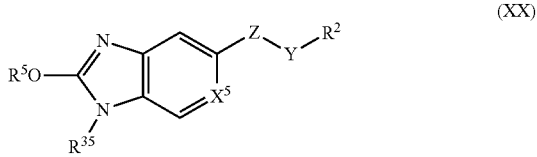

(XX)

wherein $R^5$, $X^5$, Z, Y and $R^2$ are as defined for general formula (I) and $R^{35}$ is a protecting group, suitably a silyl protecting group such as $CH_2O(CH_2)_2Si(R^{36})_3$, wherein each $R^{36}$ is independently $C_{1-6}$ alkyl or phenyl, for example by reacting with either a strong acid such as trifluoroacetic acid or a fluoride source such as tetrabutylammonium fluoride.

The compound of general formula (XX) may be prepared by reacting a compound of general formula (XXI):

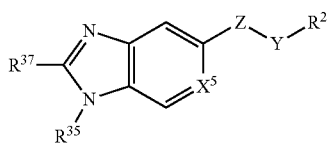

(XXI)

wherein $X^5$, Z, Y and $R^2$ are as defined for general formula (I), $R^{35}$ is as defined for general formula (XX) and $R^{37}$ is halo, especially chloro;
with a compound of general formula (XXII):

$R^5$—OH    (XXII)

wherein $R^5$ is as defined for general formula (I);
in the presence of a strong base, for example a metal hydride such as sodium hydride.

Suitably, the reaction of the compounds of general formulae (XXI) and (XXII) and the deprotection to give the compound of general formula (I) are carried out in a single step.

Compounds of general formula (XXII) are known and are readily available or may be prepared by known methods.

The compound of general formula (XXI) may be prepared from a compound of general formula (XXIII):

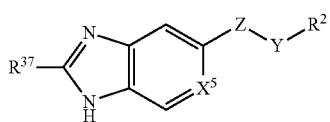

(XXIII)

wherein $X^5$, Z, Y and $R^2$ are as defined for general formula (I) and $R^{37}$ is as defined for general formula (XXI);
by reaction with a compound of general formula (XXIV):

$R^{35}$-$R^{38}$    (XXIV)

wherein $R^{35}$ is as defined for general formula (XX) and $R^{38}$ is halo, especially chloro or bromo.

Compounds of general formula (XXIV) are known and are readily available or may be prepared by known methods.

A compound of general formula (XXIII) in which Z is —NHC(O)— (i.e. NH is attached to the phenyl group) may be prepared by reacting a compound of general formula (XXV):

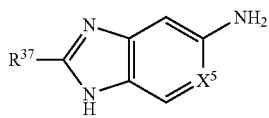

(XXV)

wherein $X^5$ is as defined for general formula (I) and $R^{37}$ is as defined for general formula (XXI);
with a compound of general formula (XXVI):

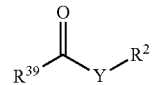

(XXVI)

wherein $R^2$ is as defined for general formula (I) and $R^{39}$ is halo, especially chloro.

Suitably, the reaction is carried out in the presence of a base such as N,N-diisopropylethylamine (DIPEA) in a polar organic solvent such as dichloromethane.

A compound of general formula (XXVI) may be prepared from a compound of general formula (IX) as defined above by reaction with a halogenating agent such as thionyl chloride.

A compound of general formula (XXV) may be prepared by reduction of a compound of general formula (XXVII):

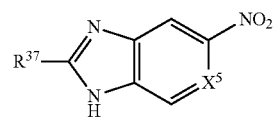

(XXVII)

wherein $X^5$ is as defined for general formula (I) and $R^{37}$ is as defined for general formula (XXI);
by reduction, typically using iron and ammonium chloride.

Compounds of general formula (XXVII) are known and are readily available or may be prepared by methods known to those of skill in the art.

A compound of general formula (XXIII) in which Z is —C(O)NH— (i.e. C(O) is attached to the phenyl group) may be prepared using a combination of the method above for a compound of general formula (XXIII) in which Z is —NHC(O)— (i.e. NH is attached to the benzimidazole group) and the method for the compound of general formula (III) in which Z is —C(O)NH— (preparation from a compound of general formula (XV)).

An alternative method for the preparation of a compound of general formula (IA) in which Z is —NHC(O)— (i.e. NH is attached to the phenyl group) is by reaction of a compound of general formula (XVII) as defined above with a compound of general formula (XXVI) as defined above.

Suitably, the reaction is conducted in the presence of an amine such as DIPEA and a coupling reagent. Suitable coupling agents are as discussed above for the reaction of the compounds of general formula (II) and general formula (III). Suitable solvents include polar organic solvents such as N,N-dimethylformamide.

A compound of general formula (XXX) may be prepared by reducing a compound of general formula (XXXI):

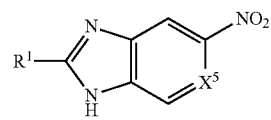

(XXXI)

wherein $R^1$ and $X^5$ are as defined for general formula (I).

Suitable reduction methods include catalysed hydrogenation, typically using a palladium/carbon catalyst and the reaction is carried out in a polar organic solvent, typically an alcoholic solvent such as ethanol.

A compound of general formula (XXXI) may be prepared by reacting a compound of general formula (II) as defined above, especially a compound of general formula (II) in which $R^{31}$ is OH, with a compound of general formula (XIX) as defined above.

Suitably the reaction is conducted in the presence of an amine such as DIPEA and a coupling reagent. Suitable coupling agents are as discussed above for the reaction of the compounds of general formula (II) and general formula (III). Suitable solvents include polar organic solvents such as N,N-dimethylformamide.

An alternative method of preparing a compound of general formula (IA) in which Z is —C(O)NH— (i.e. —C(O) is attached to the benzimidazole group) is by reaction of a compound of general formula (XXXII)

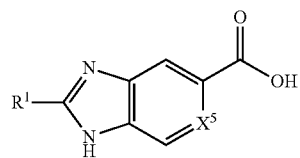

(XXXIII)

wherein $R^1$ and $X^5$ are as defined for general formula (I);
with a compound of general formula (XVI) as defined above.

The reaction may be carried out in the presence of an amine such as DIPEA and a coupling reagent. Suitable coupling reagents are as discussed above for the reaction of the compounds of general formulae (II) and (III). For example HATU may be used. N,N-dimethylformamide is a suitable solvent.

A carboxylic acid of general formula (XXXIII) may be prepared by hydrolysis of an ester of general formula (XXXIIIa):

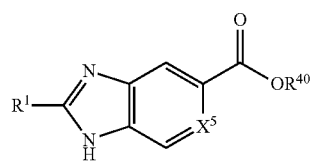

(XXXIIIa)

wherein $R^1$ and $X^5$ are as defined for general formula (I) and $R^{40}$ is $C_{1-6}$ alkyl or benzyl.

Typically, the hydrolysis is alkaline hydrolysis and is conducted using a base such as an alkali metal hydroxide, for example lithium or sodium hydroxide, in an aqueous solvent, suitably a solvent comprising a mixture of water and an alcohol or THF and an alcohol, where suitable alcohols include methanol and ethanol.

A compound of general formula (XXXIIIa) may be prepared by reacting a compound of general formula (II) as defined above with a compound of general formula (XXXIV):

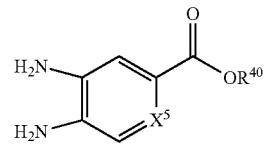

(XXXIV)

wherein $X^5$ is as defined for general formula (I) and $R^{40}$ is as defined for general formula (XXXIIIa).

The reaction may be carried out in the presence of an amine such as DIPEA and a coupling reagent. Suitable coupling reagents are as discussed above for the reaction of the compounds of general formulae (II) and (III). For example, HATU may be used. N,N-dimethylformamide is a suitable solvent.

Compounds of general formula (XXXIV) are known and are commercially available or may be prepared by methods familiar to those of skill in the art, for example by hydrolysis of a compound of general formula (XV).

Compounds of general formula (IC) in which Z is —C(O)NH— (i.e. C(O) attached to the central ring system) may be prepared by reacting a compound of general formula (XXXV):

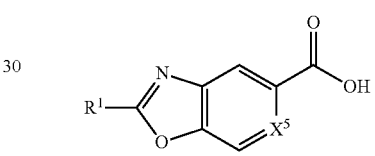

(XXXV)

wherein $R^1$ and $X^5$ are as defined for general formula (I);
with a compound of general formula (XVI) as defined above.

Suitably the reaction is conducted in the presence of an amine such as DIPEA and a coupling reagent. Suitable coupling agents are as discussed above for the reaction of the compounds of general formula (II) and general formula (III). Suitable solvents include polar organic solvents such as N,N-dimethylformamide.

A compound of general formula (XXXV) may be prepared by hydrolysis of a compound of general formula (XXXVI):

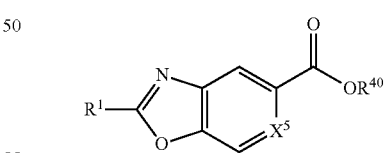

(XXXVI)

wherein $R^1$ and $X^5$ are as defined for general formula (I) and $R^{40}$ is as defined for general formula (XXXIIIa).

Typically, the hydrolysis is alkaline hydrolysis and is conducted using a base such as an alkali metal hydroxide, for example lithium or sodium hydroxide, in an aqueous solvent, suitably a solvent comprising a mixture of water and an alcohol such as methanol or ethanol.

The compound of general formula (XXXVI) may be prepared by reacting a compound of general formula (II) as defined above with a compound of general formula (XXXVII):

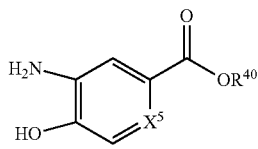

(XXXVII)

wherein $R^1$ and $X^5$ are as defined for general formula (I) and $R^{40}$
is as defined for general formula (XXXIIIa).

Suitably the reaction is conducted in the presence of an amine such as DIPEA and a coupling reagent. Suitable coupling agents are as discussed above for the reaction of the compounds of general formula (II) and general formula (III). Suitable solvents include polar organic solvents such as N,N-dimethylformamide.

Compounds of general formula (XXXVII) are known and are readily available or may be prepared by known methods.

Compounds of general formula (IC) in which Z is —NHC(O)— (i.e. NH attached to the central ring system) may be prepared by reacting a compound of general formula (XXXVIII):

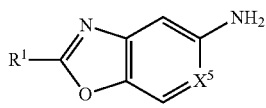

(XXXVIII)

wherein $R^1$ and $X^5$ are as defined for general formula (I); with a compound of general formula (XXVI) as defined above.

Suitably the reaction is conducted in the presence of an amine such as DIPEA and a coupling reagent. Suitable coupling agents are as discussed above for the reaction of the compounds of general formula (II) and general formula (III). Suitable solvents include polar organic solvents such as N,N-dimethylformamide.

Compounds of general formula (XXXVIII) are known and are readily available or may be prepared by known methods.

Compounds of general formula (IB) in which Z is —NHC(O)— (i.e. NH attached to the central ring system) may be prepared by reacting a compound of general formula (IX) as defined above with a compound of general formula (XL):

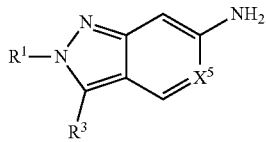

(XL)

wherein $R^1$, $R^3$ and $X^5$ are as defined above for general formula (I).

Suitably the reaction is conducted in the presence of an amine such as DIPEA and a coupling reagent. Suitable coupling agents are as discussed above for the reaction of the compounds of general formula (II) and general formula (III). Suitable solvents include polar organic solvents such as N,N-dimethylformamide.

A compound of general formula (XL) may be prepared by reduction of a compound of general formula (XLI):

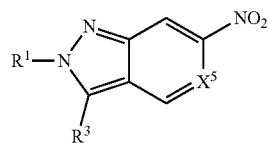

(XLI)

wherein $R^1$, $R^3$ and $X^5$ are as defined above for general formula (I).

The reduction may be carried out by catalytic hydrogenation, for example using a palladium/carbon catalyst.

A compound of general formula (XLI) in which C—$R^3$ is replaced by C—$NH_2$, may be prepared by reacting a compound of general formula (XLII)

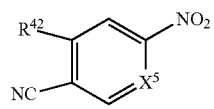

(XLII)

wherein $X^5$ is as defined for general formula (I) and $R^{42}$ is halo, especially fluoro;
with a compound of general formula (XLIII)

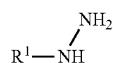

(XLIII)

wherein $R^1$ is as defined for general formula (I).

Suitably the reaction is carried out under basic conditions, for example using DIPEA and in an alcoholic solvent such as t-butanol.

Compounds of general formulae (XLII) and (XLIII) are known and are readily available or may be prepared by known methods.

Alternatively, a compound of general formula (IB) in which Z is —NHC(O)— (i.e. NH attached to the central ring system) may be prepared by reacting a compound of general formula (XLV):

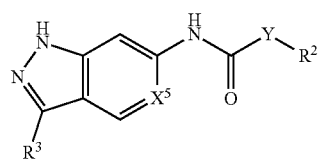

(XLV)

wherein $R^2$, $R^3$, $X^5$ and Y are as defined for general formula (I);
with a compound of general formula (XLVIII):

$R^1$-$R^{43}$ (XLVIII)

wherein $R^1$ is as defined for general formula (I) and $R^{43}$ is halo, especially chloro or bromo; under mildly basic conditions, for example in the presence of potassium carbonate.

Compounds of general formula (XLVIII) are known and are readily available or may be prepared by known methods.

A compound of general formula (XLV) may be prepared by reacting a compound of general formula (IX) as defined above with a compound of general formula (XLVI):

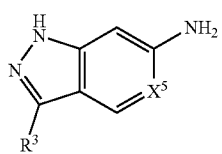

(XLVI)

wherein $R^3$ and $X^5$ are as defined for general formula (I).

Suitably the reaction is conducted in the presence of an amine such as DIPEA and a coupling reagent. Suitable coupling agents are as discussed above for the reaction of the compounds of general formula (II) and general formula (III). Suitable solvents include polar organic solvents such as N,N-dimethylformamide.

Compounds of general formula (XLVI) are known and are readily available or can be synthesised by methods known to those of skill in the art.

Compounds of general formula (IB) in which Z is —C(O)NH— (i.e. C(O) attached to the central ring system) may be prepared by reacting a compound of general formula (XLVII):

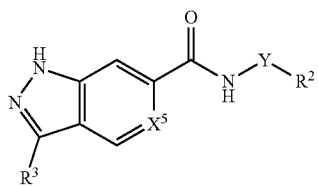

(XLVII)

wherein Y, $R^2$, $R^3$ and $X^5$ are as defined above for general formula (I);
with a compound of general formula (XLVIII) as defined above.

A compound of general formula (XLVII) may be prepared by reacting a compound of general formula (XLIX):

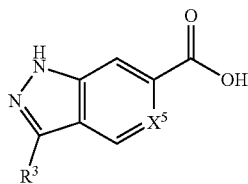

(XLIX)

wherein $R^3$ and $X^5$ are as defined above for general formula (I);
with a compound of general formula (XVI) as defined above.

Suitably the reaction is conducted in the presence of an amine such as DIPEA and a coupling reagent. Suitable coupling agents are as discussed above for the reaction of the compounds of general formula (II) and general formula (III). Suitable solvents include polar organic solvents such as N,N-dimethylformamide.

Compounds of general formula (XLIX) are known and are readily available or may be prepared by known methods.

When the compound of formula (IB) has an $R^3$ substituent $N(R^{3a})(R^{3b})$ in which either or both of $R^{3a}$ and $R^{3b}$ is H, it may be necessary to protect the amine group during the synthesis. For example, a compound of general formula (XLI) above in which $R^3$ is $NH_2$ can be protected by reacting with a compound of general formula (XIV) above in order to protect the free amine group. The following steps are carried out as set out above and following the reaction of a protected compound of general formula (XL) with a compound of general formula (IX) to give a protected compound of formula (ID), the protecting group can be removed by treatment with an acid such as trifluoroacetic acid.

Similarly, a compound of general formula (XLIX) in which $R^3$ is $NH_2$ may be protected by reaction with a compound of general formula (XIV) above. The protecting group may be removed before or after the subsequent step.

A compound of general formula (ID) may be prepared by reacting a compound of general formula (L):

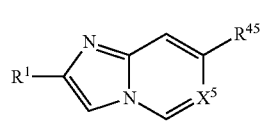

(L)

wherein $R^1$ and $X^5$ are as defined in general formula (I) and $R^{45}$ is halo, for example bromo; with formic acid, methane sulfonyl chloride, triethylamine and a compound of general formula (XVI) as defined above in the presence of 4,5-Bis(diphenylphosphino)-9,9-dimethylxanthene (Xantphos) and a Pd catalyst (such as XantPhos Pd-G3 (third generation (G3) Buchwald precatalyst)) and base (such as sodium carbonate).

Suitably, the reaction is carried out in an organic solvent such as toluene.

A compound of general formula (L) may be prepared by reacting a compound of general formula (LI):

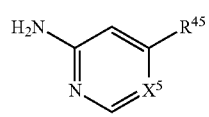

(LI)

wherein $X^5$ is as defined in general formula (I) and $R^{45}$ is as defined for general formula (L);
with a compound of general formula (LII):

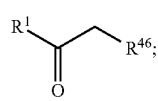

(LII)

wherein $R^1$ is as defined for general formula (I) and $R^{46}$ is halo, for example bromo.

Suitably the reaction is carried out under basic conditions, for example in the presence of sodium hydrogen carbonate, and in an alcoholic solvent such as ethanol.

Compounds of general formulae (LI) and (LII) are known and are readily available or may be prepared by methods known to those of skill in the art.

Compounds of general formula (I) may also be prepared from other compounds of general formula (I). For example, when either or both $R^1$ and $R^2$ comprises a phenyl group substituted with alkoxy, this can be converted to phenyl substituted with OH by treatment with boron tribromide.

A first compound of general formula (I) in which $R^1$ is $CH(R^7)$—$N(R^8)$—$C(O)OR^{9a}$ can be converted into a second compound of general formula (I) in which $R^1$ is $CH(R^7)$—$N(R^8)$—$C(O)OR^{9b}$; where $R^{9a}$ and $R^{9b}$ are different from one another but are both as defined above for $R^9$.

In a first step, the compound of general formula (I) in which $R^1$ is $CH(R^7)$—$N(R^8)$—$C(O)OR^{9a}$ is treated with an acid, for example HCl in a solvent such as dioxane. This gives rise to a compound similar to general formula (I) but in which the $R^1$ substituent is replaced by $CH(R^7)$—$NH(R^8)$. This compound is then treated with a compound of general formula (LV):

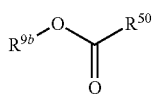

(LV)

wherein $R^{9b}$ is as defined above and $R^{50}$ is halo, especially chloro;
to arrive at the required product.

A compound of general formula (I) in which $R^1$ is $CH(R^7)$—$N(R^8)$—$C(O)OR^9$ can be converted to a compound of general formula (I) in which $R^1$ is $CH(R^7)$—$N(R^8)$—$C(O)N(R^9)(R^{10})$ by hydrolysis, typically base hydrolysis using a metal hydroxide such as sodium or lithium hydroxide, followed by reaction with an amine of formula $HN(R^9)(R^{10})$, wherein $R^9$ and $R^{10}$ are as described above for general formula (I).

Other interconversions of the various substituent groups can be carried out by methods familiar to those of skill in the art.

Compounds of formula (Ix) may be prepared in a similar manner to compounds of formula (I).

The compounds of general formula (I), (Ix), (IA), (IB), (IC), (ID) and (IE) are modulators of TMEM16A and therefore, in a further aspect of the invention, there is provided a compound of general formula (I) as defined above including all tautomeric forms all enantiomers and isotopic variants and salts and solvates thereof for use in medicine, especially in the treatment or prophylaxis of diseases and conditions affected by modulation of TMEM16A.

More suitable compounds for use in the treatment or prophylaxis of diseases and conditions affected by modulation of TMEM16A are as defined above.

There is also provided the use of a compound of general formula (I), (Ix), (IA), (IB), (IC), (ID) or (IE) in the manufacture of a medicament for the treatment or prophylaxis of diseases and conditions affected by modulation of TMEM16A.

There is also provided a method for the treatment or prophylaxis of diseases and conditions affected by modulation of TMEM16A, the method comprising administering to a patient in need of such treatment an effective amount of a compound of general formula (I), (Ix), (IA), (IB), (IC), (ID) or (IE).

The diseases and conditions affected by modulation of TMEM16A include respiratory diseases and conditions, dry mouth (xerostomia), intestinal hypermobility, cholestasis and ocular conditions.

There is also provided:
A compound of general formula (I), (Ix), (IA), (IB), (IC), (ID) or (IE) for use in the treatment or prophylaxis of respiratory diseases and conditions.
A compound of general formula (I), (Ix), (IA), (IB), (IC), (ID) or (IE) for use in the treatment or prophylaxis of dry mouth (xerostomia).
A compound of general formula (I), (Ix), (IA), (IB), (IC), (ID) or (IE) for use in the treatment or prophylaxis of intestinal hypermobility.
A compound of general formula (I), (Ix), (IA), (IB), (IC), (ID) or (IE) for use in the treatment or prophylaxis of cholestasis.
A compound of general formula (I), (Ix), (IA), (IB), (IC), (ID) or (IE) for use in the treatment or prophylaxis of ocular conditions.

The invention also provides:
The use of a compound of general formula (I), (Ix), (IA), (IB), (IC), (ID) or (IE) in the manufacture of a medicament for the treatment or prophylaxis of respiratory diseases and conditions.
The use of a compound of general formula (I), (Ix), (IA), (IB), (IC), (ID) or (IE) in the manufacture of a medicament for the treatment or prophylaxis of dry mouth (xerostomia).
The use of a compound of general formula (I), (Ix), (IA), (IB), (IC), (ID) or (IE) in the manufacture of a medicament for the treatment or prophylaxis of intestinal hypermobility.
The use of a compound of general formula (I), (Ix), (IA), (IB), (IC), (ID) or (IE) in the manufacture of a medicament for the treatment or prophylaxis of cholestasis.
The use of a compound of general formula (I), (Ix), (IA), (IB), (IC), (ID) or (IE) in the manufacture of a medicament for the treatment or prophylaxis of ocular conditions.

There is further provided:
A method for the treatment or prophylaxis of respiratory diseases and conditions, the method comprising administering to a patient in need of such treatment an effective amount of a compound of general formula (I), (Ix), (IA), (IB), (IC), (ID) or (IE).
A method for the treatment or prophylaxis of dry mouth (xerostomia), the method comprising administering to a patient in need of such treatment an effective amount of a compound of general formula (I), (Ix), (IA), (IB), (IC), (ID) or (IE).
A method for the treatment or prophylaxis of intestinal hypermobility, the method comprising administering to a patient in need of such treatment an effective amount of a compound of general formula (I), (Ix), (IA), (IB), (IC), (ID) or (IE).
A method for the treatment or prophylaxis of cholestasis, the method comprising administering to a patient in need of such treatment an effective amount of a compound of general formula (I), (Ix), (IA), (IB), (IC), (ID) or (IE).
A method for the treatment or prophylaxis of ocular conditions, the method comprising administering to a patient in need of such treatment an effective amount of a compound of general formula (I), (Ix), (IA), (IB), (IC), (ID) or (IE).

Respiratory diseases and conditions which may be treated or prevented by the compounds of general formula (I), (Ix), (IA), (IB), (IC), (ID) or (IE) include cystic fibrosis, chronic obstructive pulmonary disease (COPD), chronic bronchitis, emphysema, bronchiectasis, including non-cystic fibrosis bronchiectasis, asthma and primary ciliary dyskinesia.

Dry mouth (xerostomia) which may be treated or prevented by the compounds of general formula (I), (Ix), (IA), (IB), (IC), (ID) or (IE) may result from Sjorgens syndrome, radiotherapy treatment and xerogenic drugs.

Intestinal hypermobility which may be treated or prevented by the compounds of general formula (I), (Ix), (IA), (IB), (IC), (ID) or (IE) may be associated with a condition selected from gastric dyspepsia, gastroparesis, chronic constipation and irritable bowel syndrome.

Ocular conditions which may be treated or prevented by the compounds of by the compounds of general formula (I), (Ix), (IA), (IB), (IC), (ID) or (IE) include dry eye disease.

The compounds of the present invention will generally be administered as part of a pharmaceutical composition and therefore the invention further provides a pharmaceutical composition comprising a compound of general formula (I), (Ix), (IA), (IB), (IC), (ID) or (IE) together with a pharmaceutically acceptable excipient.

More suitable compounds of general formula (I), (Ix), (IA), (IB), (IC), (ID) or (IE) for use in the pharmaceutical compositions are as discussed above, especially the novel compounds of general formula (I), (Ix), (IA), (IB), (IC), (ID) or (IE).

The pharmaceutical composition may be formulated for oral, rectal, nasal, bronchial (inhaled), topical (including dermal, transdermal, eye drops, buccal and sublingual), vaginal or parenteral (including subcutaneous, intramuscular, intravenous and intradermal) administration and may be prepared by any methods well known in the art of pharmacy.

The composition may be prepared by bringing into association the above defined active agent with the excipient. In general, the formulations are prepared by uniformly and intimately bringing into association the active agent with liquid carriers or finely divided solid carriers or both, and then if necessary shaping the product. The invention extends to methods for preparing a pharmaceutical composition comprising bringing a compound of general formula (I), (Ix), (IA), (IB), (IC), (ID) or (IE) in conjunction or association with a pharmaceutically acceptable carrier or vehicle.

Formulations for oral administration in the present invention may be presented as: discrete units such as capsules, sachets or tablets each containing a predetermined amount of the active agent; as a powder or granules; as a solution or a suspension of the active agent in an aqueous liquid or a non-aqueous liquid; or as an oil-in-water liquid emulsion or a water in oil liquid emulsion; or as a bolus etc.

For compositions for oral administration (e.g. tablets and capsules), the term "acceptable carrier" includes vehicles such as common excipients e.g. binding agents, for example syrup, acacia, gelatin, sorbitol, tragacanth, polyvinylpyrrolidone (Povidone), methylcellulose, ethylcellulose, sodium carboxymethylcellulose, hydroxypropylmethylcellulose, sucrose and starch; fillers and carriers, for example corn starch, gelatin, lactose, sucrose, microcrystalline cellulose, kaolin, mannitol, dicalcium phosphate, sodium chloride and alginic acid; and lubricants such as magnesium stearate, sodium stearate and other metallic stearates, glycerol stearate, stearic acid, silicone fluid, talc waxes, oils and colloidal silica. Flavouring agents such as peppermint, oil of wintergreen, cherry flavouring and the like can also be used. It may be desirable to add a colouring agent to make the dosage form readily identifiable. Tablets may also be coated by methods well known in the art.

A tablet may be made by compression or moulding, optionally with one or more accessory ingredients. Compressed tablets may be prepared by compressing in a suitable machine the active agent in a free flowing form such as a powder or granules, optionally mixed with a binder, lubricant, inert diluent, preservative, surface-active or dispersing agent. Moulded tablets may be made by moulding in a suitable machine a mixture of the powdered compound moistened with an inert liquid diluent. The tablets may optionally be coated or scored and may be formulated so as to provide slow or controlled release of the active agent.

Other formulations suitable for oral administration include lozenges comprising the active agent in a flavoured base, usually sucrose and acacia or tragacanth; pastilles comprising the active agent in an inert base such as gelatin and glycerin, or sucrose and acacia; and mouthwashes comprising the active agent in a suitable liquid carrier.

For topical application to the skin, compounds of general formula (I), (Ix), (IA), (IB), (IC), (ID) or (IE) may be made up into a cream, ointment, jelly, solution or suspension etc. Cream or ointment formulations that may be used for the drug are conventional formulations well known in the art, for example, as described in standard text books of pharmaceutics such as the British Pharmacopoeia.

Topical administration to the lung may be achieved by use of an aerosol formulation. Aerosol formulations typically comprise the active ingredient suspended or dissolved in a suitable aerosol propellant, such as a chlorofluorocarbon (CFC) or a hydrofluorocarbon (HFC). Suitable CFC propellants include trichloromonofluoromethane (propellant 11), dichlorotetrafluoromethane (propellant 114), and dichlorodifluoromethane (propellant 12). Suitable HFC propellants include tetrafluoroethane (HFC-134a) and heptafluoropropane (HFC-227). The propellant typically comprises 40%-99.5% e.g. 40%-90% by weight of the total inhalation composition. The formulation may comprise excipients including co-solvents (e.g. ethanol) and surfactants (e.g. lecithin, sorbitan trioleate and the like). Other possible excipients include polyethylene glycol, polyvinylpyrrolidone, glycerine and the like. Aerosol formulations are packaged in canisters and a suitable dose is delivered by means of a metering valve (e.g. as supplied by Bespak, Valois or 3M or alternatively by Aptar, Coster or Vari).

Topical administration to the lung may also be achieved by use of a non-pressurised formulation such as an aqueous solution or suspension. These may be administered by means of a nebuliser e.g. one that can be hand-held and portable or for home or hospital use (ie non-portable). The formulation may comprise excipients such as water, buffers, tonicity adjusting agents, pH adjusting agents, surfactants and co-solvents. Suspension liquid and aerosol formulations (whether pressurised or unpressurised) will typically contain the compound of the invention in finely divided form, for example with a $D_{50}$ of 0.5-10 µm e.g. around 1-5 µm. Particle size distributions may be represented using $D_{10}$, $D_{50}$ and $D_{90}$ values. The $D_{50}$ median value of particle size distributions is defined as the particle size in microns that divides the distribution in half. The measurement derived from laser diffraction is more accurately described as a volume distribution, and consequently the $D_{50}$ value obtained using this procedure is more meaningfully referred to as a $DV_{50}$ value (median for a volume distribution). As used herein Dv values refer to particle size distributions measured using laser diffraction. Similarly, $D_{10}$ and $D_{90}$ values, used in the context of laser diffraction, are taken to mean $Dv_{10}$ and $Dv_{90}$ values and refer to the particle size whereby 10% of the distribution lies below the $D_{10}$ value, and 90% of the distribution lies below the $D_{90}$ value, respectively.

Topical administration to the lung may also be achieved by use of a dry-powder formulation. A dry powder formulation will contain the compound of the disclosure in finely divided form, typically with a mass mean diameter (MMAD) of 1-10 µm or a $D_{50}$ of 0.5-10 µm e.g. around 1-5 µm. Powders of the compound of the invention in finely divided form may be prepared by a micronization process or similar size reduction process. Micronization may be performed using a jet mill such as those manufactured by Hosokawa Alpine. The resultant particle size distribution may be measured using laser diffraction (e.g. with a Malvern Mastersizer 2000S instrument). The formulation will typically contain a topically acceptable diluent such as lactose, glucose or mannitol (preferably lactose), usually of comparatively large particle size e.g. a mass mean diameter (MMAD) of 50 µm or more, e.g. 100 µm or more or a $D_{50}$ of 40-150 µm. As used herein, the term "lactose" refers to a lactose-containing component, including α-lactose monohydrate, β-lactose monohydrate, α-lactose anhydrous, β-lactose anhydrous and amorphous lactose. Lactose components may be processed by micronization, sieving, milling, compression, agglomeration or spray drying. Commercially available forms of lactose in various forms are also encompassed, for example Lactohale® (inhalation grade lactose; DFE Pharma), InhaLac®70 (sieved lactose for dry powder inhaler; Meggle), Pharmatose® (DFE Pharma) and Respitose® (sieved inhalation grade lactose; DFE Pharma) products. In one embodiment, the lactose component is selected from the group consisting of α-lactose monohydrate, α-lactose anhydrous and amorphous lactose. Preferably, the lactose is α-lactose monohydrate.

Dry powder formulations may also contain other excipients. Thus in one embodiment a dry powder formulation according the present disclosure comprises magnesium or calcium stearate. Such formulations may have superior chemical and/or physical stability especially when such formulations also contain lactose.

A dry powder formulation is typically delivered using a dry powder inhaler (DPI) device. Example dry powder delivery systems include SPINHALER®, DISKHALER®, TURBOHALER®, DISKUS®, SKYEHALER®, ACCUHALER® and CLICKHALER®. Further examples of dry powder delivery systems include ECLIPSE, NEXT, ROTAHALER, HANDIHALER, AEROLISER, CYCLOHALER, BREEZHALER/NEOHALER, MONODOSE, FLOWCAPS, TWINCAPS, X-CAPS, TURBOSPIN, ELPENHALER, MIATHALER, TWISTHALER, NOVOLIZER, PRESSAIR, ELLIPTA, ORIEL dry powder inhaler, MICRODOSE, PULVINAL, EASYHALER, ULTRAHALER, TAIFUN, PULMOJET, OMNIHALER, GYROHALER, TAPER, CONIX, XCELOVAIR and PROHALER.

In one embodiment a compound of general formula (I), (Ix), (IA), (IB), (IC), (ID) or (IE) is provided as a micronized dry powder formulation, for example comprising lactose of a suitable grade.

Thus, as an aspect of the invention there is provided a pharmaceutical composition comprising a compound of general formula (I), (Ix), (IA), (IB), (IC), (ID) or (IE) in particulate form in combination with particulate lactose, said composition optionally comprising magnesium stearate.

In one embodiment a compound of general formula (I), (Ix), (IA), (IB), (IC), (ID) or (IE) is provided as a micronized dry powder formulation, comprising lactose of a suitable grade and magnesium stearate, filled into a device such as DISKUS. Suitably, such a device is a multidose device, for example the formulation is filled into blisters for use in a multi-unit dose device such as DISKUS.

In another embodiment a compound of general formula (I), (Ix), (IA), (IB), (IC), (ID) or (IE) is provided as a micronized dry powder formulation, for example comprising lactose of a suitable grade, filled into hard shell capsules for use in a single dose device such as AEROLISER.

In another embodiment a compound of general formula (I), (Ix), (IA), (IB), (IC), (ID) or (IE) is provided as a micronized dry powder formulation, comprising lactose of a suitable grade and magnesium stearate, filled into hard shell capsules for use in a single dose device such as AEROLISER.

In another embodiment a compound of general formula (I), (Ix), (IA), (IB), (IC), (ID) or (IE) is provided as a fine powder for use in an inhalation dosage form wherein the powder is in fine particles with a $D_{50}$ of 0.5-10 µm e.g. around 1-5 µm, that have been produced by a size reduction process other than jet mill micronisation e.g. spray drying, spray freezing, microfluidisation, high pressure homogenisation, super critical fluid crystallisation, ultrasonic crystallisation or combinations of these methods thereof, or other suitable particle formation methods known in the art that are used to produce fine particles with an aerodynamic particle size of 0.5-10 µm. The resultant particle size distribution may be measured using laser diffraction (e.g. with a Malvern Mastersizer 2000S instrument). The particles may either comprise the compound alone or in combination with suitable other excipients that may aid the processing. The resultant fine particles may form the final formulation for delivery to humans or may optionally be further formulated with other suitable excipients to facilitate delivery in an acceptable dosage form.

The compound of the invention may also be administered rectally, for example in the form of suppositories or enemas, which include aqueous or oily solutions as well as suspensions and emulsions and foams. Such compositions are prepared following standard procedures, well known by those skilled in the art. For example, suppositories can be prepared by mixing the active ingredient with a conventional suppository base such as cocoa butter or other glycerides. In this case, the drug is mixed with a suitable non-irritating excipient which is solid at ordinary temperatures but liquid at the rectal temperature and will therefore melt in the rectum to release the drug. Such materials are cocoa butter and polyethylene glycols.

Generally, for compositions intended to be administered topically to the eye in the form of eye drops or eye ointments, the total amount of the compound of general formula (I) will be about 0.0001 to less than 4.0% (w/w).

Preferably, for topical ocular administration, the compositions administered according to general formula (I), (Ix), (IA), (IB), (IC), (ID) or (IE) will be formulated as solutions, suspensions, emulsions and other dosage forms. Aqueous solutions are generally preferred, based on ease of formulation, as well as a patient's ability to administer such compositions easily by means of instilling one to two drops of the solutions in the affected eyes. However, the compositions may also be suspensions, viscous or semi-viscous gels, or other types of solid or semi-solid compositions. Suspensions may be preferred for compounds that are sparingly soluble in water.

An alternative for administration to the eye is intravitreal injection of a solution or suspension of the compound of general formula (I), (Ix), (IA), (IB), (IC), (ID) or (IE). In addition, the compound of general formula (I), (Ix), (IA), (IB), (IC), (ID) or (IE) may also be introduced by means of ocular implants or inserts.

The compositions administered according to general formula (I), (Ix), (IA), (IB), (IC), (ID) or (IE) may also include various other ingredients, including, but not limited to, tonicity agents, buffers, surfactants, stabilizing polymer, preservatives, co-solvents and viscosity building agents. Suitable pharmaceutical compositions of general formula (I), (Ix), (IA), (IB), (IC), (ID) or (IE) include a compound of the invention formulated with a tonicity agent and a buffer. The pharmaceutical compositions of general formula (I), (Ix), (IA), (IB), (IC), (ID) or (IE) may further optionally include a surfactant and/or a palliative agent and/or a stabilizing polymer.

Various tonicity agents may be employed to adjust the tonicity of the composition, preferably to that of natural tears for ophthalmic compositions. For example, sodium chloride, potassium chloride, magnesium chloride, calcium chloride, simple sugars such as dextrose, fructose, galactose, and/or simply polyols such as the sugar alcohols mannitol, sorbitol, xylitol, lactitol, isomaltitol, maltitol, and hydrogenated starch hydrolysates may be added to the composition to approximate physiological tonicity. Such an amount of tonicity agent will vary, depending on the particular agent to be added. In general, however, the compositions will have a tonicity agent in an amount sufficient to cause the final composition to have an ophthalmically acceptable osmolality (generally about 150-450 mOsm, preferably 250-350 mOsm and most preferably at approximately 290 mOsm). In general, the tonicity agents of the invention will be present in the range of 2 to 4% w/w. Preferred tonicity agents of the invention include the simple sugars or the sugar alcohols, such as D-mannitol.

An appropriate buffer system (e.g. sodium phosphate, sodium acetate, sodium citrate, sodium borate or boric acid) may be added to the compositions to prevent pH drift under storage conditions. The particular concentration will vary, depending on the agent employed. Preferably however, the buffer will be chosen to maintain a target pH within the range of pH 5 to 8, and more preferably to a target pH of pH 5 to 7.

Surfactants may optionally be employed to deliver higher concentrations of compound of general formula (I), (Ix), (IA), (IB), (IC), (ID) or (IE). The surfactants function to solubilise the compound and stabilise colloid dispersion, such as micellar solution, microemulsion, emulsion and suspension. Examples of surfactants which may optionally be used include polysorbate, poloxamer, polyosyl 40 stearate, polyoxyl castor oil, tyloxapol, Triton, and sorbitan monolaurate. Preferred surfactants to be employed in the invention have a hydrophile/lipophile/balance "HLB" in the range of 12.4 to 13.2 and are acceptable for ophthalmic use, such as TritonX114 and tyloxapol.

Additional agents that may be added to the ophthalmic compositions of compounds of general formula (I), (Ix), (IA), (IB), (IC), (ID) or (IE) are demulcents which function as a stabilising polymer. The stabilizing polymer should be an ionic/charged example with precedence for topical ocular use, more specifically, a polymer that carries negative charge on its surface that can exhibit a zeta-potential of (−)10-50 mV for physical stability and capable of making a dispersion in water (i.e. water soluble). A preferred stabilising polymer of the invention would be polyelectrolyte, or polyelectrolytes if more than one, from the family of cross-linked polyacrylates, such as carbomers and Pemulen®, specifically Carbomer 974p (polyacrylic acid), at 0.1-0.5% w/w.

Other compounds may also be added to the ophthalmic compositions of the compound of general formula (I), (Ix), (IA), (IB), (IC), (ID) or (IE) to increase the viscosity of the carrier. Examples of viscosity enhancing agents include, but are not limited to: polysaccharides, such as hyaluronic acid and its salts, chondroitin sulfate and its salts, dextrans, various polymers of the cellulose family; vinyl polymers; and acrylic acid polymers.

Topical ophthalmic products are typically packaged in multidose form. Preservatives are thus required to prevent microbial contamination during use. Suitable preservatives include: benzalkonium chloride, chlorobutanol, benzododecinium bromide, methyl paraben, propyl paraben, phenylethyl alcohol, edentate disodium, sorbic acid, polyquaternium-1, or other agents known to those skilled in the art. Such preservatives are typically employed at a level of from 0.001 to 1.0% w/v. Unit dose compositions of general formula (I), (Ix), (IA), (IB), (IC), (ID) or (IE) will be sterile, but typically unpreserved. Such compositions, therefore, generally will not contain preservatives.

Parenteral formulations will generally be sterile.

The medical practitioner, or other skilled person, will be able to determine a suitable dosage for the compound of general formula (I), (Ix), (IA), (IB), (IC), (ID) or (IE) and hence the amount of the compound of the invention that should be included in any particular pharmaceutical formulation (whether in unit dosage form or otherwise).

Compounds of general formula (I), (Ix), (IA), (IB), (IC), (ID) or (IE) may be used in combination with one or more other active agents which are useful in the treatment or prophylaxis of a disease or condition affected by modulation of TMEM16A and especially a respiratory disease or condition, for example one of the diseases and conditions mentioned above.

An additional active agent of this type may be included in the pharmaceutical composition described above but alternatively it may be administered separately, either at the same time as the compound of general formula (I), (Ix), (IA), (IB), (IC), (ID) or (IE) or at an earlier or later time.

Therefore, in a further aspect of the present invention there is provided a product comprising a compound of general formula (I), (Ix), (IA), (IB), (IC), (ID) or (IE) and an additional agent useful in the treatment or prevention of respiratory conditions as a combined preparation for simultaneous, sequential or separate use in the treatment of a disease or condition affected by modulation of TMEM16A and especially a respiratory disease or condition, for example one of the diseases and conditions mentioned above.

There is also provided a compound of general formula (I), (Ix), (IA), (IB), (IC), (ID) or (IE) in combination with an additional agent useful in the treatment or prevention of respiratory conditions as a combined preparation for simultaneous, sequential or separate use in the treatment of a disease or condition affected by modulation of TMEM16A and especially a respiratory disease or condition, for example one of the diseases and conditions mentioned above.

Suitable additional active agents which may be included in a pharmaceutical composition or a combined preparation with the compounds of general formula (I), (Ix), (IA), (IB), (IC), (ID) or (IE) include:

β2 adrenoreceptor agonists such as metaproterenol, isoproterenol, isoprenaline, albuterol, salbutamol, formoterol, salmeterol, indacaterol, terbutaline, orciprenaline, bitolterol mesylate, pirbuterol, olodaterol, vilanterol and abediterol;

antihistamines, for example histamine H$_1$ receptor antagonists such as loratadine, cetirizine, desloratadine, levocetirizine, fexofenadine, astemizole, azelastine and chlorpheniramine or H$_4$ receptor antagonists;

dornase alpha;

corticosteroids such as prednisone, prednisolone, flunisolide, triamcinolone acetonide, beclomethasone dipropionate, budesonide, fluticasone propionate mometasone furoate and fluticasone furoate;

Leukotriene antagonists such as montelukast and zafirlukast;

anticholinergic compounds, particularly muscarinic antagonists such as ipratropium, tiotropium, glycopyrrolate, aclidinium and umeclidinium;

CFTR repair therapies (e.g. CFTR potentiators, correctors or amplifiers) such as Ivacaftor, QBW251, Bamacaftor (VX659), Elexacaftor (VX445), VX561/CPT-656, VX152, VX440, GLP2737, GLP2222, GLP2451, PT1438, PT1801, PT1808, FDL-169 and FDL-176 and CFTR correctors such as Lumacaftor and Tezacaftor or combinations thereof (for example a combination of Ivacaftor, Tezacaftor and Elexacaftor);

ENaC modulators, particularly ENaC inhibitors;

Antibiotics;

Antivirals such as ribavirin and neuraminidase inhibitors such as zanamivir;

Antifungals such as PUR1900;

Airway hydrating agents (osmoloytes) such as hypertonic saline and mannitol (Bronchitol®); and Mucolytic agents such as. N-acetyl cysteine.

When the additional active agent is an ENaC modulator, it may be an ENaC inhibitor such as amiloride, VX-371, AZD5634, QBW276, SPX-101, BI443651, BI1265162 and ETD001. Other suitable ENaC blockers are disclosed in our applications WO 2017/221008, WO 2018/096325, WO 2019/077340 and WO 2019/220147 and any of the example compounds of those applications may be used in combination with the compounds of general formula (I), (Ix), (IA), (IB), (IC), (ID) or (IE). Particularly suitable compounds for use in combination with the compounds of general formula (I), (Ix), (IA), (IB), (IC), (ID) or (IE) include compounds having a cation selected from:

2-[({3-amino-5H-pyrrolo[2,3-b]pyrazin-2-yl}formamido)ethyl]-6-(4-{bis[(2S,3R,4R,5R)-2,3,4,5,6-pentahydroxyhexyl]amino}piperidine-1-carbonyl)-1,3-diethyl-1H-1,3-benzodiazol-3-ium;

2-[({3-amino-5H-pyrrolo[2,3-b]pyrazin-2-yl}formamido)methyl]-6-{[2-(4-{bis[(2S,3R,4R,5R)-2,3,4,5,6-pentahydroxyhexyl]amino}piperidin-1-yl)ethyl]carbamoyl}-1,3-diethyl-1H-1,3-benzodiazol-3-ium;

2-[({3-amino-5H-pyrrolo[2,3-b]pyrazin-2-yl}formamido)methyl]-5-[4-({bis[(2S,3R,4R,5R)-2,3,4,5,6-pentahydroxyhexyl]amino}methyl)piperidine-1-carbonyl]-1,3-diethyl-1H-1,3-benzodiazol-3-ium;

2-[({3-amino-5H-pyrrolo[2,3-b]pyrazin-2-yl}formamido)methyl]-6-[(3R)-3-{bis[(2S,3R,4R,5R)-2,3,4,5,6-pentahydroxyhexyl]amino}pyrrolidine-1-carbonyl]-1,3-diethyl-1H-1,3-benzodiazol-3-ium;

2-[({3-amino-5H-pyrrolo[2,3-b]pyrazin-2-yl}formamido)methyl]-6-[(3S)-3-{bis[(2S,3R,4R,5R)-2,3,4,5,6-pentahydroxyhexyl]amino}pyrrolidine-1-carbonyl]-1,3-diethyl-1H-1,3-benzodiazol-3-ium;

2-[({3-amino-5H-pyrrolo[2,3-b]pyrazin-2-yl}formamido)methyl]-1,3-diethyl-6-{[(1r,4r)-4-{bis[(2S,3R,4R,5R)-2,3,4,5,6-pentahydroxyhexyl]amino}cyclohexyl]carbamoyl}-1H-1,3-benzodiazol-3-ium;

2-[({3-amino-5H-pyrrolo[2,3-b]pyrazin-2-yl}formamido)methyl]-1,3-diethyl-6-{[(1s,4s)-4-{bis[(2S,3R,4R,5R)-2,3,4,5,6-pentahydroxyhexyl]amino}cyclohexyl]carbamoyl}-1H-1,3-benzodiazol-3-ium;

and a suitable anion, for example halide, sulfate, nitrate, phosphate, formate, acetate, trifluoroacetate, fumarate, citrate, tartrate, oxalate, succinate, mandelate, methane sulfonate or p-toluene sulfonate.

The invention is illustrated by the following non-limiting Examples and the drawing in which:

FIG. 1 is an example trace from a whole-cell patch clamp (Qpatch) TMEM16A potentiator assay as used in the Biological Example and illustrates the methodology used in the assay.

EXAMPLES

The invention is illustrated by the following non-limiting Examples.

Examples

General Conditions:

Mass spectra were run on LC-MS systems using electrospray ionization. These were run using either a Waters Acquity uPLC system with Waters PDA and ELS detectors or Shimadzu LCMS-2010EV systems. [M+H]+ refers to mono-isotopic molecular weights.

NMR spectra were recorded on a Bruker Avance III HD 500 MHz with a 5 mm Broad Band Inverse probe, a Bruker Avance III HD 250 MHz or a 400 MHz Avance III HD Nanobay fitted with a 5 mm Broad Band Observed SmartProbe using the solvent as internal deuterium lock. Spectra were recorded at room temperature unless otherwise stated and were referenced using the solvent peak.

Referring to the examples that follow, compounds of the preferred embodiments were synthesized using the methods described herein, or other methods, which are known in the art.

The various starting materials, intermediates, and compounds of the preferred embodiments may be isolated and purified, where appropriate, using conventional techniques such as precipitation, filtration, crystallization, evaporation, distillation, and chromatography. Unless otherwise stated, all starting materials are obtained from commercial suppliers and used without further purification. Salts may be prepared from compounds by known salt-forming procedures.

Compounds were purified by flash column chromatography on normal phase silica on Biotage® Isolera systems using the appropriate SNAP cartridge or Sfär cartridge and gradient. Alternatively, compounds were purified on reverse phase silica using either Biotage® Isolera or Biotage® Selekt systems with the appropriate SNAP C18 or Sfär C18 cartridges and reverse phase eluent or by preparative HPLC (if stated otherwise).

Preparative HPLC Using Acidic pH, Early Elution Method

Purifications by were performed on a Gilson LC system using Waters Sunfire C18 columns (30 mm×100 mm, 10 µM; temperature: RT) and a gradient of 10-95% B (A=0.1% formic acid in water; B=0.1% formic acid in acetonitrile) over 14.44 min then 95% B for 2.11 min, with an injection volume of 1500 µL and a flow rate of 40 mL/min. UV spectra were recorded at 215 nm using a Gilson detector.

Preparative HPLC Using Acidic pH, Standard Elution Method

Purifications by preparative HPLC (acidic pH, standard elution method) were performed on a Gilson LC system using Waters Sunfire C18 columns (30 mm×100 mm, 10 μM; temperature: RT) and a gradient of 30-95% B (A=0.1% formic acid in water; B=0.1% formic acid in acetonitrile) over 11 min then 95% B for 2.11 min, with an injection volume of 1500 μL and a flow rate of 40 mL/min. UV spectra were recorded at 215 nm using a Gilson detector.

Preparative HPLC Using Basic pH, Early Elution Method

Purifications by preparative HPLC (basic pH, early elution method) were performed on a Gilson LC system using Waters Xbridge C18 columns (30 mm×100 mm, 10 μM; temperature: RT) and a gradient of 10-95% (A=0.2% ammonium hydroxide in water; B=0.2% ammonium hydroxide in acetonitrile) over 14.44 min then 95% B for 2.11 min, with an injection volume of 1500 μL and a flow rate of 40 mL/min. UV spectra were recorded at 215 nm using a Gilson detector.

Preparative HPLC Using Basic pH, Standard Elution Method

Purifications by preparative HPLC (basic pH, standard elution method) were performed on a Gilson LC system using Waters Xbridge C18 columns (30 mm×100 mm, 10 μM; temperature: RT) and a gradient of 30-95% (A=0.2% ammonium hydroxide in water; B=0.2% ammonium hydroxide in acetonitrile) over 11 min then 95% B for 2.11 min, with an injection volume of 1500 μL and a flow rate of 40 mL/min. UV spectra were recorded at 215 nm using a Gilson detector.

If not indicated otherwise, the analytical HPLC conditions are as follows:

Method A
  Column: Phenomenex Kinetix-XB C18 2.1×100 mm, 1.7 μm
  Column Temp 40° C.
  Eluents: A: $H_2O$+0.1% formic acid, B: acetonitrile+0.1% formic acid
  Flow Rate: 0.6 mL/min
  Gradient: 0-5.3 min 5-100% B, 5.3-5.8 min 100% B, 5.8-5.82 min 100-5% B, 5.82-7.00 min 5% B Method B
  Column: Kinetex Core-Shell C18 2.1×50 mm, 5 μm
  Column Temp 40° C.
  Eluents: A: $H_2O$+0.1% formic acid, B: acetonitrile+0.1% formic acid
  Flow Rate: 1.2 mL/min
  Gradient: 0-1.20 min 5-100% B, 1.20-1.30 min 100% B, 1.30-1.31 min 100-5% B, 1.31-1.7 min 5% B Method C
  Column: Phenomenex Gemini-NX C18 2.0×50 mm, 3 μm
  Column Temp 40° C.
  Eluents: A: 2 mM ammonium bicarbonate, buffered to pH10, B: acetonitrile
  Flow Rate: 1 mL/min
  Gradient: 0-1.80 min 1-100% B, 1.80-2.10 min 100% B, 2.10-2.30 min 100-1% B, 2.30-3.50 min 1% B Method D
  Column: Waters UPLC® BEH™ C18, 2.1×50 mm, 1.7 μm
  Column Temp 40° C.
  Eluents: A: $H_2O$+0.1% formic acid, B: acetonitrile+0.1% formic acid
  Flow Rate: 0.9 mL/min
  Gradient: 0-1.10 min 5-100% B, 1.10-1.35 min 100% B, 1.35-1.40 min 100-5% B, 1.40-1.50 min 5% B Method E
  Column: Kinetex Core-Shell C18 2.1×50 mm, 5 μm
  Column Temp 40° C.
  Eluents: A: $H_2O$+0.1% formic acid, B: acetonitrile+0.1% formic acid
  Flow Rate: 1.2 mL/min
  Gradient: 0-1.83 min 5-100% B, 1.83-2.25 min 100% B, 2.25-2.26 min 100-5% B, 2.26-2.8 min 5% B Method F
  Column: Waters UPLC® BEH™ C18 2.1×100 mm, 1.7 μm
  Column Temp 40° C.
  Eluents: A: 2 mM ammonium bicarbonate, buffered to pH10, B: acetonitrile
  Flow Rate: 0.6 mL/min
  Gradient: 0-5.3 min 5-100% B, 5.3-5.8 min 100% B, 5.8-5.82 min 100-5% B, 5.82-7.00 min 5% B Method G
  Column: Waters UPLC® BEH™ C18 2.1×30 mm, 1.7 μm
  Column Temp: 40° C.
  Eluents: A: 2 mM ammonium bicarbonate, buffered to pH10, B: acetonitrile
  Flow Rate: 1.0 mL/min
  Gradient: 0-0.75 min 5-100% B, 0.75-0.85 min 100% B, 0.85-0.9 min 100-5% B, 0.9-1.0 min 5% B The following example are intended to illustrate the invention and are not to be construed as being limitations thereon. Temperatures are given in degrees centigrade. If not mentioned otherwise, all evaporations are performed in vacuo, preferably between about 15 mm Hg and 100 mm Hg (=20-133 mbar). The structure of final products, intermediates and starting materials is confirmed by standard analytical methods, e.g., microanalysis and spectroscopic characteristics, e.g., MS, IR, and NMR. Abbreviations used are those conventional in the art. If not defined, the terms have their generally accepted meanings.

ABBREVIATION

AcOH acetic acid
aq. aqueous
BINAP (2,2'-bis(diphenylphosphino)-1,1'-binaphthyl)
br broad
d doublet
dd doublet of doublets
DCC N, N'-dicyclohexylcarbodiimide
DCE dichloroethane
DCM dichloromethane
DIPEA diisopropylethylamine
DMAP 4-dimethylaminopyridine
DMF N,N-dimethylformamide
EDCl 1-ethyl-3-(3-dimethylaminopropyl)carbodiimide
EtOAc ethyl acetate
EtOH ethanol
HOAt 1-hydroxy-7-azabenzotriazole
HATU 2-(7-aza-1H-benzotriazole-1-yl)-1,1,3,3-tetramethyluronium hexafluorophosphate
HPLC high pressure liquid chromatography
IPA isopropyl alcohol
MeCN acetonitrile
MeOH MeOH
MS mass spectrometry
m multiplet
min minute(s)
mL milliliter(s)
m/z mass to charge ratio
NMR nuclear magnetic resonance
q quartet
Rt retention time
s singlet t triplet
TBME methyl tert-butyl ether
TBTU N,N,N',N'-tetramethyl-O-(benzotriazol-1-yl)uronium tetrafluoroborate
TEA triethylamine
TFA trifluoroacetic acid
THE tetrahydrofuran
VT variable temperature

PREPARATION OF EXAMPLES

Example 1

2-(1-Adamantyl)-N-[2-(cyclohexylmethyl)-1H-benzimidazol-5-yl]acetamide

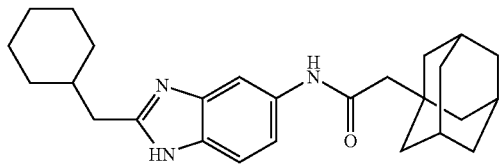 [SMILES: O=C(CC12CC3CC(CC(C3)C1)C2)Nc1ccc2[nH]c(CC3CCCCC3)nc2c1]

Step 1: 2-(1-Adamantyl)-N-(4-amino-3-nitro-phenyl)acetamide

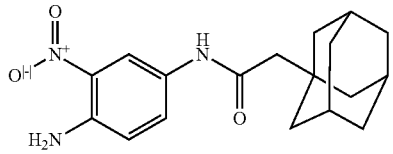

2-Nitrobenzene-1,4-diamine (3.15 g, 20.59 mmol) was added to a solution of 2-(1-adamantyl)acetic acid (4.0 g, 20.59 mmol), HATU (8.61 g, 22.65 mmol) and DIPEA (5.38 mL, 30.88 mmol) in DMF (20 mL). After stirring at room temperature for 18 hours, the reaction mixture was partitioned between EtOAc (100 mL) and water (100 mL). A black precipitate formed in the biphasic mixture. The solid was filtered off and was discarded. The phases were separated and the organic layer was washed with water (100 mL) and brine (2×50 mL), dried over MgSO₄ and was concentrated in vacuo to afford a brown/black oil. The oil was triturated in DCM (~40 mL) and the resulting suspension filtered to afford the title compound as a red/black solid.

LC-MS (Method B): Rt 1.24 min; MS m/z 330.2=[M+H]+ (99% @ 215 nm)

1H NMR (500 MHz, DMSO-d6) δ 9.73 (s, 1H), 8.39 (d, J=2.5 Hz, 1H), 7.50 (dd, J=9.1, 2.5 Hz, 1H), 7.29 (s, 2H), 6.96 (d, J=9.1 Hz, 1H), 2.00 (s, 2H), 1.93 (s, 3H), 1.69-1.63 (m, 3H), 1.63-1.54 (m, 9H).

Step 2: 2-(1-Adamantyl)-N-(3,4-diaminophenyl)acetamide

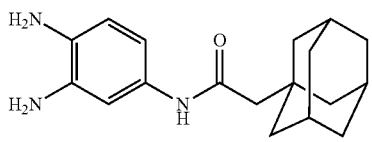 [SMILES: Nc1ccc(NC(=O)CC23CC4CC(CC(C4)C2)C3)cc1N]

A suspension of 2-(1-adamantyl)-N-(4-amino-3-nitrophenyl)acetamide (step 1) (4.82 g, 14.63 mmol) and Pd/C (10%, 1.24 g, 1.17 mmol) in EtOH (50 mL) was placed under a hydrogen atmosphere and stirred for 18 hours. The resulting mixture was filtered over Celite® (filter material) and the solid washed with EtOH (3×10 mL). The filtrate was concentrated in vacuo to afford the title compound as a purple solid.

LC-MS (Method B): Rt 0.93 min; MS m/z 300.3=[M+H]+ (98% @ 215 nm)

1H NMR (500 MHz, DMSO-d6) δ 9.12 (s, 1H), 6.83 (d, J=2.3 Hz, 1H), 6.52 (dd, J=8.2, 2.3 Hz, 1H), 6.38 (d, J=8.2 Hz, 1H), 4.54-4.22 (m, 4H), 1.96-1.88 (m, 5H), 1.70-1.54 (m, 12H).

Step 3: 2-(1-Adamantyl)-N-[2-(cyclohexylmethyl)-1H-benzimidazol-5-yl]acetamide

2-Cyclohexylacetic acid (0.06 g, 0.4 mmol), HATU (0.17 g, 0.44 mmol) and DIPEA (0.21 mL, 1.2 mmol) were dissolved in DMF (2.5 mL) and stirred at room temperature for 1 hour. 2-(1-Adamantyl)-N-(3,4-diaminophenyl)acetamide (step 2) (0.12 g, 0.4 mmol) was added and the mixture was stirred at room temperature overnight. Water (8 mL) was added followed by EtOAc (8 mL) and the resulting suspension collected by filtration and washed with EtOAc to afford a pale purple solid. The solid was sonicated in MeCN, filtered, dried under vacuum and suspended in acetic acid (2 mL). The suspension was stirred in a sealed vessel at 60° C. overnight. The resulting mixture was concentrated in vacuo and the residue partitioned between EtOAc (5 mL) and saturated aqueous sodium bicarbonate solution (5 mL). The layers were separated and the organic portion was washed with saturated aqueous sodium bicarbonate solution (5 mL) before passing through a phase separating Isolute® cartridge and concentrating in vacuo. The resulting residue was purified by C18 reverse phase chromatography eluting with 10-100% MeCN in water (+0.2% ammonium hydroxide) to afford the title compound as a pale brown solid.

LC-MS (Method A): Rt 2.87 min; MS m/z 406.4=[M+H]+ (99% @ 215 nm)

1H NMR (500 MHz, DMSO-d6) δ 12.07-11.89 (m, 1H), 9.73-9.53 (m, 1H), 8.03-7.74 (m, 1H), 7.46-7.00 (m, 2H), 2.67-2.59 (m, 2H), 2.08-2.01 (m, 2H), 1.98-1.89 (m, 3H), 1.86-1.75 (m, 1H), 1.71-1.55 (m, 17H), 1.28-1.08 (m, 3H), 1.05-0.92 (m, 2H).

Example 1.1

2-(1-Adamantyl)-N-[2-(tetrahydropyran-2-ylmethyl)-1H-benzimidazol-5-yl]acetamide

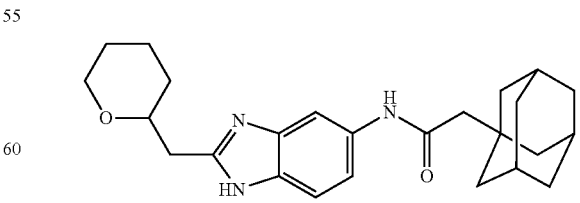

The title compound was prepared from 2-(1-adamantyl)-N-(3,4-diaminophenyl)acetamide (Example 1 step 2) and 2-tetrahydropyran-2-ylacetic acid analogously to Example 1 step 3.

LC-MS (Method A): Rt 2.34 min; MS m/z 408.3=[M+H]+ (100% @ 215 nm)

1H NMR (500 MHz, DMSO-d6) δ 12.10-11.83 (m, 1H), 9.75-9.50 (m, 1H), 8.05-7.71 (m, 1H), 7.45-7.00 (m, 2H), 3.90-3.78 (m, 1H), 3.78-3.61 (m, 1H), 3.41-3.31 (m, 1H), 2.94-2.79 (m, 2H), 2.07-2.02 (m, 2H), 1.97-1.89 (m, 3H), 1.83-1.54 (m, 14H), 1.52-1.37 (m, 3H), 1.31-1.19 (m, 1H).

Example 2

2-(2-Adamantyl)-N-(2-benzyl-1H-benzimidazol-5-yl)

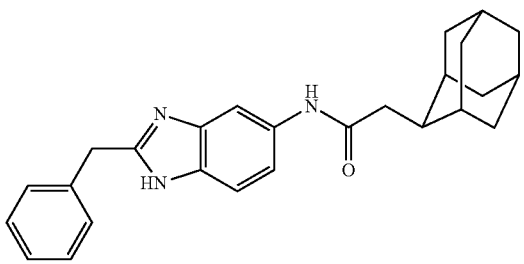 [SMILES: O=C(CC1C2CC3CC(C2)CC1C3)Nc1ccc2[nH]c(Cc3ccccc3)nc2c1]

Step 1: Ethyl 2-(2-adamantylidene)acetate

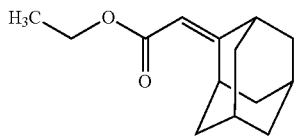 [SMILES: CCOC(=O)C=C1C2CC3CC(C2)CC1C3]

Ethyl 2-diethoxyphosphorylacetate (7.26 mL, 36.61 mmol) was added dropwise to a cooled (0° C.) suspension of NaH, 60% dispersion in mineral oil (1.86 g, 46.6 mmol) in THF (100 mL). After stirring at 0° C. for 30 mins, adamantan-2-one (5.0 g, 33.28 mmol) was added and the mixture was allowed to warm to room temperature and stirred for 2 hours. The resulting mixture was diluted with DCM (100 mL) and washed with water (100 mL). The aqueous portion was extracted with DCM (100 mL) and the combined organic extracts dried over MgSO4 and concentrated in vacuo to afford a colourless oil. The oil was purified by chromatography on silica eluting with 0-20% EtOAc in heptanes to afford the title compound as a colourless oil.

LC-MS (Method B): Rt 1.43 min; MS m/z 221.3=[M+H]+ (97% @ 215 nm)

1H NMR (500 MHz, Chloroform-d) δ 5.58 (s, 1H), 4.14 (q, J=7.1 Hz, 2H), 4.06 (s, 1H), 2.43 (s, 1H), 2.00-1.90 (m, 6H), 1.88-1.78 (m, 6H), 1.27 (t, J=7.1 Hz, 3H).

Step 2: Ethyl 2-(2-adamantyl)acetate

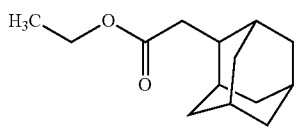 [SMILES: CCOC(=O)CC1C2CC3CC(C2)CC1C3]

A suspension of ethyl 2-(2-adamantylidene)acetate (step 1) (95%, 14.0 g, 60.37 mmol) and Pd/C (10%, 6.42 g, 6.04 mmol) in EtOH (125 mL) under a hydrogen atmosphere and was stirred for 18 hours. The resulting mixture was filtered through glass filter paper and the filter cake washed with EtOH (2×10 mL). The filtrate was concentrated in vacuo to afford the title compound as a colourless oil.

LC-MS (Method B): Rt 1.47 min; MS m/z 223.0=[M+H]+ (100% @ 215 nm)

1H NMR (500 MHz, Chloroform-d) δ 4.12 (q, J=7.1 Hz, 2H), 2.44 (d, J=7.6 Hz, 2H), 2.23 (t, J=7.6 Hz, 1H), 1.91-1.75 (m, 8H), 1.71 (d, J=10.9 Hz, 4H), 1.62-1.50 (m, 3H), 1.25 (t, J=7.1 Hz, 3H).

Step 3: 2-(2-Adamantyl)acetic acid

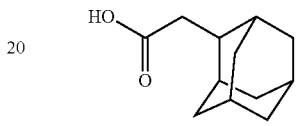

A solution of ethyl 2-(2-adamantyl)acetate (step 2) (100%, 18.3 g, 82.31 mmol) in MeOH (200 mL) and 2M aq. sodium hydroxide (82.31 mL, 164.63 mmol) was stirred at 70° C. for 2 hours. The mixture was allowed to cool to room temperature and concentrated in vacuo. The resulting solution was diluted with water (200 mL) and 6M aq. HCl solution (~30 mL) was added causing a white precipitate to form. EtOAc (300 mL) was added and the phases were separated. The aqueous portion was further extracted with EtOAc (200 mL) and the combined organic extracts were washed with brine (200 mL), dried over MgSO4 and concentrated in vacuo to afford the title compound as a white solid.

LC-MS (Method B): Rt 1.15 min; MS m/z 193.4=[M+H]+ (100% @ 215 nm)

1H NMR (500 MHz, Chloroform-d) δ 2.50 (d, J=7.6 Hz, 2H), 2.24 (t, J=7.5 Hz, 1H), 1.93-1.77 (m, 8H), 1.74 (d, J=11.2 Hz, 4H), 1.56 (d, J=12.5 Hz, 2H).

Step 4: 2-(2-Adamantyl)-N-(4-amino-3-nitro-phenyl)acetamide

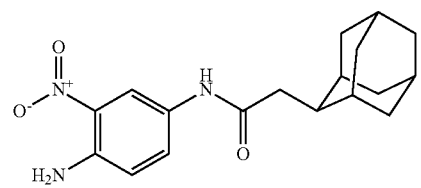 [SMILES: Nc1ccc(NC(=O)CC2C3CC4CC(C3)CC2C4)cc1[N+](=O)[O-]]

HATU (13.66 g, 35.91 mmol) was added to a cooled (0° C.) solution of 2-(2-adamantyl)acetic acid (step 3) (6.34 g, 32.65 mmol) in DMF (60 mL). DIPEA (8.53 mL, 48.97 mmol) was added dropwise over 1 min and the resulting solution stirred at 0° C. for 5 min and at room temperature for 10 min. The solution was cooled back to 0° C. and 2-nitrobenzene-1,4-diamine (5.0 g, 32.65 mmol) was added. The resulting solution was stirred at 0° C. for 1 hour and after warming to room temperature, diluted with water (60 mL). EtOAc (100 mL) and more water (40 mL) were added and the layers separated. The aqueous layer was extracted with EtOAc (100 mL) and the combined organic extracts were washed with saturated aqueous sodium bicarbonate solution (2×100 mL), 10% potassium carbonate solution (2×100 mL) and filtered under vacuum. The biphasic filtrate was placed into a separating funnel and the layers were separated. The organic layer was passed through a phase separating Isolute® cartridge and concentrated in vacuo to afford a dark black/brown/red gum. DCM (~80 mL) was added and the suspension was agitated. More DCM was added and the suspension was filtered under vacuum, washing with DCM and drying under vacuum to afford the title compound as a red/brown solid.

LC-MS (Method B): Rt 1.22 min; MS m/z 330.2=[M+H]+ (100% @ 215 nm)

1H NMR (500 MHz, DMSO-d6) δ 9.88 (s, 1H), 8.40 (d, J=2.5 Hz, 1H), 7.52 (dd, J=9.1, 2.5 Hz, 1H), 7.31 (s, 2H), 7.03-6.90 (m, 1H), 2.41 (d, J=7.6 Hz, 2H), 2.21 (t, J=7.5 Hz, 1H), 1.95-1.60 (m, 12H), 1.56-1.46 (m, 2H).

Step 5:
2-(2-Adamantyl)-N-(3,4-diaminophenyl)acetamide

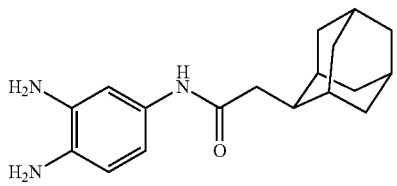 [SMILES: Nc1ccc(NC(=O)CC2C3CC4CC(C3)CC2C4)cc1N]

A solution of 2-(2-adamantyl)-N-(4-amino-3-nitro-phenyl)acetamide (step 4) (4.0 g, 12.14 mmol) in EtOH (60 mL) was purged with nitrogen and treated with Pd/C (10%, 1.03 g, 0.97 mmol). The mixture was placed under a hydrogen atmosphere and stirred at room temperature overnight. The resulting mixture was filtered through Celite® (filter material), washing with EtOAc, and concentrated in vacuo to afford the title compound as a brown foam.

LC-MS (Method B): Rt 0.97 min; MS m/z 300.2=[M+H]+ (100% @ 215 nm)

1H NMR (500 MHz, DMSO-d6) δ 9.27 (s, 1H), 6.81 (d, J=2.3 Hz, 1H), 6.53 (dd, J=2.3, 6.5 Hz, 1H), 6.38 (d, J=6.4 Hz, 1H), 4.60-4.07 (m, 4H), 2.33 (d, J=7.6 Hz, 2H), 2.20-2.13 (m, 1H), 1.95-1.62 (m, 12H), 1.55-1.42 (m, 2H).

Step 6: 2-(2-Adamantyl)-N-(2-benzyl-1H-benzimidazol-5-yl)acetamide

DIPEA (4.20 mL, 24.05 mmol) was added to a mixture of 2-phenylacetic acid (1.64 g, 12.02 mmol) and HATU (5.03 g, 13.23 mmol) in DMF (30 mL) and the mixture was stirred at room temperature for 10 minutes. The resulting mixture was added to a solution of 2-(2-adamantyl)-N-(3,4-diaminophenyl)acetamide (step 5) (3.60 g, 12.02 mmol) in DMF (30 mL) and stirred overnight at room temperature. The mixture was partitioned between water (100 mL) and EtOAc (100 mL) and the phases were separated. The organic extracts were washed with water (100 mL) causing solid precipitate formation in the organic and aqueous layers. The aqueous portion was back-extracted with EtOAc (80 mL) and the combined organic suspensions were filtered and dried in a vacuum oven to afford the desired amide intermediate as a pale purple solid. The solid was suspended in acetic acid (20 mL) and stirred at 60° C. for 1 hour then at 66° C. for 4 hours. The resulting mixture was concentrated in vacuo and the residue partitioned between EtOAc (50 mL) and saturated aqueous sodium bicarbonate solution (50 mL). The phases were separated and the organic layer was washed with saturated aqueous sodium bicarbonate solution (2×50 mL) and water (2×30 mL). The organic phase was passed through a phase separating Isolute® cartridge and concentrated in vacuo to give the crude product as a brown oily solid. The solid was suspended in MeCN and filtered under vacuum to afford a pale pink solid. Purification of the solid by C18 reverse phase chromatography eluting with 10-100% MeCN in water (+0.1% ammonium hydroxide modifier) yielded a pale yellow solid. The solid was dissolved in boiling MeOH (40 mL) and the mixture was allowed to cool to room temperature overnight and further cooled to 0° C. for 30 minutes. The resulting precipitate was filtered and dried in a vacuum oven to afford to the title product.

LC-MS (Method A): Rt 2.72 min; MS m/z 400.3=[M+H]+ (100% @ 215 nm)

1H NMR (250 MHz, DMSO-d6, VT at 353K) δ 11.86 (br. s, 1H), 9.52 (br. s, 1H), 7.85 (br. s, 1H), 7.48-7.08 (m, 7H), 4.14 (s, 2H), 2.48-2.40 (m, 2H), 2.34-2.20 (m, 1H), 2.07-1.66 (m, 12H), 1.61-1.48 (m, 2H).

Example 2.1

2-(2-Adamantyl)-N-[2-(2-phenylethyl)-1H-benzimidazol-5-yl]acetamide

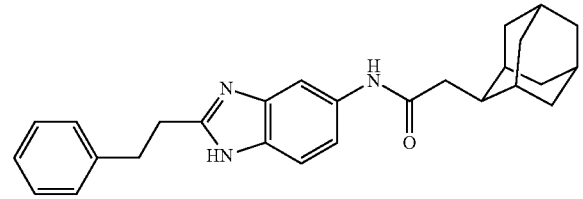 [SMILES: O=C(CC1C2CC3CC(C2)CC1C3)Nc1ccc2[nH]c(CCc3ccccc3)nc2c1]

The title compound was prepared from 2-(2-adamantyl)-N-(3,4-diaminophenyl)acetamide (Example 2 step 5) and 3-phenylpropanoic acid analogously to Example 2 step 6.

LC-MS (Method A): Rt 2.84 min; MS m/z 414.3=[M+H]+ (99% @ 215 nm)

1H NMR (500 MHz, DMSO-d6) δ 12.10 (br. s, 1H), 9.81 (br. s, 1H), 7.92 (br. s, 1H), 7.45-7.05 (m, 7H), 3.14-3.01 (m, 4H), 2.45 (d, J=7.6 Hz, 2H), 2.27-2.20 (m, 1H), 1.98-1.91 (m, 2H), 1.89-1.65 (m, 10H), 1.56-1.48 (m, 2H).

Example 2.2

2-(2-Adamantyl)-N-[2-[methoxy(phenyl)methyl]-1H-benzimidazol-5-yl]acetamide

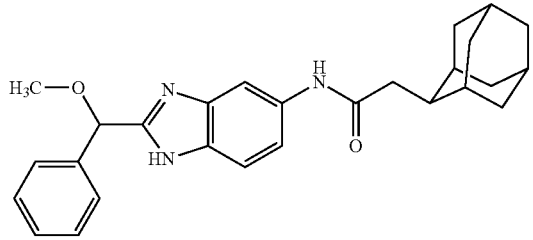 [SMILES: COC(c1ccccc1)c1nc2cc(NC(=O)CC3C4CC5CC(C4)CC3C5)ccc2[nH]1]

The title compound was prepared from 2-(2-adamantyl)-N-(3,4-diaminophenyl)acetamide (Example 2 step 5) and 2-methoxy-2-phenyl-acetic acid analogously to Example 2 step 6.

LC-MS (Method A): Rt 2.88 min; MS m/z 430.3=[M+H]+ (99% @ 215 nm) Variable Temperature 1H NMR (500 MHz, DMSO-d6) δ 12.42-12.32 (m, 1H), 9.94-9.70 (m, 1H), 8.06-7.80 (m, 1H), 7.51-7.06 (m, 7H), 5.61-5.49 (m, 1H), 3.39-3.34 (s, 3H), 2.48-2.41 (m, 2H), 2.27-2.19 (m, 1H), 1.98-1.91 (m, 2H), 1.88-1.64 (m, 10H), 1.56-1.47 (m, 2H).

Example 2.3

2-(2-Adamantyl)-N-[2-[(2-methoxyphenyl)methyl]-1H-benzimidazol-5-yl]acetamide

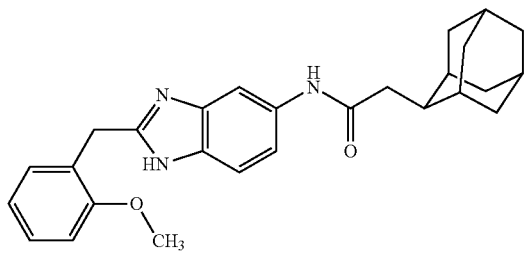 [SMILES: COc1ccccc1Cc1nc2cc(NC(=O)CC3C4CC5CC(C4)CC3C5)ccc2[nH]1]

The title compound was prepared from 2-(2-adamantyl)-N-(3,4-diaminophenyl)acetamide (Example 2 step 5) and 2-(2-methoxyphenyl)acetic acid analogously to Example 2 step 6.

LC-MS (Method A): Rt 2.85 min; MS m/z 430.4=[M+H]+ (97% @ 215 nm)

1H NMR (500 MHz, DMSO-d6) δ 11.95 (br. s, 1H), 9.87-9.72 (m, 1H), 7.91 (s, 1H), 7.42-7.29 (m, 1H), 7.28-7.08 (m, 3H), 7.00 (d, J=8.3 Hz, 1H), 6.88 (td, J=7.4, 1.0 Hz, 1H), 4.08 (s, 2H), 3.79 (s, 3H), 2.46-2.42 (m, 2H), 2.27-2.20 (m, 1H), 1.99-1.90 (m, 2H), 1.89-1.64 (m, 10H), 1.56-1.47 (m, 2H).

Example 3

2-(2-Adamantyl)-N-[2-[(R)-methylamino(phenyl)methyl]-1H-benzimidazol-5-yl]acetamide

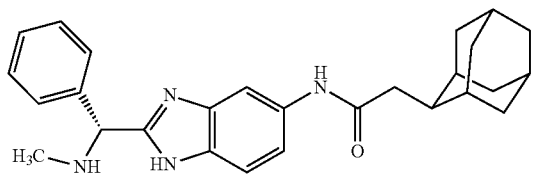 [SMILES: CN[C@H](c1ccccc1)c1nc2cc(NC(=O)CC3C4CC5CC(C4)CC3C5)ccc2[nH]1]

Step 1: tert-Butyl N—[(R)-[5-[[2-(2-adamantyl)acetyl]amino]-1H-benzimidazol-2-yl]-phenyl-methyl]-N-methyl-carbamate The title compound was prepared from 2-(2-adamantyl)-N-(3,4-diaminophenyl)acetamide (Example 2 step 5) and (2R)-2-[tert-butoxycarbonyl(methyl)amino]-2-phenyl-acetic acid analogously to Example 2 step 6.

LC-MS (Method A): Rt 3.52 min; MS m/z 529.4=[M+H]+ (99% @ 215 nm) Variable Temperature 1H NMR (250 MHz, DMSO-d6, 353K) δ 12.10 (br. s, 1H), 9.57 (s, 1H), 7.92 (s, 1H), 7.54-7.13 (m, 7H), 6.62 (s, 1H), 2.81 (s, 3H), 2.49-2.45 (m, 2H), 2.34-2.24 (m, 1H), 2.05-1.70 (m, 12H), 1.63-1.50 (m, 2H), 1.42 (s, 9H).

Step 2: 2-(2-Adamantyl)-N-[2-[(R)-methylamino(phenyl)methyl]-1H-benzimidazol-5-yl]acetamide To a solution of tert-butyl N—[(R)-[5-[[2-(2-adamantyl)acetyl]amino]-1H-benzimidazol-2-yl]-phenyl-methyl]-N-methyl-carbamate (step 1) (40 mg, 0.08 mmol) in DCM (2 mL) was added TFA (0.12 mL, 1.51 mmol). The resulting solution was stirred at room temperature for 5.5 hours and then concentrated in vacuo. The crude residue was dissolved in MeOH (0.5 mL) and passed through a 1 g Isolute® SCX cartridge eluting with MeOH (10 mL) followed by 3.5N NH3 in MeOH (10 mL). The methanolic ammonia eluent was concentrated in vacuo to afford the title compound as an off white solid.

LC-MS (Method A): Rt 2.38 min; MS m/z 429.4=[M+H]+ (100% @ 215 nm)

1H NMR (500 MHz, DMSO-d6) δ 12.18 (s, 1H), 9.91-9.69 (m, 1H), 8.04-7.77 (m, 1H), 7.54-7.04 (m, 7H), 4.99-4.81 (m, 1H), 2.47-2.41 (m, 2H), 2.28 (s, 3H), 2.26-2.19 (m, 1H), 1.98-1.64 (m, 12H), 1.55-1.46 (m, 2H).

Example 4

2-(1-Adamantyl)-N-[2-[(2-chloro-3-pyridyl)methyl]-1H-benzimidazol-5-yl]acetamide

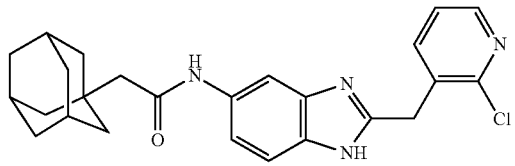 [SMILES: O=C(CC12CC3CC(CC(C3)C1)C2)Nc1ccc2[nH]c(Cc3cccnc3Cl)nc2c1]

Step 1: N-[4-[[2-(1-Adamantyl)acetyl]amino]-2-amino-phenyl]-2-(2-chloro-3-pyridyl) acetamide

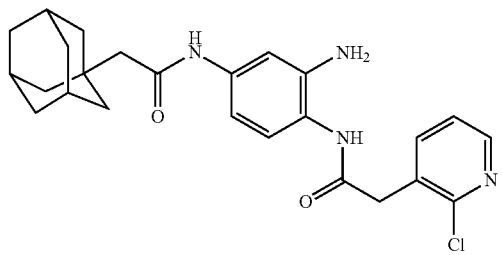 [SMILES: Nc1cc(NC(=O)CC23CC4CC(CC(C4)C2)C3)ccc1NC(=O)Cc1cccnc1Cl]

To a solution of 2-(1-adamantyl)-N-(3,4-diaminophenyl)acetamide (Example 1 step 2) (192 mg, 0.64 mmol), 2-(2-chloro-3-pyridyl)acetic acid (100 mg, 0.58 mmol) and DIPEA (214 µL, 1.22 mmol) in DCM (3 mL) was added HATU (244 mg, 0.64 mmol) and the mixture stirred at room temperature for 1 hour. The resulting mixture was diluted with DCM and washed with water (10 mL) and brine (10 mL). The organic extracts were separated, dried over Na₂SO₄ and concentrated in vacuo. The crude residue purified by chromatography on silica eluting with 0-10% MeOH in DCM. Further purification by C18 reverse phase chromatography eluting with 10-100% MeCN in H₂O+0.1% formic acid afforded the title compound as a pale orange powder.

LC-MS (Method B): Rt 1.11 min; MS m/z 453.1/455.2= [M+H]+ (77% @ 215 nm)

Step 2: 2-(1-Adamantyl)-N-[2-[(2-chloro-3-pyridyl) methyl]-1H-benzimidazol-5-yl]acetamide N-[4-[[2-(1-adamantyl)acetyl]amino]-2-amino-phenyl]-2-(2-chloro-3-pyridyl)acetamide (step 1) (80%, 32 mg, 0.06 mmol) was dissolved in acetic acid (0.5 mL) and heated at 60° C. After 1 hour, the excess acetic acid was removed in vacuo and the residue dissolved in EtOAc. The mixture was washed saturated aqueous sodium bicarbonate solution, brine, dried over Na₂SO₄ and concentrated in vacuo. The crude residue was purified by chromatography on silica eluting with 0-10% MeOH in DCM. Further purification by preparative HPLC (basic pH, early elution method) afforded the title compound.

LC-MS (Method A): Rt 2.38 min; MS m/z 435.3/437.3= [M+H]+ (98% @ 215 nm)

1H NMR (500 MHz, DMSO-d6) δ 12.21 (br. s, 1H), 9.71 (br. s, 1H), 8.34 (dd, J=4.7, 1.8 Hz, 1H), 8.00 (s, 1H), 7.84 (dd, J=7.6, 1.7 Hz, 1H), 7.43 (dd, J=7.5, 4.7 Hz, 1H), 7.40-7.06 (m, 2H), 4.29 (s, 2H), 2.05 (s, 2H), 1.93 (s, 3H), 1.68-1.57 (m, 12H).

Example 5

2-(2-Adamantyl)-N-[2-[(2-hydroxyphenyl)methyl]-1H-benzimidazol-5-yl]acetamide

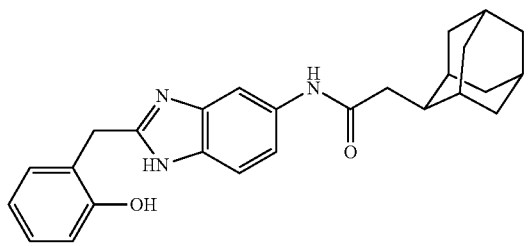 [SMILES: O=C(CC1C2CC3CC(C2)CC1C3)Nc1ccc2[nH]c(Cc3ccccc3O)nc2c1]

1M BBr₃ in DCM (0.28 mL, 0.28 mmol) was added dropwise to an ice cold solution of 2-(2-adamantyl)-N-[2-[(2-methoxyphenyl)methyl]-1H-benzimidazol-5-yl]acetamide (Example 2.3) (61 mg, 0.14 mmol) in DCM (3 mL). The mixture was stirred in the ice bath for 5 min then at room temperature overnight. The mixture was cooled in an ice bath and treated with a further portion of 1M BBr₃ in DCM (0.14 mL, 0.14 mmol). The reaction mixture was stirred room temperature for 90 min and then water (5 mL) was added. The majority of the aqueous phase was removed with a pipette and the remaining suspension was collected by filtration. The solid was dissolved in MeOH and purified by acidic C18 reverse phase chromatography eluting with 10-100% MeCN in water (+0.1% formic acid) to afford the title compound as a white solid.

LC-MS (Method A): Rt 2.65 min; MS m/z 416.3=[M+H]+ (100% @ 215 nm)

1H NMR (500 MHz, DMSO-d6) δ 12.03 (br. s, 1H), 9.82 (br. s, 2H), 8.08-7.72 (m, 1H), 7.51-7.09 (m, 2H), 7.09-7.03 (m, 2H), 6.83 (dd, J=7.1, 0.9 Hz, 1H), 6.73 (td, J=7.4, 1.1 Hz, 1H), 4.05 (s, 2H), 2.44 (d, J=7.6 Hz, 2H), 2.29-2.17 (m, 1H), 2.00-1.89 (m, 2H), 1.89-1.63 (m, 10H), 1.60-1.43 (m, 2H).

Example 5.1

2-(2-Adamantyl)-N-[2-[(4-hydroxyphenyl)methyl]-1H-benzimidazol-5-yl]acetamide

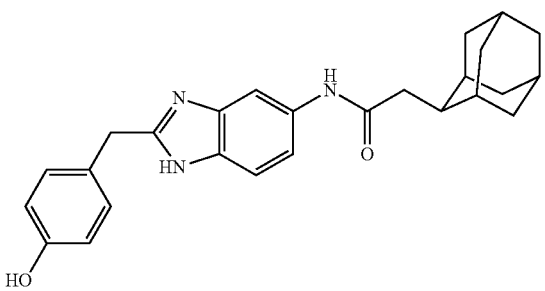 [SMILES: O=C(CC1C2CC3CC(C2)CC1C3)Nc1ccc2[nH]c(Cc3ccc(O)cc3)nc2c1]

Step 1: 2-(2-Adamantyl)-N-[2-[(4-methoxyphenyl) methyl]-1H-benzimidazol-5-yl]acetamide

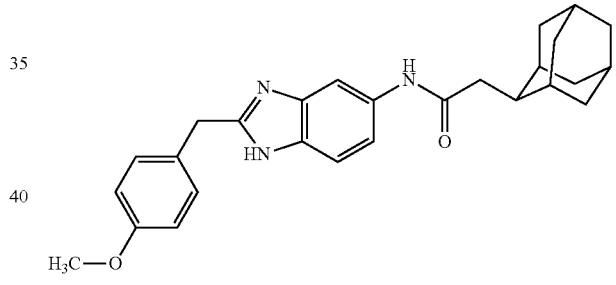

The title compound was prepared from 2-(2-adamantyl)-N-(3,4-diaminophenyl)acetamide (Example 2 step 5) and 2-(4-methoxyphenyl)acetic acid analogously to Example 2 step 6.

LC-MS (Method A): Rt 2.78 min; MS m/z 430.4=[M+H]+ (98% @ 215 nm)

1H NMR (500 MHz, DMSO-d6) δ 12.06 (s, 1H), 9.81 (s, 1H), 8.04-7.75 (m, 1H), 7.45-6.99 (m, 4H), 6.95-6.80 (m, 2H), 4.05 (s, 2H), 3.71 (s, 3H), 2.44 (d, J=7.7 Hz, 2H), 2.26-2.19 (m, 1H), 1.98-1.89 (m, 2H), 1.89-1.63 (m, 10H), 1.56-1.47 (m, 2H).

Step 2: 2-(2-Adamantyl)-N-[2-[(4-hydroxyphenyl) methyl]-1H-benzimidazol-5-yl]acetamide The title compound was prepared from 2-(2-adamantyl)-N-[2-[(4-methoxyphenyl)methyl]-1H-benzimidazol-5-yl] acetamide (step 1) analogously to Example 5.

LC-MS (Method A): Rt 2.48 min; MS m/z 416.3=[M+H]+ (100% @ 215 nm)

1H NMR (500 MHz, DMSO-d6) δ 12.07 (s, 1H), 9.81 (s, 1H), 9.26 (s, 1H), 7.91 (s, 1H), 7.36 (d, J=8.0 Hz, 1H), 7.26-7.15 (m, 1H), 7.14-7.01 (m, 2H), 6.76-6.62 (m, 2H), 4.01 (s, 2H), 2.45 (d, J=7.5 Hz, 2H), 2.27-2.20 (m, 1H), 1.99-1.91 (m, 2H), 1.90-1.66 (m, 10H), 1.57-1.48 (m, 2H).

Example 5.2

2-(2-Adamantyl)-N-[2-[(5-chloro-2-hydroxy-phenyl)methyl]-1H-benzimidazol-5-yl]acetamide

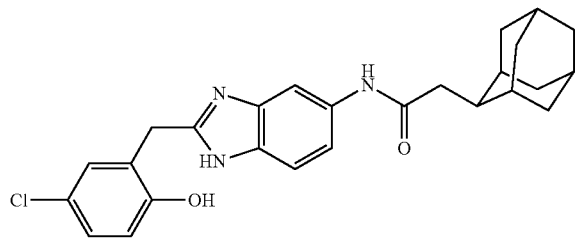 [SMILES: O=C(CC1C2CC3CC(C2)CC1C3)Nc1ccc2[nH]c(Cc3cc(Cl)ccc3O)nc2c1]

Step 1: 2-(2-Adamantyl)-N-[2-[(5-chloro-2-methoxy-phenyl)methyl]-1H-benzimidazol-5-yl]acetamide

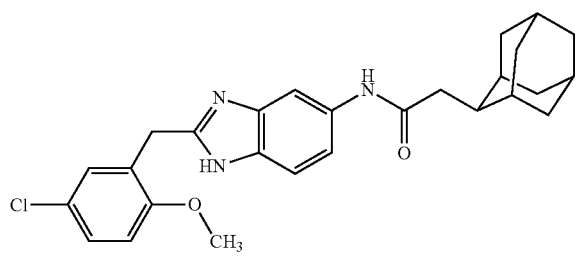 [SMILES: COc1ccc(Cl)cc1Cc1nc2cc(NC(=O)CC3C4CC5CC(C4)CC3C5)ccc2[nH]1]

The title compound was prepared from 2-(2-adamantyl)-N-(3,4-diaminophenyl)acetamide (Example 2 step 5) and 2-(5-chloro-2-methoxy-phenyl)acetic acid analogously to Example 2 step 6.

LC-MS (Method A): Rt 3.01 min; MS m/z 464.3/466.3=[M+H]+ (99% @ 215 nm)

1H NMR (500 MHz, DMSO-d6) δ 10.04 (s, 1H), 8.13 (d, J=1.5 Hz, 1H), 7.51 (d, J=8.7 Hz, 1H), 7.41-7.30 (m, 3H), 7.10-7.05 (m, 1H), 4.26 (s, 2H), 3.76 (s, 3H), 2.49 (d, J=7.7 Hz, 2H), 2.29-2.20 (m, 1H), 1.99-1.92 (m, 2H), 1.90-1.65 (m, 10H), 1.59-1.48 (m, 2H).

Step 2: 2-(2-Adamantyl)-N-[2-[(5-chloro-2-hydroxy-phenyl)methyl]-1H-benzimidazol-5-yl]acetamide The title compound was prepared from 2-(2-adamantyl)-N-[2-[(5-chloro-2-methoxy-phenyl)methyl]-1H-benzimidazol-5-yl]acetamide (step 1) analogously to Example 5.

LC-MS (Method A): Rt 2.56 min; MS m/z 450.3/452.3=[M+H]+ (100% @ 215 nm)

1H NMR (500 MHz, DMSO-d6) δ 12.24 (br. s, 1H), 10.04 (br. s, 1H), 9.85 (s, 1H), 7.95 (s, 1H), 7.38 (d, 1H), 7.29-7.05 (m, 3H), 6.92-6.72 (m, 1H), 4.07 (s, 2H), 2.45 (d, J=7.7 Hz, 2H), 2.27-2.20 (m, 1H), 1.99-1.90 (m, 2H), 1.89-1.65 (m, 10H), 1.57-1.47 (m, 2H).

Example 6

2,2,2-Trifluoroethyl N-[[5-[[2-(1-adamantyl)acetyl]amino]-1H-benzimidazol-2-yl]methyl]carbamate

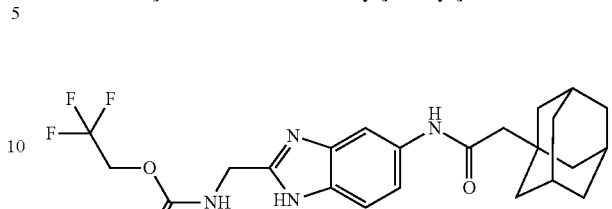

Step 1: tert-butyl N-[[5-[[2-(1-adamantyl)acetyl]amino]-1H-benzimidazol-2-yl]methyl]carbamate

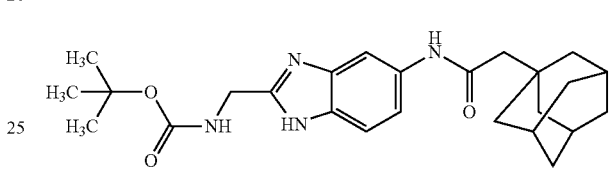

The title compound was prepared from 2-(1-adamantyl)-N-(3,4-diaminophenyl)acetamide (Example 1 step 2) and 2-(tert-butoxycarbonylamino)acetic acid analogously to Example 1 step 3.

LC-MS (Method B): Rt 1.11 min; MS m/z 439.2=[M+H]+ (100% @ 215 nm)

1H NMR (250 MHz, DMSO-d6) δ 12.03 (s, 1H), 9.67 (s, 1H), 7.94 (s, 1H), 7.44-7.30 (m, 2H), 7.31-7.10 (m, 1H), 4.31 (d, J=5.9 Hz, 2H), 2.05 (s, 2H), 1.97-1.89 (m, 3H), 1.74-1.54 (m, 12H), 1.41 (s, 9H).

Step 2: 2-(1-Adamantyl)-N-[2-(aminomethyl)-1H-benzimidazol-5-yl]acetamide

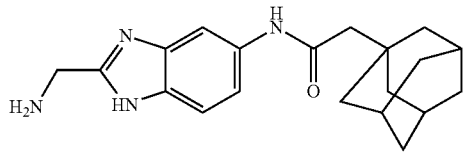 [SMILES: NCc1nc2cc(NC(=O)CC34CC5CC(CC(C5)C3)C4)ccc2[nH]1]

tert-Butyl N-[[5-[[2-(1-adamantyl)acetyl]amino]-1H-benzimidazol-2-yl]methyl]carbamate (step 1) (0.79 g, 1.8 mmol) was dissolved in 1,4-dioxane (10 mL) and treated with 4M HCl in dioxane (635 µL, 18 mmol). After stirring at room temperature under an inert atmosphere for 3 days, a further portion of 4M HCl in dioxane (635 µL, 18 mmol) was added and stirring continued for the 24 hours. The resulting mixture was concentrated in vacuo and the crude residue dissolved in MeOH (~10 mL). The mixture was passed through a 5 g Isolute® SCX column eluting with MeOH (20 mL) followed by 7M NH3 in MeOH (20 mL). The methanolic ammonia eluent was concentrated in vacuo to afford the title compound as a red brown solid.

LC-MS (Method A): Rt 1.89 min; MS m/z 339.2=[M+H]+ (99% @ 215 nm)

1H NMR (500 MHz, DMSO-d6) δ 12.00 (br. s, 1H), 9.65 (s, 1H), 7.93 (br. s, 1H), 7.44-7.30 (m, 1H), 7.17 (br. s, 1H), 3.88 (s, 2H), 2.34 (br. s, 2H), 2.05 (s, 2H), 1.99-1.89 (m, 3H), 1.69-1.57 (m, 12H).

Step 3: 2,2,2-Trifluoroethyl N-[[5-[[2-(1-adamantyl)acetyl]amino]-1H-benzimidazol-2-yl]methyl]carbamate A solution of 2,2,2-trifluoroethyl chloroformate (24 mg, 0.14 mmol) in DMF (0.2 mL) was added to a solution of 2-(1-adamantyl)-N-[2-(aminomethyl)-1H-benzimidazol-5-yl]acetamide (step 2) (50 mg, 0.15 mmol) and DIPEA (0.031 mL, 0.18 mmol) in DMF (1 mL). The resulting mixture was stirred at room temperature for 90 min. Water (4 mL) was added followed by EtOAc (4 mL) and the layers were separated. The organic portion was washed with water (2×4 mL), passed through a phase separating Isolute® cartridge and concentrated in vacuo to afford a brown oil. The oil was purified by preparative HPLC (acidic pH, standard elution method) to afford the title compound as an off-white powder.

LC-MS (Method A): Rt 2.50 min; MS m/z 465.3=[M+H]+ (97% @ 215 nm)

1H NMR (500 MHz, DMSO-d6) δ 12.15 (br. s, 1H), 9.69 (s, 1H), 8.29 (t, J=5.8 Hz, 1H), 8.07-7.78 (m, 1H), 7.51-7.05 (m, 2H), 4.68 (q, J=9.1 Hz, 2H), 4.41 (d, J=6.0 Hz, 2H), 2.05 (s, 2H), 1.98-1.86 (m, 3H), 1.75-1.50 (m, 12H).

Example 7

2-(1-Adamantyl)-N-[2-[[3-(3,5-dimethylisoxazol-4-yl)phenyl]methyl]-3H-benzimidazol-5-yl]acetamide

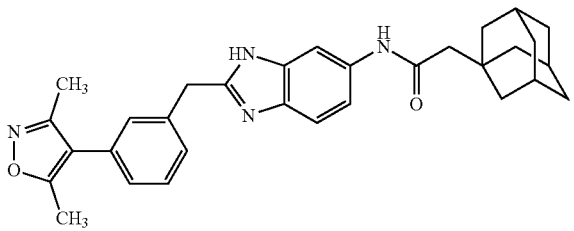 [SMILES: Cc1noc(C)c1-c1cccc(Cc2nc3ccc(NC(=O)CC45CC6CC(CC(C6)C4)C5)cc3[nH]2)c1]

Step 1: Ethyl 2-[3-(3,5-dimethylisoxazol-4-yl)phenyl]acetate

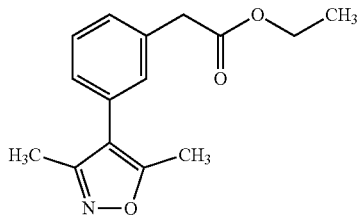 [SMILES: CCOC(=O)Cc1cccc(-c2c(C)noc2C)c1]

A solution of ethyl 2-(3-bromophenyl)acetate (360 μL, 2.06 mmol), tripotassium phosphate (1310 mg, 6.17 mmol) and 3,5-dimethyl-4-(4,4,5,5-tetramethyl-1,3,2-dioxaborolan-2-yl)isoxazole (505 mg, 2.26 mmol) in 1,4-dioxane (10 mL) was degassed under a flow of N2 for 10 min and then Pd(dppf)Cl2·DCM (168 mg, 0.21 mmol) was added. The mixture was heated at 100° C. for 1 hour and then allowed to cool to room temperature. The mixture was diluted with EtOAc and filtered through Celite® (filter material). The filtrate was absorbed onto silica and purified by chromatography on silica eluting with 0-50% EtOAc in heptanes to afford the title compound as a colourless viscous oil.

LC-MS (Method B): Rt 1.13 min; MS m/z 260.1=[M+H]+ (99% @ 215 nm)

1H NMR (250 MHz, Chloroform-d) δ 7.44-7.36 (m, 1H), 7.29 (s, 1H), 7.22-7.12 (m, 2H), 4.17 (q, J=7.1 Hz, 2H), 3.65 (s, 2H), 2.41 (s, 3H), 2.28 (s, 3H), 1.26 (t, J=7.1 Hz, 3H).

Step 2: 2-[3-(3,5-Dimethylisoxazol-4-yl)phenyl]acetic acid

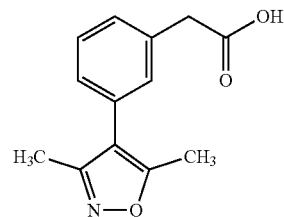 [SMILES: Cc1noc(C)c1-c1cccc(CC(=O)O)c1]

To a solution of ethyl 2-[3-(3,5-dimethylisoxazol-4-yl)phenyl]acetate (step 1) (231 mg, 0.89 mmol) in THF (1.5 mL), MeOH (1.5 mL) and water (1.5 mL) was added LiOH (26 mg, 1.07 mmol) and the mixture stirred at room temperature for 2 hours. Additional LiOH (11 mg, 0.45 mmol) was added and the reaction mixture was stirred at room temperature overnight. The resulting mixture was acidified to pH 1 using 1M HCl and diluted with EtOAc (10 mL). The organic phase was separated, washed with brine (10 mL), dried over Na2SO4 and concentrated in vacuo to afford the title compound as a pale yellow oil, which crystallised on standing at room temperature.

LC-MS (Method B): Rt 0.97 min; MS m/z 232.2=[M+H]+ (99% @ 215 nm)

1H NMR (500 MHz, Chloroform-d) δ 7.41 (t, J=7.6 Hz, 1H), 7.28 (d, J=7.8 Hz, 1H), 7.21-7.16 (m, 2H), 3.70 (s, 2H), 2.40 (s, 3H), 2.27 (s, 3H).

Step 3: 2-(1-Adamantyl)-N-[2-[[3-(3,5-dimethylisoxazol-4-yl)phenyl]methyl]-3H-benzimidazol-5-yl]acetamide To a solution of 2-[3-(3,5-dimethylisoxazol-4-yl)phenyl] acetic acid (step 2) (100 mg, 0.43 mmol), DIPEA (159 μL, 0.91 mmol) and 2-(1-adamantyl)-N-(3,4-diaminophenyl) acetamide (Example 1 step 2) (117 mg, 0.39 mmol) in DMF (2 mL) was added HATU (148 mg, 0.39 mmol) and the mixture stirred at room temperature for 2 hours. The resulting mixture was diluted with EtOAc (20 mL), washed with water (2×10 mL), brine (10 mL), dried over Na2SO4 and was concentrated in vacuo to afford a dark red oil. The oil was dissolved in 4M HCl in dioxane (2 mL) and stirred at 80° C. in a sealed tube for 1 hour. After cooling to room temperature, the mixture was concentrated in vacuo and the resulting residue partitioned between EtOAc (10 mL) and saturated aqueous sodium bicarbonate solution (10 mL). The phases were separated and the organic extracts were washed with brine (5 mL), dried over Na2SO4 and concentrated in vacuo to give a yellow oil. The crude product was purified by preparative HPLC (basic pH, early elution method) to afford the title compound as a yellow powder.

LC-MS (Method A): Rt 2.68 min; MS m/z 495.3=[M+H]+ (100% @ 215 nm)

1H NMR (500 MHz, DMSO-d6) δ 12.24-12.15 (m, 1H), 9.73-9.61 (m, 1H), 7.98-7.83 (m, 1H), 7.43-7.10 (m, 6H), 4.20 (s, 2H), 2.39 (s, 3H), 2.21 (s, 3H), 2.05 (s, 2H), 1.93 (s, 3H), 1.67-1.58 (m, 12H).

Example 8 tert-Butyl N-[[5-[[2-(2-adamantyl)acetyl]amino]-1H-benzimidazol-2-yl]methyl]carbamate

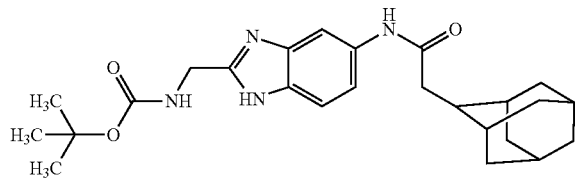 [SMILES: CC(C)(C)OC(=O)NCc1nc2cc(NC(=O)CC3C4CC5CC(C4)CC3C5)ccc2[nH]1]

Step 1: tert-Butyl N-[(5-nitro-1H-benzimidazol-2-yl)methyl]carbamate

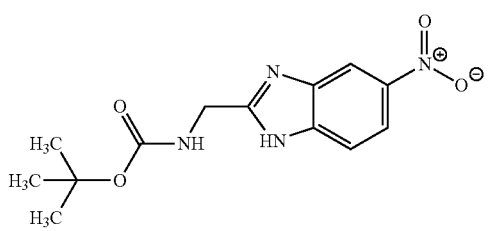 [SMILES: CC(C)(C)OC(=O)NCc1nc2cc([N+](=O)[O-])ccc2[nH]1]

To a solution of 2-(tert-butoxycarbonylamino)acetic acid (2 g, 11.42 mmol) in DMF (50 mL) was added HATU (4.78 g, 12.56 mmol) followed by DIPEA (3.99 mL, 22.83 mmol). The resulting mixture was stirred under an inert atmosphere for 1 hour and 4-nitrobenzene-1,2-diamine (1.75 g, 11.42 mmol) was added. After stirring at room temperature overnight the mixture was poured into saturated aqueous sodium bicarbonate solution (100 mL) and diluted with EtOAc (100 mL). The layers were separated and the aqueous portion back extracted with EtOAc (3×50 mL). The combined organic extracts were washed with water (3×25 mL), brine (3×25 mL), dried over Na₂SO₄ and concentrated in vacuo. The residue was dissolved in acetic acid (40 mL) and stirred at 70° C. for 1 hour. The resulting mixture was concentrated in vacuo, re-dissolved in EtOAc and washed with saturated aqueous sodium bicarbonate solution (50 mL), water (3×50 mL) and brine (50 mL). The organic extracts were dried over MgSO₄ and concentrated in vacuo. The resulting crude black oil was purified by chromatography on silica eluting with 0-100% EtOAc in heptanes to afford the title compound.

LC-MS (Method B): Rt 0.99 min; MS m/z 293.1=[M+H]+ (100% @ 215 nm)

1H NMR (500 MHz, DMSO-d6) δ 12.88 (s, 1H), 8.40 (s, 1H), 8.09 (d, J=8.9 Hz, 1H), 7.68 (d, J=6.3 Hz, 1H), 7.53 (s, 1H), 4.42 (d, J=5.8 Hz, 2H), 1.41 (s, 9H).

Step 2: tert-Butyl N-[(5-amino-1H-benzimidazol-2-yl)methyl]carbamate

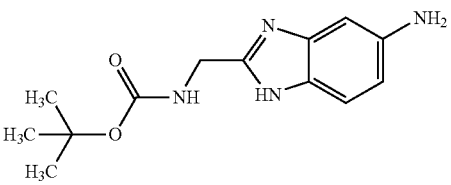 [SMILES: CC(C)(C)OC(=O)NCc1nc2cc(N)ccc2[nH]1]

A solution of tert-butyl N-[(5-nitro-1H-benzimidazol-2-yl)methyl]carbamate (step 1) (100%, 1.5 g, 5.13 mmol) in EtOH (50 mL) was degassed with nitrogen and charged with Pd/C (10%, 163.19 mg, 0.15 mmol). The mixture was placed under an atmosphere of hydrogen and stirred at room temperature overnight. The resulting mixture was filtered through Celite® (filter material) and washed through with EtOH (20 mL). The filtrate was concentrated in vacuo to afford the title compound as a beige solid.

LC-MS (Method B): Rt 0.46-0.63 min; MS m/z 263.1=[M+H]+ (99% @ 215 nm)

1H NMR (500 MHz, DMSO-d6) δ 11.73-11.45 (m, 1H), 7.28 (s, 1H), 7.20-7.09 (m, 1H), 6.74-6.57 (m, 1H), 6.50-6.36 (m, 1H), 4.85-4.58 (m, 2H), 4.25 (d, J=5.8 Hz, 2H), 1.41 (s, 9H).

Step 3: tert-Butyl N-[[5-[[2-(2-adamantyl)acetyl]amino]-1H-benzimidazol-2-yl]methyl]carbamate A mixture of 2-(2-adamantyl)acetic acid (Example 2 step 3) (74 mg, 0.38 mmol), HOAt (62 mg, 0.46 mmol) and EDCl (88 mg, 0.46 mmol) in DCM (0.5 mL) was stirred for 15 min and tert-butyl N-[(5-amino-1H-benzimidazol-2-yl)methyl]carbamate (100 mg, 0.38 mmol) was added followed by DIPEA (0.13 mL, 0.76 mmol). The resulting mixture was stirred at room temperature for 48 hours then diluted with water (2 mL). The organic portion was separated and the aqueous further extracted with DCM (3 mL). The combined organic extracts were diluted with water (5 mL) and the resulting suspension collected by filtration. Purification of the solid by preparative HPLC (acidic pH, early elution method) afforded the title compound as an off white solid.

LC-MS (Method A): Rt 2.77 min; MS m/z 439.4=[M+H]+ (97% @ 215 nm)

1H NMR (500 MHz, DMSO-d6) δ 12.07-12.00 (m, 1H), 9.87-9.75 (m, 1H), 8.00-7.85 (m, 1H), 7.43-7.11 (m, 3H), 4.34-4.27 (m, 2H), 2.47-2.43 (m, 2H), 2.27-2.21 (m, 1H), 1.99-1.91 (m, 2H), 1.89-1.66 (m, 10H), 1.57-1.49 (m, 2H), 1.41 (s, 9H).

Example 9

2-(2-Adamantyl)-N-(2-tetrahydrofuran-3-yloxy-1H-benzimidazol-5-yl)acetamide

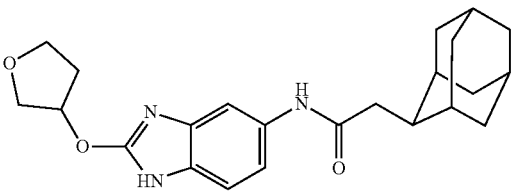 [SMILES: O=C(CC1C2CC3CC(C2)CC1C3)Nc1ccc2[nH]c(OC3CCOC3)nc2c1]

Step 1a: 2-Chloro-1H-benzimidazol-5-amine

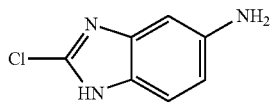

Iron (2.83 g, 50.61 mmol) was added to a suspension of 2-chloro-5-nitro-1H-benzimidazole (2 g, 10.12 mmol) and ammonium chloride (2.71 g, 50.61 mmol) in EtOH (60 mL) and water (20 mL) and the reaction mixture was heated at 80° C. for 1 hour. After cooling to room temperature, the mixture was filtered through a Celite® (filter material) and the filtrate partitioned between EtOAc (100 mL) and saturated NH$_4$Cl (100 mL). The phases were separated and the organic portion washed with water (50 mL) and brine (50 mL), dried over Na$_2$SO$_4$ and concentrated in vacuo to afford the title compound as a beige foam.

LC-MS (Method B): Rt 0.15 min; MS m/z 168.0/170.0=[M+H]+ (100% ELS)

1H NMR (500 MHz, DMSO-d6) δ 12.55 (s, 1H), 7.16 (d, J=8.5 Hz, 1H), 6.58 (s, 1H), 6.51 (dd, J=8.5, 1.9 Hz, 1H), 4.93 (s, 2H).

Step 1b: 2-(2-adamantyl)acetyl Chloride

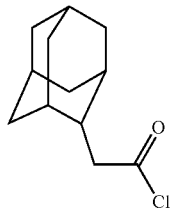 [SMILES: O=C(Cl)CC1C2CC3CC(C2)CC1C3]

A suspension of 2-(2-adamantyl)acetic acid (Example 2 step 3) (600 mg, 3.09 mmol) in thionyl chloride (10 mL, 137.85 mmol) was heated at reflux for 30 min. After cooling to room temperature, the solvent was removed in vacuo and the residue azeotroped with DCM (3×10 mL) to afford the title compound as a yellow oil.

Step 2: 2-(2-Adamantyl)-N-(2-chloro-1H-benzimidazol-5-yl)acetamide

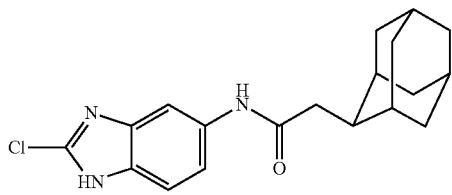 [SMILES: O=C(CC1C2CC3CC(C2)CC1C3)Nc1ccc2[nH]c(Cl)nc2c1]

A solution of 2-(2-adamantyl)acetyl chloride (step 1b) (100%, 657 mg, 3.09 mmol) in DCM (15 mL) was added dropwise over 5 min to a suspension of 2-chloro-1H-benzimidazol-5-amine (step 1a) (518 mg, 3.09 mmol) and DIPEA (807 μL, 4.63 mmol) in DCM (15 mL). After standing at room temperature for 16 hours, the mixture was diluted with water (30 mL). The phases were separated and the aqueous portion extracted with DCM (4×5 mL) and EtOAc (5 mL). The combined organic portions were concentrated in vacuo and the resultant residue suspended in DCM (10 mL). The solid was collected by filtration, washed with DCM and dried under vacuum to afford the title compound as a cream solid.

LC-MS (Method B): Rt 1.18 min; MS m/z 344.1/346.1=[M+H]+ (97% @ 215 nm)

1H NMR (500 MHz, DMSO-d6) δ 13.08 (s, 1H), 9.93 (s, 1H), 8.01 (s, 1H), 7.50-7.11 (m, 2H), 2.46 (d, J=7.7 Hz, 2H), 2.28-2.20 (m, 1H), 1.97-1.90 (m, 2H), 1.87-1.66 (m, 10H), 1.57-1.45 (m, 2H).

Step 3: 1:1 Mixture of 2-(adamantan-2-yl)-N-(2-chloro-1-{[2-(trimethylsilyl)ethoxy]methyl}-1H-1,3-benzodiazol-5-yl)acetamide and 2-(adamantan-2-yl)-N-(2-chloro-1-{[2-(trimethylsilyl)ethoxy]methyl}-1H-1,3-benzodiazol-6-yl)acetamide

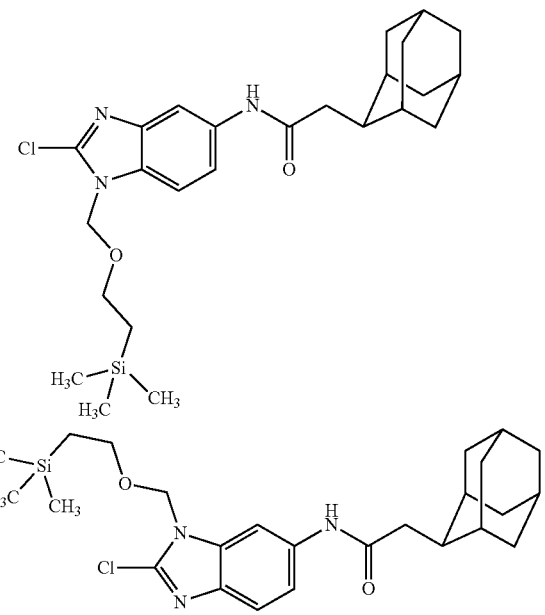

2-(Chloromethoxy)ethyl-trimethyl-silane (39 μL, 0.22 mmol) was added to an ice cooled suspension of 2-(2-adamantyl)-N-(2-chloro-1H-benzimidazol-5-yl)acetamide (step 2) (50 mg, 0.15 mmol) and potassium carbonate (60 mg, 0.44 mmol) in DMF (2 mL). The reaction mixture was allowed to warm to room temperature and was stirred for 4 hours. A further portion of 2-(chloromethoxy)ethyl-trimethyl-silane (39 μL, 0.22 mmol) was added and stirring continued at room temperature overnight. The resulting mixture was partitioned between EtOAc (10 mL) and water (10 mL). The organic layer was washed with water (10 mL), brine (5 mL), passed through a phase separating Isolute® cartridge and concentrated in vacuo to afford an orange oil. The oil was purified by chromatography on silica eluting with a gradient of 0-100% EtOAc in heptanes to afford the title compound.

LC-MS (Method B): Rt 1.54 and 1.57 min; MS m/z 474.2/476.2=[M+H]+ (89% @ 215 nm)

Step 4: 2-(2-Adamantyl)-N-(2-tetrahydrofuran-3-yloxy-1H-benzimidazol-5-yl)acetamide 1:1 Mixture of 2-(adamantan-2-yl)-N-(2-chloro-1-{[2-(trimethylsilyl)ethoxy]methyl}-1H-1,3-benzodiazol-5-yl)

acetamide and 2-(adamantan-2-yl)-N-(2-chloro-1-{[2-(trimethylsilyl)ethoxy]methyl}-1H-1,3-benzodiazol-6-yl) acetamide (step 3) (50 mg, 0.11 mmol) and tetrahydrofuran-3-ol (0.085 mL, 0.11 mmol) were dissolved in DMF (1 mL). NaH, 60% dispersion in mineral oil (6 mg, 0.16 mmol) was added and the reaction mixture stirred at room temperature for 16 hours and then at 55° C. for 3 hours. A further portion of tetrahydrofuran-3-ol (0.085 mL, 0.11 mmol) pre-treated with NaH, 60% dispersion in mineral oil (6 mg, 0.16 mmol) in DMF (1 mL) was added and the mixture was stirred at 55° C. for 24 hours. After cooling to room temperature, the reaction was quenched with water and the mixture partitioned between EtOAc (20 mL) and water (20 mL). The layers were separated and the organic portion was washed with brine (20 mL), dried over $Na_2SO_4$ and concentrated in vacuo. The crude residue was dissolved in DCM (10 mL) and treated with TFA (1 mL). After stirring for 24 hours, the mixture was concentrated in vacuo. The crude residue was dissolved in MeOH (1 mL) and passed through a 1 g Isolute® SCX column eluting with MeOH (10 mL) and followed by 7N $NH_3$ in MeOH (10 mL). The methanolic ammonia eluent concentrated in vacuo and the residue was further purified by preparative HPLC under the following conditions to afford the title compound as a white solid.

Gilson LC system using a Waters CSH column (19 mm×100 mm, 5 µM; room temperature) and a gradient of 5-25% (A=0.2% ammonium hydroxide in water; B=0.2% ammonium hydroxide in acetonitrile) over 2 min then 25-40% for 14 min then 95% B for 2 min, with an injection volume of 1500 µL and a flow rate of 40 mL/min. UV spectra were recorded at 215 nm using a Gilson detector.

LC-MS (Method A): Rt 3.07 min; MS m/z 396.3=[M+H]+ (97% @ 215 nm)

1H NMR (500 MHz, DMSO-d6) δ 9.72 (s, 1H), 7.73 (s, 1H), 7.17 (d, J=8.5 Hz, 1H), 7.07 (d, J=8.3 Hz, 1H), 5.55-5.49 (m, 1H), 3.89 (d, J=3.0 Hz, 2H), 3.88-3.83 (m, 1H), 3.78 (td, J=8.4, 4.5 Hz, 1H), 2.43 (d, J=7.6 Hz, 2H), 2.31-2.19 (m, 2H), 2.13-2.06 (m, 1H), 1.98-1.91 (m, 2H), 1.88-1.84 (m, 1H), 1.83-1.78 (m, 3H), 1.77-1.66 (m, 6H), 1.55-1.47 (m, 2H).

Example 10

N-(Cycloheptylmethyl)-2-[(2-hydroxyphenyl) methyl]-1,3-benzoxazole-5-carboxamide

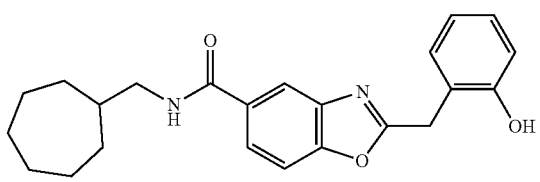 [SMILES: O=C(NCC1CCCCCC1)c1ccc2oc(Cc3ccccc3O)nc2c1]

Step 1: Methyl 2-[(2-methoxyphenyl)methyl]-1,3-benzoxazole-5-carboxylate

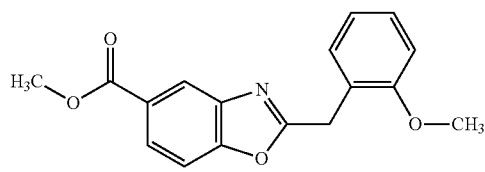

To a solution of 2-(2-methoxyphenyl)acetic acid (239 mg, 1.44 mmol) in DMF (6 mL) was added DIPEA (0.25 mL, 1.44 mmol), HATU (546 mg, 1.44 mmol) followed by methyl 3-amino-4-hydroxy-benzoate (200 mg, 1.2 mmol) and the mixture stirred at room temperature overnight. The resulting mixture was diluted with water (5 mL) and extracted with EtOAc (2×10 mL). The organic extracts were washed with brine, dried over $Na_2SO_4$ and concentrated in vacuo. The crude residue was dissolved in acetic acid (6 mL) and heated at 120° C. overnight. After cooling to room temperature, the mixture was concentrated in vacuo. The crude residue was dissolved in EtOAc and washed with saturated aqueous sodium bicarbonate solution (10 mL), brine (10 mL), dried over $Na_2SO_4$ and concentrated in vacuo. The crude residue was absorbed onto silica and purified by chromatography on silica eluting with 0-50% EtOAc in heptanes to afford the title compound.

LC-MS (Method B): Rt 1.20 min; MS m/z 298.0=[M+H]+ (93% @ 215 nm)

1H NMR (250 MHz, Chloroform-d) δ 8.36 (d, J=1.6 Hz, 1H), 8.04 (dd, J=8.5, 1.6 Hz, 1H), 7.48 (d, J=8.6 Hz, 1H), 7.32-7.25 (m, 2H), 7.00-6.88 (m, 2H), 4.31 (s, 2H), 3.94 (s, 3H), 3.81 (s, 3H).

Step 2: 2-[(2-Methoxyphenyl)methyl]-1,3-benzoxazole-5-carboxylic acid

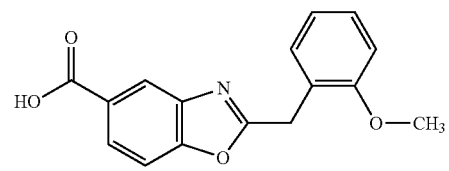 [SMILES: COc1ccccc1Cc1nc2cc(C(=O)O)ccc2o1]

To a solution of methyl 2-[(2-methoxyphenyl)methyl]-1,3-benzoxazole-5-carboxylate (step 1) (95%, 73 mg, 0.23 mmol) in THF (0.33 mL)/MeOH (0.33 mL)/Water (0.33 mL) was added LiOH (8 mg, 0.35 mmol) and the mixture heated at 50° C. for 1 hour. After cooling to room temperature and the mixture was acidified to pH 2 using 1M HCl solution. The resulting mixture was diluted with water (5 mL) and extracted with IPA/$CHCl_3$ (1:1, 2×5 mL). The combined organic extracts were dried over $Na_2SO_4$ and concentrated in vacuo to afford the title compound as a pale yellow solid.

LC-MS (Method B): Rt 1.09 min; MS m/z 284.0=[M+H]+ (92% @ 215 nm)

Step 3: N-(cycloheptylmethyl)-2-[(2-methoxyphenyl)methyl]-1,3-benzoxazole-5-carboxamide

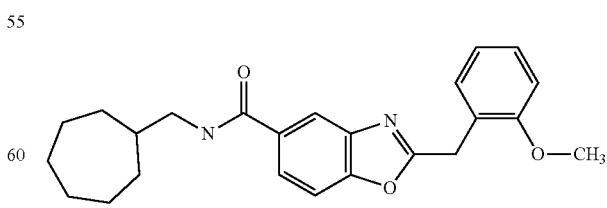

To a solution of 2-[(2-methoxyphenyl)methyl]-1,3-benzoxazole-5-carboxylic acid (step 2) (96%, 48 mg, 0.16 mmol) in DMF (1 mL) was added DIPEA (34 µL, 0.2 mmol), HATU (74 mg, 0.2 mmol) and cycloheptylmethanamine (28 µL, 0.2 mmol) and the mixture stirred at room temperature for 2 hours. The resulting mixture was diluted with EtOAc and washed with water (5 mL) and brine (5 mL). The organic portion was separated, dried over Na₂SO₄ and concentrated in vacuo. The crude residue was absorbed onto silica and purified by chromatography on silica eluting with 0-50% EtOAc in heptanes to afford the title compound as a colourless glass.

LC-MS (Method B): Rt 1.31 min; MS m/z 393.1=[M+H]+ (99% @ 215 nm)

1H NMR (500 MHz, Chloroform-d) δ 8.01 (d, J=1.5 Hz, 1H), 7.78 (dd, J=8.5, 1.8 Hz, 1H), 7.48 (d, J=8.5 Hz, 1H), 7.32-7.27 (m, 2H), 6.95 (td, J=7.5, 1.0 Hz, 1H), 6.91 (d, J=8.2 Hz, 1H), 6.16 (br. s, 1H), 4.30 (s, 2H), 3.81 (s, 3H), 3.32 (t, J=6.2 Hz, 2H), 1.82-1.75 (m, 3H), 1.72-1.65 (m, 2H), 1.61-1.56 (m, 2H), 1.53-1.42 (m, 4H), 1.29-1.22 (m, 2H).

Step 4: N-(Cycloheptylmethyl)-2-[(2-hydroxyphenyl)methyl]-1,3-benzoxazole-5-carboxamide The title compound was prepared from N-(cycloheptylmethyl)-2-[(2-methoxyphenyl)methyl]-1,3-benzoxazole-5-carboxamide (step 3) and 1M BBr₃ in DCM analogously to Example 5.

LC-MS (Method A): Rt 3.61 min; MS m/z 379.3=[M+H]+ (99% @ 215 nm)

1H NMR (500 MHz, DMSO-d6) δ 9.59 (s, 1H), 8.50 (t, J=5.8 Hz, 1H), 8.13 (d, J=1.4 Hz, 1H), 7.85 (dd, J=8.5, 1.7 Hz, 1H), 7.70 (d, J=8.4 Hz, 1H), 7.20 (dd, J=7.5, 1.5 Hz, 1H), 7.12 (td, J=7.9, 1.7 Hz, 1H), 6.83 (dd, J=8.1, 1.0 Hz, 1H), 6.78 (td, J=7.4, 1.1 Hz, 1H), 4.24 (s, 2H), 3.11 (t, J=6.3 Hz, 2H), 1.80-1.69 (m, 3H), 1.66-1.60 (m, 2H), 1.57-1.51 (m, 2H), 1.50-1.44 (m, 2H), 1.42-1.34 (m, 2H), 1.21-1.13 (m, 2H).

Example 11

2-(1-Adamantyl)-N-[3-amino-2-[(2-hydroxyphenyl)methyl]indazol-6-yl]acetamide

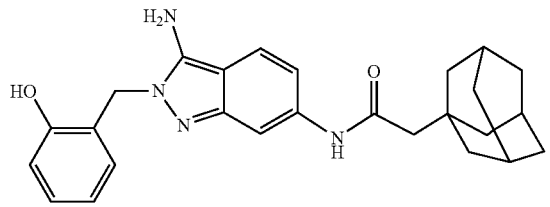 [SMILES: Nc1c2ccc(NC(=O)CC34CC5CC6CC(C3)C6(C5)C4)cc2nn1Cc1ccccc1O]

Step 1: 2-[(2-Methoxyphenyl)methyl]-6-nitro-indazol-3-amine

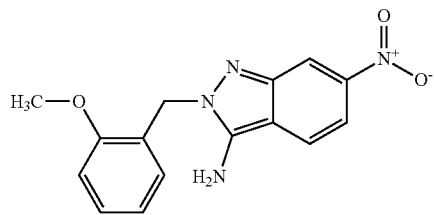 [SMILES: COc1ccccc1Cn1nc2cc([N+](=O)[O-])ccc2c1N]

DIPEA (1.51 mL, 8.67 mmol) was added to a mixture of 2-fluoro-4-nitro-benzonitrile (240 mg, 1.44 mmol) and (2-methoxyphenyl)methylhydrazine hydrochloride (545 mg, 2.89 mmol) in tert-butanol (5 mL). The resulting mixture was stirred at room temperature for 1 hour followed by heating to 140° C. overnight. After cooling to room temperature and standing for 3 days, the mixture was diluted with saturated aqueous sodium bicarbonate solution (20 mL) and EtOAc (20 mL). The phases were separated and the organic portion washed with saturated aqueous sodium bicarbonate solution (20 mL), brine (20 mL), dried over Na₂SO₄ and concentrated in vacuo. The crude product was purified preparative HPLC (acidic pH, standard method) to afford the title compound as a bright red solid.

LC-MS (Method B): Rt 1.10 min; MS m/z 299.0=[M+H]+ (100% @ 215 nm)

1H NMR (500 MHz, DMSO-d6) δ 8.17 (d, J=1.7 Hz, 1H), 7.89 (d, J=9.0 Hz, 1H), 7.41 (dd, J=9.1, 2.0 Hz, 1H), 7.27 (td, J=8.2, 1.6 Hz, 1H), 7.05 (d, J=7.8 Hz, 1H), 6.84 (td, J=6.7, 0.9 Hz, 1H), 6.61 (s, 2H), 6.54 (dd, J=7.5, 1.4 Hz, 1H), 5.40 (s, 2H), 3.85 (s, 3H).

Step 2: tert-Butyl N-tert-butoxycarbonyl-N-[2-[(2-methoxyphenyl)methyl]-6-nitro-indazol-3-yl]carbamate

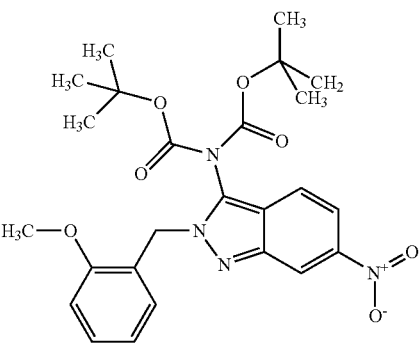 [SMILES: COc1ccccc1Cn1nc2cc([N+](=O)[O-])ccc2c1N(C(=O)OC(C)(C)C)C(=O)OC(C)(C)C]

A solution of 2-[(2-methoxyphenyl)methyl]-6-nitro-indazol-3-amine (step 1) (90%, 67 mg, 0.2 mmol) in DCM (5 mL) was treated with Boc anhydride (97 mg, 0.45 mmol) followed by DMAP (5 mg, 0.04 mmol) and stirred at room temperature for 18 hours. Additional Boc anhydride (40 mg) was added and the reaction mixture was stirred for a further 3 hours. The resulting mixture was concentrated in vacuo and the residue partitioned between EtOAc (15 mL) and 1:1 water:brine (15 mL). The phases were separated and the aqueous portion back extracted with EtOAc (15 mL). The combined organic extracts were dried over Na₂SO₄ and concentrated in vacuo. Purification of the crude product by chromatography on silica eluting with 0-80% EtOAc in heptanes afforded the title compound as a yellow/orange solid.

LC-MS (Method B): Rt 1.42 min; MS m/z 499.1=[M+H]+ (99% @ 215 nm)

1H NMR (500 MHz, DMSO-d6) δ 8.69-8.67 (m, 1H), 7.86 (dd, J=9.1, 1.9 Hz, 1H), 7.80 (d, J=9.2 Hz, 1H), 7.35-7.29 (m, 1H), 7.12 (dd, J=7.6, 1.5 Hz, 1H), 7.07 (d, J=8.1 Hz, 1H), 6.90 (t, J=7.3 Hz, 1H), 5.56 (s, 2H), 3.81 (s, 3H), 1.21 (s, 18H).

Step 3: tert-Butyl N-[6-amino-2-[(2-methoxyphenyl)methyl]indazol-3-yl]-N-tert-butoxycarbonyl-carbamate

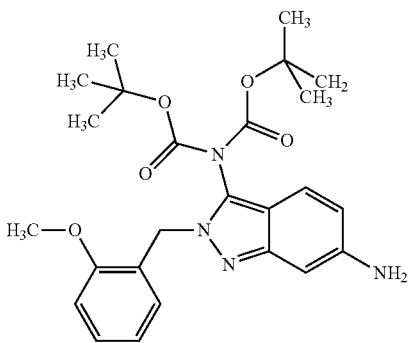 [SMILES: COc1ccccc1Cn1nc2cc(N)ccc2c1N(C(=O)OC(C)(C)C)C(=O)OC(C)(C)C]

A mixture of tert-butyl N-tert-butoxycarbonyl-N-[2-[(2-methoxyphenyl)methyl]-6-nitro-indazol-3-yl]carbamate (step 2) (85%, 135 mg, 0.23 mmol) in EtOH (8 mL) was placed under a nitrogen atmosphere. Pd/C (10%, 24.41 mg, 0.02 mmol) was added and the resulting mixture placed under a hydrogen atmosphere and stirred at room temperature for 4 hours. The resulting mixture was filtered through Celite® (filter material), washing through with EtOAc, and the filtrate concentrated in vacuo to afford the title compound as a pale orange foam.

LC-MS (Method B): Rt 1.19 min; MS m/z 469.3=[M+H]+ (90% @ 215 nm)

1H NMR (500 MHz, DMSO-d6) δ 7.28-7.23 (m, 1H), 7.11 (d, J=8.8 Hz, 1H), 7.02 (dd, J=7.8, 0.7 Hz, 1H), 6.93 (dd, J=5.9, 1.8 Hz, 1H), 6.84 (td, J=7.4, 0.9 Hz, 1H), 6.57 (dd, J=8.9, 1.8 Hz, 1H), 6.45 (d, J=1.1 Hz, 1H), 5.25 (s, 2H), 5.12 (s, 2H), 3.81 (s, 3H), 1.23 (s, 18H).

Step 4: tert-Butyl N-[6-[[2-(1-adamantyl)acetyl]amino]-2-[(2-methoxyphenyl)methyl]indazol-3-yl]-N-tert-butoxycarbonyl-carbamate

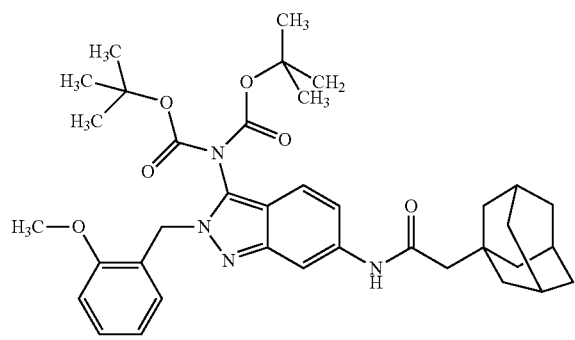 [SMILES: COc1ccccc1Cn1nc2cc(NC(=O)CC34CC5CC(CC(C5)C3)C4)ccc2c1N(C(=O)OC(C)(C)C)C(=O)OC(C)(C)C]

The title compound was prepared from tert-Butyl N-[6-amino-2-[(2-methoxyphenyl)methyl]indazol-3-yl]-N-tert-butoxycarbonyl-carbamate (step 3) and 2-(1-adamantyl)acetic acid analogously to Example 1 step 1.

LC-MS (Method B): Rt 1.51 min; MS m/z 645.4=[M+H]+ (95% @ 215 nm)

1H NMR (500 MHz, DMSO-d6) δ 9.78 (s, 1H), 8.05 (s, 1H), 7.37 (dd, J=8.9, 0.4 Hz, 1H), 7.30-7.25 (m, 1H), 7.12 (dd, J=9.0, 1.6 Hz, 1H), 7.04 (d, J=7.9 Hz, 1H), 6.99 (dd, J=7.6, 1.6 Hz, 1H), 6.85 (td, J=7.5, 1.0 Hz, 1H), 5.38 (s, 2H), 3.82 (s, 3H), 2.09 (s, 2H), 1.96-1.92 (m, 3H), 1.70-1.57 (m, 12H), 1.21 (s, 18H).

Step 5: 2-(1-Adamantyl)-N-[3-amino-2-[(2-methoxyphenyl)methyl]indazol-6-yl]acetamide

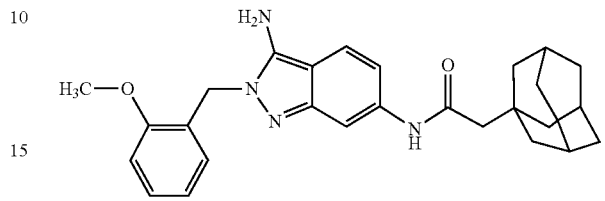

The title compound was prepared from tert-butyl N-[6-[[2-(1-adamantyl)acetyl]amino]-2-[(2-methoxyphenyl)methyl]indazol-3-yl]-N-tert-butoxycarbonyl-carbamate (step 4) and TFA analogously to Example 3 step 2.

LC-MS (Method A): Rt 2.79 min; MS m/z 445.3=[M+H]+ (91% @ 215 nm)

1H NMR (500 MHz, MeOH-d4) δ 7.54-7.52 (m, 1H), 7.46-7.43 (m, 1H), 7.16 (td, J=8.2, 1.7 Hz, 1H), 6.90 (d, J=7.9 Hz, 1H), 6.79-6.73 (m, 2H), 6.67 (dd, J=7.6, 1.5 Hz, 1H), 5.23 (s, 2H), 3.80 (s, 3H), 2.01 (s, 2H), 1.87 (br. s, 3H), 1.67-1.58 (m, 12H).

Step 6: 2-(1-Adamantyl)-N-[3-amino-2-[(2-hydroxyphenyl)methyl]indazol-6-yl]acetamide The title compound was prepare from 2-(1-adamantyl)-N-[3-amino-2-[(2-methoxyphenyl)methyl]indazol-6-yl]acetamide (step 5) and 1M BBr3 in DCM analogously to Example 5.

LC-MS (Method A): Rt 2.60 min; MS m/z 431.3=[M+H]+ (95% @ 215 nm)

1H NMR (500 MHz, DMSO-d6) δ 9.56 (s, 1H), 7.66 (d, J=1.0 Hz, 1H), 7.51 (d, J=8.8 Hz, 1H), 7.13-7.08 (m, 1H), 6.88 (dd, J=7.6, 1.5 Hz, 1H), 6.82 (dd, J=8.0, 0.7 Hz, 1H), 6.73-6.69 (m, 2H), 6.28 (br. s, 1H), 5.23 (s, 2H), 4.02 (br. s, 2H), 2.05 (s, 2H), 1.93 (s, 3H), 1.68-1.58 (m, 12H).

Example 12

2-Cyclohexyl-N-(2-isopropyl-1,3-benzoxazol-5-yl)acetamide

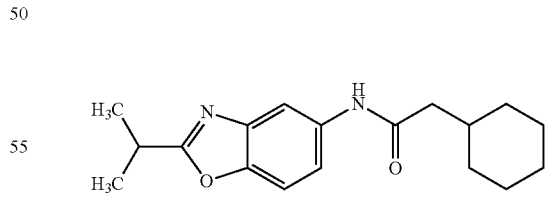

A solution of 2-isopropyl-1,3-benzoxazol-5-amine (50 mg, 0.28 mmol) in DCM (2 mL) was treated with DIPEA (0.1 mL, 0.57 mmol) and the mixture stirred at room temperature. To this mixture was added dropwise 2-cyclohexylacetyl chloride (55 mg, 0.34 mmol) and stirring continued at room temperature for 1 hour. The resulting mixture was diluted with DCM and washed with Na2CO3 (3×5 mL). The organic portion was dried (hydrophobic frit) and concentrated in vacuo. Purification of the crude product by preparative HPLC (basic pH, early elution method) afforded the title compound as an off-white solid.

LC-MS (Method A): Rt 3.56 min; MS m/z 301.1=[M+H]+ (94% @ 215 nm)

1H NMR (500 MHz, DMSO-d6) δ 9.95 (s, 1H), 8.00 (d, J=1.9 Hz, 1H), 7.56 (d, J=8.7 Hz, 1H), 7.45 (dd, J=8.8, 2.0 Hz, 1H), 3.27-3.18 (m, 1H), 2.19 (d, J=7.1 Hz, 2H), 1.83-1.73 (m, 1H), 1.73-1.57 (m, 5H), 1.36 (d, J=6.9 Hz, 6H), 1.30-1.08 (m, 3H), 1.03-0.93 (m, 2H).

Example 13

N-(Cycloheptylmethyl)-2-[(2-hydroxyphenyl)methyl]indazole-6-carboxamide

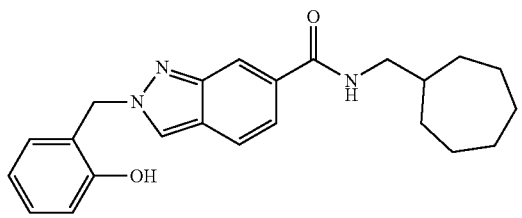 [SMILES: O=C(NCC1CCCCCC1)c1ccc2cn(Cc3ccccc3O)nc2c1]

Step 1: N-(Cycloheptylmethyl)-1H-indazole-6-carboxamide

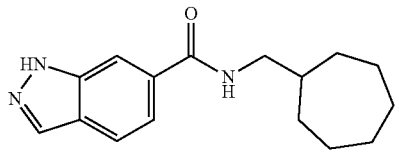 [SMILES: O=C(NCC1CCCCCC1)c1ccc2cn[nH]c2c1]

A solution of 1H-indazole-6-carboxylic acid (200 mg, 1.23 mmol) in DMF (4 mL) was treated with cycloheptylmethanamine (0.2 mL, 1.36 mmol), DIPEA (0.26 mL, 1.48 mmol) followed by HATU (563 mg, 1.48 mmol) and the resulting mixture stirred at room temperature for 30 minutes. The mixture was diluted with EtOAc (30 mL) and water (30 mL) and the phases were separated. The organic portion was washed with water (2×30 mL), brine (30 mL), dried over Na2SO4 and concentrated in vacuo. Purification of the crude product by C18 reverse phase chromatography eluting with 10-100% MeCN in water (0.1% formic acid modifier) afforded the title compound as a pale orange solid.

LC-MS (Method B): Rt 1.12 min; MS m/z 272.2=[M+H]+ (100% @ 215 nm)

1H NMR (250 MHz, DMSO-d6) δ 13.31 (s, 1H), 8.55 (t, J=5.7 Hz, 1H), 8.13 (s, 1H), 8.05-7.97 (m, 1H), 7.80 (dd, J=8.5, 0.6 Hz, 1H), 7.57 (dd, J=8.5, 1.4 Hz, 1H), 3.12 (t, J=6.3 Hz, 2H), 1.86-1.30 (m, 11H), 1.27-1.07 (m, 2H).

Step 2: N-(Cycloheptylmethyl)-2-[(2-methoxyphenyl)methyl]indazole-6-carboxamide

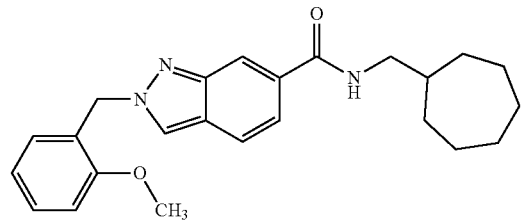 [SMILES: COc1ccccc1Cn1cc2ccc(C(=O)NCC3CCCCCC3)cc2n1]

A mixture of N-(cycloheptylmethyl)-1H-indazole-6-carboxamide (step 1) (100 mg, 0.37 mmol), 1-(chloromethyl)-2-methoxy-benzene (154 μL, 1.11 mmol), sodium iodide (166 mg, 1.11 mmol) and potassium carbonate (255 mg, 1.84 mmol) in 1,4-dioxane (3 mL) in a sealed tube was heated to 110° C. overnight. The resulting mixture was diluted with EtOAc (15 mL) and water (15 mL). The phases were separated and the organic portion washed with water (15 mL), brine (15 mL) and concentrated in vacuo to give a yellow oil. Purification of the crude product by C18 reverse phase chromatography eluting with 10-100% MeCN in water (0.1% formic acid modifier) afforded the title compound as a white solid.

LC-MS (Method A): Rt 3.90 min; MS m/z 392.3=[M+H]+ (100% @ 215 nm)

1H NMR (500 MHz, DMSO-d6) δ 8.44 (t, J=5.7 Hz, 1H), 8.39 (d, J=0.7 Hz, 1H), 8.14-8.10 (m, 1H), 7.73 (dd, J=8.8, 0.7 Hz, 1H), 7.47 (dd, J=8.7, 1.4 Hz, 1H), 7.33 (td, J=8.3, 1.8 Hz, 1H), 7.06 (d, J=7.7 Hz, 1H), 7.00 (dd, J=7.5, 1.7 Hz, 1H), 6.91 (td, J=7.5, 0.9 Hz, 1H), 5.63 (s, 2H), 3.83 (s, 3H), 3.11 (t, J=6.3 Hz, 2H), 1.81-1.68 (m, 3H), 1.67-1.59 (m, 2H), 1.58-1.33 (m, 6H), 1.24-1.12 (m, 2H).

Step 3: N-(Cycloheptylmethyl)-2-[(2-hydroxyphenyl)methyl]indazole-6-carboxamide The title compound was prepare from N-(cycloheptylmethyl)-2-[(2-methoxyphenyl)methyl]indazole-6-carboxamide (step 2) and 1M BBr3 in DCM analogously to Example 5.

LC-MS (Method A): Rt 3.54 min; MS m/z 378.2=[M+H]+ (100% @ 215 nm)

1H NMR (500 MHz, DMSO-d6) δ 9.86 (s, 1H), 8.44 (t, J=5.8 Hz, 1H), 8.37 (d, J=0.7 Hz, 1H), 8.15-8.10 (m, 1H), 7.73 (dd, J=8.8, 0.8 Hz, 1H), 7.47 (dd, J=8.7, 1.4 Hz, 1H), 7.15 (td, J=8.0, 1.7 Hz, 1H), 7.00 (dd, J=7.6, 1.6 Hz, 1H), 6.87 (dd, J=8.1, 1.0 Hz, 1H), 6.76 (td, J=7.5, 1.1 Hz, 1H), 5.59 (s, 2H), 3.11 (t, J=6.3 Hz, 2H), 1.82-1.68 (m, 3H), 1.68-1.59 (m, 2H), 1.58-1.44 (m, 4H), 1.44-1.34 (m, 2H), 1.22-1.14 (m, 2H).

Example 14

2-(1-Adamantyl)-N-(2-benzyl-3H-imidazo[4,5-c]pyridin-6-yl)acetamide

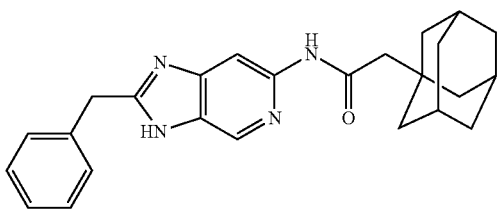 [SMILES: O=C(CC12CC3CC(CC(C3)C1)C2)Nc1cc2nc(Cc3ccccc3)[nH]c2cn1]

Step 1a: 2-(1-Adamantyl)acetamide

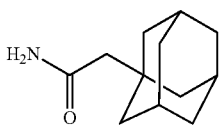 [SMILES: NC(=O)CC12CC3CC(CC(C3)C1)C2]

2-(1-Adamantyl)acetic acid (2.5 g, 12.87 mmol) was dissolved in thionyl chloride (10.21 mL, 140.70 mmol) and heated at 50° C. for 30 min. The resulting mixture was concentrated in vacuo and azeotroped with DCM to remove thionyl chloride. The residue was cooled in an ice bath and treated dropwise with concentrated ammonium hydroxide (12 mL, 12.87 mmol) stirring for 2 hours. The resulting solid was sonicated and collected by filtration, washing with excess water. The gum-like solid was dried under vacuum overnight to give a white solid. The solid was suspended in EtOAc (200 mL) and sonicated until dissolution. The organic mixture was washed with 2M sodium carbonate solution (2×50 mL), water (2×50 mL), brine (10 mL) filtered through a hydrophobic frit and concentrated in vacuo to afford the title compound as a white solid.

LC-MS (Method B): Rt 1.01 min; MS m/z 194.1=[M+H]+ (88% @ 215 nm)

1H NMR (500 MHz, DMSO-d6) δ 7.12 (s, 1H), 6.62 (s, 1H), 1.95-1.88 (m, 3H), 1.78 (s, 2H), 1.70-1.49 (m, 12H).

Step 1b: tert-Butyl N-(2-bromo-5-nitro-4-pyridyl)carbamate

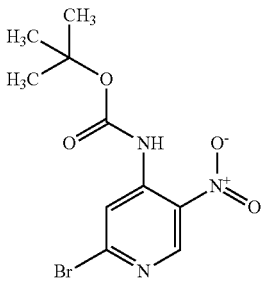

To a solution of 2-bromo-5-nitro-pyridin-4-amine (0.9 g, 4.13 mmol) in DMF (8 mL) was added NaH, 60% dispersion in mineral oil (182 mg, 4.54 mmol) at 0° C. and the mixture stirred for 15 min. A solution of Boc anhydride (1.08 g, 4.95 mmol) in DMF (8 mL) was added dropwise and the mixture was allowed to warm to room temperature and stirred for 3 hours. A further portion of Boc anhydride (0.54 g, 2.48 mmol) in DMF (1 mL) was added and stirring continued at room temperature overnight. The mixture was re-treated with solid Boc anhydride (0.54 g, 2.48 mmol) portionwise and stirred at room temperature overnight. Water (30 mL) and EtOAc (30 mL) were added and the layers were separated. The aqueous layer was extracted with EtOAc (30 mL) and the combined organic extracts were washed with water (3×20 mL), saturated aqueous sodium bicarbonate solution (3×20 mL), brine (20 mL), dried Na2SO4 and concentrated in vacuo. Purification by chromatography on silica eluting 0-100% EtOAc in heptanes afforded a white gummy solid. The solid was dissolved in MeOH and purification by C18 reverse phase chromatography eluting with 10-100% MeCN in water with 0.1% formic acid afforded the title compound as a white solid.

LC-MS (Method B): Rt 1.32 min; MS m/z 318.0/320.0=[M+H]+ (100% @ 215 nm)

1H NMR (500 MHz, DMSO-d6) δ 10.00 (s, 1H), 8.92 (s, 1H), 8.15 (s, 1H), 1.48 (s, 9H).

Step 2: tert-Butyl N-[2-[[2-(1-adamantyl)acetyl]amino]-5-nitro-4-pyridyl]carbamate

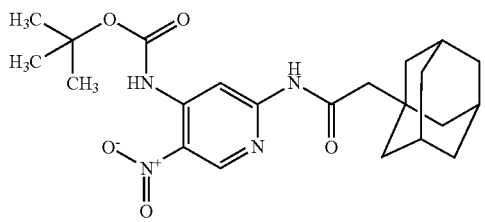 [SMILES: CC(C)(C)OC(=O)Nc1cc(NC(=O)CC23CC4CC(CC(C4)C2)C3)ncc1[N+](=O)[O-]]

tert-Butyl N-(2-bromo-5-nitro-4-pyridyl)carbamate (step 1b) (526 mg, 1.65 mmol), 2-(1-adamantyl)acetamide (step 1a) (640 mg, 3.31 mmol), (1R,2R)—N1,N2-dimethylcyclohexane-1,2-diamine (71 mg, 0.5 mmol) and potassium phosphate (702 mg, 3.31 mmol) were suspended in dioxane (18 mL) The mixture was placed under an atmosphere of nitrogen, treated with copper iodide (94 mg, 0.5 mmol) and heated using microwave radiation stirring at 110° C. for 1 hour. The resulting mixture was filtered and the filtrate concentrated in vacuo. The residue was partitioned between EtOAc (10 mL) and water (10 mL) and the organic layer separated, washed with water (10 mL), passed through a hydrophobic frit and concentrated in vacuo. Purification of the resulting solid by chromatography on silica eluting with 0-100% EtOAc in heptanes followed by trituration with diethyl ether to afforded the title compound as a pale yellow solid.

LC-MS (Method B): Rt 1.57 min; MS m/z 431.2=[M+H]+ (100% @ 215 nm)

1H NMR (500 MHz, DMSO-d6) δ 10.91-10.74 (m, 1H), 9.97-9.82 (m, 1H), 9.01-8.86 (m, 2H), 2.25-2.13 (m, 2H), 1.98-1.86 (m, 3H), 1.72-1.54 (m, 12H), 1.52-1.43 (m, 9H).

Step 3: tert-Butyl N-[2-[[2-(1-adamantyl)acetyl] amino]-5-amino-4-pyridyl]carbamate

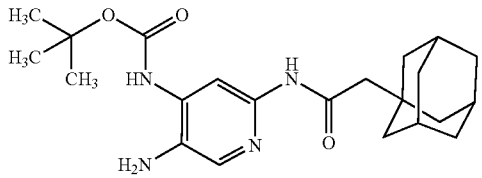 [SMILES: CC(C)(C)OC(=O)Nc1cc(NC(=O)CC23CC4CC(CC(C4)C2)C3)ncc1N]

The title compound was prepared from tert-butyl N-[2-[[2-(1-adamantyl)acetyl]amino]-5-nitro-4-pyridyl]carbamate (step 2) and 10% Pd/C analogously to Example 11 step 3.

LC-MS (Method B): Rt 1.09 min; MS m/z 401.7=[M+H]+ (97% @ 215 nm)

1H NMR (500 MHz, DMSO-d6) δ 9.73 (s, 1H), 8.54 (s, 1H), 8.34 (s, 1H), 7.67 (s, 1H), 4.83 (s, 2H), 2.05 (s, 2H), 1.95-1.87 (m, 3H), 1.70-1.54 (m, 12H), 1.49 (s, 9H).

Step 4: tert-Butyl N-[2-[[2-(1-adamantyl)acetyl] amino]-5-[(2-phenylacetyl)amino]-4-pyridyl]carbamate

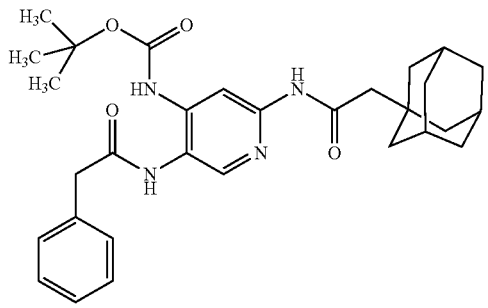 [SMILES: CC(C)(C)OC(=O)Nc1cc(NC(=O)CC23CC4CC(CC(C4)C2)C3)ncc1NC(=O)Cc1ccccc1]

2-Phenylacetic acid (0.07 g, 0.5 mmol), HATU (0.21 g, 0.55 mmol) and DIPEA (0.26 mL, 1.5 mmol) were dissolved in DMF (1 mL) and stirred at room temperature for 10 min. To this mixture was added a solution of tert-butyl N-[2-[[2-(1-adamantyl)acetyl]amino]-5-amino-4-pyridyl]carbamate (step 3) (0.2 g, 0.5 mmol) in DMF (2 mL) and stirring continued at room temperature overnight. A further portion of a solution comprising 2-phenylacetic acid (0.035 g, 0.25 mmol), HATU (0.11 g, 0.28 mmol) and DIPEA (0.13 mL, 0.75 mmol) in DMF (0.5 mL) pre-stirred for 10 min was added to the main reaction mixture and stirring continued for 2 hours. The resulting mixture was partitioned between water (8 mL) and EtOAc (8 mL). The organic layer was separated and washed with 10% potassium carbonate solution (2×10 mL), water (2×10 mL) and passed through a hydrophobic frit. The filtrate was concentrated in vacuo and purification of the crude material by chromatography on silica eluting with 0-100% EtOAc in heptanes yielded a brown oil. The oil was purified by C18 reverse phase chromatography eluting with 10-100% MeCN in water with 0.2% ammonium hydroxide to afford the title compound as a white solid.

LC-MS (Method B): Rt 1.37 min; MS m/z 519.8=[M+H]+ (97% @ 215 nm)

1H NMR (500 MHz, DMSO-d6) δ 10.18 (s, 1H), 9.56 (s, 1H), 8.74-8.53 (m, 2H), 8.14-8.02 (m, 1H), 7.39-7.19 (m, 5H), 3.77-3.56 (m, 2H), 2.18-2.08 (m, 2H), 1.98-1.84 (m, 3H), 1.72-1.54 (m, 12H), 1.54-1.44 (m, 9H).

Step 5: N-[6-[[2-(1-Adamantyl)acetyl]amino]-4-amino-3-pyridyl]-2-phenyl-acetamide

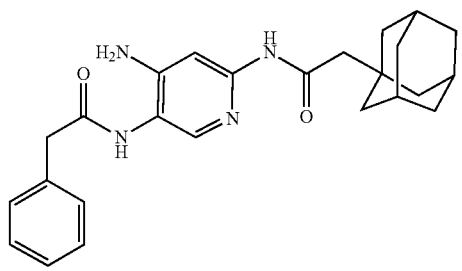 [SMILES: Nc1cc(NC(=O)CC23CC4CC(CC(C4)C2)C3)ncc1NC(=O)Cc1ccccc1]

The title compound was prepared from tert-butyl N-[2-[[2-(1-adamantyl)acetyl]amino]-5-[(2-phenylacetyl)amino]-4-pyridyl]carbamate (step 5) and 4M HCl analogously to Example 6 step 2.

LC-MS (Method B): Rt 1.03 min; MS m/z 419.7=[M+H]+ (99% @ 215 nm)

1H NMR (500 MHz, DMSO-d6) δ 9.81 (s, 1H), 9.23 (s, 1H), 7.77 (s, 1H), 7.50 (s, 1H), 7.37-7.20 (m, 5H), 5.83-5.77 (m, 2H), 3.66-3.60 (m, 2H), 2.12-2.03 (m, 2H), 1.95-1.87 (m, 3H), 1.70-1.52 (m, 12H).

Step 6: 2-(1-Adamantyl)-N-(2-benzyl-3H-imidazo [4,5-c]pyridin-6-yl)acetamide A solution of N-[6-[[2-(1-adamantyl)acetyl]amino]-4-amino-3-pyridyl]-2-phenyl-acetamide (step 5) (68 mg, 0.16 mmol) in acetic acid (1 mL) was placed under an atmosphere of nitrogen in a sealed vessel and heated at 120° C. for 2 days. After cooling to room temperature, the mixture was concentrated in vacuo. The residue was dissolved in EtOAc (5 mL) and washed with saturated aqueous sodium bicarbonate solution (5 mL). The layers were separated and the organic portion passed through a phase separating Isolute® cartridge and concentrated in vacuo. Purification of the resulting oil by C18 reverse phase chromatography eluting with 10-100% MeCN in water (+0.2% ammonium hydroxide) afforded the title compound as a white solid.

LC-MS (Method A): Rt 2.86 min; MS m/z 401.3=[M+H]+ (98% @ 215 nm)

1H NMR (500 MHz, DMSO-d6) δ 12.51 (br. s, 1H), 10.23-10.00 (m, 1H), 8.54-8.45 (m, 1H), 8.24-8.11 (m, 1H), 7.40-7.18 (m, 5H), 4.23-4.13 (m, 2H), 2.19-2.10 (m, 2H), 1.97-1.86 (m, 3H), 1.72-1.50 (m, 12H).

Example 15

2-Benzyl-N-(cycloheptylmethyl)imidazo[1,2-a]pyridine-7-carboxamide

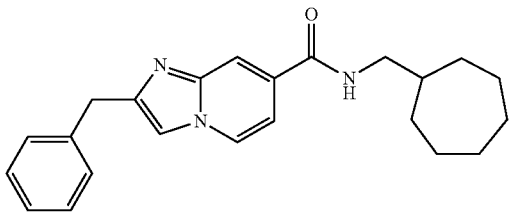 [SMILES: O=C(NCC1CCCCCC1)c1ccn2cc(Cc3ccccc3)nc2c1]

Step 1: 2-Benzyl-7-bromo-imidazo[1,2-a]pyridine

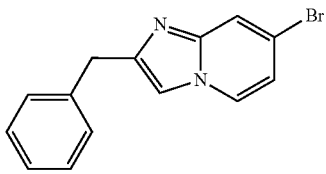 [SMILES: Brc1ccn2cc(Cc3ccccc3)nc2c1]

To a solution of 4-bromopyridin-2-amine (150 mg, 0.87 mmol) in EtOH (2 mL) was added 1-bromo-3-phenylpropan-2-one (203 mg, 0.95 mmol) followed by NaHCO$_3$ (219 mg, 2.6 mmol). The resulting mixture was stirred at room temperature overnight and then concentrated in vacuo. The crude residue was partitioned between EtOAc (20 mL) and water (20 mL) and the organic portion was separated, washed with brine (20 mL), dried over Na$_2$SO$_4$ and concentrated in vacuo. Purification of the crude product by C18 reverse phase chromatography eluting with 0-100% MeCN in water (0.1% formic acid modifier) afforded the title compound as an off-white solid.

LC-MS (Method B): Rt 0.85 min; MS m/z 287.0/289.0=[M+H]+ (100% @ 215 nm)

1H NMR (250 MHz, DMSO-d6) δ 8.43 (dd, J=7.2, 0.7 Hz, 1H), 7.82-7.72 (m, 1H), 7.67-7.65 (m, 1H), 7.33-7.15 (m, 5H), 6.99 (dd, J=7.2, 2.0 Hz, 1H), 4.02 (s, 2H).

Step 2: 2-Benzyl-N-(cycloheptylmethyl)imidazo[1,2-a]pyridine-7-carboxamide

All reagents charged to COware equipment (carbon monoxide generating system) according to the following procedure; Chamber A was charged 2-benzyl-7-bromo-imidazo[1,2-a]pyridine (step 1) (110 mg, 0.38 mmol), sodium carbonate (122 mg, 1.15 mmol) and XantPhos Pd-G3 (third generation G3 Buchwald precatalyst) (36 mg, 0.04 mmol). Toluene (4 mL)) was added followed by cycloheptylmethanamine (73 mg, 0.57 mmol). The reaction mixture was degassed with nitrogen for 5 min. To Chamber B, formic acid (43 μL, 1.15 mmol) in toluene (5 mL) was added followed by mesyl chloride (89 μL, 1.15 mmol). Both chambers were de-gassed with nitrogen, sealed and TEA (320 μL, 2.3 mmol) added to chamber B to generate carbon monoxide. The COware equipment was heated at 100° C. for overnight. The resulting mixture was concentrated in vacuo, dissolved in EtOAc:THF solution (20:1) (25 mL) and washed with water (2×25 mL). The organic portion was concentrated in vacuo and purified by preparative HPLC (basic pH, early elution method) to afford the title compound as a white solid.

LC-MS (Method A): Rt 2.40 min; MS m/z 362.2=[M+H]+ (99% @ 215 nm)

1H NMR (500 MHz, DMSO-d6) δ 8.57 (t, J=5.7 Hz, 1H), 8.49 (dd, J=7.1, 0.8 Hz, 1H), 8.01-7.99 (m, 1H), 7.72 (s, 1H), 7.33-7.27 (m, 4H), 7.24 (dd, J=7.1, 1.7 Hz, 1H), 7.22-7.17 (m, 1H), 4.07 (s, 2H), 3.11 (t, J=6.3 Hz, 2H), 1.80-1.67 (m, 3H), 1.67-1.58 (m, 2H), 1.58-1.32 (m, 6H), 1.21-1.12 (m, 2H).

Example 16

2-(1-Adamantyl)-N-(2-benzylindazol-6-yl)acetamide

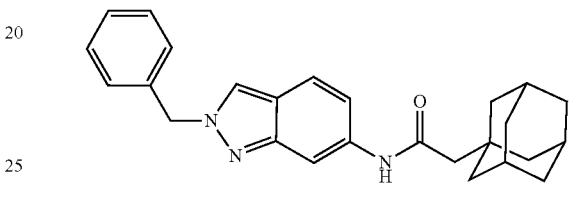

Step 1: 2-(1-Adamantyl)-N-(1H-indazol-6-yl)acetamide

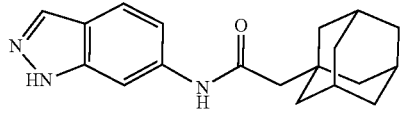

A solution of 1H-indazol-6-amine (250 mg, 1.88 mmol), HATU (785 mg, 2.07 mmol), DIPEA (0.49 mL, 2.82 mmol) and 2-(1-adamantyl)acetic acid (365 mg, 1.88 mmol) was stirred in DMF (2 mL) for 2 hours. The resulting mixture was partitioned between EtOAc (25 mL) and water (25 mL). The organic layer was separated, washed with water (25 mL), brine (2×25 mL), dried over MgSO$_4$ and concentrated in vacuo to afford a brown solid. The solid was purified by chromatography on silica eluting with 0-100% EtOAc in heptanes to afford the title compound as an off-white solid.

LC-MS (Method B): Rt 1.21 min; MS m/z 311.0=[M+H]+ (85% @ 215 nm)

1H NMR (500 MHz, DMSO-d6) δ 12.84 (s, 1H), 9.87 (s, 1H), 8.16 (s, 1H), 7.94 (s, 1H), 7.62 (d, J=8.6 Hz, 1H), 7.06 (dd, J=8.7, 1.7 Hz, 1H), 2.09 (s, 2H), 1.96-1.90 (m, 3H), 1.70-1.57 (m, 12H). Step 2: 2-(1-Adamantyl)-N-(2-benzylindazol-6-yl)acetamide Bromomethylbenzene (0.04 mL, 0.36 mmol) was added to an ice-cooled suspension of 2-(1-adamantyl)-N-(1H-indazol-6-yl)acetamide (step 1) (100 mg, 0.32 mmol) and potassium carbonate (134 mg, 0.97 mmol) in 1,4-dioxane (2 mL) and heated to 110° C. for 20 hours. The resulting mixture was cooled to room temperature and partitioned between DCM (10 mL) and water (10 mL). The organic layer was passed through a hydrophobic frit and was concentrated in vacuo. The resulting red oil was purified by preparative HPLC (acidic pH, early elution method) to afford the title compound as an off-white solid.

LC-MS (Method A): Rt 4.09 min; MS m/z 400.3=[M+H]+ (100% @ 215 nm)

1H NMR (500 MHz, DMSO-d6) δ 9.72 (s, 1H), 8.39-8.31 (m, 1H), 8.05 (s, 1H), 7.59 (d, J=8.8 Hz, 1H), 7.37-7.31 (m, 2H), 7.31-7.27 (m, 3H), 7.06 (dd, J=9.0, 1.7 Hz, 1H), 5.58 (s, 2H), 2.07 (s, 2H), 1.93 (s, 3H), 1.70-1.56 (m, 12H).

Example 17

2-(1-Adamantyl)-N-(2-benzyl-3-methyl-indazol-6-yl)acetamide

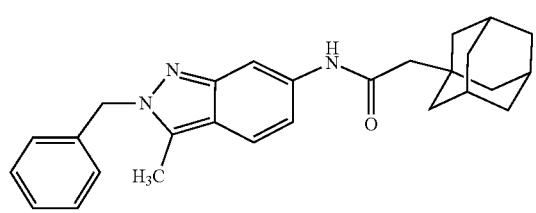 [SMILES: Cc1c2ccc(NC(=O)CC34CC5CC(CC(C5)C3)C4)cc2nn1Cc1ccccc1]

Step 1: 2-(1-Adamantyl)-N-(3-methyl-1H-indazol-6-yl)acetamide

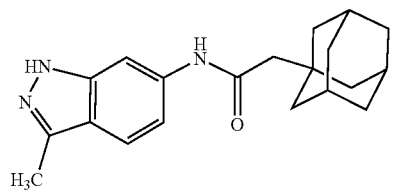 [SMILES: Cc1n[nH]c2cc(NC(=O)CC34CC5CC(CC(C5)C3)C4)ccc12]

The title compound was prepared from 2-(1-adamantyl)acetic acid and 3-methyl-1H-indazol-6-amine analogously to Example 16 step 1. LC-MS (Method B): Rt 1.23 min; MS m/z 325.0=[M+H]+ (100% @ 215 nm)

1H NMR (500 MHz, DMSO-d6) δ 12.38 (s, 1H), 9.82 (s, 1H), 8.06-8.04 (m, 1H), 7.55 (d, J=8.6 Hz, 1H), 7.03 (dd, J=8.6, 1.6 Hz, 1H), 2.42 (s, 3H), 2.08 (s, 2H), 1.97-1.90 (m, 3H), 1.70-1.57 (m, 12H).

Step 2: 2-(1-Adamantyl)-N-(2-benzyl-3-methyl-indazol-6-yl)acetamide

The title compound was prepared from 2-(1-adamantyl)-N-(3-methyl-1H-indazol-6-yl)acetamide (step 1) and bromomethylbenzene analogously to Example 16 step 2.

LC-MS (Method C): Rt 5.30 min; MS m/z 414.2=[M+H]+ (100% @ 215 nm)

1H NMR (500 MHz, DMSO-d6) δ 9.69 (s, 1H), 7.99 (s, 1H), 7.55 (d, J=8.9 Hz, 1H), 7.34-7.29 (m, 2H), 7.29-7.24 (m, 1H), 7.16-7.12 (m, 2H), 7.01 (dd, J=9.0, 1.6 Hz, 1H), 5.56 (s, 2H), 2.53 (s, 3H), 2.07 (s, 2H), 1.96-1.91 (m, 3H), 1.68-1.57 (m, 12H).

Example 18

N-(2-tert-Butyl-1H-benzimidazol-5-yl)-2-(5-chloro-2-hydroxy-phenyl)acetamide

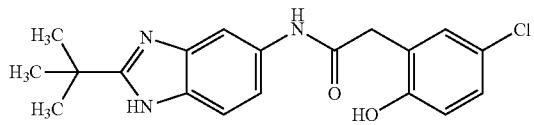 [SMILES: CC(C)(C)c1nc2cc(NC(=O)Cc3cc(Cl)ccc3O)ccc2[nH]1]

Step 1: 2-tert-Butyl-5-nitro-1H-benzimidazole

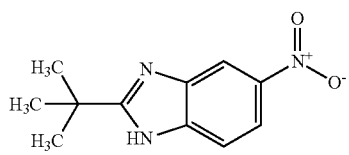 [SMILES: CC(C)(C)c1nc2cc([N+](=O)[O-])ccc2[nH]1]

The title compound was prepared from 4-nitrobenzene-1,2-diamine and 2,2-dimethylpropanoic acid analogously to Example 8 step 1.

LC-MS (Method B): Rt 0.87 min; MS m/z 220.0=[M+H]+ (100% @ 215 nm)

1H NMR (500 MHz, DMSO-d6) δ 12.80 (br. s, 1H), 8.38 (br. s, 1H), 8.07 (dd, J=8.8, 2.2 Hz, 1H), 7.65 (d, J=8.5 Hz, 1H), 1.43 (s, 9H).

Step 2: 2-tert-Butyl-1H-benzimidazol-5-amine

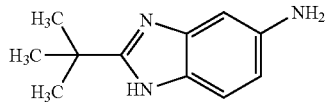

The title compound was prepared from 2-tert-butyl-5-nitro-1H-benzimidazole (step 1) and 10% Pd/C analogously to Example 8 step 2.

1H NMR (500 MHz, MeOH-d4) δ 7.28 (d, J=6.9 Hz, 1H), 6.87 (s, 1H), 6.69 (dd, J=8.5, 2.0 Hz, 1H), 1.43 (s, 9H).

Step 3: N-(2-tert-Butyl-1H-benzimidazol-5-yl)-2-(5-chloro-2-methoxy-phenyl)acetamide

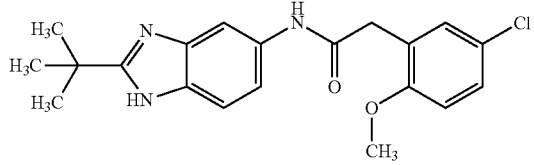 [SMILES: COc1ccc(Cl)cc1CC(=O)Nc1ccc2[nH]c(C(C)(C)C)nc2c1]

To a solution of 2-(5-chloro-2-methoxy-phenyl)acetic acid (70 mg, 0.35 mmol) in DMF (1 mL) was added DIPEA (0.06 mL, 0.35 mmol), HATU (133 mg, 0.35 mmol) followed by a solution of 2-tert-butyl-1H-benzimidazol-5-amine (step 2) (80%, 69 mg, 0.29 mmol) in DMF (0.5 mL).

The mixture was stirred at room temperature for 2 hours, then diluted with EtOAc and washed with water (5 mL) and brine (5 mL). The organic portion was dried over Na₂SO₄ and concentrated in vacuo. The crude residue was purified by chromatography on silica eluting with 50-100% EtOAc in heptanes to afford the title compound as a colourless powder.

LC-MS (Method B): Rt 1.04 min; MS m/z 372.0/374.1= [M+H]+ (88% @ 215 nm)

1H NMR (500 MHz, DMSO-d6) δ 11.94 (br. s, 1H), 10.02 (br. s, 1H), 7.95 (br. s, 1H), 7.41 (br. s, 1H), 7.31-7.28 (m, 2H), 7.15 (br. s, 1H), 7.01 (d, J=8.4 Hz, 1H), 3.77 (s, 3H), 3.65 (s, 2H), 1.38 (s, 9H).

Step 4: N-(2-tert-Butyl-1H-benzimidazol-5-yl)-2-(5-chloro-2-hydroxy-phenyl)acetamide The title compound was prepare from N-(2-tert-butyl-1H-benzimidazol-5-yl)-2-(5-chloro-2-methoxy-phenyl)acetamide (step 3) and 1M BBr₃ in DCM analogously to Example 5.

LC-MS (Method A): Rt 1.76 min; MS m/z 358.2/359.2= [M+H]+ (99% @ 215 nm)

1H NMR (500 MHz, MeOH-d4) δ 7.93 (br. s, 1H), 7.44 (br. s, 1H), 7.33-7.12 (m, 2H), 7.09 (dd, J=8.6, 2.6 Hz, 1H), 6.80 (d, J=8.6 Hz, 1H), 3.69 (s, 2H), 1.45 (s, 9H).

Example 19 tert-Butyl N-[3-[(2-benzyl-1H-benzimidazole-5-carbonyl)amino]-2,2-dimethyl-propyl]carbamate

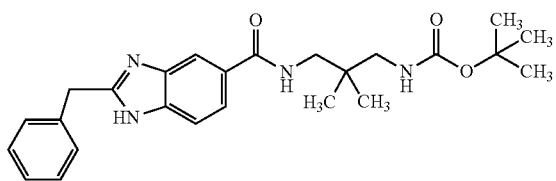 [SMILES: CC(C)(CNC(=O)OC(C)(C)C)CNC(=O)c1ccc2[nH]c(Cc3ccccc3)nc2c1]

The title compound was prepared from 2-benzyl-1H-benzimidazole-5-carboxylic acid and tert-butyl N-(3-amino-2,2-dimethyl-propyl)carbamate analogously to Example 10 step 3.

LC-MS (Method A): Rt 2.35 min; MS m/z 437.3=[M+H]+ (97% @ 215 nm)

1H NMR (500 MHz, DMSO-d6) δ 8.31 (t, J=6.3 Hz, 1H), 8.00 (s, 1H), 7.66 (dd, J=8.4, 1.4 Hz, 1H), 7.51 (d, J=8.3 Hz, 1H), 7.34-7.30 (m, 4H), 7.28-7.20 (m, 1H), 6.88 (t, J=6.6 Hz, 1H), 4.20 (s, 2H), 3.09 (d, J=6.4 Hz, 2H), 2.79 (d, J=6.6 Hz, 2H), 1.40 (s, 9H), 0.81 (s, 6H).

Example 20

2-tert-Butyl-N-(cycloheptylmethyl)-3H-benzimidazole-5-carboxamide

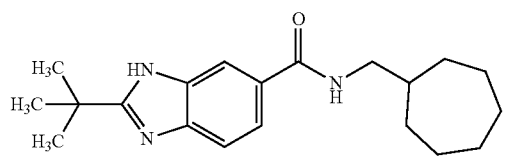 [SMILES: CC(C)(C)c1nc2ccc(C(=O)NCC3CCCCCC3)cc2[nH]1]

Step 1: 3,4-Diamino-N-(cycloheptylmethyl)benzamide

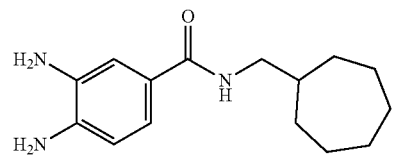 [SMILES: Nc1ccc(C(=O)NCC2CCCCCC2)cc1N]

To a solution of cycloheptylmethanamine (2.27 mL, 15.77 mmol) and 3,4-diaminobenzoic acid (2 g, 13.14 mmol) in THE (50 mL) and DMF (20 mL) was added TBTU (5.06 g, 15.77 mmol) and TEA (5.5 mL, 39.43 mmol). The reaction mixture was stirred at room temperature for 19 hours and then concentrated in vacuo. The crude product was dissolved in EtOAc (50 mL) and washed with water (2×25 mL). The aqueous portion was back extracted with EtOAc (3×50 mL) and the organic extracts were combined, washed with brine (2×25 mL), dried over Na₂SO₄ and concentrated in vacuo. The crude residue was purified by C18 reverse phase chromatography eluting with 0-100% MeCN in water to afford the title compound as a pale brown solid.

LC-MS (Method B): Rt 0.96 min; MS m/z 262.1=[M+H]+ (95% @ 215 nm)

1H NMR (250 MHz, Chloroform-d) δ 7.22 (d, J=1.9 Hz, 1H), 7.08 (dd, J=8.0, 2.0 Hz, 1H), 6.67 (d, J=8.0 Hz, 1H), 6.13-5.92 (m, 1H), 3.81-2.90 (m, 6H), 1.85-1.33 (m, 11H), 1.32-1.14 (m, 2H).

Step 2: 2-tert-Butyl-N-(cycloheptylmethyl)-3H-benzimidazole-5-carboxamide

A mixture of 2,2-dimethylpropanoic acid (23 mg, 0.23 mmol), HATU (87 mg, 0.23 mmol) and TEA (67 µL, 0.38 mmol) in DMF (1.91 mL) was stirred at room temperature. After 1 hour, 3,4-diamino-N-(cycloheptylmethyl)benzamide (step 1) (50 mg, 0.19 mmol) in DMF (1 mL) was added and stirring continued for 18 hours. The resulting mixture was diluted with EtOAc (10 mL) and washed with saturated aqueous sodium hydrogen carbonate (2×10 mL). The organic portion was dried over Na₂SO₄ and concentrated in vacuo. The resulting residue was dissolved in acetic acid (1.91 mL) and stirred at 60° C. for 3 hours. The mixture was diluted with EtOAc (20 mL) and washed with saturated aqueous sodium hydrogen carbonate (3×20 mL). The organic portion was dried over Na₂SO₄ and concentrated in vacuo. The residue was purified by chromatography on silica eluting with 0-100% EtOAc in heptanes followed by 0-100% MeOH in EtOAc to afford the title compound as a colourless solid.

LC-MS (Method A): Rt 2.12 min; MS m/z 328.2=[M+H]+ (100% @ 215 nm)

1H NMR (500 MHz, DMSO-d6) δ 12.34-12.17 (m, 1H), 8.42-8.25 (m, 1H), 8.14-7.84 (m, 1H), 7.71-7.60 (m, 1H), 7.57-7.39 (m, 1H), 3.11 (t, J=6.3 Hz, 2H), 1.81-1.68 (m, 3H), 1.69-1.60 (m, 2H), 1.59-1.51 (m, 2H), 1.50-1.43 (m, 2H), 1.43-1.35 (m, 11H), 1.23-1.12 (m, 2H).

Example 21

2-[(4-tert-Butyl-2-fluoro-5-hydroxy-phenyl)methyl]-N-[1-(trifluoromethyl) cyclopropyl]-1H-benzimidazole-5-carboxamide

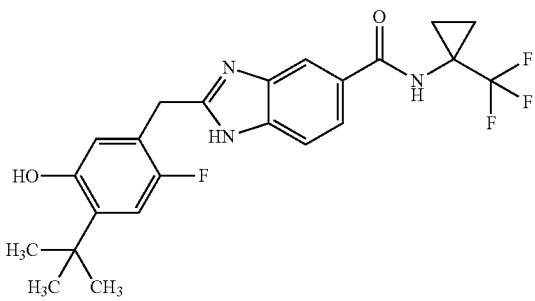 [SMILES: CC(C)(C)c1cc(F)c(Cc2nc3cc(C(=O)NC4(C(F)(F)F)CC4)ccc3[nH]2)cc1O]

Step 1: 2-(4-tert-Butyl-2-fluoro-5-methoxy-phenyl)acetic acid

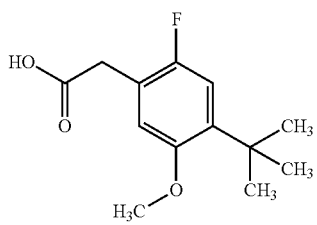

A solution of 2-(2-fluoro-5-methoxy-phenyl)acetic acid (5.0 g, 27.15 mmol) in DCE (181 mL) was treated with tert-butanol (31.16 mL, 325.8 mmol) and concentrated sulfuric acid (17.37 mL, 325.8 mmol). After 1 hour, additional tert-butanol (10.0 mL, 105 mmol) and concentrated sulfuric acid (5.8 mL, 109 mmol) were added and the reaction was stirred overnight. The resulting mixture was diluted with water (150 mL) and the phases were separated. The aqueous layer was extracted with DCM (3×150 mL). The combined organic extracts were washed with brine, dried over Na₂SO₄ and concentrated in vacuo. The crude residue was diluted with MeOH (100 mL) and treated with 2M HCl in MeOH (100 mL, freshly prepared from thionyl chloride). The reaction mixture was heated at reflux for 40 mins. The resulting mixture was then cooled to room temperature and concentrated in vacuo. The residue was dissolved in DCM (150 mL) and washed with saturated aqueous sodium bicarbonate solution (150 mL). The organic layer was separated and the aqueous portion was further extracted with DCM (3×100 mL). The organic extracts were combined, dried over Na₂SO₄ and concentrated in vacuo. Purification by column chromatography on silica, eluting with 0-10% EtOAc in heptanes, afford the methyl ester of the desired product. The material was dissolved in a mixture of 1M aq. LiOH (80 mL) and THF (80 mL) and stirred for 1 hour. The volatiles were then removed in vacuo, and the aqueous solution was acidified with 1M HCl, which resulted in precipitation of the desired product. The solids were obtained by filtration, washed with excess water and dried to afford 2-(4-tert-butyl-2-fluoro-5-methoxy-phenyl)acetic acid (5.22 g, 21.3 mmol, 78% yield) as a pale yellow solid.

1H NMR (500 MHz, DMSO-d6) δ 6.93 (d, J=6.1 Hz, 1H), 6.92 (s, 1H), 3.77 (s, 3H), 3.54 (s, 2H), 1.31 (s, 9H).

Step 2: Methyl 2-[(4-tert-butyl-2-fluoro-5-methoxy-phenyl)methyl]-1H-benzimidazole-5-carboxylate

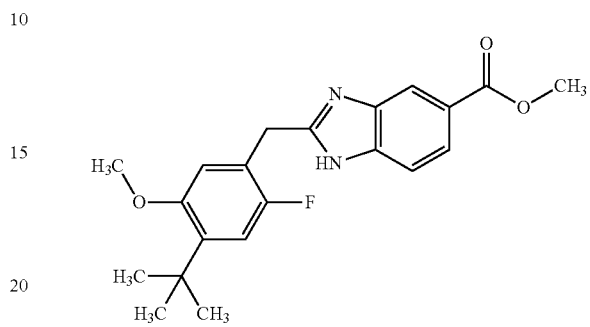

To a stirred solution of 2-(4-tert-butyl-2-fluoro-5-methoxy-phenyl)acetic acid (step 1) (289 mg, 1.2 mmol), methyl 3,4-diaminobenzoate (200 mg, 1.2 mmol) and DIPEA (0.24 mL, 1.35 mmol) in DMF (4 mL) was added HATU (458 mg, 1.2 mmol) and the reaction mixture was stirred at room temperature for 3 h. The resulting mixture was concentrated in vacuo and the residue was diluted with sat. NaHCO₃ (10 mL) and EtOAc (10 mL). The organic layer was separated, washed with brine (2×10 mL), dried over Na₂SO₄ and concentrated in vacuo. The crude material was dissolved in acetic acid (4 mL) and stirred at 80° C. for 1 h. The resulting mixture was concentrated in vacuo and the residue was partitioned between sat. NaHCO₃ (10 mL) and EtOAc (10 mL). The organic layer was separated, washed with brine (2×10 mL), dried over Na₂SO₄ and concentrated in vacuo. Purification by chromatography on silica eluting with a gradient of 0-100% EtOAc in heptanes afforded the title compound as a viscous brown oil.

LC-MS (Method B): Rt 1.20 min; MS m/z 371.1=[M+H]+ (87% @ 215 nm)

1H NMR (500 MHz, DMSO-d6) δ 12.66-12.56 (m, 1H), 8.16-8.02 (m, 1H), 7.83-7.73 (m, 1H), 7.62-7.49 (m, 1H), 7.08-7.03 (m, 1H), 7.00-6.95 (m, 1H), 4.24-4.17 (m, 2H), 3.85 (s, 3H), 3.78 (s, 3H), 1.31 (s, 9H).

Step 3: 2-[(4-tert-Butyl-2-fluoro-5-methoxy-phenyl)methyl]-1H-benzimidazole-5-carboxylic acid

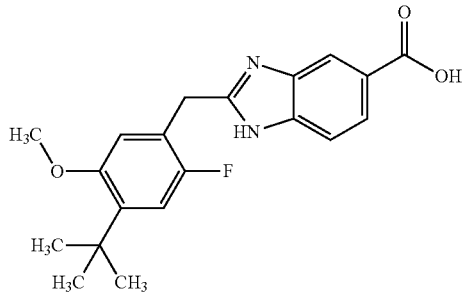 [SMILES: COc1cc(Cc2nc3cc(C(=O)O)ccc3[nH]2)c(F)cc1C(C)(C)C]

A solution of methyl 2-[(4-tert-butyl-2-fluoro-5-methoxy-phenyl)methyl]-1H-benzimidazole-5-carboxylate (step 2)

(87%, 282 mg, 0.66 mmol) in THF (1 mL) and MeOH (1 mL) was treated with 1M LiOH (1.0 mL, 2.0 mmol) and the reaction mixture was stirred at room temperature for 1.5 h. Additional 1M LiOH (1.0 mL, 2.0 mmol) was added and the reaction stirred overnight. Solid LiOH (16 mg, 0.66 mmol) was added and stirring continued for 1 h. Further solid LiOH (32 mg, 1.32 mmol) was added and stirred for an additional 3 h. The resulting mixture was diluted in EtOAc (5 mL) and H₂O (5 mL). The pH was adjusted to 4 using 2M KHSO₄. The layers were separated and the aqueous portion was extracted with EtOAc (5 mL). The organic extracts were combined, dried over Na₂SO₄ and concentrated in vacuo and azeotroping with EtOAc/heptane to afforded the title compound as a beige solid.

LC-MS (Method B): Rt 1.06 min; MS m/z 357.3=[M+H]+ (93% @ 215 nm)

1H NMR (500 MHz, DMSO-d6) δ 12.75-12.25 (m, 2H), 8.17-7.96 (m, 1H), 7.81-7.70 (m, 1H), 7.61-7.44 (m, 1H), 7.05 (d, J=6.7 Hz, 1H), 6.97 (d, J=11.8 Hz, 1H), 4.20 (s, 2H), 3.78 (s, 3H), 1.31 (s, 9H).

Step 4: 2-[(4-tert-Butyl-2-fluoro-5-methoxy-phenyl) methyl]-N-[1-(trifluoromethyl) cyclopropyl]-1H-benzimidazole-5-carboxamide

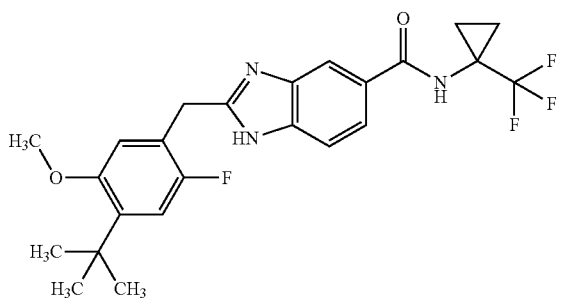 [SMILES: COc1cc(Cc2nc3cc(C(=O)NC4(C(F)(F)F)CC4)ccc3[nH]2)c(F)cc1C(C)(C)C]

To a stirred solution of HATU (73 mg, 0.19 mmol), 2-[(4-tert-butyl-2-fluoro-5-methoxy-phenyl)methyl]-1H-benzimidazole-5-carboxylic acid (85%, 80 mg, 0.19 mmol) and 1-(trifluoromethyl)cyclopropanamine hydrochloride (34 mg, 0.21 mmol) in DMF (1 mL) was added DIPEA (70 µL, 0.4 mmol) and the reaction mixture was stirred at room temperature for 4 h. Additional 1-(trifluoromethyl)cyclopropanamine hydrochloride (34 mg, 0.21 mmol) and DIPEA (70 µL, 0.4 mmol) were added and the mixture left standing overnight. The resulting mixture was diluted with sat. NaHCO₃ (4 mL) and EtOAc (4 mL). The organic layer was separated, washed with brine (2×4 mL), dried over Na₂SO₄ and concentrated in vacuo. Purification by chromatography on silica eluting with a gradient of 0-100% EtOAc in heptanes afforded the title compound as an orange solid.

LC-MS (Method D): Rt 0.97 min; MS m/z 464.2=[M+H]+ (86% @ 215 nm)

1H NMR (400 MHz, Methanol-d4) δ 8.15-7.91 (m, 1H), 7.75-7.68 (m, 1H), 7.64-7.45 (m, 1H), 7.01 (d, J=11.9 Hz, 1H), 6.92 (d, J=6.6 Hz, 1H), 4.26 (s, 2H), 3.80 (s, 3H), 1.40-1.36 (m, 2H), 1.34 (s, 9H), 1.26-1.18 (m, 2H).

Step: 5: 2-[(4-tert-Butyl-2-fluoro-5-hydroxy-phenyl) methyl]-N-[1-(trifluoromethyl) cyclopropyl]-1H-benzimidazole-5-carboxamide

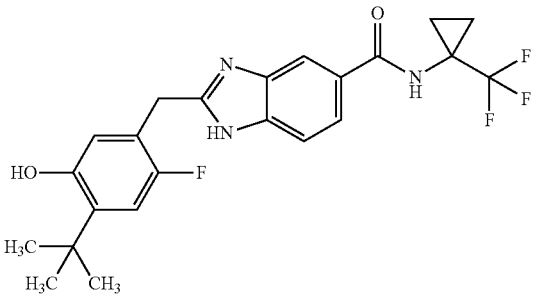 [SMILES: CC(C)(C)c1cc(F)c(Cc2nc3cc(C(=O)NC4(C(F)(F)F)CC4)ccc3[nH]2)cc1O]

1M BBr₃ in DCM (441 µL, 0.44 mmol) was added dropwise to a stirred solution of 2-[(4-tert-butyl-2-fluoro-5-methoxy-phenyl)methyl]-N-[1-(trifluoromethyl)cyclopropyl]-1H-benzimidazole-5-carboxamide (step 4) (70%, 79 mg, 0.12 mmol) in DCM (790 µL) and the reaction mixture was stirred at room temperature for 2 h. The resulting mixture was concentrated in vacuo (at 20° C.). The residue was treated with sat. aq. NaHCO₃ (2 mL) and extracted with EtOAc (2×2 mL). The combined organic extracts were washed with brine (2 mL), dried over Na₂SO₄ and concentrated in vacuo. The residue purified by preparative HPLC (acidic pH, standard elution method). The product fractions were combined, the pH adjusted to 7-8 using NaHCO₃ and extracted with EtOAc (×2). The combined organic extracts were dried over Na₂SO₄ and concentrated in vacuo to afford the title compound as an off-white powder.

LC-MS (Method A): Rt 2.74 min; MS m/z 450.3=[M+H]+ (100% @ 215 nm)

1H NMR (500 MHz, Methanol-d4) δ 8.04 (br. s, 1H), 7.74-7.69 (m, 1H), 7.60-7.48 (m, 1H), 6.94 (d, J=12.0 Hz, 1H), 6.58 (d, J=6.8 Hz, 1H), 4.19 (s, 2H), 1.40-1.37 (m, 2H), 1.35 (s, 9H), 1.24-1.20 (m, 2H).

Example 21.1

2-[(4-tert-Butyl-2-fluoro-5-hydroxy-phenyl)methyl]-N-[[1-(trifluoromethyl) cyclopropyl]methyl]-1H-benzimidazole-5-carboxamide

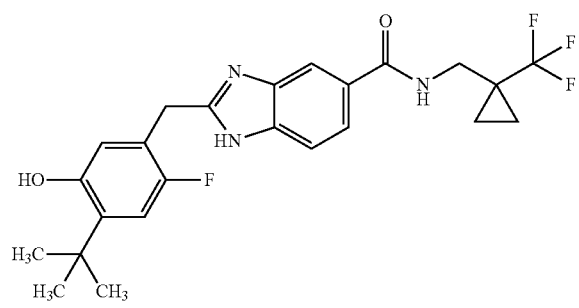 [SMILES: CC(C)(C)c1cc(F)c(Cc2nc3cc(C(=O)NCC4(C(F)(F)F)CC4)ccc3[nH]2)cc1O]

Step 1: 2-[(4-tert-Butyl-2-fluoro-5-methoxy-phenyl)methyl]-N-[[1-(trifluoromethyl) cyclopropyl]methyl]-1H-benzimidazole-5-carboxamide

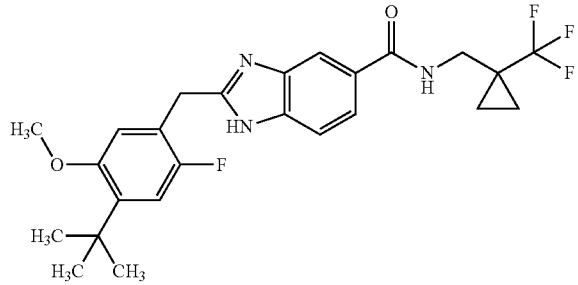 [SMILES: COc1cc(Cc2nc3cc(C(=O)NCC4(C(F)(F)F)CC4)ccc3[nH]2)c(F)cc1C(C)(C)C]

The title compound was prepared from 2-[(4-tert-butyl-2-fluoro-5-methoxy-phenyl)methyl]-1H-benzimidazole-5-carboxylic acid (Example 21 step 3) and [1-(trifluoromethyl)cyclopropyl]methanamine hydrochloride analogously to Example 21 step 4.

LC-MS (Method D): Rt 1.00 min; MS m/z 478.2=[M+H]+ (99% @ 215 nm)

1H NMR (500 MHz, DMSO-d6) δ 12.70-12.29 (m, 1H), 8.58-8.43 (m, 1H), 8.10-7.78 (m, 1H), 7.70-7.60 (m, 1H), 7.50 (br. s, 1H), 7.04 (d, J=6.7 Hz, 1H), 6.97 (d, J=11.8 Hz, 1H), 4.19 (s, 2H), 3.77 (s, 3H), 3.61 (d, J=6.1 Hz, 2H), 1.31 (s, 9H), 0.97-0.92 (m, 2H), 0.92-0.87 (m, 2H).

Step 2: 2-[(4-tert-Butyl-2-fluoro-5-hydroxy-phenyl)methyl]-N-[[1-(trifluoromethyl) cyclopropyl]methyl]-1H-benzimidazole-5-carboxamide The title compound was prepared from 2-[(4-tert-butyl-2-fluoro-5-methoxy-phenyl)methyl]-N-[[1-(trifluoromethyl)cyclopropyl]methyl]-1H-benzimidazole-5-carboxamide (step 1) and BBr3 analogously to Example 21 step 5.

LC-MS (Method A): Rt 2.82 min; MS m/z 464.3=[M+H]+ (89% @ 215 nm)

1H NMR (500 MHz, Methanol-d4) δ 8.03 (s, 1H), 7.71 (dd, J=8.5, 1.6 Hz, 1H), 7.57 (d, J=7.9 Hz, 1H), 6.96 (d, J=12.0 Hz, 1H), 6.60 (d, J=6.8 Hz, 1H), 4.21 (s, 2H), 3.73 (s, 2H), 1.37 (s, 9H), 1.03-0.95 (m, 4H)

Example 21.2

2-[(4-tert-Butyl-2-fluoro-5-hydroxy-phenyl)methyl]-N-(3,3,3-trifluoropropyl)-1H-benzimidazole-5-carboxamide

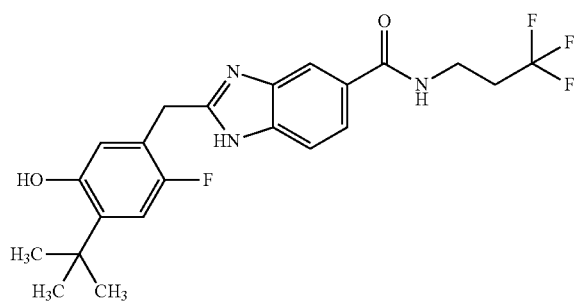 [SMILES: CC(C)(C)c1cc(F)c(Cc2nc3cc(C(=O)NCCC(F)(F)F)ccc3[nH]2)cc1O]

Step 1: 2-[(4-tert-butyl-2-fluoro-5-methoxy-phenyl)methyl]-N-(3,3,3-trifluoropropyl)-1H-benzimidazole-5-carboxamide

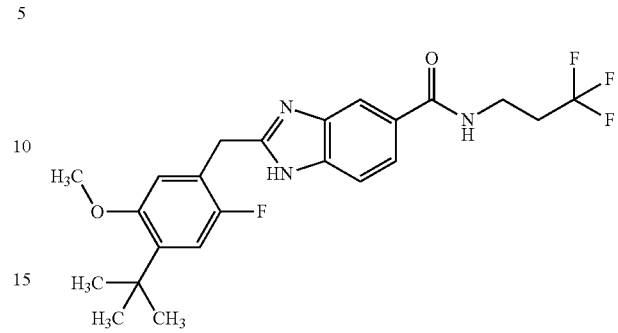

The title compound was prepared from 2-[(4-tert-butyl-2-fluoro-5-methoxy-phenyl)methyl]-1H-benzimidazole-5-carboxylic acid (Example 21 step 3) and 3,3,3-trifluoropropan-1-amine hydrochloride analogously to Example 21 step 4.

LC-MS (Method B): Rt 1.13 min; MS m/z 452.7=[M+H]+ (89% @ 215 nm)

1H NMR (500 MHz, DMSO-d6) δ 12.61-12.37 (m, 1H), 8.65-8.53 (m, 1H), 8.12-7.86 (m, 1H), 7.71-7.42 (m, 2H), 7.04 (d, J=6.7 Hz, 1H), 6.97 (d, J=11.8 Hz, 1H), 4.19 (s, 2H), 3.77 (s, 3H), 3.54-3.47 (m, 2H), 2.61-2.52 (m, 2H), 1.31 (s, 9H).

Step 2: 2-[(4-tert-Butyl-2-fluoro-5-hydroxy-phenyl)methyl]-N-(3,3,3-trifluoropropyl)-1H-benzimidazole-5-carboxamide The title compound was prepared from 2-[(4-tert-butyl-2-fluoro-5-methoxy-phenyl)methyl]-N-(3,3,3-trifluoropropyl)-1H-benzimidazole-5-carboxamide (step 1) and BBr3 analogously to Example 21 step 5.

LC-MS (Method A): Rt 2.61 min; MS m/z 438.5=[M+H]+ (97% @ 215 nm)

1H NMR (500 MHz, Methanol-d4) δ 8.02 (br. s, 1H), 7.70 (d, J=8.3 Hz, 1H), 7.55 (br. s, 1H), 6.94 (d, J=12.0 Hz, 1H), 6.58 (d, J=6.8 Hz, 1H), 4.19 (s, 2H), 3.64 (t, J=7.0 Hz, 2H), 2.54 (qt, J=11.0, 7.1 Hz, 2H), 1.35 (s, 9H).

Example 21.3

2-[(4-tert-Butyl-2-fluoro-5-hydroxy-phenyl)methyl]-N-[1-(trifluoromethyl) cyclopropyl]-1,3-benzoxazole-5-carboxamide

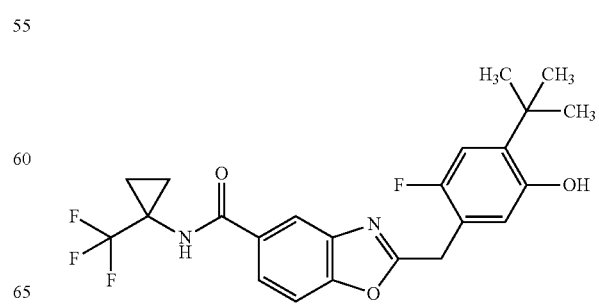

Step 1: Methyl 2-[(4-tert-butyl-2-fluoro-5-methoxy-phenyl)methyl]-1,3-benzoxazole-5-carboxylate

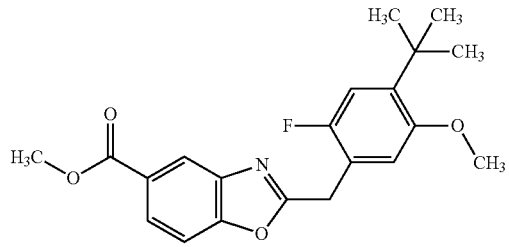

The title compound was prepared from 2-(4-tert-butyl-2-fluoro-5-methoxy-phenyl)acetic acid (Example 21 step 1) and methyl 3-amino-4-hydroxy-benzoate analogously to Example 21 step 2.

LC-MS (Method D): Rt 1.21 min; MS m/z 372.3=[M+H]+ (98% @ 215 nm)

1H NMR (500 MHz, DMSO-d6) δ 8.25-8.21 (m, 1H), 8.00 (dd, J=8.6, 1.7 Hz, 1H), 7.82 (dd, J=8.6, 0.5 Hz, 1H), 7.10 (d, J=6.7 Hz, 1H), 7.01 (d, J=11.8 Hz, 1H), 4.37 (s, 2H), 3.88 (s, 3H), 3.79 (s, 3H), 1.32 (s, 9H).

Step 2: 2-[(4-tert-Butyl-2-fluoro-5-methoxy-phenyl)methyl]-1,3-benzoxazole-5-carboxylic acid

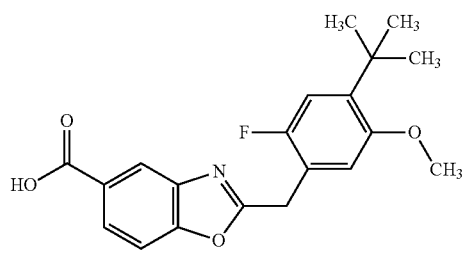 [SMILES: COc1cc(Cc2nc3cc(C(=O)O)ccc3o2)c(F)cc1C(C)(C)C]

The title compound was prepared from methyl 2-[(4-tert-butyl-2-fluoro-5-methoxy-phenyl)methyl]-1,3-benzoxazole-5-carboxylate (step 1) and 2M lithium hydroxide analogously to Example 21 step 3.

LC-MS (Method D): Rt 1.07 min; MS m/z 358.2=[M+H]+ (86% @ 215 nm)

1H NMR (400 MHz, DMSO-d6) δ 13.03 (br. s, 1H), 8.20 (s, 1H), 7.98 (d, J=8.5 Hz, 1H), 7.78 (d, J=8.5 Hz, 1H), 7.10 (d, J=6.6 Hz, 1H), 7.01 (d, J=11.8 Hz, 1H), 4.36 (s, 2H), 3.79 (s, 3H), 1.32 (s, 9H).

Step 3: 2-[(4-tert-Butyl-2-fluoro-5-methoxy-phenyl)methyl]-N-[1-(trifluoromethyl) cyclopropyl]-1,3-benzoxazole-5-carboxamide

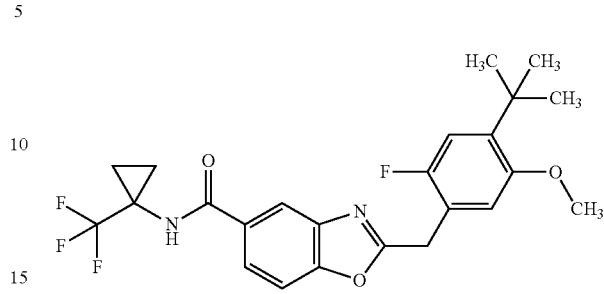

The title compound was prepared from 2-[(4-tert-butyl-2-fluoro-5-methoxy-phenyl)methyl]-1,3-benzoxazole-5-carboxylic acid (step 2) and 1-(trifluoromethyl)cyclopropan-amine; hydrochloride analogously to Example 21 step 4.

LC-MS (Method D): Rt 1.13 min; MS m/z 465.3=[M+H]+ (79% @ 215 nm)

1H NMR (400 MHz, DMSO-d6) δ 9.22 (s, 1H), 8.18 (d, J=1.4 Hz, 1H), 7.89 (dd, J=8.6, 1.8 Hz, 1H), 7.76 (d, J=8.5 Hz, 1H), 7.09 (d, J=6.7 Hz, 1H), 7.01 (d, J=11.8 Hz, 1H), 4.36 (s, 2H), 3.79 (s, 3H), 1.34-1.30 (m, 11H), 1.20-1.16 (m, 2H).

Step 4: 2-[(4-tert-Butyl-2-fluoro-5-hydroxy-phenyl)methyl]-N-[1-(trifluoromethyl) cyclopropyl]-1,3-benzoxazole-5-carboxamide The title compound was prepared from 2-[(4-tert-butyl-2-fluoro-5-methoxy-phenyl)methyl]-N-[1-(trifluoromethyl)cyclopropyl]-1,3-benzoxazole-5-carboxamide (step 3) and 1M BBr3 analogously to Example 21 step 5.

LC-MS (Method A): Rt 3.87 min; MS m/z 451.2=[M+H]+ (96% @ 215 nm)

1H NMR (400 MHz, DMSO-d6) δ 9.39 (s, 1H), 9.23 (s, 1H), 8.19 (d, J=1.3 Hz, 1H), 7.90 (dd, J=8.6, 1.8 Hz, 1H), 7.76 (d, J=8.9 Hz, 1H), 6.92 (d, J=12.0 Hz, 1H), 6.75 (d, J=6.9 Hz, 1H), 4.27 (s, 2H), 1.35-1.30 (m, 11H), 1.21-1.15 (m, 2H).

Example 21.4

2-[(4-tert-Butyl-2-fluoro-5-hydroxy-phenyl)methyl]-N-[[1-(trifluoromethyl) cyclopropyl]methyl]-1,3-benzoxazole-5-carboxamide

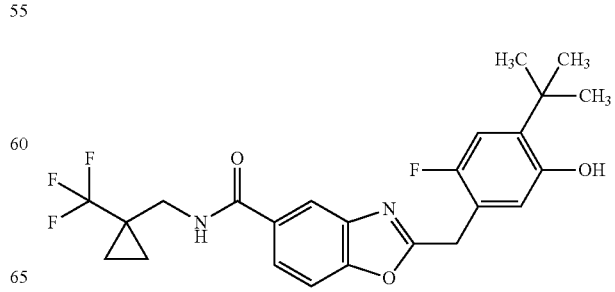

Step 1: 2-[(4-tert-Butyl-2-fluoro-5-methoxy-phenyl) methyl]-N-[[1-(trifluoromethyl) cyclopropyl] methyl]-1,3-benzoxazole-5-carboxamide

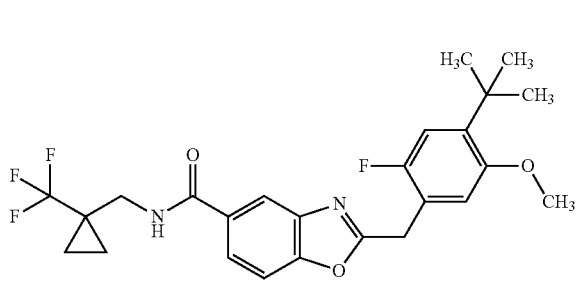 [SMILES: COc1cc(Cc2nc3cc(C(=O)NCC4(C(F)(F)F)CC4)ccc3o2)c(F)cc1C(C)(C)C]

The title compound was prepared from 2-[(4-tert-butyl-2-fluoro-5-methoxy-phenyl)methyl]-1,3-benzoxazole-5-carboxylic acid (Example 21.3 step 2) and [1-(trifluoromethyl)cyclopropyl]methanamine; hydrochloride analogously to Example 21 step 4.

LC-MS (Method D): Rt 1.15 min; MS m/z 479.3=[M+H]+ (48% @ 215 nm)

1H NMR (500 MHz, DMSO-d6) δ 8.66 (t, J=6.1 Hz, 1H), 8.14 (d, J=1.4 Hz, 1H), 7.86 (dd, J=8.6, 1.7 Hz, 1H), 7.76 (d, J=8.5 Hz, 1H), 7.10 (d, J=6.7 Hz, 1H), 7.01 (d, J=11.8 Hz, 1H), 4.36 (s, 2H), 3.79 (s, 3H), 3.61 (d, J=6.1 Hz, 2H), 1.32 (s, 9H), 0.97-0.89 (m, 4H).

Step 2: 2-[(4-tert-Butyl-2-fluoro-5-hydroxy-phenyl) methyl]-N-[[1-(trifluoromethyl) cyclopropyl] methyl]-1,3-benzoxazole-5-carboxamide The title compound was prepared from 2-[(4-tert-butyl-2-fluoro-5-methoxyphenyl)methyl]-N-{[1-(trifluoromethyl)cyclopropyl]methyl}-1,3-benzoxazole-5-carboxamide (step 1) and 1M BBr$_3$ analogously to Example 21 step 5.

LC-MS (Method A): Rt 4.03 min; MS m/z 465.2=[M+H]+ (95% @ 215 nm)

1H NMR (400 MHz, DMSO-d6) δ 9.38 (s, 1H), 8.67 (t, J=6.0 Hz, 1H), 8.16 (d, J=1.3 Hz, 1H), 7.87 (dd, J=8.5, 1.7 Hz, 1H), 7.76 (d, J=8.6 Hz, 1H), 6.92 (d, J=12.0 Hz, 1H), 6.75 (d, J=6.9 Hz, 1H), 4.27 (s, 2H), 3.62 (d, J=6.1 Hz, 2H), 1.32 (s, 9H), 0.98-0.89 (m, 4H).

Example 22

2-[2-Fluoro-5-hydroxy-4-(1-hydroxy-1-methyl-ethyl)phenyl]-N-[2-[1-(trifluoromethyl) cyclopropyl]-1H-benzimidazol-5-yl]acetamide

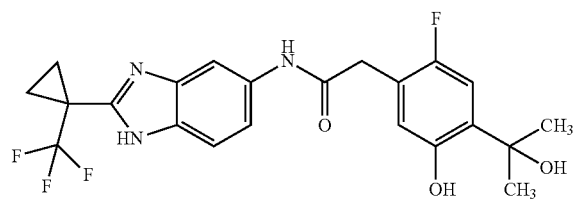 [SMILES: CC(C)(O)c1cc(F)c(CC(=O)Nc2ccc3[nH]c(C4(C(F)(F)F)CC4)nc3c2)cc1O]

Step 1: 5-Nitro-2-[1-(trifluoromethyl)cyclopropyl]-1H-benzimidazole

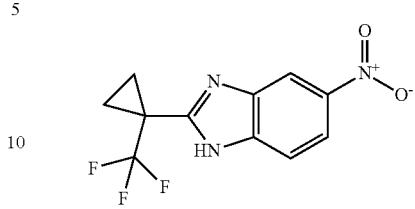

To a stirred solution of 1-(trifluoromethyl)cyclopropanecarboxylic acid (403 mg, 2.61 mmol), 4-nitrobenzene-1,2-diamine (400 mg, 2.61 mmol) and DIPEA (0.52 mL, 2.98 mmol) in DMF (8 mL) was added HATU (993 mg, 2.61 mmol) and the reaction mixture was stirred at room temperature overnight. The resulting mixture was concentrated in vacuo and the residue was partitioned between sat. NaHCO$_3$ (15 mL) and EtOAc (15 mL). The phases were separated and the organic layer was washed with brine (2×10 mL), dried over Na$_2$SO$_4$ then concentrated in vacuo. The crude residue was dissolved in acetic acid (8 mL) and stirred at 80° C. for 2 h. The resulting mixture was concentrated in vacuo and the residue was partitioned between sat. NaHCO$_3$ (25 mL) and EtOAc (25 mL). The organic layer was separated, washed with water (2×15 mL), dried over Na$_2$SO$_4$ and concentrated in vacuo. Purification by chromatography on silica eluting with a gradient of 0-100% EtOAc in heptanes afforded the title compound as a pale yellow solid.

LC-MS (Method B): Rt 1.06 min; MS m/z 272.0=[M+H]+ (99% @ 215 nm)

1H NMR (500 MHz, DMSO-d6) δ 13.27 (br. s, 1H), 8.45 (s, 1H), 8.13 (dd, J=8.8, 1.8 Hz, 1H), 7.72 (d, J=7.6 Hz, 1H), 1.60 (s, 4H).

Step 2: 2-[1-(Trifluoromethyl)cyclopropyl]-1H-benzimidazol-5-amine

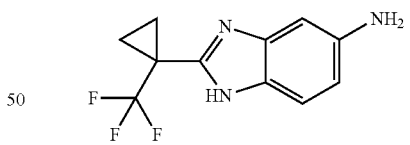

To a solution of 5-nitro-2-[1-(trifluoromethyl)cyclopropyl]-1H-benzimidazole (step 1) (99%, 582 mg, 2.12 mmol) in EtOH (5.8 mL) was added Pd/C (10%, 226 mg, 0.21 mmol). The reaction mixture was placed under an atmosphere of hydrogen and stirred overnight. The resulting mixture was filtered through Celite® washing through with EtOH (10 mL). The filtrate was concentrated in vacuo and azeotroping with DCM afforded the title compound as a beige solid.

1H NMR (500 MHz, DMSO-d6) δ 12.12-11.84 (m, 1H), 7.26-7.06 (m, 1H), 6.73-6.45 (m, 2H), 4.99-4.62 (m, 2H), 1.44-1.37 (m, 4H).

Step 3: 2-[5-Benzyloxy-2-fluoro-4-(1-hydroxy-1-methyl-ethyl)phenyl]-N-[2-[1-(trifluoromethyl)cyclopropyl]-1H-benzimidazol-5-yl]acetamide

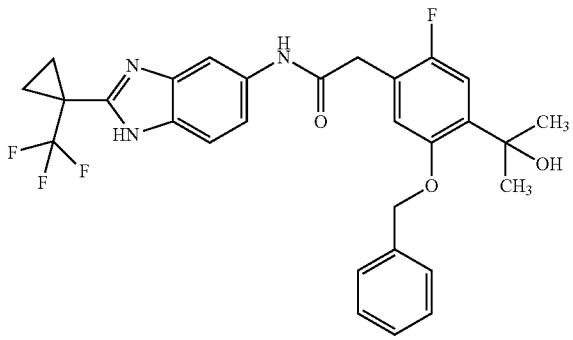 [SMILES: CC(C)(O)c1cc(F)c(CC(=O)Nc2ccc3[nH]c(C4(C(F)(F)F)CC4)nc3c2)cc1OCc1ccccc1]

To a stirred solution of 2-[5-benzyloxy-2-fluoro-4-(1-hydroxy-1-methyl-ethyl)phenyl]acetic acid (Intermediate A) (80%, 72 mg, 0.18 mmol), 2-[1-(trifluoromethyl)cyclopropyl]-1H-benzimidazol-5-amine (step 2) (90%, 65 mg, 0.24 mmol) and DIPEA (0.05 mL, 0.27 mmol) in DMF (2 mL) was added HATU (92 mg, 0.24 mmol) and the reaction mixture was stirred at room temperature for 3 h. The resulting mixture was concentrated in vacuo and the crude material washed with water, brine and dried over $Na_2SO_4$ and concentrated in vacuo. Purification by preparative HPLC (acidic pH, early elution method) afforded the title compound as an off white solid.

LC-MS (Method D): Rt 0.88 min; MS m/z 542.2=[M+H]+ (91% @ 215 nm)

Step 4: 2-[2-Fluoro-5-hydroxy-4-(1-hydroxy-1-methyl-ethyl)phenyl]-N-[2-[1-(trifluoro methyl)cyclopropyl]-1H-benzimidazol-5-yl]acetamide To a solution of 2-[5-benzyloxy-2-fluoro-4-(1-hydroxy-1-methyl-ethyl)phenyl]-N-[2-[1-(trifluoromethyl)cyclopropyl]-1H-benzimidazol-5-yl]acetamide (step 3) (90%, 44 mg, 0.07 mmol) in EtOH (5 mL) was added Pd/C (10%, 7.78 mg, 0.01 mmol). The reaction was placed under a hydrogen atmosphere and stirred for 16 h. The resulting mixture was filtered through Celite® and the filtrate concentrated in vacuo. Purification of the crude residue by preparative HPLC (acidic pH, standard elution method) afforded the title compound as an off white solid.

LC-MS (Method A): Rt 2.16 min; MS m/z 452.2=[M+H]+ (95% @ 215 nm)

1H NMR (400 MHz, DMSO-d6, VT at 354.7K) δ 12.23 (br. s, 1H), 9.88 (s, 1H), 9.44 (br. s, 1H), 7.94 (s, 1H), 7.49-7.39 (m, 1H), 7.29 (br. s, 1H), 7.05 (d, J=11.4 Hz, 1H), 6.77 (d, J=6.7 Hz, 1H), 5.55 (br. s, 1H), 3.61 (s, 2H), 1.52 (s, 6H), 1.52-1.47 (m, 4H).

Example 23

2-(4-tert-Butyl-2-fluoro-5-hydroxy-phenyl)-N-[2-[1-(trifluoromethyl)cyclopropyl]-1H-benzimidazol-5-yl]acetamide

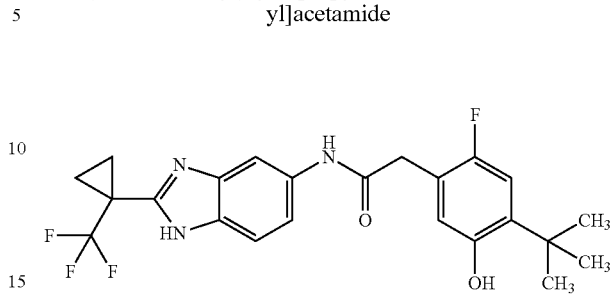

Step 1: 2-(4-tert-Butyl-2-fluoro-5-methoxy-phenyl)-N-[2-[1-(trifluoromethyl)cyclopropyl]-1H-benzimidazol-5-yl]acetamide

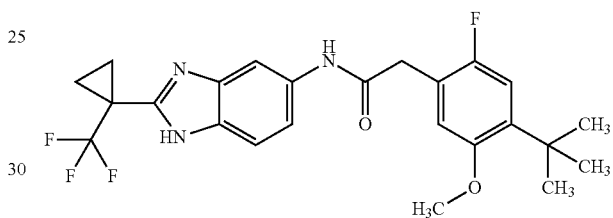

To a stirred solution of 2-(4-tert-butyl-2-fluoro-5-methoxy-phenyl)acetic acid (Example 21 step 1) (90 mg, 0.37 mmol), 2-[1-(trifluoromethyl)cyclopropyl]-1H-benzimidazol-5-amine (Example 22 step 2) (90%, 100 mg, 0.37 mmol) and DIPEA (73 μL, 0.42 mmol) in DMF (2 mL) was added HATU (142 mg, 0.37 mmol) and the reaction mixture was stirred at room temperature for 1.5 h. The resulting mixture was diluted with sat. $NaHCO_3$ (10 mL) and EtOAc (10 mL). The organic layer was separated, washed with brine (2×10 mL), dried over $Na_2SO_4$ then concentrated in vacuo. Purification by chromatography on silica eluting with a gradient of 0-100% EtOAc in heptanes afforded the title compound as a beige solid.

LC-MS (Method B): Rt 1.25 min; MS m/z 464.2=[M+H]+ (97% @ 215 nm)

1H NMR (500 MHz, DMSO-d6) δ 12.45 (br. s, 1H), 10.17 (s, 1H), 7.98 (s, 1H), 7.54-7.39 (m, 1H), 7.35-7.16 (m, 1H), 7.01 (d, J=6.7 Hz, 1H), 6.95 (d, J=11.7 Hz, 1H), 3.79 (s, 3H), 3.68 (s, 2H), 1.48 (s, 4H), 1.32 (s, 9H).

Step 2: 2-(4-tert-Butyl-2-fluoro-5-hydroxy-phenyl)-N-[2-[1-(trifluoromethyl)cyclopropyl]-1H-benzimidazol-5-yl]acetamide 1M $BBr_3$ (467 μL, 0.47 mmol) was added dropwise to a cooled (0° C.), stirred solution of 2-(4-tert-butyl-2-fluoro-5-methoxy-phenyl)-N-[2-[1-(trifluoromethyl)cyclopropyl]-1H-benzimidazol-5-yl]acetamide (step 1) (86%, 168 mg, 0.31 mmol) in DCM (1.5 mL). The mixture was stirred at 0° C. for 10 mins, then allowed to warm to room temperature and stirred for 2 h. Additional $BBr_3$ (467 μL, 0.47 mmol) was added and the mixture was stirred for 3 days. The resulting mixture was concentrated in vacuo and the crude material was purified by C18 reverse phase chromatography eluting with a gradient of 10-100% MeCN (+0.1% formic acid) in H₂O (+0.1% formic acid). The product fractions were combined, the pH adjusted to 7 using NaHCO₃ and the mixture was extracted with EtOAc (×2). The organic extracts were combined, dried over Na₂SO₄ and concentrated in vacuo to afford the title compound as an off-white solid.

LC-MS (Method A): Rt 3.02 min; MS m/z 450.3=[M+H]+ (97% @ 215 nm)

1H NMR (500 MHz, DMSO-d6) δ 12.53-12.40 (m, 1H), 10.23-10.09 (m, 1H), 9.29 (s, 1H), 8.10-7.86 (m, 1H), 7.52-7.18 (m, 2H), 6.89-6.73 (m, 2H), 3.61-3.56 (m, 2H), 1.48 (s, 4H), 1.32 (s, 9H).

Example 24

2-Benzyl-N-(3,3,3-trifluoropropyl)-1H-benzimidazole-5-carboxamide

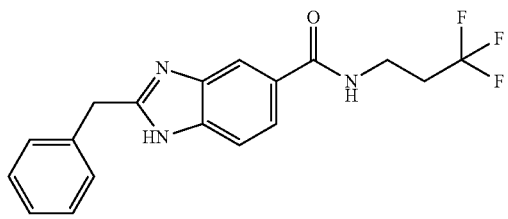 [SMILES: O=C(NCCC(F)(F)F)c1ccc2[nH]c(Cc3ccccc3)nc2c1]

To a solution of commercially available 2-benzyl-1H-benzimidazole-5-carboxylic acid (50 mg, 0.2 mmol) in DMF (2 mL) was added HATU (83 mg, 0.22 mmol) followed by DIPEA (69 µL, 0.4 mmol). The reaction mixture was stirred at room temperature under nitrogen for 10 mins, treated with (3,3,3-trifluoropropan-1-amine (25 mg, 0.22 mmol) and then stirred at room temperature for 16 h. The resulting mixture was concentrated in vacuo and the residue was partitioned between EtOAc (10 mL) and water (10 mL). The organic layer was separated, washed with brine (10 mL) and concentrated in vacuo. Purification by preparative HPLC (basic pH, early elution method) afforded the title compound as a white solid.

LC-MS (Method A): Rt 1.70 min; MS m/z 348.1=[M+H]+ (99% @ 215 nm)

1H NMR (500 MHz, DMSO-d6) δ 12.47 (br. s, 1H), 8.58 (t, J=5.5 Hz, 1H), 7.99 (s, 1H), 7.65 (dd, J=8.4, 1.6 Hz, 1H), 7.50 (d, J=8.4 Hz, 1H), 7.35-7.29 (m, 4H), 7.26-7.21 (m, 1H), 4.20 (s, 2H), 3.50 (q, J=6.9 Hz, 2H), 2.61-2.52 (m, 2H).

Example 24.1

2-Benzyl-N-(cyclopentylmethyl)-1H-benzimidazole-5-carboxamide

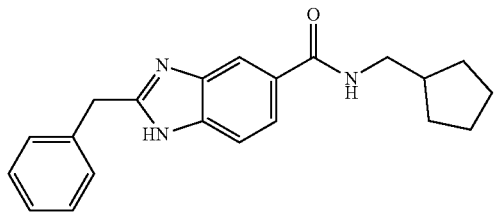 [SMILES: O=C(NCC1CCCC1)c1ccc2[nH]c(Cc3ccccc3)nc2c1]

The title compound was prepared from commercially available 2-benzyl-1H-benzimidazole-5-carboxylic acid and cyclopentylmethanamine analogously to Example 24

LC-MS (Method A): Rt 2.02 min; MS m/z 334.2=[M+H]+ (99% @ 215 nm)

1H NMR (500 MHz, DMSO-d6) δ 12.48 (br. s, 1H), 8.37 (t, J=5.7 Hz, 1H), 8.00 (s, 1H), 7.66 (dd, J=8.4, 1.5 Hz, 1H), 7.49 (d, J=8.2 Hz, 1H), 7.36-7.29 (m, 4H), 7.26-7.21 (m, 1H), 4.20 (s, 2H), 3.22-3.17 (m, 2H), 2.20-2.12 (m, 1H), 1.71-1.64 (m, 2H), 1.63-1.44 (m, 4H), 1.30-1.22 (m, 2H).

Example 24.2

2-Benzyl-N-(cycloheptylmethyl)-1H-benzimidazole-5-carboxamide

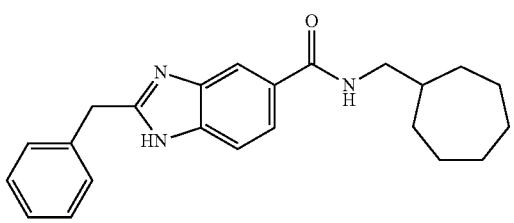 [SMILES: O=C(NCC1CCCCCC1)c1ccc2[nH]c(Cc3ccccc3)nc2c1]

The title compound was prepared from commercially available 2-benzyl-1H-benzimidazole-5-carboxylic acid and cycloheptylmethanamine analogously to Example 24

LC-MS (Method A): Rt 2.43 min; MS m/z 362.2=[M+H]+ (96% @ 215 nm)

1H NMR (500 MHz, DMSO-d6) δ 12.47 (br. s, 1H), 8.36 (t, J=5.6 Hz, 1H), 8.00 (br. s, 1H), 7.66 (d, J=8.4 Hz, 1H), 7.52-7.44 (m, 1H), 7.35-7.29 (m, 4H), 7.26-7.21 (m, 1H), 4.20 (s, 2H), 3.10 (t, J=6.3 Hz, 2H), 1.80-1.68 (m, 3H), 1.67-1.58 (m, 2H), 1.58-1.33 (m, 6H), 1.22-1.12 (m, 2H).

Example 25

N-(Cycloheptylmethyl)-2-[(2-fluoro-6-hydroxy-phenyl)methyl]-1H-benzimidazole-5-carboxamide

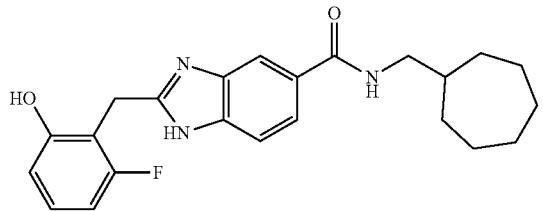 [SMILES: O=C(NCC1CCCCCC1)c1ccc2[nH]c(Cc3c(O)cccc3F)nc2c1]

Step 1: Methyl 2-[(2-fluoro-6-methoxy-phenyl)methyl]-1H-benzimidazole-5-carboxylate

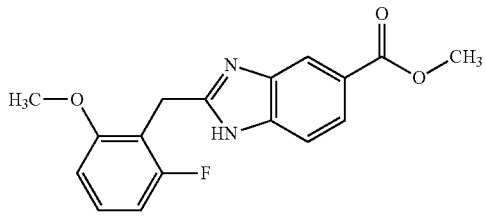

To a stirred solution of 2-(2-fluoro-6-methoxy-phenyl)acetic acid (250 mg, 1.36 mmol), methyl 3,4-diaminobenzoate (226 mg, 1.36 mmol) and DIPEA (0.31 mL, 1.76 mmol) in DMF (6 mL) was added HATU (517 mg, 1.36 mmol). The reaction mixture was stirred at room temperature for 2 h. The resulting mixture was concentrated in vacuo and the residue was partitioned between EtOAc (50 mL) and water (50 mL). The organic layer was separated, dried over $Na_2SO_4$ and concentrated in vacuo. The crude material was dissolved in acetic acid (25 mL) and stirred at 70° C. for 16 h. The resulting mixture was concentrated in vacuo and the residue was partitioned between EtOAc (50 mL) and water (50 mL). The organic layer was separated, dried over $Na_2SO_4$ and concentrated in vacuo. Purification of the crude material by chromatography on silica eluting with 5-75% EtOAc in heptanes afforded the title compound as an off white solid.

LC-MS (Method B): Rt 0.92 min; MS m/z 315.4=[M+H]+ (94% @ 215 nm)

1H NMR (500 MHz, DMSO-d6) δ 12.43 (br. s, 1H), 8.06 (br. s, 1H), 7.76 (br. s, 1H), 7.52 (br. s, 1H), 7.37-7.30 (m, 1H), 6.91 (d, J=8.4 Hz, 1H), 6.86 (t, J=8.8 Hz, 1H), 4.19 (s, 2H), 3.85 (s, 3H), 3.79 (s, 3H).

Step 2: 2-[(2-Fluoro-6-methoxy-phenyl)methyl]-1H-benzimidazole-5-carboxylic acid

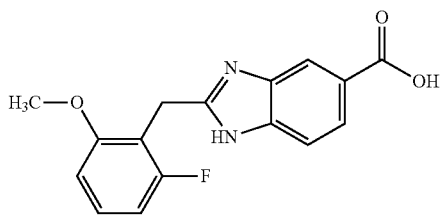 [SMILES: COc1cccc(F)c1Cc1nc2cc(C(=O)O)ccc2[nH]1]

2M aqueous LiOH solution (3.2 mL, 6.4 mmol) was added to a solution of methyl 2-[(2-fluoro-6-methoxy-phenyl)methyl]-1H-benzimidazole-5-carboxylate (step 1) (312 mg, 0.99 mmol) in THF (5 mL) and the mixture was stirred at 60° C. for 4 h. The resulting mixture was partially concentrated in vacuo to remove the volatile solvent and the remaining aqueous layer was acidified to pH 4 with 2M aqueous HCl. The aqueous portion was extracted with 3:1 chloroform:IPA (3×30 mL) and the combined organic extracts were dried over $Na_2SO_4$ and concentrated in vacuo to afford the title compound as a pale orange powder.

LC-MS (Method B): Rt 0.85 min; MS m/z 301.0=[M+H]+ (94% @ 215 nm)

1H NMR (500 MHz, DMSO-d6) δ 8.19 (s, 1H), 7.98 (dd, J=8.5, 1.3 Hz, 1H), 7.73 (d, J=8.6 Hz, 1H), 7.54-7.38 (m, 1H), 6.97-6.89 (m, 2H), 4.42 (s, 2H), 3.77 (s, 3H).

Step 3: N-(Cycloheptylmethyl)-2-[(2-fluoro-6-methoxy-phenyl)methyl]-1H-benzimidazole-5-carboxamide

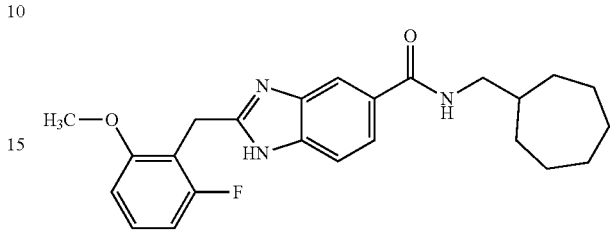

To a stirred solution of 2-[(2-fluoro-6-methoxy-phenyl)methyl]-1H-benzimidazole-5-carboxylic acid (step 2) (88%, 144 mg, 0.42 mmol), DIPEA (0.15 mL, 0.85 mmol) and HATU (177 mg, 0.46 mmol) in DMF (1 mL) was added cycloheptylmethanamine (59 mg, 0.46 mmol) and the mixture was stirred at room temperature for 2 h. The resulting mixture was concentrated in vacuo and the residue was partitioned between EtOAc (15 mL) and water (10 mL). The organic layer was separated, dried over $Na_2SO_4$ and concentrated in vacuo. Purification by preparative HPLC (basic pH, standard elution method) afforded the title compound as a white powder.

LC-MS (Method A): Rt 2.50 min; MS m/z 410.3=[M+H]+ (85% @ 215 nm)

1H NMR (500 MHz, DMSO-d6) δ 12.35-12.20 (m, 1H), 8.40-8.26 (m, 1H), 8.05-7.85 (m, 1H), 7.63 (dd, J=24.2, 7.9 Hz, 1H), 7.44 (dd, J=32.0, 8.4 Hz, 1H), 7.36-7.28 (m, 1H), 6.93-6.79 (m, 2H), 4.16 (s, 2H), 3.78 (s, 3H), 3.13-3.06 (m, 2H), 1.80-1.67 (m, 3H), 1.66-1.43 (m, 6H), 1.41-1.31 (m, 2H), 1.22-1.09 (m, 2H).

Step 4: N-(Cycloheptylmethyl)-2-[(2-fluoro-6-hydroxy-phenyl)methyl]-1H-benzimidazole-5-carboxamide To a cooled (0° C.) solution of N-(cycloheptylmethyl)-2-[(2-fluoro-6-methoxy-phenyl)methyl]-1H-benzimidazole-5-carboxamide (step 3) (85%, 124 mg, 0.26 mmol) in DCM (0.5 mL) was added 1M $BBr_3$ in DCM (0.77 mL, 0.77 mmol) and the mixture was stirred at room temperature for 1 h. The resulting mixture was diluted with MeOH (~5 mL) and concentrated in vacuo. Purification by preparative HPLC (basic pH, early elution method) afforded the title compound as a white powder.

LC-MS (Method A): Rt 2.32 min; MS m/z 396.2=[M+H]+ (100% @ 215 nm)

1H NMR (500 MHz, DMSO-d6) δ 8.36-8.30 (m, 1H), 7.96 (s, 1H), 7.64 (dd, J=8.4, 1.3 Hz, 1H), 7.45 (d, J=8.3 Hz, 1H), 7.17-7.10 (m, 1H), 6.71 (d, J=8.3 Hz, 1H), 6.66 (t, J=8.7 Hz, 1H), 4.14 (s, 2H), 3.10 (t, J=6.3 Hz, 2H), 1.80-1.68 (m, 3H), 1.68-1.59 (m, 2H), 1.58-1.42 (m, 4H), 1.42-1.32 (m, 2H), 1.21-1.11 (m, 2H).

The compounds of the following tabulated Examples (Table 1) were prepared analogously to Example 25 steps 1-4 by replacing 2-(2-fluoro-6-methoxy-phenyl)acetic acid (step 1) with the appropriate commercially available phenyl acetic acid.

TABLE 1

| Ex. | Structure and Name | Retention Time, [M + H]+, 1H NMR |
|---|---|---|
| 25.1 | 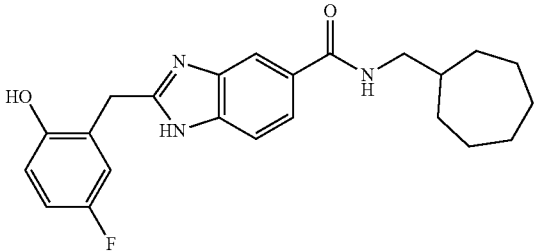<br>N-(Cycloheptylmethyl)-2-[(5-fluoro-2-hydroxyphenyl)methyl]-1H-benzimidazole-5-carboxamide | LC-MS (Method A): Rt 2.33 min; MS m/z 396.3 = [M + H]+ (100% @ 215 nm)<br>1H NMR (500 MHz, DMSO-d6) δ 8.35 (t, J = 5.8 Hz, 1H), 8.00 (s, 1H), 7.66 (dd, J = 8.4, 1.5 Hz, 1H), 7.48 (d, J = 8.4 Hz, 1H), 6.98-6.88 (m, 2H), 6.84-6.77 (m, 1H), 4.12 (s, 2H), 3.10 (t, J = 6.3 Hz, 2H), 1.80-1.67 (m, 3H), 1.67-1.58 (m, 2H), 1.59-1.42 (m, 4H), 1.42-1.32 (m, 2H), 1.22-1.12 (m, 2H). |
| 25.2 | 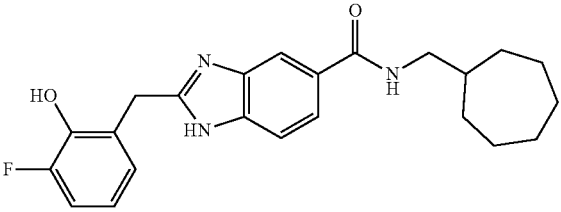<br>N-(Cycloheptylmethyl)-2-[(3-fluoro-2-hydroxyphenyl)methyl]-1H-benzimidazole-5-carboxamide | LC-MS (Method A): Rt 2.29 min; MS m/z 396.2 = [M + H]+ (97% @ 215 nm)<br>1H NMR (500 MHz, DMSO-d6) δ 8.36 (t, J = 5.7 Hz, 1H), 8.00 (s, 1H), 7.67 (dd, J = 8.4, 1.5 Hz, 1H), 7.48 (d, J = 8.3 Hz, 1H), 7.10-7.04 (m, 1H), 6.94 (d, J = 7.6 Hz, 1H), 6.79-6.73 (m, 1H), 4.19 (s, 2H), 3.10 (t, J = 6.3 Hz, 2H), 1.80-1.68 (m, 3H), 1.67-1.59 (m, 2H), 1.58-1.42 (m, 4H), 1.42-1.33 (m, 2H), 1.22-1.12 (m, 2H). |
| 25.3 | 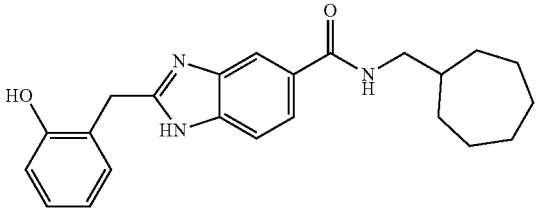<br>N-(Cycloheptylmethyl)-2-[(2-hydroxyphenyl)methyl]-1H-benzimidazole-5-carboxamide | LC-MS (Method A): Rt 2.19 min; MS m/z 378.3 = [M + H]+ (95% @ 215 nm)<br>1H NMR (500 MHz, DMSO-d6) δ 8.35 (t, J = 5.7 Hz, 1H), 7.99 (s, 1H), 7.65 (dd, J = 8.4, 1.6 Hz, 1H), 7.47 (d, J = 8.4 Hz, 1H), 7.10-7.05 (m, 2H), 6.83 (dd, J = 8.5, 1.1 Hz, 1H), 6.74 (td, J = 7.4, 1.0 Hz, 1H), 4.11 (s, 2H), 3.10 (t, J = 6.3 Hz, 2H), 1.79-1.67 (m, 3H), 1.67-1.59 (m, 2H), 1.59-1.33 (m, 6H), 1.21-1.12 (m, 2H). |
| 25.4 | 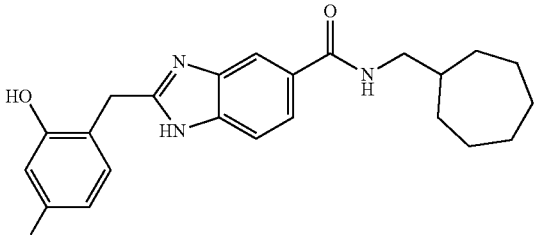<br>N-(Cycloheptylmethyl)-2-[(4-fluoro-2-hydroxyphenyl)methyl]-1H-benzimidazole-5-carboxamide | LC-MS (Method A): Rt 2.31 min; MS m/z 396.2 = [M + H]+ (98% @ 215 nm)<br>1H NMR (500 MHz, DMSO-d6) δ 8.35 (t, J = 5.7 Hz, 1H), 7.99 (s, 1H), 7.65 (dd, J = 8.4, 1.5 Hz, 1H), 7.47 (d, J = 8.4 Hz, 1H), 7.12 (dd, J = 8.2, 7.2 Hz, 1H), 6.62 (dd, J = 10.8, 2.6 Hz, 1H), 6.58 (td, J = 8.5, 2.6 Hz, 1H), 4.09 (s, 2H), 3.10 (t, J = 6.3 Hz, 2H), 1.80-1.68 (m, 3H), 1.67-1.59 (m, 2H), 1.58-1.32 (m, 6H), 1.21-1.12 (m, 2H). |

Example 25.5

N-(Cycloheptylmethyl)-2-[(3-hydroxyphenyl)methyl]-1H-benzimidazole-5-carboxamide

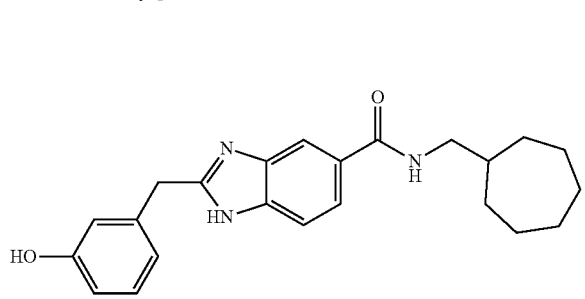

Step 1; methyl 2-[(3-benzyloxyphenyl)methyl]-1H-benzimidazole-5-carboxylate

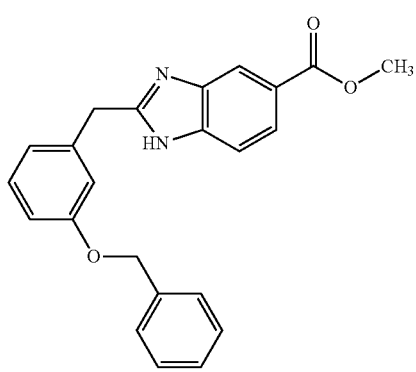 [SMILES: COC(=O)c1ccc2[nH]c(Cc3cccc(OCc4ccccc4)c3)nc2c1]

A solution of 2-(3-benzyloxyphenyl)acetic acid (2.01 g, 8.3 mmol), HATU (3.16 g, 8.3 mmol) and DIPEA (3.19 mL, 18.27 mmol) in DMF (50 mL) was stirred at room temperature for 45 min then methyl 3,4-diaminobenzoate (1.38 g, 8.3 mmol) was added. After stirring at room temperature for 18 h, the resulting mixture was concentrated in vacuo and the residue partitioned between sat. NaHCO$_3$ (100 mL) and EtOAc (125 mL). The organic layer was separated, washed with water (2×75 mL) and brine (2×75 mL), dried over Na$_2$SO$_4$ then concentrated in vacuo. The resulting material was triturated with MeOH (40 mL) and the off-white solid was filtered and dried in a vacuum oven at 40° C. for 3 h. The solid was then suspended in AcOH (25 mL) and stirred at 70° C. for 6 h. The resulting mixture was concentrated in vacuo and the residue diluted with sat. NaHCO$_3$ (100 mL) and EtOAc (125 mL). The organic layer was separated, washed with water (2×75 mL), brine (2×75 mL), dried over Na$_2$SO$_4$ and concentrated in vacuo to afford the title compound as an off-white powder.

LC-MS (Method B): Rt 1.05 min; MS m/z 373.0=[M+H]+ (98% @ 215 nm)

1H NMR (500 MHz, DMSO-d6) δ 8.20-7.99 (m, 1H), 7.79 (dd, J=8.4, 1.6 Hz, 1H), 7.56 (d, J=8.4 Hz, 1H), 7.48-7.39 (m, 2H), 7.39-7.33 (m, 2H), 7.33-7.27 (m, 1H), 7.24 (t, J=7.9 Hz, 1H), 7.06-6.98 (m, 1H), 6.97-6.83 (m, 2H), 5.07 (s, 2H), 4.19 (s, 2H), 3.85 (s, 3H).

Step 2: Methyl 2-[(3-hydroxyphenyl)methyl]-1H-benzimidazole-5-carboxylate

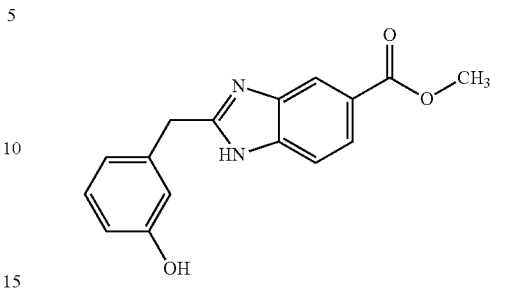

To a suspension of methyl 2-[(3-benzyloxyphenyl)methyl]-1H-benzimidazole-5-carboxylate (step 1) (95%, 700 mg, 1.79 mmol) in EtOH (20 mL) was added Pd/C (10%, 150 mg, 0.14 mmol). The reaction mixture was placed under a hydrogen atmosphere and stirred at room temperature for 6 h. The resulting mixture was filtered through Celite @ washing through with EtOH (45 mL). The filtrate was concentrated in vacuo to afford the title compound as a pale orange/brown solid.

LC-MS (Method B): Rt 0.83 min; MS m/z 283.1=[M+H]+ (98% @ 215 nm)

1H NMR (500 MHz, DMSO-d6) δ 8.09 (s, 1H), 7.78 (dd, J=8.4, 1.6 Hz, 1H), 7.55 (d, J=8.4 Hz, 1H), 7.10 (t, J=7.8 Hz, 1H), 6.74 (d, J=7.7 Hz, 1H), 6.72-6.69 (m, 1H), 6.62 (dd, J=8.0, 1.8 Hz, 1H), 4.12 (s, 2H), 3.85 (s, 3H).

Step 3: 2-[(3-Hydroxyphenyl)methyl]-1H-benzimidazole-5-carboxylic acid

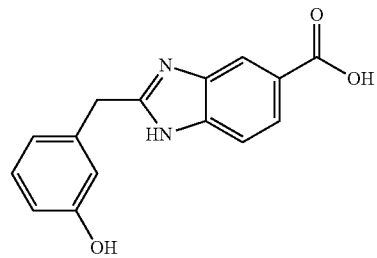 [SMILES: O=C(O)c1ccc2[nH]c(Cc3cccc(O)c3)nc2c1]

2M aq. LiOH solution (2.53 mL, 5.06 mmol) was added to a solution of methyl 2-[(3-hydroxyphenyl)methyl]-1H-benzimidazole-5-carboxylate (step 2) (95%, 501 mg, 1.69 mmol) in THF (8 mL) and the reaction mixture was stirred at 50° C. for 4 h. The resulting mixture was partially concentrated (to remove the THF) and the remaining aqueous layer was acidified to pH 4 and extracted with 3:1 chloroform:IPA (3×30 mL). The combined organic extracts were dried over Na$_2$SO$_4$ and concentrated in vacuo to afford the title compound as a pale orange powder.

LC-MS (Method B): Rt 0.73 min; MS m/z 269.1=[M+H]+ (95% @ 215 nm)

1H NMR (500 MHz, DMSO-d6) δ 13.48-11.55 (m, 2H), 9.37 (s, 1H), 8.10 (s, 1H), 7.81 (dd, J=8.4, 1.5 Hz, 1H), 7.57 (d, J=8.4 Hz, 1H), 7.12 (t, J=7.8 Hz, 1H), 6.75 (d, J=7.7 Hz, 1H), 6.73-6.70 (m, 1H), 6.64 (dd, J=8.0, 1.8 Hz, 1H), 4.16 (s, 2H).

Step 4: N-(Cycloheptylmethyl)-2-[(3-hydroxyphenyl)methyl]-1H-benzimidazole-5-carboxamide The title compound was prepared from 2-[(3-hydroxyphenyl)methyl]-1H-benzimidazole-5-carboxylic acid (step 3) and cycloheptylmethanamine analogously to Example 25 step 3.

LC-MS (Method A): Rt 2.18 min; MS m/z 378.3=[M+H]+ (100% @ 215 nm)

1H NMR (500 MHz, Methanol-d4) δ 8.53-8.42 (m, 1H), 8.04 (d, J=1.2 Hz, 1H), 7.73 (dd, J=8.5, 1.6 Hz, 1H), 7.57 (d, J=8.5 Hz, 1H), 7.16 (t, J=7.9 Hz, 1H), 6.80 (d, J=7.7 Hz, 1H), 6.78-6.74 (m, 1H), 6.70 (dd, J=8.1, 2.0 Hz, 1H), 4.21 (s, 2H), 3.26 (t, J=6.4 Hz, 2H), 1.94-1.79 (m, 3H), 1.79-1.69 (m, 2H), 1.69-1.61 (m, 2H), 1.61-1.44 (m, 4H), 1.35-1.25 (m, 2H).

Example 26

2-(5-Chloro-2-hydroxy-phenyl)-N-[2-(2,2-dimethylpropyl)-1H-benzimidazol-5-yl]acetamide

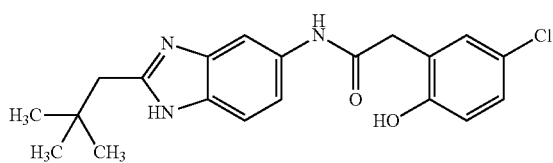 [SMILES: CC(C)(C)Cc1nc2cc(NC(=O)Cc3cc(Cl)ccc3O)ccc2[nH]1]

Step 1: N-(4-Amino-3-nitro-phenyl)-2-(5-chloro-2-methoxy-phenyl)acetamide

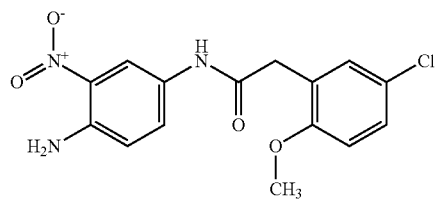 [SMILES: COc1ccc(Cl)cc1CC(=O)Nc1ccc(N)c([N+](=O)[O-])c1]

To a solution of 2-(5-chloro-2-methoxy-phenyl)acetic acid (2.88 g, 14.37 mmol) in DMF (65 mL) was added DIPEA (2.74 mL, 15.67 mmol) and HATU (5.96 g, 15.67 mmol) followed by 2-nitrobenzene-1,4-diamine (2 g, 13.06 mmol) and the mixture stirred at room temperature overnight. The resulting mixture was concentrated in vacuo and the residue dissolved in EtOAc and washed with water (30 mL). A precipitate formed which was filtered from the biphasic mixture and the layers were separated. The organic portion was washed with brine, dried over Na2SO4 and concentrated in vacuo. Purification of the crude material by chromatography on silica eluting with 10-70% EtOAc in heptanes afforded the title compound as a yellow powder.

LC-MS (Method B): Rt 1.10 min; MS m/z 336.0/338.0=[M+H]+ (100% @ 215 nm)

1H NMR (500 MHz, Chloroform-d) δ 7.93 (d, J=1.8 Hz, 1H), 7.71 (d, J=9.0 Hz, 1H), 7.46 (br. s, 1H), 7.29-7.26 (m, 2H), 6.89 (d, J=8.4 Hz, 1H), 6.77 (d, J=9.0 Hz, 1H), 5.97 (s, 2H), 3.92 (s, 3H), 3.65 (s, 2H).

Step 2: 2-(5-Chloro-2-methoxy-phenyl)-N-(3,4-diaminophenyl)acetamide

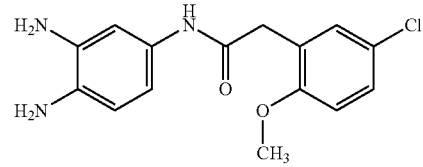 [SMILES: COc1ccc(Cl)cc1CC(=O)Nc1ccc(N)c(N)c1]

To a cooled (0° C.) solution of N-(4-amino-3-nitro-phenyl)-2-(5-chloro-2-methoxy-phenyl)acetamide (step 1) (100%, 200 mg, 0.6 mmol) in MeOH (4.5 mL)/acetic acid (1.5 mL) at was added zinc (195 mg, 2.98 mmol) and the mixture was allowed to warm to room temperature, stirring for 45 mins. The resulting mixture was filtered through Celite®, rinsing through with MeOH. The filtrate was concentrated in vacuo and the crude residue was dissolved in EtOAc and washed with sat. NaHCO3 solution. The organic portion was separated, washed with water, brine, dried over Na2SO4 and concentrated in vacuo to afford the title compound as a red/brown solid.

LC-MS (Method B): Rt 0.91 min; MS m/z 306.0/308.0=[M+H]+ (98% @ 215 nm)

1H NMR (500 MHz, Chloroform-d) δ 7.33 (br. s, 1H), 7.28 (d, J=2.6 Hz, 1H), 7.24 (dd, J=8.7, 2.6 Hz, 1H), 7.07 (d, J=2.3 Hz, 1H), 6.85 (d, J=8.7 Hz, 1H), 6.59 (d, J=8.2 Hz, 1H), 6.52 (dd, J=8.2, 2.3 Hz, 1H), 3.88 (s, 3H), 3.62 (s, 2H).

Step 3: 2-(5-Chloro-2-methoxy-phenyl)-N-[2-(2,2-dimethylpropyl)-1H-benzimidazol-5-yl]acetamide

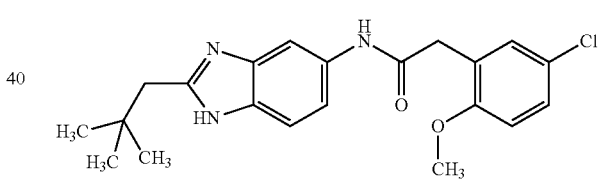

To a solution of 3,3-dimethylbutanoic acid (66 μL, 0.52 mmol) in DMF (2.5 mL) was added TEA (0.09 mL, 0.52 mmol) and HATU (198 mg, 0.52 mmol) followed by 2-(5-chloro-2-methoxy-phenyl)-N-(3,4-diaminophenyl)acetamide (step 2) (98%, 140 mg, 0.43 mmol) and the mixture stirred at room temperature for 2 h. The resulting mixture was diluted with EtOAc and washed with 1M aqueous HCl. The organic portion was separated, washed with brine, dried over Na2SO4 and concentrated in vacuo. The crude residue was dissolved in acetic acid (2.5 mL) and heated at 60° C. for 2 h followed by heating at 80° C. for 4 h. After standing at room temperature for 3 days, the mixture was concentrated in vacuo and the residue dissolved in EtOAc and washed sequentially with sat. NaHCO3 solution and brine. The organic portion was separated, dried over Na2SO4 and concentrated in vacuo. The crude residue was absorbed onto silica and purified by chromatography eluting with 50-100% EtOAc in heptanes followed by preparative HPLC (acidic pH, standard elution method) to afford the title compound as a colourless solid.

LC-MS (Method B): Rt 1.04 min; MS m/z 386.1/388.1=[M+H]+ (98% @ 215 nm)

1H NMR (500 MHz, Chloroform-d) δ 7.84-7.80 (m, 1H), 7.42-7.37 (m, 1H), 7.24-7.22 (m, 1H), 7.20-7.16 (m, 1H), 6.98-6.92 (m, 1H), 6.83-6.78 (m, 1H), 3.84-3.80 (m, 3H), 3.63-3.60 (m, 2H), 2.67-2.63 (m, 2H), 0.96-0.93 (m, 9H).

Step 4: 2-(5-Chloro-2-hydroxy-phenyl)-N-[2-(2,2-dimethylpropyl)-1H-benzimidazol-5-yl]acetamide To a cooled (0° C.) solution of 2-(5-chloro-2-methoxy-phenyl)-N-[2-(2,2-dimethylpropyl)-1H-benzimidazol-5-yl] acetamide (step 3) (98%, 14 mg, 0.04 mmol) in DCM (1 mL) was added 1M BBr₃ in DCM (54 µL, 0.05 mmol) and the mixture allowed to warm to room temperature and stirred overnight. The reaction was quenched by addition of sat. NaHCO₃ solution (5 drops) and the resulting mixture was concentrated by removing the DCM under a stream of nitrogen. The residue was dissolved in EtOAc (3 mL) and washed with sat.
NaHCO₃ solution (1 mL). The organic layer was separated and dried over Na₂SO₄. The solution was filtered and concentrated under a stream of nitrogen and dried in a vacuum oven to afford the title compound as a colourless glass.
LC-MS (Method A): Rt 1.95 min; MS m/z 372.2/374.3=[M+H]+ (100% @ 215 nm)
1H NMR (500 MHz, Methanol-d4) δ 7.92 (d, J=1.4 Hz, 1H), 7.44 (d, J=8.6 Hz, 1H), 7.24-7.20 (m, 2H), 7.09 (dd, J=8.6, 2.6 Hz, 1H), 6.80 (d, J=8.6 Hz, 1H), 3.69 (s, 2H), 2.73 (s, 2H), 1.03 (s, 9H).

Example 27

N-(2-tert-Butyl-1H-benzimidazol-5-yl)-2-(5-chloro-2-hydroxy-phenyl)acetamide

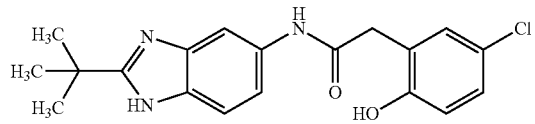 [SMILES: CC(C)(C)c1nc2cc(NC(=O)Cc3cc(Cl)ccc3O)ccc2[nH]1]

Step 1: 2-tert-Butyl-5-nitro-1H-benzimidazole

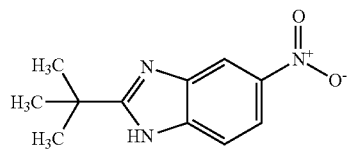 [SMILES: CC(C)(C)c1nc2cc([N+](=O)[O-])ccc2[nH]1]

To a solution of 4-nitrobenzene-1,2-diamine (200 mg, 1.31 mmol), 2,2-dimethylpropanoic acid (160 mg, 1.57 mmol) and DIPEA (274 µL, 1.57 mmol) in DMF (7 mL) was added HATU (546 mg, 1.44 mmol) and the mixture stirred at room temperature for 1 h. Another 1 equivalence of 2,2-dimethylpropanoic acid, DIPEA and HATU were added and stirring continued overnight. The reaction mixture was diluted with EtOAc and washed water (10 mL) and brine (10 mL). The organic extracts were dried over Na₂SO₄ and concentrated in vacuo. The crude residue was dissolved in acetic acid (7 mL) and heated at 60° C. for 2 h and then at 70° C. for a further 2 h. After cooling to room temperature, the reaction mixture was left stirring for 3 days. The acetic acid was removed in vacuo and the residue dissolved in EtOAc then washed with sat. NaHCO₃ solution. The organic portion was separated, washed with brine, dried over Na₂SO₄ and concentrated in vacuo. Purification of the crude material by chromatography on silica eluting with 30-100% EtOAc in heptanes afforded the title compound.
LC-MS (Method B): Rt 0.87 min; MS m/z 220.0=[M+H]+ (100% @ 215 nm)
1H NMR (500 MHz, DMSO-d6) δ 12.80 (br. s, 1H), 8.38 (br. s, 1H), 8.07 (dd, J=8.8, 2.2 Hz, 1H), 7.65 (d, J=8.5 Hz, 1H), 1.43 (s, 9H).

Step 2: 2-tert-Butyl-1H-benzimidazol-5-amine

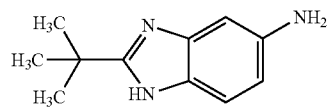

To a solution of 2-tert-butyl-5-nitro-1H-benzimidazole (step 1) (70 mg, 0.32 mmol) in EtOH (4 mL) under an N₂ atmosphere was added Pd/C (10%, 15 mg, 0.14 mmol). The nitrogen atmosphere was exchanged for a hydrogen atmosphere and the mixture stirred at room temperature overnight. The resulting mixture was filtered through Celite® and washed through with MeOH. The filtrate was concentrated in vacuo to afford the title compound as pale pink glass.
1H NMR (500 MHz, Methanol-d4) δ 7.28 (d, J=6.9 Hz, 1H), 6.87 (s, 1H), 6.69 (dd, J=8.5, 2.0 Hz, 1H), 1.43 (s, 9H).

Step 3: N-(2-tert-Butyl-1H-benzimidazol-5-yl)-2-(5-chloro-2-methoxy-phenyl)acetamide

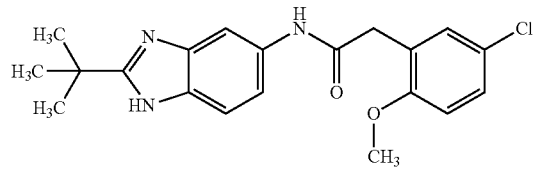 [SMILES: COc1ccc(Cl)cc1CC(=O)Nc1ccc2[nH]c(C(C)(C)C)nc2c1]

To a solution of 2-(5-chloro-2-methoxy-phenyl)acetic acid (70 mg, 0.35 mmol) in DMF (1 mL) was added DIPEA (0.06 mL, 0.35 mmol) and HATU (133.08 mg, 0.35 mmol) followed by a solution of 2-tert-butyl-1H-benzimidazol-5-amine (step 2) (80%, 69 mg, 0.29 mmol) in DMF (0.5 mL) and the mixture stirred at room temperature for 2 h. The resulting mixture was diluted with EtOAc and washed with water (5 mL) and brine (5 mL). The organics were separated, dried over Na₂SO₄ and concentrated in vacuo. Purification of the crude material by chromatography on silica eluting with 50-100% EtOAc in heptanes afforded the title compound as a colourless powder.
LC-MS (Method B): Rt 1.04 min; MS m/z 372.0/374.1=[M+H]+ (88% @ 215 nm)
1H NMR (500 MHz, DMSO-d₆) δ 11.94 (br. s, 1H), 10.06-9.92 (m, 1H), 7.98-7.73 (m, 1H), 7.47-7.38 (m, 1H), 7.31-7.28 (m, 2H), 7.19-7.10 (m, 1H), 7.01 (d, J=8.4 Hz, 1H), 3.77 (s, 3H), 3.67-3.61 (m, 2H), 1.38 (s, 9H).

Step 4: N-(2-tert-Butyl-1H-benzimidazol-5-yl)-2-(5-chloro-2-hydroxy-phenyl)acetamide To a cooled (0° C.) solution of N-(2-tert-butyl-1H-benzimidazol-5-yl)-2-(5-chloro-2-methoxy-phenyl)acetamide (step 3) (88%, 103 mg, 0.25 mmol) in DCM (1 mL) was added 1M $BBr_3$ in DCM (0.39 mL, 0.39 mmol). The mixture was allowed to warm to room temperature and stirred overnight. The reaction was quenched by dropwise addition of sat. $NaHCO_3$ solution (5 mL). The resulting mixture was diluted with EtOAc and washed with sat. $NaHCO_3$ solution. The organic portion was separated, washed with brine, dried over $Na_2SO_4$ and concentrated in vacuo to give a pale pink powder. The powder was triturated with MeCN/water (1:1.1 mL) and filtered. The filter cake was washed with ether and dried in a vacuum oven to afford the title compound as colourless powder.

LC-MS (Method A): Rt 1.76 min; MS m/z 358.2/360.2=[M+H]+ (99% @ 215 nm)

1H NMR (500 MHz, Methanol-d4) δ 7.93 (br. s, 1H), 7.44 (br. s, 1H), 7.33-7.12 (m, 2H), 7.09 (dd, J=8.6, 2.6 Hz, 1H), 6.80 (d, J=8.6 Hz, 1H), 3.71-3.65 m, 2H), 1.45 (s, 9H).

Example 28

N-(Cycloheptylmethyl)-2-(1-methylcyclobutyl)-3H-benzimidazole-5-carboxamide

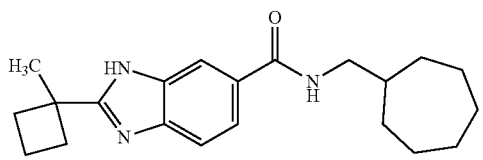 [SMILES: CC1(c2nc3ccc(C(=O)NCC4CCCCCC4)cc3[nH]2)CCC1]

Step 1:
3,4-Diamino-N-(cycloheptylmethyl)benzamide

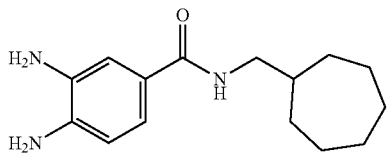 [SMILES: Nc1ccc(C(=O)NCC2CCCCCC2)cc1N]

A solution of cycloheptylmethanamine (209 mg, 1.64 mmol), 3,4-diaminobenzoic acid (250 mg, 1.64 mmol), DCC (373 mg, 1.81 mmol) and DMAP (221 mg, 1.81 mmol) in DCM (30 mL) was stirred at room temperature for 18 h. The resulting mixture was concentrated in vacuo and the crude material was purified by chromatography on silica eluting with 10-100% EtOAc in heptanes. The resulting yellow solid was partitioned between EtOAc (30 mL) and water (30 mL). The organic layer was washed with water (2×30 mL), brine (30 mL), dried over $Na_2SO_4$ and concentrated in vacuo to afford the title compound as a pale yellow solid.

LC-MS (Method B): Rt 0.95 min; MS m/z 262.1=[M+H]+ (96% @ 215 nm)

1H NMR (500 MHz, DMSO-$d_6$) δ 7.85 (t, J=5.8 Hz, 1H), 7.06 (d, J=1.4 Hz, 1H), 6.98 (dd, J=8.0, 1.4 Hz, 1H), 6.49 (d, J=8.1 Hz, 1H), 4.93 (br. s, 4H), 3.01 (t, J=6.3 Hz, 2H), 1.72-1.60 (m, 5H), 1.57-1.44 (m, 4H), 1.41-1.30 (m, 2H), 1.16-1.06 (m, 2H).

Step 2: N-(Cycloheptylmethyl)-2-(1-methylcyclobutyl)-3H-benzimidazole-5-carboxamide A mixture of 1-methylcyclobutanecarboxylic acid (26 mg, 0.23 mmol), HATU (87 mg, 0.23 mmol) and TEA (67 μL, 0.38 mmol) in DMF (2 mL) was stirred at room temperature for 1 hour and then treated with 3,4-diamino-N-(cycloheptylmethyl)benzamide (step 1) (50 mg, 0.19 mmol) in DMF (1 mL) and the mixture was stirred for 18 h. The resulting mixture was diluted with EtOAc (10 mL) and washed with saturated aqueous sodium hydrogen carbonate (2×10 mL). The organic layer was dried over $Na_2SO_4$, filtered and concentrated in vacuo. The resulting residue was dissolved into acetic acid (2 mL) and stirred at 60° C. for 3 h. The mixture was diluted with EtOAc (20 ml) and washed with saturated aqueous sodium hydrogen carbonate (3×20 mL). The organic layer was separated, dried over $Na_2SO_4$ and concentrated in vacuo. Purification of the crude material by chromatography on silica eluting with 0-100% EtOAc in heptanes followed by 0-100% MeOH in EtOAc afforded the title compound as a colourless solid.

LC-MS (Method A): Rt 2.17 min; MS m/z 340.3=[M+H]+ (99% @ 215 nm)

1H NMR (500 MHz, DMSO-d6) δ 12.41-12.22 (m, 1H), 8.48-8.25 (m, 1H), 8.20-7.88 (m, 1H), 7.72-7.61 (m, 1H), 7.60-7.40 (m, 1H), 3.12 (t, J=6.3 Hz, 2H), 2.67-2.59 (m, 2H), 2.14-2.00 (m, 3H), 1.97-1.86 (m, 1H), 1.83-1.69 (m, 3H), 1.69-1.62 (m, 2H), 1.60 (s, 3H), 1.58-1.52 (m, 2H), 1.52-1.45 (m, 2H), 1.45-1.34 (m, 2H), 1.23-1.12 (m, 2H).

Example 29

2-[[2-Fluoro-5-hydroxy-4-(2-hydroxy-1,1-dimethyl-ethyl)phenyl]methyl]-N-[[1-(trifluoromethyl)cyclopropyl]methyl]-1H-benzimidazole-5-carboxamide

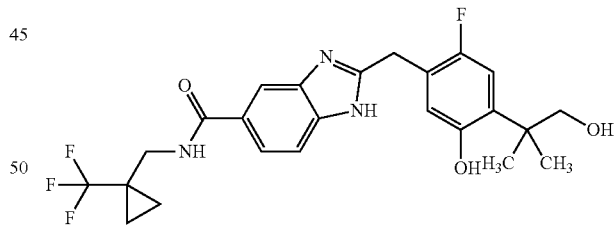

Step 1: 3,4-Diamino-N-[[1-(trifluoromethyl)cyclopropyl]methyl]benzamide

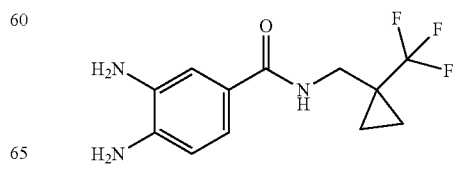

A solution of 3,4-diaminobenzoic acid (150 mg, 0.99 mmol), [1-(trifluoromethyl)cyclopropyl]methanamine hydrochloride (173 mg, 0.99 mmol), EDCl (208 mg, 1.08 mmol) and DMAP (132 mg, 1.08 mmol) in DCM (10 mL) was stirred at room temperature. DIPEA (344 µL, 1.97 mmol) was added and the reaction mixture was stirred under an inert atmosphere for 3 days. The resulting mixture was diluted with DCM (20 mL), washed with water (2×20 mL), dried over $Na_2SO_4$ and concentrated in vacuo. Purification of the crude material by chromatography on silica eluting with 0-100% MeOH in EtOAc afforded the title compound as a tan residue.

1H NMR (500 MHz, DMSO-d6) δ 7.96 (t, J=6.2 Hz, 1H), 7.02 (d, J=2.0 Hz, 1H), 6.95 (dd, J=8.1, 2.0 Hz, 1H), 6.48 (d, J=8.1 Hz, 1H), 4.96 (s, 2H), 4.55 (s, 2H), 3.54 (d, J=6.2 Hz, 2H), 0.92-0.81 (m, 4H).

Step 2: 2-[(5-Fluoro-3,3-dimethyl-2-oxo-benzo-furan-6-yl)methyl]-N-[[1-(trifluoromethyl) cyclopropyl]methyl]-1H-benzimidazole-5-carboxamide

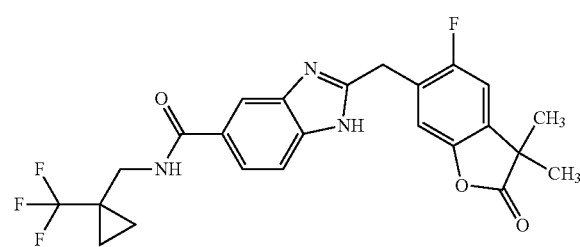 [SMILES: CC1(C)C(=O)Oc2cc(Cc3nc4cc(C(=O)NCC5(C(F)(F)F)CC5)ccc4[nH]3)c(F)cc21]

The title compound was prepared from 3,4-diamino-N-[[1-(trifluoromethyl)cyclopropyl]methyl]benzamide (step 1) and 2-(5-fluoro-3,3-dimethyl-2-oxo-benzofuran-6-yl)acetic acid (Intermediate B) analogously to Example 25 step 1.

LC-MS (Method D): Rt 0.80 min; MS m/z 476.2=[M+H]+ (53% @ 215 nm)

Step 3: 2-[[2-Fluoro-5-hydroxy-4-(2-hydroxy-1,1-dimethyl-ethyl)phenyl]methyl]-N-[[1-(trifluoromethyl)cyclopropyl]methyl]-1H-benzimidazole-5-carboxamide 2-[(5-Fluoro-3,3-dimethyl-2-oxo-benzofuran-6-yl)methyl]-N-[[1-(trifluoromethyl)cyclo propyl]methyl]-1H-benzimidazole-5-carboxamide (step 2) (53%, 146 mg, 0.16 mmol) was dissolved in THF (500 µL) and treated with LiBH4 (4M in THF) (154 µL, 0.61 mmol) and the reaction mixture was stirred for 18 h. Additional THF (1 mL) and LiBH4 (4M in THF) (154 µL, 0.61 mmol) were added and the mixture was stirred for a further 2 h. A drop of MeOH was added and stirring continued for a further 2 hours. The resulting mixture was purified by C18 reverse phase chromatography eluting with 5-100% MeCN in water. The product fractions were combined, concentrated in vacuo and further purified by chromatography on silica eluting with 0-100% EtOAc in heptanes followed by 0-100% MeOH in EtOAc. The product fractions were combined, concentrated in vacuo and further purified by preparative HPLC (acidic pH, standard elution method). The product factions were combined and concentrated in vacuo to remove the majority of the organics. The aqueous portion was treated with $NaHCO_3$ (sat aq) (7.5 mL) and EtOAc (20 mL) and the organic layer was separated, dried over $Na_2SO_4$, filtered and concentrated in vacuo to afford the title compound.

LC-MS (Method A): Rt 2.13 min; MS m/z 480.3=[M+H]+ (100% @ 215 nm)

1H NMR (500 MHz, DMSO-d6) δ 9.46 (s, 1H), 8.67 (s, 1H), 8.09 (s, 1H), 7.81 (d, J=8.7 Hz, 1H), 7.67 (d, J=8.2 Hz, 1H), 6.95 (d, J=12.2 Hz, 1H), 6.67 (d, J=6.9 Hz, 1H), 4.27 (s, 2H), 3.62 (d, J=6.1 Hz, 2H), 3.59 (s, 2H), 1.24 (s, 6H), 0.99-0.94 (m, 2H), 0.94-0.89 (m, 2H).

Example 29.1

2-[[2-Fluoro-5-hydroxy-4-(2-hydroxy-1,1-dimethyl-ethyl)phenyl]methyl]-N-(3,3,3-trifluoropropyl)-1H-benzimidazole-5-carboxamide

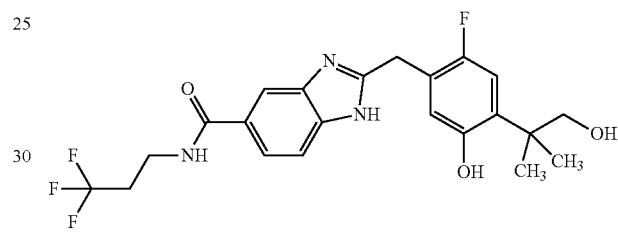

Step 1:
3,4-Diamino-N-(3,3,3-trifluoropropyl)benzamide

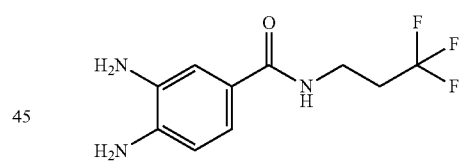

3,3,3-Trifluoropropan-1-amine hydrochloride (108 mg, 0.72 mmol) and 3,4-diaminobenzoic acid (100 mg, 0.66 mmol) were suspended in 1,4-dioxane (2 mL) and treated with DIPEA (241 µL, 1.38 mmol), TBTU (211 mg, 0.66 mmol) and DCM (0.5 mL). The reaction mixture was stirred for 1 h and then concentrated in vacuo. The residue was purified by chromatography on silica eluting with a gradient of 0 to 100% EtOAc in heptanes followed by a gradient of 0 to 100% MeOH in EtOAc to afford the title compound as a purple residue.

LC-MS (Method C): Rt 1.16 min; MS m/z 248.3=[M+H]+ (41% @ 215 nm)

1H NMR (500 MHz, DMSO-d6) δ 8.05 (t, J=5.6 Hz, 1H), 7.02 (d, J=2.0 Hz, 1H), 6.92 (dd, J=8.1, 2.0 Hz, 1H), 6.46 (d, J=8.1 Hz, 1H), 4.95 (s, 2H), 4.54 (s, 2H), 3.42-3.35 (m, 2H), 2.65-2.57 (m, 2H).

Step 2: 2-[(5-Fluoro-3,3-dimethyl-2-oxo-benzofuran-6-yl)methyl]-N-(3,3,3-trifluoropropyl)-1H-benzimidazole-5-carboxamide

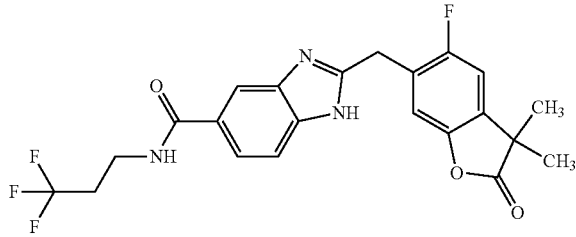 [SMILES: CC1(C)C(=O)Oc2cc(Cc3nc4cc(C(=O)NCCC(F)(F)F)ccc4[nH]3)c(F)cc21]

The title compound was prepared from 3,4-diamino-N-(3,3,3-trifluoropropyl)benzamide (step 1) and 2-(5-fluoro-3,3-dimethyl-2-oxo-benzofuran-6-yl)acetic acid (Intermediate B) analogously to Example 25 step 1.

LC-MS (Method D): Rt 0.75 min; MS m/z 450.2=[M+H]+ (54% @ 215 nm)

Step 3: 2-[[2-Fluoro-5-hydroxy-4-(2-hydroxy-1,1-dimethyl-ethyl)phenyl]methyl]-N-(3,3,3-trifluoropropyl)-1H-benzimidazole-5-carboxamide The title compound was prepared from 2-[(5-fluoro-3,3-dimethyl-2-oxo-benzofuran-6-yl)methyl]-N-(3,3,3-trifluoropropyl)-1H-benzimidazole-5-carboxamide (step 2) and 4M LiBH₄ analogously to Example 29 step 3.

LC-MS (Method A): Rt 1.90 min; MS m/z 454.3=[M+H]+ (95% @ 215 nm)

1H NMR (500 MHz, DMSO-d6) δ 12.58 (br. s, 1H), 9.34 (br. s, 1H), 8.60 (t, J=5.1 Hz, 1H), 8.01 (s, 1H), 7.66 (d, J=8.2 Hz, 1H), 7.51 (s, 1H), 6.91 (d, J=12.1 Hz, 1H), 6.62 (d, J=7.0 Hz, 1H), 4.73 (br. s, 1H), 4.10 (s, 2H), 3.58 (s, 2H), 3.51 (q, J=6.9 Hz, 2H), 2.63-2.51 (m, 2H), 1.24 (s, 6H).

Example 30

N-[[2-Fluoro-5-hydroxy-4-(2-hydroxy-1,1-dimethyl-ethyl)phenyl]methyl]-2-[1-(trifluoromethyl)cyclopropyl]-1H-benzimidazole-5-carboxamide

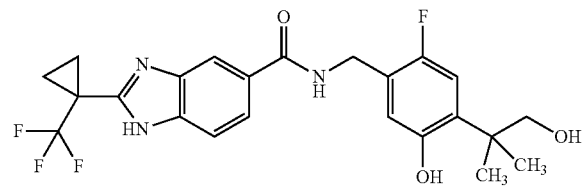 [SMILES: CC(C)(CO)c1cc(F)c(CNC(=O)c2ccc3[nH]c(C4(C(F)(F)F)CC4)nc3c2)cc1O]

Step 1: Methyl 2-[1-(trifluoromethyl)cyclopropyl]-1H-benzimidazole-5-carboxylate

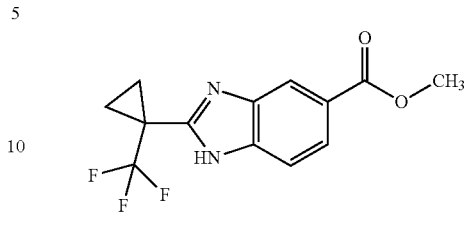

To a stirred solution of 1-(trifluoromethyl)cyclopropanecarboxylic acid (371 mg, 2.41 mmol), methyl 3,4-diaminobenzoate (400 mg, 2.41 mmol) and DIPEA (0.47 mL, 2.66 mmol) in DMF (8 mL) was added HATU (915 mg, 2.41 mmol) and the mixture was stirred at room temperature for 3 h. The resulting mixture was concentrated in vacuo and the residue was partitioned between sat. NaHCO₃ (25 mL) and EtOAc (25 mL). The organic layer was separated, washed with brine (2×25 mL), dried over Na₂SO₄ and concentrated in vacuo. The resulting crude was dissolved in acetic acid (8 mL) and stirred at 80° C. for 1 h. The reaction mixture was concentrated in vacuo and the residue was partitioned between sat. NaHCO₃ (25 mL) and EtOAc (25 mL). The organic layer was washed with brine (25 mL), dried over Na₂SO₄ and concentrated in vacuo. Purification by chromatography on silica eluting with a gradient of 0-100% EtOAc in heptanes afforded the title compound as a brown viscous oil.

LC-MS (Method B): Rt 1.04 min; MS m/z 285.1=[M+H]+ (93% @ 215 nm)
1H NMR (500 MHz, DMSO-d6) δ 12.93 (br. s, 1H), 8.15 (s, 1H), 7.84 (d, J=8.4 Hz, 1H), 7.68-7.54 (m, 1H), 3.86 (s, 3H), 1.60-1.53 (s, 4H).

Step 2: 2-[1-(Trifluoromethyl)cyclopropyl]-1H-benzimidazole-5-carboxylic acid

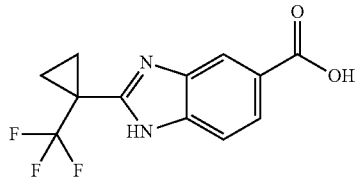 [SMILES: O=C(O)c1ccc2[nH]c(C3(C(F)(F)F)CC3)nc2c1]

A solution of methyl 2-[1-(trifluoromethyl)cyclopropyl]-1H-benzimidazole-5-carboxylate (step 1) (93%, 630 mg, 2.06 mmol) in THF (3 mL) and MeOH (3 mL) was treated with 1M lithium hydroxide hydrate (3.09 mL, 6.18 mmol) and stirred at room temperature for 1.5 h. Additional 1M lithium hydroxide hydrate (3.09 mL, 6.18 mmol) was added and the mixture stirred overnight. Solid lithium hydroxide hydrate (260 mg, 6.18 mmol) was added and stirring continued for 5 h. The resulting mixture was diluted in EtOAc (15 mL) and H₂O (15 mL). The pH was adjusted to 4 using 2M KHSO₄, the layers separated and the aqueous layer was extracted with EtOAc (15 mL). The combined organic extracts were dried over Na₂SO₄ and concentrated in vacuo to afford the title compound as a beige sticky/gummy solid.

LC-MS (Method B): Rt 0.89 min; MS m/z 270.9=[M+H]+ (98% @ 215 nm)

1H NMR (500 MHz, DMSO-d6) δ 12.95-12.83 (m, 1H), 12.72 (br. s, 1H), 8.24-8.00 (m, 1H), 7.88-7.76 (m, 1H), 7.69-7.51 (m, 1H), 1.59-1.52 (m, 4H). NMR purity 80%

Step 3: N-[(2-Fluoro-5-methoxy-phenyl)methyl]-2-[1-(trifluoromethyl)cyclopropyl]-1H-benzimidazole-5-carboxamide

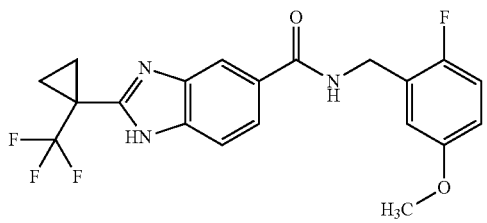 [SMILES: COc1ccc(F)c(CNC(=O)c2ccc3[nH]c(C4(C(F)(F)F)CC4)nc3c2)c1]

To a stirred solution of HATU (507 mg, 1.33 mmol), 2-[1-(trifluoromethyl)cyclopropyl]-1H-benzimidazole-5-carboxylic acid (step 2) (80%, 450 mg, 1.33 mmol) and (2-fluoro-5-methoxy-phenyl)methanamine (207 mg, 1.33 mmol) in DMF (5 mL) was added DIPEA (256 µL, 1.47 mmol) and the mixture was stirred at room temperature for 1 h and allowed to stand overnight. The resulting mixture was diluted with sat. NaHCO₃ (10 mL) and EtOAc (10 mL). The organic layer was separated, washed with brine (2×10 mL), dried over Na₂SO₄ then concentrated in vacuo. Purification by chromatography on silica eluting with 0-100% EtOAc in heptanes afforded the title compound as a viscous brown oil.

LC-MS (Method D): Rt 0.80 min; MS m/z 408.2=[M+H]+ (82% @ 215 nm)

1H NMR (500 MHz, Methanol-d4) δ 8.12 (br. s, 1H), 7.83-7.78 (m, 1H), 7.66-7.58 (m, 1H), 7.01 (t, J=9.3 Hz, 1H), 6.95 (dd, J=6.0, 3.2 Hz, 1H), 6.82 (dt, J=8.9, 3.6 Hz, 1H), 4.62 (s, 2H), 3.75 (s, 3H), 1.60-1.56 (m, 2H), 1.55-1.51 (m, 2H). NMR purity 69%

Step 4: N-[(4-Bromo-2-fluoro-5-methoxy-phenyl) methyl]-2-[1-(trifluoromethyl)cyclopropyl]-1H-benzimidazole-5-carboxamide

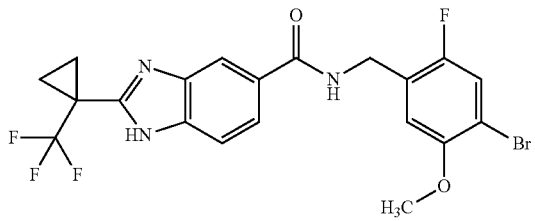 [SMILES: COc1cc(CNC(=O)c2ccc3[nH]c(C4(C(F)(F)F)CC4)nc3c2)c(F)cc1Br]

Bromine (122 µL, 2.13 mmol, 2.4 eq.) was added to a solution of N-[(2-fluoro-5-methoxy-phenyl)methyl]-2-[1-(trifluoromethyl)cyclopropyl]-1H-benzimidazole-5-carboxamide (step 3) (69%, 524 mg, 0.89 mmol) in anhydrous MeCN (10 mL) and the mixture was stirred at room temperature overnight. The reaction was carefully quenched with 10% aq. sodium sulfite (10 mL) and then diluted with sat. aq. NaHCO₃ (10 mL) and EtOAc (10 mL). The organic layer was separated and the aqueous layer was further extracted with EtOAc (10 mL). The combined organic extracts were dried over Na₂SO₄ and concentrated in vacuo. Purification of the crude material by chromatography on silica eluting with a gradient of 0-75% EtOAc in heptanes followed by C18 reverse phase chromatography eluting with 10-100% MeCN in water with 0.1% formic acid modifier afforded the title compound as a yellow viscous oil.

LC-MS (Method D): Rt 0.89 min; MS m/z 486.1/488.1= [M+H]+ (84% @ 215 nm)

1H NMR (500 MHz, Methanol-d4) δ 8.12 (s, 1H), 7.80 (dd, J=8.5, 1.5 Hz, 1H), 7.62 (d, J=8.5 Hz, 1H), 7.35 (d, J=9.1 Hz, 1H), 7.10 (d, J=6.5 Hz, 1H), 4.61 (s, 2H), 3.83 (s, 3H), 1.61-1.56 (m, 2H), 1.55-1.50 (m, 2H).

Step 5: N-[(4-Bromo-2-fluoro-5-methoxy-phenyl) methyl]-2-[1-(trifluoromethyl)cyclopropyl]-1-(2-trimethylsilylethoxymethyl)benzimidazole-5-carboxamide

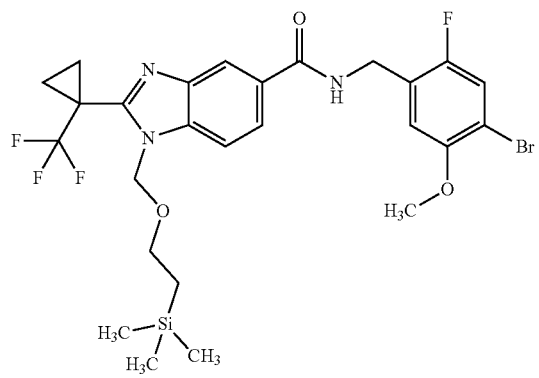 [SMILES: COc1cc(CNC(=O)c2ccc3c(c2)nc(C2(C(F)(F)F)CC2)n3COCC[Si](C)(C)C)c(F)cc1Br]

The title compound was prepared from N-[(4-bromo-2-fluoro-5-methoxy-phenyl)methyl]-2-[1-(trifluoromethyl)cyclopropyl]-1H-benzimidazole-5-carboxamide (step 4) and 2-(chloromethoxy)ethyl-trimethyl-silane analogously to Example 9 step 3.

LC-MS (Method D): Rt 1.21 min; MS m/z 616.2/618.2= [M+H]+ (86% @ 215 nm)

1H NMR (500 MHz, Methanol-d4) δ 8.29-8.20 (m, 1H), 7.95-7.84 (m, 1H), 7.78-7.72 (m, 1H), 7.37-6.98 (m, 2H), 5.97-5.78 (m, 2H), 4.65-4.60 (m, 2H), 3.85-3.59 (m, 5H), 1.69-1.64 (m, 3H), 1.58-1.53 (m, 2H), 0.97-0.84 (m, 2H), 0.02--0.09 (m, 9H) [2:1 Mixture of regioisomers which were not separated and used in the next step as a mixture]

Step 6: Methyl 2-[5-fluoro-2-methoxy-4-[[[2-[1-(trifluoromethyl)cyclopropyl]-1-(2-trimethylsilylethoxymethyl)benzimidazole-5-carbonyl]amino] methyl]phenyl]-2-methyl-propanoate

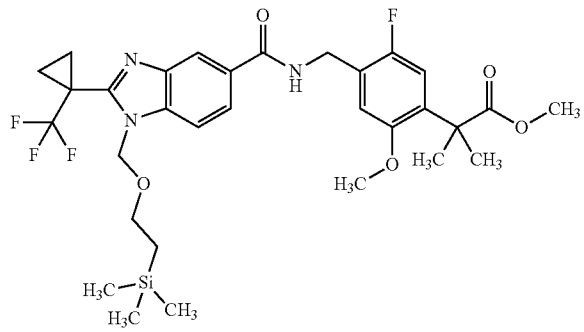 [SMILES: COC(=O)C(C)(C)c1cc(F)c(CNC(=O)c2ccc3c(c2)nc(C2(C(F)(F)F)CC2)n3COCC[Si](C)(C)C)cc1OC]

The title compound was prepared from N-[(4-bromo-2-fluoro-5-methoxy-phenyl)methyl]-2-[1-(trifluoromethyl)cyclopropyl]-1-(2-trimethylsilylethoxymethyl)benzimidazole-5-carboxamide (step 5) and (1-methoxy-2-methyl-prop-1-enoxy)-trimethyl-silane analogously to Intermediate B step 4.

LC-MS (Method E): Rt 1.80 min; MS m/z 638.4=[M+H]+ (87% @ 215 nm)

1H NMR (500 MHz, Methanol-d4) δ 8.24-8.21 (m, 1H), 7.94-7.84 (m, 1H), 7.78-7.72 (m, 1H), 7.09-7.05 (m, 1H), 7.02-6.99 (m, 1H), 5.82-5.77 (m, 2H), 4.66-4.62 (m, 2H), 3.73 (s, 3H), 3.72-3.69 (m, 2H), 3.60 (s, 3H), 1.69-1.65 (m, 2H), 1.58-1.54 (m, 2H), 1.46 (s, 6H), 0.96-0.92 (m, 2H), −0.02−−0.06 (m, 9H).

Step 7: N-[(5-fluoro-3,3-dimethyl-2-oxo-benzofuran-6-yl)methyl]-2-[1-(trifluoromethyl) cyclopropyl]-1H-benzimidazole-5-carboxamide

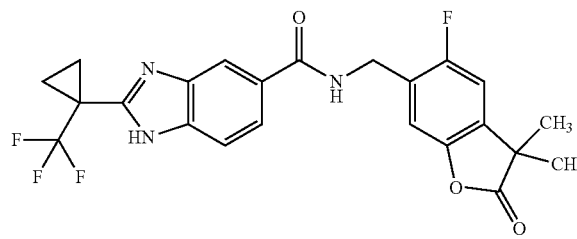 [SMILES: CC1(C)C(=O)Oc2cc(CNC(=O)c3ccc4[nH]c(C5(C(F)(F)F)CC5)nc4c3)c(F)cc21]

BBr₃ (299 μL, 0.3 mmol) was added to a cooled (0° C.), stirred solution of methyl 2-[5-fluoro-2-methoxy-4-[[[2-[1-(trifluoromethyl)cyclopropyl]-1-(2-trimethylsilylethoxymethyl) benzimidazole-5-carbonyl]amino]methyl]phenyl]-2-methyl-propanoate (step 6) (87%, 73 mg, 0.1 mmol) in DCM (300 μL) under N₂ and the mixture was allowed to warm to room temperature and stirred overnight. The resulting mixture was concentrated in vacuo (at 30° C.). The residue was quenched and azeotroped with MeCN:H₂O (1:1). Purification by C18 reverse phase chromatography eluting with 10-100% MeCN in water with 0.1% formic acid modifier afforded the title compound as an orange viscous oil.

LC-MS (Method D): Rt 0.86 min; MS m/z 462.2=[M+H]+ (73% @ 215 nm)

Step 8: N-[[2-Fluoro-5-hydroxy-4-(2-hydroxy-1,1-dimethyl-ethyl)phenyl]methyl]-2-[1-(trifluoromethyl)cyclopropyl]-1H-benzimidazole-5-carboxamide The title compound was prepared from N-[(5-fluoro-3,3-dimethyl-2-oxo-benzofuran-6-yl)methyl]-2-[1-(trifluoromethyl)cyclopropyl]-1H-benzimidazole-5-carboxamide (step 7) analogously to Example 29 step 3.

LC-MS (Method A): Rt 2.50 min; MS m/z 466.1=[M+H]+ (96% @ 215 nm)

1H NMR (500 MHz, Methanol-d4) δ 8.15 (br. s, 1H), 7.83 (dd, J=8.5, 1.5 Hz, 1H), 7.64 (d, J=7.8 Hz, 1H), 6.96 (d, J=12.3 Hz, 1H), 6.80 (d, J=6.8 Hz, 1H), 4.69-4.53 (m, 3H), 3.80 (s, 2H), 1.62-1.57 (m, 2H), 1.57-1.52 (m, 2H), 1.35 (s, 6H).

Example 31

2-[[2-Fluoro-5-hydroxy-4-(1-hydroxy-1-methyl-ethyl)phenyl]methyl]-N-(3,3,3-trifluoropropyl)-1H-benzimidazole-5-carboxamide

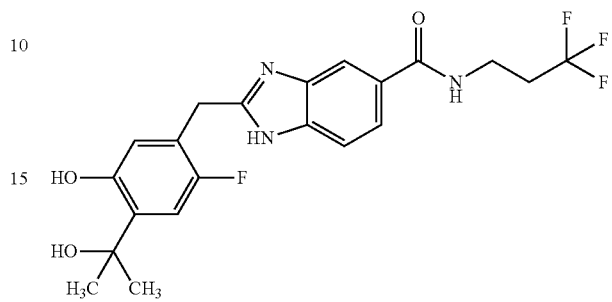

Step 1: Methyl 2-[[5-benzyloxy-2-fluoro-4-(1-hydroxy-1-methyl-ethyl)phenyl]methyl]-1H-benzimidazole-5-carboxylate

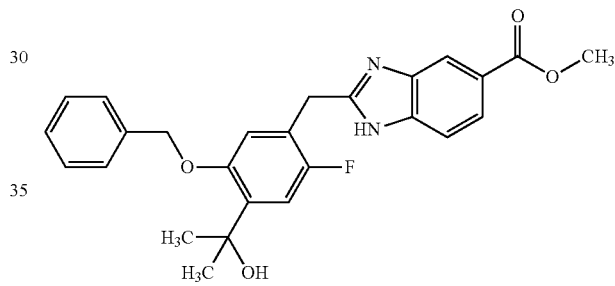

The title compound was prepared from 2-[5-benzyloxy-2-fluoro-4-(1-hydroxy-1-methyl-ethyl)phenyl]acetic acid (Intermediate A) and methyl 3,4-diaminobenzoate analogously to Example 22 step 1.

LC-MS (Method C): Rt 1.63 min; MS m/z 449.3=[M+H]+ (86% @ 215 nm)

Step 2: 2-[[5-Benzyloxy-2-fluoro-4-(1-hydroxy-1-methyl-ethyl)phenyl]methyl]-1H-benzimidazole-5-carboxylic acid

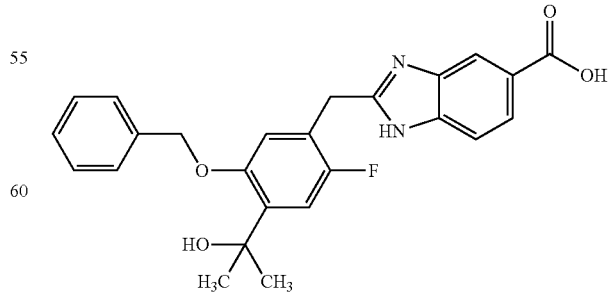

To a solution of methyl 2-[[5-benzyloxy-2-fluoro-4-(1-hydroxy-1-methyl-ethyl)phenyl]methyl]-1H-benzimidazole-5-carboxylate (step 1) (86%, 415 mg, 0.79 mmol) in THF (1.2 mL) was added 2M LiOH (1.2 mL, 2.4 mmol) and the resulting mixture was stirred vigorously at room temperature for 6 h. Additional 2M LiOH (0.6 mL, 1.2 mmol) was added and the mixture was heated to 50° C. for 1 h and then left standing at room temperature for 3 days. The volatile solvents were removed in vacuo (at 30° C.) and the pH of the resulting aqueous mixture was adjusted to 4 by dropwise addition of sat. aq. NH$_4$Cl and 1M HCl. The mixture was extracted with EtOAc (3×25 mL) and the combined organic extracts were dried over Na$_2$SO$_4$ and concentrated in vacuo to afford the title compound as a brown viscous oil.

LC-MS (Method C): Rt 1.12 min; MS m/z 435.3=[M+H]+ (97% @ 215 nm)

1H NMR (500 MHz, Methanol-d4) δ 8.31-8.29 (m, 1H), 8.09 (dd, J=8.6, 1.5 Hz, 1H), 7.69-7.66 (m, 1H), 7.41 (d, J=11.5 Hz, 1H), 7.39-7.35 (m, 2H), 7.31-7.23 (m, 3H), 7.02 (d, J=6.2 Hz, 1H), 5.12 (s, 2H), 4.42 (s, 2H), 1.57 (s, 6H).

Step 3: 2-[[5-Benzyloxy-2-fluoro-4-(1-hydroxy-1-methyl-ethyl)phenyl]methyl]-N-(3,3,3-trifluoropropyl)-1H-benzimidazole-5-carboxamide

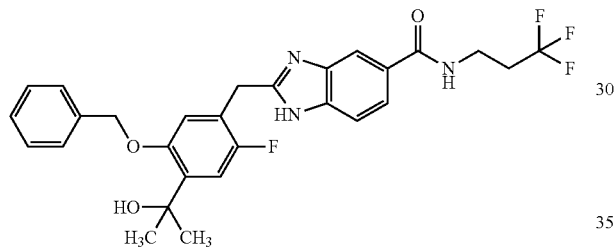

To a stirred solution of HATU (91 mg, 0.24 mmol), 2-[[5-benzyloxy-2-fluoro-4-(1-hydroxy-1-methyl-ethyl)phenyl]methyl]-1H-benzimidazole-5-carboxylic acid (step 2) (83%, 114 mg, 0.22 mmol) and 3,3,3-trifluoropropan-1-amine hydrochloride (72 mg, 0.48 mmol) in DMF (1.5 mL) was added DIPEA (133 µL, 0.76 mmol) and the reaction mixture was stirred at room temperature for 2 h. The resulting mixture was diluted with sat. NaHCO$_3$ (4 mL) and EtOAc (4 mL). The organic layer was separated, washed with brine (2×4 mL), dried over Na$_2$SO$_4$ and concentrated in vacuo. Purification by chromatography on NH-silica eluting with 0-100% EtOAc in heptanes afforded the title compound as a yellow viscous oil.

LC-MS (Method C): Rt 1.60 min; MS m/z 530.5=[M+H]+ (98% @ 215 nm)

1H NMR (400 MHz, Methanol-d4) δ 8.03 (br. s, 1H), 7.73 (dd, J=8.4, 1.4 Hz, 1H), 7.60-7.50 (m, 1H), 7.37-7.30 (m, 3H), 7.28-7.20 (m, 3H), 6.94 (d, J=6.3 Hz, 1H), 5.07 (s, 2H), 4.25 (s, 2H), 3.66 (t, J=7.0 Hz, 2H), 2.55 (qt, J=11.0, 7.0 Hz, 2H), 1.56 (s, 6H).

Contains 25% w/w EtOAc by NMR.

Step 4: 2-[[2-Fluoro-5-hydroxy-4-(1-hydroxy-1-methyl-ethyl)phenyl]methyl]-N-(3,3,3-trifluoropropyl)-1H-benzimidazole-5-carboxamide To a solution of 2-[[5-benzyloxy-2-fluoro-4-(1-hydroxy-1-methyl-ethyl)phenyl]methyl]-N-(3,3,3-trifluoropropyl)-1H-benzimidazole-5-carboxamide (step 3) (73%, 107 mg, 0.15 mmol) in EtOH (2 mL) was added 10% Pd/C [50% in H$_2$O] (5%, 31 mg, 0.015 mmol). The reaction was placed under a H$_2$ atmosphere and stirred for 2 h. The resulting mixture was filtered through a pad of Celite®, rinsing through with EtOH (10 mL). The filtrate was concentrated in vacuo and purified by chromatography on C18-silica eluting with 10-100% MeCN (0.2% ammonium hydroxide) in H$_2$O (0.2% ammonium hydroxide). The product fractions were combined, the pH adjusted to 7 using 1M HCl and then extracted with EtOAc (×2). The organic layers were combined, dried over Na$_2$SO$_4$ and concentrated in vacuo to afford the title compound as a beige solid.

LC-MS (Method A): Rt 1.78 min; MS m/z 440.2=[M+H]+ (98% @ 215 nm)

1H NMR (500 MHz, Methanol-d4) δ 8.03 (br. s, 1H), 7.73-7.67 (m, 1H), 7.61-7.48 (m, 1H), 7.03 (d, J=11.2 Hz, 1H), 6.66 (d, J=6.6 Hz, 1H), 4.21 (s, 2H), 3.64 (t, J=7.1 Hz, 2H), 2.59-2.49 (m, 2H), 1.56 (s, 6H).

Example 31.1

2-[[2-Fluoro-5-hydroxy-4-(1-hydroxy-1-methyl-ethyl)phenyl]methyl]-N-[1-(trifluoromethyl)cyclopropyl]-1H-benzimidazole-5-carboxamide

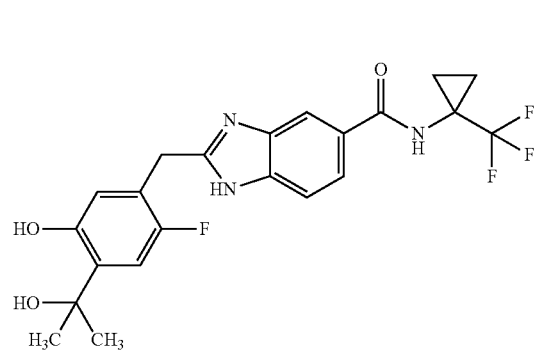 [SMILES: CC(C)(O)c1cc(F)c(Cc2nc3cc(C(=O)NC4(C(F)(F)F)CC4)ccc3[nH]2)cc1O]

Step 1: 2-[[5-Benzyloxy-2-fluoro-4-(1-hydroxy-1-methyl-ethyl)phenyl]methyl]-N-[1-(trifluoromethyl)cyclopropyl]-1H-benzimidazole-5-carboxamide

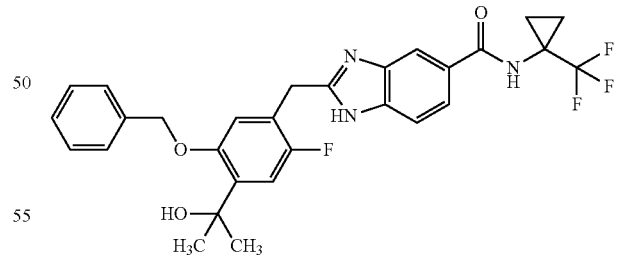

The title compound was prepared from 2-[[5-benzyloxy-2-fluoro-4-(1-hydroxy-1-methyl-ethyl)phenyl]methyl]-1H-benzimidazole-5-carboxylic acid (Example 31 step 2) and 1-(trifluoromethyl)cyclopropanamine hydrochloride analogously to Example 31 step 3.

LC-MS (Method C): Rt 1.61 min; MS m/z 542.4=[M+H]+ (100% @ 215 nm)

1H NMR (400 MHz, Methanol-d4) δ 8.04 (br. s, 1H), 7.77-7.70 (m, 1H), 7.61-7.49 (m, 1H), 7.38-7.30 (m, 3H), 7.29-7.19 (m, 3H), 6.95 (d, J=6.3 Hz, 1H), 5.07 (s, 2H), 4.25 (s, 2H), 1.56 (s, 6H), 1.41-1.36 (m, 2H), 1.27-1.20 (m, 2H).

Step 2: 2-[[2-Fluoro-5-hydroxy-4-(1-hydroxy-1-methyl-ethyl)phenyl]methyl]-N-[1-(trifluoromethyl) cyclopropyl]-1H-benzimidazole-5-carboxamide The title compound was prepared from 2-[[5-benzyloxy-2-fluoro-4-(1-hydroxy-1-methyl-ethyl)phenyl]methyl]-N-[1-(trifluoromethyl)cyclopropyl]-1H-benzimidazole-5-carboxamide (step 1) analogously to Example 31 step 4.

LC-MS (Method A): Rt 1.86 min; MS m/z 452.2=[M+H]+ (98% @ 215 nm)

1H NMR (500 MHz, Methanol-d4) δ 8.04 (br. s, 1H), 7.74-7.69 (m, 1H), 7.61-7.49 (m, 1H), 7.03 (d, J=11.2 Hz, 1H), 6.66 (d, J=6.6 Hz, 1H), 4.20 (s, 2H), 1.56 (s, 6H), 1.40-1.36 (m, 2H), 1.24-1.20 (m, 2H).

Example 32

2-[[5-Fluoro-2-hydroxy-3-(2-hydroxy-1,1-dimethyl-ethyl)phenyl]methyl]-N-[[1-(trifluoromethyl)cyclopropyl]methyl]-1H-benzimidazole-5-carboxamide

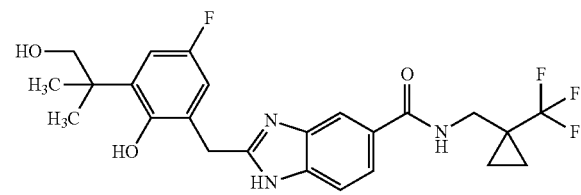 [SMILES: CC(C)(CO)c1cc(F)cc(Cc2nc3cc(C(=O)NCC4(C(F)(F)F)CC4)ccc3[nH]2)c1O]

Step 1: Methyl 2-[5-fluoro-2-methoxy-3-[[5-[[1-(trifluoromethyl)cyclopropyl]methylcarbamoyl]-1H-benzimidazol-2-yl]methyl]phenyl]-2-methyl-propanoate

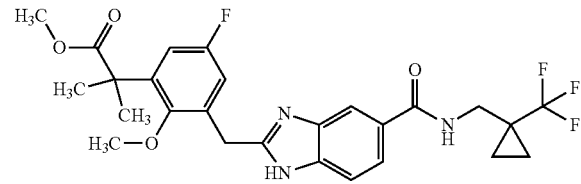 [SMILES: COC(=O)C(C)(C)c1cc(F)cc(Cc2nc3cc(C(=O)NCC4(C(F)(F)F)CC4)ccc3[nH]2)c1OC]

To a solution of 2-[5-fluoro-2-methoxy-3-(2-methoxy-1,1-dimethyl-2-oxo-ethyl)phenyl]acetic acid (Intermediate C) (88%, 156 mg, 0.48 mmol) in DMF (5 mL) was added HATU (230 mg, 0.6 mmol) followed by DIPEA (0.21 mL, 1.21 mmol). After stirring for 5 min, [2-amino-4-[[1-(trifluoromethyl)cyclopropyl]methylcarbamoyl]phenyl]ammonium formate (formate salt of Example 29 step 1) (88%, 175 mg, 0.48 mmol) was added and the reaction mixture was stirred under an inert atmosphere, at room temperature for 4 h. The resulting mixture was diluted with EtOAc (40 mL) and washed with water (2×25 mL), brine (25 mL), dried over Na2SO4 and concentrated in vacuo. The crude material was dissolved in acetic acid (5 mL) and stirred at 80° C. for 2 h. The resulting mixture concentrated in vacuo and the residue was partitioned between EtOAc (25 mL) and NaHCO3 (25 mL). The layers were separated and the aqueous portion was back extracted with EtOAc (25 mL). The combined organic extracts were dried over Na2SO4 and concentrated in vacuo. Purification of the crude material by C18 reverse phase chromatography eluting with a gradient of 10-100% MeCN (+0.1% formic acid) in H2O (+0.1% formic acid) afforded the title compound as a light yellow solid LC-MS (Method B): Rt 1.09 min; MS m/z 522.3=[M+H]+ (100% @ 215 nm)

1H NMR (400 MHz, Methanol-d4) δ 8.57 (t, J=6.0 Hz, 1H), 8.11 (br. s, 1H), 8.04-8.00 (m, 1H), 7.71 (dd, J=8.5, 1.4 Hz, 1H), 7.56 (d, J=8.5 Hz, 1H), 7.07 (dd, J=9.8, 3.1 Hz, 1H), 6.91-6.85 (m, 1H), 4.35-4.29 (m, 2H), 3.73-3.68 (m, 5H), 3.57 (s, 3H), 1.50 (s, 6H), 1.05-0.89 (m, 4H). NH protons partially exchanged.

Step 2: 2-[(5-Fluoro-3,3-dimethyl-2-oxo-benzofuran-7-yl)methyl]-N-[[1-(trifluoromethyl) cyclopropyl]methyl]-1H-benzimidazole-5-carboxamide

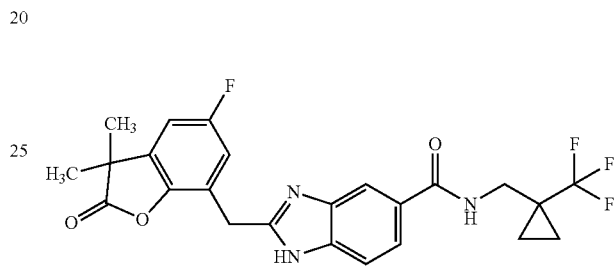

To a solution of methyl 2-[5-fluoro-2-methoxy-3-[[5-[[1-(trifluoromethyl) cyclopropyl]methylcarbamoyl]-1H-benzimidazol-2-yl]methyl]phenyl]-2-methyl-propanoate (step 1) (100%, 78 mg, 0.15 mmol) in DCM (2.5 mL) under an inert atmosphere was added 1M BBr3 in DCM (0.45 mL, 0.45 mmol) resulting in the formation of a gum. The gum was scratched to a solid, sonicated for 5 min and stirring continued at room temperature for 2 h. A further portion of 1M BBr3 in DCM (0.45 mL, 0.45 mmol) was added, the resulting solid scratched and sonicated and the mixture was stirred at room temperature for 2 h. The mixture was concentrated in vacuo, the residue taken up in MeCN:H2O and stirred for 1 h. Purification of the mixture by C18 reverse phase chromatography eluting with a gradient of 10-100% MeCN (+0.1% formic acid) in H2O (+0.1% formic acid) afforded the title compound as a colourless oil.

LC-MS (Method D): Rt 0.91 min; MS m/z 476.2=[M+H]+ (99% @ 215 nm)

1H NMR (400 MHz, Methanol-d4) δ 8.09 (s, 1H), 8.02 (d, J=1.3 Hz, 1H), 7.71 (dd, J=8.5, 1.6 Hz, 1H), 7.57 (d, J=8.5 Hz, 1H), 7.11 (dd, J=7.6, 2.7 Hz, 1H), 7.03 (dd, J=9.8, 2.6 Hz, 1H), 4.35 (s, 2H), 3.70 (s, 2H), 1.49 (s, 6H), 1.03-0.92 (m, 4H).

Step 3: 2-[[5-Fluoro-2-hydroxy-3-(2-hydroxy-1,1-dimethyl-ethyl)phenyl]methyl]-N-[[1-(trifluoromethyl)cyclopropyl]methyl]-1H-benzimidazole-5-carboxamide The title compound was prepared from 2-[(5-fluoro-3,3-dimethyl-2-oxo-benzofuran-7-yl)methyl]-N-[[1-(trifluoromethyl)cyclopropyl]methyl]-1H-benzimidazole-5-carboxamide (step 2) and 4M LiBH4 in THF analogously to Example 29 step 3.

LC-MS (Method A): Rt 2.25 min; MS m/z 480.3=[M+H]+ (95% @ 215 nm)

1H NMR (500 MHz, Methanol-d4) δ 8.31 (s, 1H), 8.00 (d, J=1.2 Hz, 1H), 7.68 (dd, J=8.5, 1.7 Hz, 1H), 7.55 (d, J=8.4 Hz, 1H), 6.92 (dd, J=11.1, 3.1 Hz, 1H), 6.81 (dd, J=8.2, 3.1 Hz, 1H), 4.25-4.20 (m, 2H), 3.73-3.67 (m, 4H), 1.36 (s, 6H), 1.02-0.93 (m, 4H). Singlet at 8.31 partially exchanging with D.

Example 33

2-[(4-tert-Butyl-2-fluoro-5-hydroxy-phenyl)methyl]-N-[1-(trifluoromethyl)cyclopropyl] imidazo[1,2-a]pyridine-7-carboxamide

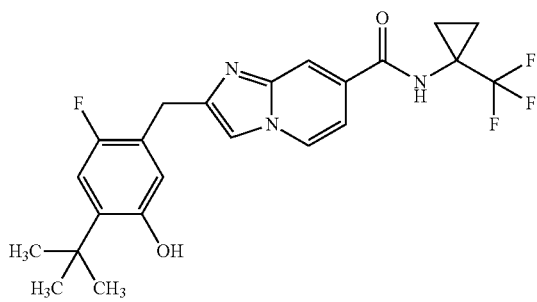 [SMILES: CC(C)(C)c1cc(F)c(Cc2cn3ccc(C(=O)NC4(C(F)(F)F)CC4)cc3n2)cc1O]

Step 1: 1-Bromo-3-(4-tert-butyl-2-fluoro-5-methoxy-phenyl)propan-2-one

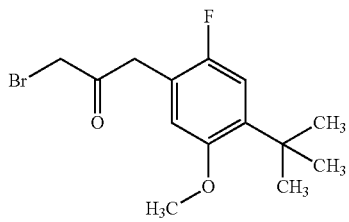 [SMILES: COc1cc(CC(=O)CBr)c(F)cc1C(C)(C)C]

2 drops of DMF were added to a solution of 2-(4-tert-butyl-2-fluoro-5-methoxy-phenyl)acetic acid (Example 21 step 1) (300 mg, 1.25 mmol) in DCM (10 mL) followed by thionyl chloride (453 μL, 6.24 mmol) and the reaction mixture was stirred at room temperature for 1 h. The resulting mixture was concentrated in vacuo, azeotroped with dry MeCN and the residue was dissolved in dry MeCN (20 mL). The mixture was cooled to 0° C., treated dropwise with 2M trimethylsilyl diazomethane in ether (0.94 mL, 1.87 mmol) and the resulting mixture was allowed to warm to room temperature, stirring for 2 h. The mixture was re-cooled to 0° C., treated dropwise with a solution of HBr in acetic acid (33%, 1.08 mL, 6.24 mmol) and stirred whilst warming to room temperature for 1 h. The reaction was diluted with acetic acid (5 mL), water (80 mL) and EtOAc (80 mL). The organics were separated and washed further with water (2×40 mL) and brine (40 mL). The combined aqueous layers were back-extracted with EtOAc and the combined organic extracts were dried over Na₂SO₄ and concentrated in vacuo. The crude material was purified by chromatography on silica eluting with 0-100% EtOAc in heptanes to afford the title compound as a yellow oil.

LC-MS (Method D): Rt 1.11 min (59% @ 215 nm)
1H NMR (500 MHz, DMSO-d6) δ 6.97-6.93 (m, 1H), 6.87-6.84 (m, 1H), 4.48 (s, 2H), 3.95 (s, 2H), 3.77 (s, 3H), 1.31 (s, 9H).

Step 2: Methyl 2-[(4-tert-butyl-2-fluoro-5-methoxy-phenyl)methyl]imidazo[1,2-a]pyridine-7-carboxylate

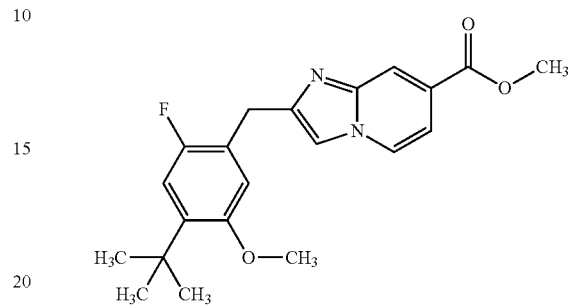

To a solution of 1-bromo-3-(4-tert-butyl-2-fluoro-5-methoxy-phenyl)propan-2-one (step 1) (59%, 272 mg, 0.51 mmol) and methyl 2-aminopyridine-4-carboxylate (140 mg, 0.92 mmol) in DCE (10 mL) was added potassium iodide (92 mg, 0.55 mmol) and the mixture was stirred in a pressure tube at 100° C. for 4 h. The resulting mixture was cooled to room temperature, diluted with DCM (40 mL) and washed with water (2×25 mL). The organic portion was dried over Na₂SO₄ and concentrated in vacuo. Purification of the crude material by chromatography on silica eluting with 0-100% EtOAc in heptanes afforded the title compound as a brown oil.

LCMS (Method G): Rt 0.72 min; MS m/z 371.3=[M+H]+ (92% @ 215 nm)
1H NMR (500 MHz, DMSO-d6) δ 8.56 (dd, J=7.1, 0.9 Hz, 1H), 8.07-8.04 (m, 1H), 7.84 (s, 1H), 7.28 (dd, J=7.1, 1.7 Hz, 1H), 7.01 (d, J=6.8 Hz, 1H), 6.96 (d, J=11.8 Hz, 1H), 4.07 (s, 2H), 3.88 (s, 3H), 3.76 (s, 3H), 1.30 (s, 9H).

Step 3: 2-[(4-tert-Butyl-2-fluoro-5-methoxy-phenyl)methyl]imidazo[1,2-a]pyridine-7-carboxylic acid

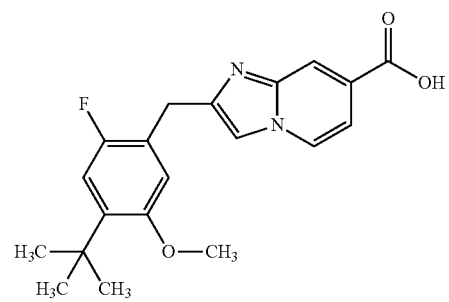 [SMILES: COc1cc(Cc2cn3ccc(C(=O)O)cc3n2)c(F)cc1C(C)(C)C]

To a solution of methyl 2-[(4-tert-butyl-2-fluoro-5-methoxy-phenyl)methyl]imidazo[1,2-a]pyridine-7-carboxylate (step 2) (92%, 100 mg, 0.25 mmol) in THF (5 mL) was added 2M lithium hydroxide (0.37 mL, 0.75 mmol) and the reaction mixture was stirred at 40° C. for 1 h and then at 50° C. for 4 h. After cooling to room temperature, the organics were removed in vacuo and the resulting solid dissolved in water (10 mL). The solution was acidified to pH 4-5 using aqueous 2M HCl (approx. 1 mL) and the resulting precipitate was extracted into EtOAc (3×10 mL). The combined organic extracts were washed with brine (10 mL), dried over Na₂SO₄ and concentrated in vacuo to afford the title compound as a light brown solid.

LCMS (Method G): Rt 0.44 mins; MS m/z 357.3=[M+H]+ (95% @ 215 nm)

1H NMR (500 MHz, DMSO-d6) δ 13.31 (br. s, 1H), 8.52 (dd, J=7.0, 0.8 Hz, 1H), 8.01 (s, 1H), 7.81 (s, 1H), 7.25 (dd, J=7.1, 1.7 Hz, 1H), 7.00 (d, J=6.8 Hz, 1H), 6.96 (d, J=11.8 Hz, 1H), 4.06 (s, 2H), 3.76 (s, 3H), 1.30 (s, 9H).

Step 4: 2-[(4-tert-Butyl-2-fluoro-5-methoxy-phenyl) methyl]-N-[1-(trifluoromethyl) cyclopropyl]imidazo [1,2-a]pyridine-7-carboxamide

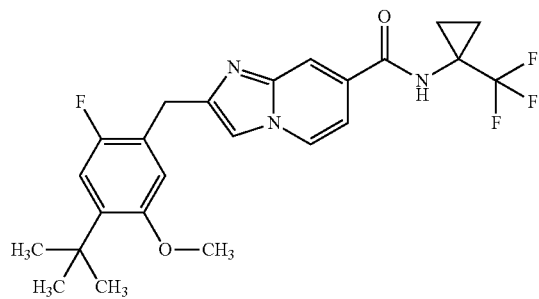 [SMILES: COc1cc(Cc2cn3ccc(C(=O)NC4(C(F)(F)F)CC4)cc3n2)c(F)cc1C(C)(C)C]

To a solution of 2-[(4-tert-butyl-2-fluoro-5-methoxy-phenyl)methyl]imidazo[1,2-a]pyridine-7-carboxylic acid (step 3) (87%, 100 mg, 0.24 mmol) in DMF (5 mL) was added HATU (139 mg, 0.37 mmol) followed by 1-(trifluoromethyl) cyclopropanamine; hydrochloride (59 mg, 0.37 mmol) and DIPEA (0.11 mL, 0.61 mmol) and the mixture was stirred under an inert atmosphere at room temperature for 2 h. A further portion of 1-(trifluoromethyl)cyclopropanamine; hydrochloride (59 mg, 0.37 mmol) and DIPEA (0.11 mL, 0.61 mmol) was added and the mixture was heated at 40° C. for 2 h. The resulting mixture was diluted with EtOAc (25 mL) and washed with water (2×25 mL), brine (25 mL), dried over Na₂SO₄ and concentrated in vacuo. Purification by chromatography on silica eluting with 0 to 100% EtOAc in heptanes afforded the title compound as a light brown solid.

LC-MS (Method C): Rt 1.90 min; MS m/z 464.3=[M+H]+ (95% @ 215 nm)

1H NMR (500 MHz, DMSO-d6) δ 9.28 (s, 1H), 8.51 (dd, J=7.1, 0.8 Hz, 1H), 8.04 (s, 1H), 7.74 (s, 1H), 7.24 (dd, J=7.1, 1.8 Hz, 1H), 7.00 (d, J=6.8 Hz, 1H), 6.96 (d, J=11.8 Hz, 1H), 4.05 (s, 2H), 3.75 (s, 3H), 1.36-1.32 (m, 2H), 1.30 (s, 9H), 1.20-1.14 (m, 2H).

Step 5: 2-[(4-tert-Butyl-2-fluoro-5-hydroxy-phenyl) methyl]-N-[1-(trifluoromethyl) cyclopropyl]imidazo [1,2-a]pyridine-7-carboxamide To a solution of 2-[(4-tert-butyl-2-fluoro-5-methoxy-phenyl)methyl]-N-[1-(trifluoromethyl)cyclopropyl]imidazo[1, 2-a]pyridine-7-carboxamide (step 4) (95%, 70 mg, 0.14 mmol) in DCM (2 mL) was added 1M BBr₃ in DCM (430 µL, 0.43 mmol) and the reaction mixture was stirred at room temperature for 3 h. The resulting mixture was concentrated in vacuo and the crude material was dissolved in EtOAc (15 mL). The organic mixture was washed with sat. aq. NaHCO₃ (10 mL), water (10 mL), dried over Na₂SO₄ and concentrated in vacuo. The crude product was purified by preparative HPLC (high pH, early elution method) to afford the title compound as an off-white solid.

LCMS (Method A): Rt 2.71 mins; MS m/z 450.3=[M+H]+ (97% @ 215 nm)

1H NMR (400 MHz, DMSO-d6) δ 9.28 (s, 1H), 9.18 (s, 1H), 8.53 (dd, J=7.1, 0.8 Hz, 1H), 8.05-8.01 (m, 1H), 7.77 (s, 1H), 7.25 (dd, J=7.1, 1.7 Hz, 1H), 6.87 (d, J=12.0 Hz, 1H), 6.65 (d, J=7.0 Hz, 1H), 3.96 (s, 2H), 1.36-1.28 (m, 11H), 1.20-1.15 (m, 2H).

Preparation of Intermediate Compounds

Intermediate A

2-[5-Benzyloxy-2-fluoro-4-(1-hydroxy-1-methylethyl)phenyl]acetic acid

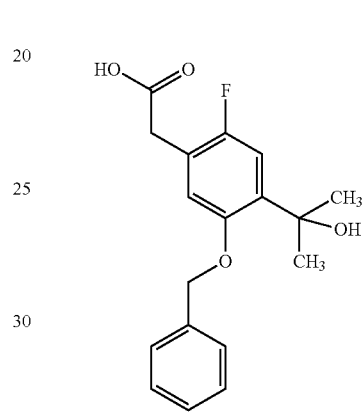

Step 1: (3-Bromo-4-fluoro-phenyl) acetate

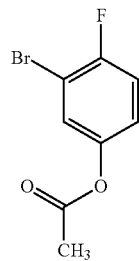

A cooled (0° C.) solution of 3-bromo-4-fluoro-phenol (5 g, 26.18 mmol) and TEA (6.86 mL, 39.27 mmol) in DCM (100 mL) was treated dropwise with acetyl chloride (2.61 mL, 36.65 mmol) and the mixture was stirred at room temperature for 45 min. The resulting mixture was diluted with DCM (100 mL) and washed sequentially with 0.5M HCl (120 mL), water (120 mL), sat. NaHCO₃ (120 mL) and brine (120 mL). The organic portion was dried over Na₂SO₄ and concentrated in vacuo to afford the title compound as a tan solid.

LC-MS (Method B): Rt 1.14 mins (85% @ 215 nm)

¹H NMR (500 MHz, DMSO-d6) δ 7.59 (dd, J=6.0, 2.8 Hz, 1H), 7.43 (t, J=8.8 Hz, 1H), 7.26-7.17 (m, 1H), 2.26 (s, 3H).

Step 2: 1-(4-Bromo-5-fluoro-2-hydroxy-phenyl)ethanone

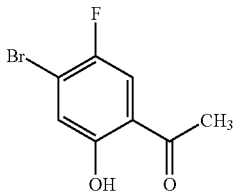

A mixture of (3-bromo-4-fluoro-phenyl) acetate (step 1) (90%, 6.3 g, 24.33 mmol) and aluminium trichloride (5.84 g, 43.8 mmol) was stirred at 165° C. for 3 hours. The melt was allowed to cool to room temperature and the resulting solid was suspended in DCM (100 mL). 2N HCl (100 mL) was added and the insoluble material was removed by filtration through Celite® (filter material). The layers were separated and the aqueous portion was re-extracted with DCM (60 mL). The combined organic extracts were washed with water (140 mL), brine (140 mL), dried over $Na_2SO_4$ and concentrated in vacuo. The crude material was purified by chromatography on silica eluting with 0-30% EtOAc in heptanes to afford the title compound as an off-white solid.

LC-MS (Method B): Rt 1.17 mins (96% @ 215 nm)

$^1$H NMR (500 MHz, DMSO-d6) δ 11.62 (s, 1H), 7.79 (d, J=9.4 Hz, 1H), 7.33 (d, J=5.8 Hz, 1H), 2.61 (s, 3H).

Step 3: 1-(2-Benzyloxy-4-bromo-5-fluoro-phenyl)ethanone

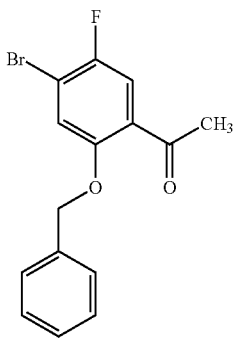 [SMILES: CC(=O)c1cc(F)c(Br)cc1OCc1ccccc1]

Benzyl bromide (3.23 mL, 27.19 mmol) was added to a stirred mixture of 1-(4-bromo-5-fluoro-2-hydroxy-phenyl) ethanone (step 2) (96%, 5.5 g, 22.66 mmol) and $K_2CO_3$ (7.83 g, 56.65 mmol) in DMF (25 mL) and the mixture was stirred at 80° C. for 1 hour. The resulting mixture was allowed to cool to room temperature and partitioned between EtOAc (150 mL) and water (150 mL). The aqueous layer was further extracted with EtOAc (100 mL). The combined organic extracts were washed with water (2×150 mL), brine (150 mL), dried over $Na_2SO_4$ and concentrated in vacuo. The crude material was purified by chromatography on silica eluting with 0-60% EtOAc in heptanes to afford the title compound as an off-white solid.

LC-MS (Method B): Rt 1.35 mins (87% @ 215 nm)

$^1$H NMR (500 MHz, DMSO-d6) δ 7.65 (d, J=5.5 Hz, 1H), 7.55-7.46 (m, 3H), 7.44-7.40 (m, 2H), 7.39-7.35 (m, 1H), 5.26 (s, 2H), 2.49 (s, 3H).

Step 4: 2-(2-Benzyloxy-4-bromo-5-fluoro-phenyl)propan-2-ol

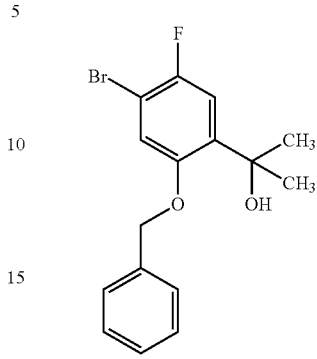

To a stirred solution of 1-(2-benzyloxy-4-bromo-5-fluoro-phenyl)ethanone (step 3) (90%, 100 mg, 0.28 mmol) in THF (1 mL) at −78° C. was added bromo(methyl)magnesium (3M in $Et_2O$) (121 µL, 0.36 mmol). The dry ice bath was removed and the mixture was stirred at room temperature for 1 hour. The resulting mixture was diluted with sat. aq. $NH_4Cl$ (10 mL) and EtOAc (10 mL). The organic layer was separated, dried over $Na_2SO_4$ and concentrated in vacuo to afford the title compound as a pale yellow solid.

LC-MS (Method B): Rt 1.31 mins; MS m/z 320.9/322.9 [M+H—$H_2O$]+(95% @ 215 nm)

$^1$H NMR (400 MHz, DMSO-d6) δ 7.57-7.27 (m, 7H), 5.23 (s, 1H), 5.14 (s, 2H), 1.45 (s, 6H).

Step 5: 2-[5-Benzyloxy-2-fluoro-4-(1-hydroxy-1-methyl-ethyl)phenyl]acetic acid To a stirred solution of potassium 3-ethoxy-3-oxo-propanoate (75 mg, 0.44 mmol) and 2-(2-benzyloxy-4-bromo-5-fluoro-phenyl)propan-2-ol (step 4) (100 mg, 0.29 mmol) in toluene (2 mL) was added DMAP (3.6 mg, 0.03 mmol). The resulting mixture was degassed with $N_2$ for 5 mins. Diallyldipalladium dichloride (2.2 mg, 0.01 mmol) and BINAP (11.0 mg, 0.02 mmol) were added and the sealed reaction mixture was stirred at 140° C. for 3.5 hours. The resulting mixture was concentrated in vacuo and the residue dissolved in THF (3 mL). The insoluble material was removed by filtration and the filtrate was diluted with MeOH (0.5 mL) and treated with 2M aq LiOH solution (0.44 mL, 0.88 mmol). The resulting mixture was stirred at room temperature for 16 hours. The mixture was diluted with 2M NaOH (10 mL) and extracted with EtOAc (3×10 mL). The organic extracts were discarded and the aqueous portion was acidified to pH 3 using 2M aq. HCl. The mixture was extracted with EtOAc (3×10 mL) and the combined organic extracts were dried over $Na_2SO_4$ and concentrated in vacuo to afford the title compound as an off-white solid.

LC-MS (Method B): Rt 1.10 mins; MS m/z 301.0 [M+H—$H_2O$]+(93% @ 215 nm)

$^1$H NMR (500 MHz, DMSO-d6) δ 12.40 (s, 1H), 7.49-7.45 (m, 2H), 7.45-7.40 (m, 2H), 7.37-7.33 (m, 1H), 7.31 (d, J=11.5 Hz, 1H), 7.05 (d, J=6.3 Hz, 1H), 5.08 (s, 1H), 5.06 (s, 2H), 3.57 (s, 2H), 1.46 (s, 6H).

Intermediate B

2-(5-Fluoro-3,3-dimethyl-2-oxo-benzofuran-6-yl)acetic acid

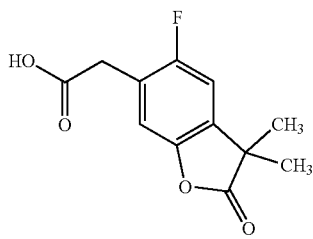 [SMILES: CC1(C)C(=O)Oc2cc(CC(=O)O)c(F)cc21]

Step 1: 2-(4-Bromo-2-fluoro-5-methoxy-phenyl)acetic acid

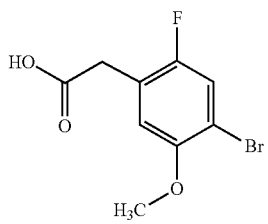

To a cooled (0° C.) solution of 2-(2-fluoro-5-methoxy-phenyl)acetic acid (45 g, 244.35 mmol) in MeCN (1200 mL) was added dropwise a solution of bromine (12.63 mL, 219.92 mmol) in MeCN (100 mL) over a period of 10 mins. The mixture was allowed to warm to room temperature gradually without removing the ice bath (~1.5 h). A second portion of bromine (4.21 mL, 73.31 mmol) in MeCN (50 mL) was added dropwise at 0° C. and stirring continued at room temperature for 3.5 h. A third portion of bromine (4.21 mL, 73.31 mmol) in MeCN (50 mL) was added at room temperature and stirring continued for 30 mins. The reaction was quenched carefully with sat. aq. sodium sulfite (~700 mL) until the bright orange colour had disappeared. The colourless solution was diluted with brine (200 mL) and EtOAc (200 mL), stirred vigorously for 10 mins and then left to stand at room temperature overnight. The organic layer was separated and the aqueous layer was further extracted with EtOAc (200 mL). The combined organic extracts were dried over $Na_2SO_4$ and concentrated in vacuo to obtain the crude as a white solid. The solid was recrystallised by dissolving in AcOH (700 mL) and treating with water (4 L). The mixture was stirred and kept at room temperature for 1 h and then at 0° C. for 3 h. The resulting solid was filtered, washed with water (200 mL) and dried at 40° C. under vacuum to afford the title compound as a fluffy white solid.

LC-MS (Method B): Rt 1.07 min; MS m/z 523.2/525.1/527.0=[2M−H]− (99% @ 215 nm)

1H NMR (500 MHz, DMSO-d6) δ 12.55 (br. s, 1H), 7.50 (d, J=8.9 Hz, 1H), 7.13 (d, J=6.6 Hz, 1H), 3.81 (s, 3H), 3.61 (d, J=1.3 Hz, 2H).

Step 2: 2-(4-Bromo-2-fluoro-5-hydroxy-phenyl)acetic acid

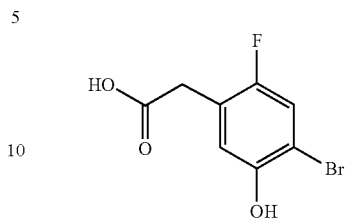

1M $BBr_3$ in DCM (112.9 mL, 112.9 mmol) was added dropwise over 1 h to a cooled (0° C.) stirred solution of 2-(4-bromo-2-fluoro-5-methoxy-phenyl)acetic acid (step 1) (99%, 10 g, 37.63 mmol) in DCM (150 mL) under $N_2$. The reaction mixture was allowed to warm to room temperature and then stirred for 1 h. The resulting mixture was concentrated in vacuo and the residue was partitioned between water (250 mL) and EtOAc (250 mL). The organic layer was washed with water (250 mL), dried over $Na_2SO_4$ and concentrated in vacuo to afford the title compound as an off-white powder.

LC-MS (Method D): Rt 0.67 min (90% @ 215 nm)

1H NMR (500 MHz, Methanol-d4) δ 7.23 (d, J=9.0 Hz, 1H), 6.84 (d, J=6.8 Hz, 1H), 3.55 (d, J=1.2 Hz, 2H).

Step 3: Benzyl 2-(5-benzyloxy-4-bromo-2-fluoro-phenyl)acetate

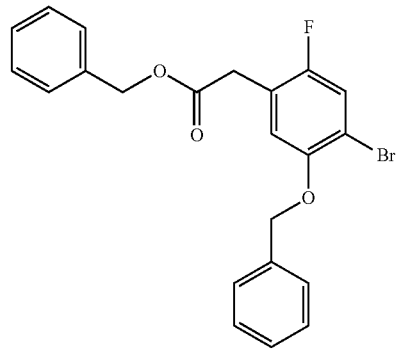 [SMILES: O=C(Cc1cc(OCc2ccccc2)c(Br)cc1F)OCc1ccccc1]

To a solution of 2-(4-bromo-2-fluoro-5-hydroxy-phenyl)acetic acid (step 2) (90%, 9.2 g, 33.25 mmol) in DMF (90 mL) was added $K_2CO_3$ (13.79 g, 99.75 mmol) and bromomethylbenzene (8.69 mL, 73.15 mmol) and the reaction mixture was stirred at room temperature overnight. The resulting mixture was diluted with EtOAc (300 mL) and water (300 mL). The aqueous layer was further extracted with EtOAc (150 mL). The combined organic extracts were washed with sat. $NaHCO_3$ (150 mL), brine (2×150 mL), dried over $Na_2SO_4$ and concentrated in vacuo. Purification by chromatography on silica eluting with 0-100% TBME in heptanes afforded the title compound as an off-white solid.

LC-MS (Method E): Rt 1.84 min (98% @ 215 nm)

1H NMR (500 MHz, DMSO-d6) δ 7.56 (d, J=8.9 Hz, 1H), 7.49-7.45 (m, 2H), 7.43-7.32 (m, 8H), 7.28 (d, J=6.6 Hz, 1H), 5.13 (s, 2H), 5.12 (s, 2H), 3.80-3.77 (m, 2H).

Step 4: Methyl 2-[2-benzyloxy-4-(2-benzyloxy-2-oxo-ethyl)-5-fluoro-phenyl]-2-methyl-propanoate

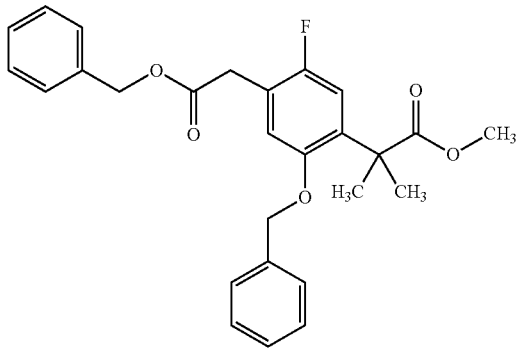 [SMILES: COC(=O)C(C)(C)c1cc(F)c(CC(=O)OCc2ccccc2)cc1OCc1ccccc1]

A solution of benzyl 2-(5-benzyloxy-4-bromo-2-fluoro-phenyl)acetate (step 3) (98%, 12.5 g, 28.54 mmol), $ZnF_2$ (2951 mg, 28.54 mmol) and $Pd(t-Bu_3P)_2$ (1.46 g, 2.85 mmol) in DMF (100 mL) was bubbled with $N_2$ for 10 mins at room temperature. (1-Methoxy-2-methyl-prop-1-enoxy)-trimethyl-silane (11.59 mL, 57.07 mmol) was added and the reaction mixture was heated to 80° C. overnight. The resulting mixture was filtered through a pad of Celite® washing through with EtOAc (3×100 mL). The filtrate was washed with brine (500 mL) and the organic layer was dried over $Na_2SO_4$ and concentrated in vacuo. Purification by chromatography on silica eluting with a gradient of 0-100% TBME in heptanes afforded the title compound as a pale yellow oil.

LC-MS (Method A): Rt 4.51 min; MS m/z 449.2=[M−H]− (81% @ 215 nm)

A sample was further purified by C18 reverse phase chromatography eluting with 10-100% MeCN in water with 0.1% formic acid, The NMR data refers to this sample 1H NMR (500 MHz, DMSO-d6) δ 7.43-7.35 (m, 5H), 7.38-7.29 (m, 5H), 7.13 (d, J=11.0 Hz, 1H), 7.11 (d, J=6.5 Hz, 1H), 5.14 (s, 2H), 5.00 (s, 2H), 3.77 (s, 2H), 3.33 (s, 3H), 1.44 (s, 6H).

Step 5: 2-(5-Fluoro-3,3-dimethyl-2-oxo-benzofuran-6-yl)acetic acid

A cooled (0° C.) solution of methyl 2-[2-benzyloxy-4-(2-benzyloxy-2-oxo-ethyl)-5-fluoro-phenyl]-2-methyl-propanoate (step 4) (70%, 10.7 g, 16.63 mmol) in DCM (250 mL) was treated with 1M $BBr_3$ in DCM (83.13 mL, 83.13 mmol). The reaction mixture was allowed to warm to room temperature and stirred overnight. The resulting mixture was poured onto ice (500 g) and stirred for a further 30 minutes. The resulting emulsion was filtered through a sintered funnel to obtain clear biphasic mixture. The organic layer was separated and the aqueous layer was extracted with EtOAc (2×200 mL). The combined organic extracts were dried over $Na_2SO_4$ and concentrated in vacuo. Purification of the crude material by C18 reverse phase chromatography eluting with 10-100% MeCN in water (0.1% formic acid modifier) afforded the title compound as an off-white solid.

LC-MS (Method F): Rt 1.31 min; MS m/z 237.2=[M−H]− (100% @ 215 nm)

1H NMR (500 MHz, DMSO-d6) δ 12.51 (br. s, 1H), 7.41 (d, J=8.9 Hz, 1H), 7.24 (d, J=5.8 Hz, 1H), 3.64 (d, J=1.4 Hz, 2H), 1.44 (s, 6H).

Intermediate C

2-[5-Fluoro-2-methoxy-3-(2-methoxy-1,1-dimethyl-2-oxo-ethyl)phenyl]acetic acid

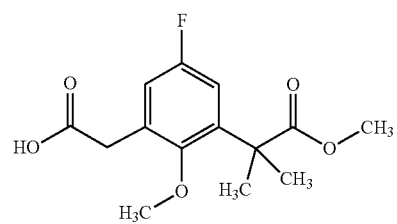 [SMILES: COC(=O)C(C)(C)c1cc(F)cc(CC(=O)O)c1OC]

Step 1: 2-(3-Bromo-5-fluoro-2-methoxy-phenyl)acetic acid

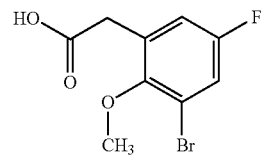

Bromine (3.74 mL, 65.16 mmol) was added to a stirred solution of 2-(5-fluoro-2-methoxy-phenyl)acetic acid (1.5 g, 8.15 mmol) in acetic acid (30 mL) and the mixture was stirred at room temperature for 1 h. The resulting mixture was cooled to 10° C. and diluted with EtOAc (100 mL). Saturated aq. sodium thiosulfate (~50 mL) was added with stirring until the deep brown colour became yellow. The mixture was diluted with water (100 mL) and the organic layer was separated. The aqueous layer was back extracted with a 3:1 chloroform:IPA mix (3×50 mL) and the combined organic extracts were washed with water (2×50 mL), dried over $Na_2SO_4$ and concentrated in vacuo. The resulting crude material was purified by chromatography on silica eluting with 0-100% EtOAc in heptanes to afford the title compound as a white solid.

LC-MS (Method D): Rt 0.91 min; MS m/z 261.0/263.0=[M−H]− (81% @ 215 nm)

1H NMR (400 MHz, DMSO-d6) δ 12.52 (br. s, 1H), 7.50 (dd, J=8.0, 3.1 Hz, 1H), 7.21 (dd, J=9.0, 3.1 Hz, 1H), 3.71 (s, 3H), 3.65 (s, 2H).

Step 2: tert-Butyl 2-(3-bromo-5-fluoro-2-methoxy-phenyl)acetate

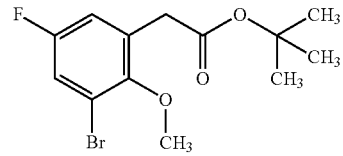

To a solution of 2-(3-bromo-5-fluoro-2-methoxy-phenyl)acetic acid (step 1) (260 mg, 0.99 mmol) in tert-butanol (5 mL) was added Boc anhydride (227 mg, 1.04 mmol) and DMAP (12 mg, 0.1 mmol) and the reaction mixture was stirred at 40° C. for 5 h. The resulting mixture was concentrated in vacuo and the residue re-dissolved in EtOAc (25 mL). The organic mixture was washed with water (25 mL), sat. NaHCO$_3$ (2×25 mL), brine (25 mL), dried over Na$_2$SO$_4$ and concentrated in vacuo. The crude material was purified by chromatography on silica eluting with 0-100% EtOAc in heptanes to afford the title compound as a colourless oil.

LC-MS (Method E): Rt 1.67 min (98% @ 215 nm)

1H NMR (500 MHz, DMSO-d6) δ 7.51 (dd, J=8.0, 3.1 Hz, 1H), 7.20 (dd, J=9.0, 3.1 Hz, 1H), 3.71 (s, 3H), 3.64 (s, 2H), 1.41 (s, 9H).

Step 3: Methyl 2-[3-(2-tert-butoxy-2-oxo-ethyl)-5-fluoro-2-methoxy-phenyl]-2-methyl-propanoate

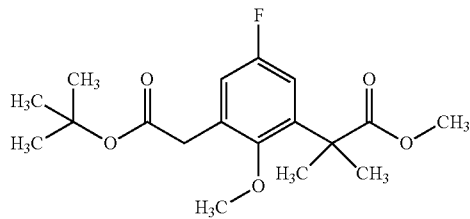 [SMILES: COC(=O)C(C)(C)c1cc(F)cc(CC(=O)OC(C)(C)C)c1OC]

The title compound was prepared from tert-butyl 2-(3-bromo-5-fluoro-2-methoxy-phenyl)acetate (step 2) and (1-methoxy-2-methyl-prop-1-enoxy)-trimethyl-silane analogously to Intermediate B step 4.

LC-MS (Method B): Rt 1.38 min; MS m/z 363.1=[M+Na]+(80% @ 215 nm)

1H NMR (400 MHz, DMSO-d6) δ 7.09 (dd, J=10.1, 3.2 Hz, 1H), 7.00 (dd, J=8.9, 3.1 Hz, 1H), 3.59-3.56 (m, 5H), 3.56 (s, 3H), 1.42 (s, 6H), 1.39 (s, 9H).

Step 4: 2-[5-Fluoro-2-methoxy-3-(2-methoxy-1,1-dimethyl-2-oxo-ethyl)phenyl]acetic acid To a solution of methyl 2-[3-(2-tert-butoxy-2-oxo-ethyl)-5-fluoro-2-methoxy-phenyl]-2-methyl-propanoate (step 3) (80%, 215 mg, 0.51 mmol) in DCM (10 mL) was added TFA (387 µL, 5.05 mmol) and the mixture was stirred at room temperature for 2 h. A further portion of TFA (387 µL, 5.05 mmol) was added and the reaction mixture was stirred at room temperature 3 days.

The resulting mixture was concentrated in vacuo and azeotroping twice with DCM afforded the title compound as a brown oil.

LC-MS (Method B): Rt 1.07 min; MS m/z 283.0=[M-H]− (88% @ 215 nm)

1H NMR (400 MHz, DMSO-d6) δ 7.11-7.05 (m, 1H), 7.02 (dd, J=8.9, 3.1 Hz, 1H), 3.60 (s, 2H), 3.58 (s, 3H), 3.57-3.55 (m, 3H), 1.42 (s, 6H).

BIOLOGICAL EXAMPLE

Automated Whole-Cell Patch Clamp Assay to Detect TMEM16A Activity in Recombinant Cells
Cell Culture and Preparation Fisher rat thyroid (FRT) cells stably expressing human TMEM16A (TMEM16Aabc variant; Dr Luis Galietta, Insituto Giannina, Italy) were cultured in T-75 flasks in Hams F-12 media with Coon's modification (Sigma) supplemented with 10% (v/v) foetal bovine serum, penicillin-streptomycin (10,000 U/mL/10000 µg/mL), G-418 (750 µg/mL), L-glutamine (2 mM) and sodium bicarbonate solution (7.5% v/v). At ~90% confluence cells were harvested for experiments by detachment with a 2:1 (v/v) mixture of Detachin (BMS Biotechnology) and 0.25% (w/v) trypsin-EDTA. Cells were diluted to a density of 3.5-4.5×10$^6$ cells/mL with media consisting of CHO-S-SFM II (Sigma), 25 mM HEPES (Sigma) and Soy bean trypsin inhibitor (Sigma).

Whole-Cell Patch Clamp Recording

FRT-TMEM16A cells were whole-cell patch clamped using an automated planar patch clamp system (Qpatch, Sophion). Briefly, once high resistance (GOhm) seals were established between the cells and the planar recording array the patch was ruptured using suction pulses to establish the whole-cell recording configuration of the patch clamp technique. The assay employed the following solutions (all reagents Sigma):

Intracellular solution (mM): N-methyl-D-glucamine 130, CaCl$_2$ 18.2, MgCl$_2$ 1, HEPES 10, EGTA 10, BAPTA 20, Mg-ATP 2, pH 7.25, 325 mOsm with sucrose.

Extracellular solution (mM): N-methyl-D-glucamine 130, CaCl$_2$ 2, MgCl$_2$ 1, HEPES 10, pH 7.3, 320 mOsm with sucrose.

The intracellular solution buffers intracellular calcium at levels required to give ~20% activation of the maximal TMEM16A mediated current (EC$_{20}$ for calcium ions). Cells were voltage clamped at a holding potential of −70 mV and a combined voltage step (to +70 mV)/ramp (−90 my to +90 mV) was applied at 0.05 Hz. After a period of current stabilisation test compounds, solubilised in 100% (v/v) DMSO and subsequently diluted into extracellular solution, were applied to generate a cumulative concentration response curve. Each concentration of test compound was incubated for 5 minutes before addition of the next concentration. After the final concentration was tested a supramaximal concentration of either a known active positive modulator or the TMEM16A inhibitor, CaCCinhA01 (Del La Fuente et al, 2008) was added to define the upper and lower limits of the assay.

Compound activity was quantified by measuring the increase in current upon compound addition and expressing this as a percentage increase of baseline TMEM16A current level. Percentage increases in current were determined for each concentration and the data plotted as a function of concentration using either the Qpatch software or Graphpad Prism v6.05 providing the concentration which gave 50% of its maximal effect (EC$_{50}$) and maximum efficacy (percentage of baseline increase).

The method of calculating the results is illustrated in FIG. 1, which shows an example trace from the Qpatch TMEM16A assay. In FIG. 1, I$_{BL}$ equals baseline current, I$_{[\#1]}$ equals the peak current during test compound concentration 1 incubation period and so on.

Peak TMEM16A current at +70 mV was plotted as a function of time over the assay period. Baseline current (I$_{BL}$) was measured after a period of stabilisation. The increase in current for each compound addition was determined by taking the peak current during the incubation period and subtracting the current from the previous recording period and then expressing this as a percentage of the baseline current. For test compound concentration 1 in FIG. 1 this is:

$$(I_{[\#2]} - I_{[\#1]}/I_{BL}) \times 100$$

For each additional concentration tested the increase in current was determined by subtracting the current from the previous incubation period and normalising the baseline value—for test concentration 2 in FIG. 1 this is:

$$(I_{[\#1]} - I_{BL}/I_{BL}) \times 100$$

The values for each test concentration were plotted as a cumulative function of concentration e.g. for test concentration two this would be the sum of the peak changes measured during concentration one plus concentration two.

The results obtained for the example compounds are shown in Table 2, from which it can be seen that the compounds of the present invention are capable of significantly increasing the TMEM16A current level.

TABLE 2

% Potentiation shown by 3.33 µM solution of Test Compounds and Calculated $EC_{50}$ Values

| Example | % Potentiation @ 3.33 µM Avg | $EC_{50}$ Avg (µM) |
|---|---|---|
| 1 | 157.3 | 0.338 |
| 1.1 | 100.5 | 1.097 |
| 2 | 183.6 | 0.268 |
| 2.1 | 149.1 | 0.808 |
| 2.2 | 194.2 | 0.651 |
| 2.3 | 211.2 | 0.263 |
| 3 | 108.2 | 1.644 |
| 4 | 187.3 | 0.732 |
| 5 | 156.9 | 0.079 |
| 5.1 | 165.9 | 0.596 |
| 5.2 | 204.2 | 0.254 |
| 6 | 246.3 | 1.253 |
| 7 | 136.5 | 1.577 |
| 8 | 129.2 | 0.282 |
| 9 | 87.4 | 0.841 |
| 10 | 67.7 | 0.122 |
| 11 | 122.7 | 0.098 |
| 12 | 44.6 | 3.337 |
| 13 | 96.6 | 0.198 |
| 14 | 59.4 | |
| 15 | 58.6 | 1.056 |
| 16 | 137.3 | 0.502 |
| 17 | 118.3 | 0.918 |
| 18 | 95.9 | 0.156 |
| 19 | 181.6 | 0.936 |
| 20 | 85.9 | 0.776 |
| 21 | 262 | 0.099 |
| 21.1 | 275 | 0.227 |
| 21.2 | 272 | 0.15 |
| 22 | 149 | 0.168 |
| 23 | 153 | 0.052 |
| 24 | 69 | 1.096 |
| 24.1 | 106 | 0.176 |
| 24.2 | 137 | 0.12 |
| 25 | 57 | 0.036 |
| 25.1 | 142 | 0.076 |
| 25.2 | 83 | 0.2 |
| 25.3 | 104 | 0.076 |
| 25.4 | 120 | 0.13 |
| 25.5 | 66 | 0.223 |
| 26 | 69 | 0.098 |
| 27 | 96 | 0.156 |
| 28 | 82 | 0.61 |
| 29 | 183 | 0.496 |
| 30 | 66 | |
| 31 | 158 | |
| 31.1 | 108 | |
| 32 | 56.6 | 0.227 |

All literature and patent documents referred to herein are incorporated by reference to the fullest extent possible.

REFERENCES

Accurso F J, Moss R B, Wilmott R W, Anbar R D, Schaberg A E, Durham T A, Ramsay B W; TIGER-1 Investigator Study Group (2011) Denufosol tetrasodium in patients with cystic fibrosis and normal to mildly impaired lung function. Am J Respir Crit Care Med, 183(5):627-634.

Boucher R C (2007) Evidence for airway surface dehydration as the initiating event in C F airway disease. J Intern Med., 261(1):5-16.

Caputo A, Caci E, Ferrera L, Pedemonte N, Barsanti C, Sondo E, Pfeffer U, Ravazzolo R, Zegarra-Moran O & Galietta L J (2008) TMEM16A, a membrane protein associated with calcium-dependent chloride channel activity. Science, 322(5901):590-594.

Del La Fuente R, Namkung W, Mills A & Verkman A S (2008) Small molecule screen identifies inhibitors of a human intestinal calcium-activated chloride channel. Mol Pharmacol, 73(3):758-768.

Kellerman D, Rossi Mospan A, Engels J, Schaberg A, Gorden J & Smiley L (2008) Denufosol: a review of studies with inhaled P2Y(2) agonists that led to Phase 2. Pulm Pharmacol Ther, 21(4):600-607.

Kunzelmann K & Mall M (2003) Pharmacotherapy of the ion transport defect in cystic fibrosis: role of purinergic receptor agonists and other potential therapeutics. Am J Respir Med, 2(4):299-309.

Matsui H, Grubb B R, Tarran R, Randell S H, Gatzy J T, Davis C W and Boucher R C (1998) Evidence for periciliary liquid layer depletion, not abnormal ion composition, in the pathogenesis of cystic fibrosis airways disease. Cell, 95(7):1005-15.

Moss R B (2013) Pitfalls of drug development: lessons learned from trials of denufosol in cystic fibrosis. J Pediatr, 162(4):676-680.

Pedemonte N & Galietta L J (2014) Structure and function of TMEM16 proteins (anoctamins). Physiol Rev, 94(2): 419-459.

Pezzulo A A, Tang X X, Hoegger M J, Abou Alaiwa M H, Ramachandran S, Moninger T O, Karp P H, Wohlford-Lenan C L, Haagsman H P, van Eijk M, Banfi B, Horswill A R, Stoltz D A, McCray P B Jr, Welsh M J & Zabner J (2012) reduced airway surface pH impairs bacterial killing in the porcine cystic fibrosis lung. Nature, 487(7405): 109-113.

Yang Y D, Cho H, Koo J Y, Tak M H, Cho Y, Shim W S, Park S P, Lee J, Lee B, Kim B M, Raouf R, Shin Y K & Oh U (2008) TMEM16 confers receptor-activated calcium-dependent chloride conductance. Nature, 455(7217):1210-1215.

The invention claimed is:

1. A compound selected from:
2-(1-Adamantyl)-N-[2-(tetrahydropyran-2-ylmethyl)-1H-benzimidazol-5-yl] acetamide (Compound 1.1);
2-(2-Adamantyl)-N-(2-benzyl-1H-benzimidazol-5-yl) (Compound 2);
2-(2-Adamantyl)-N-[2-(2-phenylethyl)-1H-benzimidazol-5-yl]acetamide (Compound 2.1);
2-(2-Adamantyl)-N-[2-[methoxy (phenyl)methyl]-1H-benzimidazol-5-yl]acetamide (Compound 2.2);
2-(2-Adamantyl)-N-[2-[(2-methoxyphenyl)methyl]-1H-benzimidazol-5-yl]acetamide (Compound 2.3);
2-(2-Adamantyl)-N-[2-[(R)-methylamino (phenyl) methyl]-1H-benzimidazol-5-yl]acetamide (Compound 3);
2-(1-Adamantyl)-N-[2-[(2-chloro-3-pyridyl)methyl]-1H-benzimidazol-5-yl]acetamide (Compound 4);

2-(2-Adamantyl)-N-[2-[(2-hydroxyphenyl)methyl]-1H-benzimidazol-5-yl]acetamide (Compound 5);

2-(2-Adamantyl)-N-[2-[(4-hydroxyphenyl)methyl]-1H-benzimidazol-5-yl]acetamide (Compound 5.1);

2-(2-Adamantyl)-N-[2-[(5-chloro-2-hydroxy-phenyl)methyl]-1H-benzimidazol-5-yl]acetamide (Compound 5.2);

2,2,2-Trifluoroethyl N-[[5-[[2-(1-adamantyl)acetyl]amino]-1H-benzimidazol-2-yl]methyl]carbamate (Compound 6);

2-(1-Adamantyl)-N-[2-[[3-(3,5-dimethylisoxazol-4-yl)phenyl]methyl]-3H-benzimidazol-5-yl]acetamide (Compound 7);

tert-Butyl N-[[5-[[2-(2-adamantyl)acetyl]amino]-1H-benzimidazol-2-yl]methyl]carbamate (Compound 8);

2-(2-Adamantyl)-N-(2-tetrahydrofuran-3-yloxy-1H-benzimidazol-5-yl)acetamide (Compound 9);

N-(Cycloheptylmethyl)-2-[(2-hydroxyphenyl)methyl]-1,3-benzoxazole-5-carboxamide (Compound 10);

2-(1-Adamantyl)-N-[3-amino-2-[(2-hydroxyphenyl)methyl]indazol-6-yl]acetamide (Compound 11);

2-Cyclohexyl-N-(2-isopropyl-1,3-benzoxazol-5-yl)acetamide (Compound 12);

N-(Cycloheptylmethyl)-2-[(2-hydroxyphenyl)methyl]indazole-6-carboxamide (Compound 13);

2-(1-Adamantyl)-N-(2-benzyl-3H-imidazo[4,5-c]pyridin-6-yl)acetamide (Compound 14);

2-Benzyl-N-(cycloheptylmethyl) imidazo[1,2-a]pyridine-7-carboxamide (Compound 15);

2-(1-Adamantyl)-N-(2-benzylindazol-6-yl)acetamide (Compound 16);

2-(1-Adamantyl)-N-(2-benzyl-3-methyl-indazol-6-yl)acetamide (Compound 17);

N-(2-tert-Butyl-1H-benzimidazol-5-yl)-2-(5-chloro-2-hydroxy-phenyl)acetamide (Compound 18);

tert-Butyl N-[3-[(2-benzyl-1H-benzimidazole-5-carbonyl)amino]-2,2-dimethyl-propyl]carbamate (Compound 19);

2-tert-Butyl-N-(cycloheptylmethyl)-3H-benzimidazole-5-carboxamide (Compound 20);

2-[(4-tert-Butyl-2-fluoro-5-hydroxy-phenyl)methyl]-N-[1-(trifluoromethyl) cyclopropyl]-1H-benzimidazole-5-carboxamide (Compound 21);

2-[(4-tert-Butyl-2-fluoro-5-hydroxy-phenyl)methyl]-N-[[1-(trifluoromethyl) cyclopropyl]methyl]-1H-benzimidazole-5-carboxamide (Compound 21.1);

2-[(4-tert-Butyl-2-fluoro-5-hydroxy-phenyl)methyl]-N-(3,3,3-trifluoropropyl)-1H-benzimidazole-5-carboxamide (Compound 21.2);

2-[(4-tert-Butyl-2-fluoro-5-hydroxy-phenyl)methyl]-N-[1-(trifluoromethyl) cyclopropyl]-1,3-benzoxazole-5-carboxamide (Compound 21.3);

2-[(4-tert-Butyl-2-fluoro-5-hydroxy-phenyl)methyl]-N-[[1-(trifluoromethyl) cyclopropyl]methyl]-1,3-benzoxazole-5-carboxamide (Compound 21.4);

2-[2-Fluoro-5-hydroxy-4-(1-hydroxy-1-methyl-ethyl)phenyl]-N-[2-[1-(trifluoromethyl) cyclopropyl]-1H-benzimidazol-5-yl]acetamide (Compound 22);

2-(4-tert-Butyl-2-fluoro-5-hydroxy-phenyl)-N-[2-[1-(trifluoromethyl) cyclopropyl]-1H-benzimidazol-5-yl]acetamide (Compound 23);

2-Benzyl-N-(3,3,3-trifluoropropyl)-1H-benzimidazole-5-carboxamide (Compound 24);

2-Benzyl-N-(cycloheptylmethyl)-1H-benzimidazole-5-carboxamide (Compound 24.2);

N-(Cycloheptylmethyl)-2-[(2-fluoro-6-hydroxy-phenyl)methyl]-1H-benzimidazole-5-carboxamide (Compound 25);

N-(Cycloheptylmethyl)-2-[(5-fluoro-2-hydroxy-phenyl)methyl]-1H-benzimidazole-5-carboxamide (Compound 25.1);

N-(Cycloheptylmethyl)-2-[(3-fluoro-2-hydroxy-phenyl)methyl]-1H-benzimidazole-5-carboxamide (Compound 25.2);

N-(Cycloheptylmethyl)-2-[(2-hydroxy phenyl)methyl]-1H-benzimidazole-5-carboxamide (Compound 25.3);

N-(Cycloheptylmethyl)-2-[(4-fluoro-2-hydroxy-phenyl)methyl]-1H-benzimidazole-5-carboxamide (Compound 25.4);

N-(Cycloheptylmethyl)-2-[(3-hydroxyphenyl)methyl]-1H-benzimidazole-5-carboxamide (Compound 25.5);

2-(5-Chloro-2-hydroxy-phenyl)-N-[2-(2,2-dimethylpropyl)-1H-benzimidazol-5-yl]acetamide (Compound 26);

N-(2-tert-Butyl-1H-benzimidazol-5-yl)-2-(5-chloro-2-hydroxy-phenyl)acetamide (Compound 27);

N-(Cycloheptylmethyl)-2-(1-methylcyclobutyl)-3H-benzimidazole-5-carboxamide (Compound 28);

2-[[2-Fluoro-5-hydroxy-4-(2-hydroxy-1,1-dimethyl-ethyl)phenyl]methyl]-N-[[1-(trifluoromethyl)cyclopropyl]methyl]-1H-benzimidazole-5-carboxamide (Compound 29);

2-[[2-Fluoro-5-hydroxy-4-(2-hydroxy-1,1-dimethyl-ethyl)phenyl]methyl]-N-(3,3,3-trifluoropropyl)-1H-benzimidazole-5-carboxamide (Compound 29.1);

N-[[2-Fluoro-5-hydroxy-4-(2-hydroxy-1,1-dimethyl-ethyl)phenyl]methyl]-2-[1-(trifluoromethyl)cyclopropyl]-1H-benzimidazole-5-carboxamide (Compound 30);

2-[[2-Fluoro-5-hydroxy-4-(1-hydroxy-1-methyl-ethyl)phenyl]methyl]-N-(3,3,3-trifluoropropyl)-1H-benzimidazole-5-carboxamide (Compound 31);

2-[[2-Fluoro-5-hydroxy-4-(1-hydroxy-1-methyl-ethyl)phenyl]methyl]-N-[1-(trifluoromethyl)cyclopropyl]-1H-benzimidazole-5-carboxamide (Compound 31.1);

2-[[5-Fluoro-2-hydroxy-3-(2-hydroxy-1,1-dimethyl-ethyl)phenyl]methyl]-N-[[1-(trifluoromethyl)cyclopropyl]methyl]-1H-benzimidazole-5-carboxamide (Compound 32);

2-[(4-tert-Butyl-2-fluoro-5-hydroxy-phenyl)methyl]-N-[1-(trifluoromethyl)cyclopropyl] imidazo[1,2-a]pyridine-7-carboxamide (Compound 33);

and salts and solvates of the above.

2. The compound of claim 1, wherein the compound is 2-(2-Adamantyl)-N-[2-[(2-hydroxyphenyl)methyl]-1H-benzimidazol-5-yl]acetamide (Compound 5); or a salt thereof.

3. The compound of claim 1, wherein the compound is 2-(2-Adamantyl)-N-[2-[(5-chloro-2-hydroxy-phenyl)methyl]-1H-benzimidazol-5-yl]acetamide (Compound 5.2); or a salt thereof.

4. The compound of claim 1, wherein the compound is 2-(4-tert-Butyl-2-fluoro-5-hydroxy-phenyl)-N-[2-[1-(trifluoromethyl)cyclopropyl]-1H-benzimidazol-5-yl]acetamide (Compound 23); or a salt thereof.

5. The compound of claim 1, wherein the compound is N-(Cycloheptylmethyl)-2-[(2-hydroxyphenyl)methyl]indazole-6-carboxamide (Compound 13); or a salt thereof.

6. The compound of claim 1, wherein the compound is 2-[2-Fluoro-5-hydroxy-4-(1-hydroxy-1-methyl-ethyl)phenyl]-N-[2-[1-(trifluoromethyl)cyclopropyl]-1H-benzimidazol-5-yl]acetamide (Compound 22); or a salt thereof.

7. A pharmaceutical composition comprising a compound according to claim 1 and a pharmaceutically acceptable excipient.

8. A method for the treatment or prophylaxis of diseases and conditions affected by modulation of TMEM 16A, the method comprising administering to a patient in need of such treatment an effective amount of a compound according to claim 1.

* * * * *